(12) United States Patent
Liu et al.

(10) Patent No.: US 12,530,083 B2
(45) Date of Patent: Jan. 20, 2026

(54) FEEDBACK METHOD AND RELATED DEVICE

(71) Applicant: HUAWEI TECHNOLOGIES CO., LTD., Guangdong (CN)

(72) Inventors: Yishuo Liu, Shenzhen (CN); Da-Yuan Huang, Shenzhen (CN); Wei Li, Toronto (CA); Che Yan, Shenzhen (CN); Xuan Zhou, Shenzhen (CN); Yunjing Zhao, Shenzhen (CN); Alice Jing Fei Liang, Shenzhen (CN); Hongting Li, Shenzhen (CN); Xueyan Huang, Shenzhen (CN); Zhuo Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 64 days.

(21) Appl. No.: 18/343,948

(22) Filed: Jun. 29, 2023

(65) Prior Publication Data

US 2023/0359279 A1    Nov. 9, 2023

Related U.S. Application Data

(63) Continuation of application No. PCT/CN2021/141838, filed on Dec. 28, 2021.

(30) Foreign Application Priority Data

Dec. 30, 2020    (CN) .......................... 202011628845.7

(51) Int. Cl.
*G06F 3/01*    (2006.01)
*G06F 3/04886*    (2022.01)
*G06F 3/044*    (2006.01)

(52) U.S. Cl.
CPC .......... *G06F 3/016* (2013.01); *G06F 3/04886* (2013.01); *G06F 3/044* (2013.01); *G06F 2203/04803* (2013.01)

(58) Field of Classification Search
CPC ...... G06F 3/016; G06F 3/04886; G06F 3/044; G06F 2203/04803; G06F 3/01; G06F 3/048; G06F 3/041
See application file for complete search history.

(56) References Cited

U.S. PATENT DOCUMENTS 8,599,152 B1    12/2013    Wurtenberger et al.
2007/0236474 A1*   10/2007    Ramstein ................ G06F 3/016
                                              345/173

(Continued)

FOREIGN PATENT DOCUMENTS

CN    102236505 A    11/2011
CN    105446646 A    3/2016

(Continued)

*Primary Examiner* — Michael A Faragalla
(74) *Attorney, Agent, or Firm* — WOMBLE BOND DICKINSON (US) LLP

(57) ABSTRACT

An embodiment provides a feedback method, applied to an electronic device provided with a touchscreen. The touchscreen is provided with a plurality of vibration feedback elements. The method includes detecting a first contact operation acting on the touchscreen, and obtaining first location information of a first contact point corresponding to the first contact operation, where the first location information corresponds to a first virtual key on a virtual keyboard. The method also includes if the first virtual key is an anchor point key, obtaining, from the plurality of vibration feedback elements, a first vibration feedback element that matches the first virtual key, and indicating the first vibration feedback element to emit a vibration wave, to prompt that the first virtual key is an anchor point key, so that the user can sense (Continued)

a location of the anchor point key. This can reduce difficulty in implementing touch typing on the touchscreen.

17 Claims, 88 Drawing Sheets

(56) References Cited

U.S. PATENT DOCUMENTS

| | | | | |
|---|---|---|---|---|
| 2014/0109016 A1* | 4/2014 | Ouyang | ............. | G06F 3/04812 |
| | | | | 715/856 |
| 2018/0067646 A1* | 3/2018 | Chang | ................. | G06F 3/04845 |
| 2019/0064997 A1* | 2/2019 | Wang | ................. | G06F 3/04886 |
| 2020/0371593 A1* | 11/2020 | Araújo | .................... | G06F 3/016 |

FOREIGN PATENT DOCUMENTS

| CN | 105892919 A | 8/2016 |
|---|---|---|
| CN | 106445369 A | 2/2017 |
| CN | 107632667 A | 1/2018 |
| CN | 109683794 A | 4/2019 |

* cited by examiner (a)

(b)

(a)

(b)

FEEDBACK METHOD AND RELATED DEVICE

CROSS-REFERENCE TO RELATED APPLICATIONS

This application is a continuation of International Application No. PCT/CN2021/141838, filed on Dec. 28, 2021, which claims priority to Chinese Patent Application No. 202011628845.7, filed on Dec. 30, 2020. The disclosures of the aforementioned applications are hereby incorporated by reference in their entireties.

TECHNICAL FIELD

This application relates to the field of computer technologies, and in particular, to a feedback method and a related device.

BACKGROUND

A most common manner of providing text input for a computer system is implemented by using a keyboard, but the keyboard is not a very portable device. Therefore, a virtual keyboard is provided on a touchscreen in the common text input manner, and a user may input texts by using the virtual keyboard.

However, the virtual keyboard lacks many features of a physical keyboard. As a result, it is a difficult task to implement touch typing on the virtual keyboard.

SUMMARY

Embodiments of this application provide a feedback method and a related device. When a user touches an anchor point key on a virtual key, a first feedback operation is performed by using a touchscreen, to prompt the user that the user currently touches the anchor point key, so that the user can sense a location of the anchor point key. This reduces difficulty in implementing touch typing on the touchscreen.

To resolve the foregoing technical problem, embodiments of this application provide the following technical solutions.

According to a first aspect, an embodiment of this application provides a feedback method, which may be used in the field of virtual keyboards. The method is applied to an electronic device. The electronic device is provided with a touchscreen. The touchscreen is provided with a plurality of vibration feedback elements. The method includes: The electronic device detects a first contact operation acting on the touchscreen, and obtains, in response to the first contact operation, first location information of a first contact point corresponding to the first contact operation. The first location information corresponds to a first virtual key on the virtual keyboard. If the first virtual key is an anchor point key, the electronic device obtains one or more first vibration feedback elements from the plurality of vibration feedback elements. The first vibration feedback element is a vibration feedback element that matches the first virtual key. Vibration feedback elements that match different virtual keys are not completely the same. The virtual keyboard may be represented as any type of keyboard. For example, the virtual keyboard may be a full-size keyboard, a numeric keyboard, a function keyboard. Alternatively, the virtual keyboard may be a collective name of all operation keys on the touchscreen. Meaning of the anchor point key is not equivalent to that of a positioning key, that is, the anchor point key means a key used to prompt a user. After a currently displayed virtual keyboard is determined, a specific virtual key may be preconfigured as an anchor point key in the electronic device, in other words, a specific virtual key may be predetermined as an anchor point key. Alternatively, a specific virtual key may be customized by the user as an anchor point key, that is, the user may define a specific virtual key as an anchor point key in a "setting" interface of the electronic device. Further, for a process of determining, based on the first location information, whether the first virtual key is an anchor point key, in an embodiment, the electronic device obtains, based on the first location information, the first virtual key corresponding to the first contact point, and then determines whether the first virtual key is an anchor point key. In another embodiment, the electronic device may prestore a specific location region on the touchscreen as a location region of the anchor point key, and a specific location region on the touchscreen as a location region of a non-anchor point key. The electronic device directly determines, based on the first location information, whether the first contact point is located in the location region of the anchor point key, to determine whether the first virtual key corresponding to the first location information is an anchor point key. The electronic device indicates the first vibration feedback elements that match the first virtual key to emit a vibration wave, to perform a first feedback operation. The first feedback operation is used to prompt that the first virtual key is an anchor point key.

In this embodiment, when the user touches an anchor point key in the virtual key, the user performs a first feedback operation by using the touchscreen, to prompt the user that the user is currently touching an anchor point key, so that the user can sense a location of the anchor point key. This can reduce difficulty in implementing touch typing on the touchscreen. In addition, the touchscreen is provided with a plurality of vibration feedback elements. If the first virtual key is determined as an anchor point key, at least one first vibration feedback element that matches the first virtual key is obtained from the plurality of vibration feedback elements. The at least one first vibration feedback is indicated to emit a vibration wave. This can generate vibration feedback effect only around the first virtual key, in other words, vibration feedback is not performed on a full screen. All fingers are placed on the touchscreen during typing. If the full screen vibrates, all fingers feel vibration. The user is likely to be confused. However, if the vibration feedback effect is generated only around the first virtual key, the user is not likely to be confused. It is easier to help the user form a muscle memory at the finger, to assist the user in implementing touch typing on the touchscreen.

In a possible embodiment of the first aspect, after the electronic device obtains the first location information of the first contact point corresponding to the first contact operation, the method further includes: The electronic device obtains, based on the first location information, the first virtual key corresponding to the first contact point. In this embodiment, the first virtual key corresponding to the first contact point can be obtained in real time based on the first location information. In this way, this solution is compatible with both a virtual keyboard whose location is fixed and a virtual keyboard whose location is movable. This expands an application scenario of this solution.

In a possible embodiment of the first aspect, a first mapping relationship is configured for the electronic device. The first mapping relationship indicates a correspondence between virtual keys and vibration feedback elements. That the electronic device obtains a first vibration feedback element from the plurality of vibration feedback elements includes: The electronic device obtains, based on the first mapping relationship and the first virtual key, a first vibration feedback element that matches the first virtual key. Optionally, the electronic device is preconfigured with a plurality of mapping relationships that are in a one-to-one correspondence with a plurality of types of virtual keyboards, and each mapping relationship includes a correspondence between a plurality of virtual keys and a plurality of first vibration feedback elements. Then, before obtaining, based on the first mapping relationship and the first virtual key, the first vibration feedback element that matches the first virtual key, the electronic device needs to first obtain, from the plurality of mapping relationships, a first mapping relationship that matches a type of a currently displayed virtual keyboard.

In this embodiment, the first mapping relationship is preconfigured, so that after the first virtual key is obtained, at least one first vibration feedback element that matches the first virtual key can be obtained based on the first mapping relationship. This is convenient and helps improve efficiency of a matching process of the vibration feedback element. The operation of determining the vibration feedback element is split, so that when a fault occurs, a fault location can be precisely located.

In a possible embodiment of the first aspect, a first mapping relationship is configured for the electronic device. The first mapping relationship indicates a correspondence between the location information and the vibration feedback element. That the electronic device obtains a first vibration feedback element from the plurality of vibration feedback elements includes: The electronic device obtains, based on the first mapping relationship and first location information, a first vibration feedback element that matches the first location information. Because the first location information corresponds to the first virtual key on the virtual keyboard, it means obtaining the first vibration feedback element corresponding to the first virtual key. In this embodiment, at least one first vibration feedback element that matches the first virtual key can be obtained based on the first location information and the first mapping relationship. This is convenient and helps improve efficiency of a matching process of the vibration feedback element. In addition, the first mapping relationship can indicate a correspondence between the first location information and one first vibration feedback element. In this way, this solution is compatible with both a virtual keyboard whose location is fixed and a virtual keyboard whose location is movable. This ensures that vibration feedback can be provided in various scenarios.

In a possible embodiment of the first aspect, before the electronic device emits the vibration wave by using the first vibration feedback element, the method further includes: The electronic device obtains a vibration intensity of a vibration wave corresponding to each of at least one first vibration feedback element. The vibration intensity of the vibration wave of each of the at least one first vibration feedback element is related to any one or more of the following factors: a first quantity, a distance between each first vibration feedback unit and a central point of the first virtual key, a type of the vibration wave, whether the virtual key is an anchor point key, or a location type of the first location information. The first quantity is a quantity of the first vibration feedback elements. That the electronic device emits a vibration wave by using the first vibration feedback element includes: The electronic device emits, based on the vibration intensity of the vibration wave corresponding to each first vibration feedback element, the vibration wave by using the at least one first vibration feedback element, so that a difference between a vibration feedback intensity corresponding to the first virtual key and a vibration feedback intensity corresponding to a second virtual key falls within a preset intensity range. The second virtual key and the first virtual key are different virtual keys. The preset intensity range may be an intensity difference within 2%, an intensity difference within 3%, an intensity difference within 4%, or an intensity difference within 5%. Further, in a process of measuring an intensity on a surface of the touchscreen, a probe of a vibration measurement instrument may be attached to a surface of one virtual key (namely, a detection point) on the touchscreen, to collect a vibration wave at the detection point and further obtain a waveform curve of the collected vibration wave. The waveform curve indicates a vibration feedback intensity corresponding to the detection point. Further, the difference between the vibration feedback intensity corresponding to the first virtual key and the vibration feedback intensity corresponding to the second virtual key may be obtained by comparing a waveform curve measured at a detection point of the first virtual key and a waveform curve measured at a detection point of the second virtual key.

In this embodiment, different virtual keys may correspond to different quantities of vibration feedback elements. Therefore, the intensity of each vibration feedback element is determined based on a quantity of matched vibration feedback elements, so that a difference between vibration feedback intensities of the virtual keys falls within a preset range. When the user uses a physical key, force feedbacks provided by different keys are basically the same. Therefore, a difference between the virtual keyboard and the physical keyboard can be reduced, and user viscosity is enhanced.

In a possible embodiment of the first aspect, the first vibration feedback element is any one type of the following: a piezoelectric ceramic sheet, a linear motor, or a piezoelectric film. In this embodiment, a plurality of specific representation forms of the vibration feedback element are provided, improving implementation flexibility of this solution.

In a possible embodiment of the first aspect, the first contact point is a newly added contact point on the touchscreen. In this embodiment of this application, when using a physical keyboard, the user usually focuses on an actual key that is newly touched. This solution generates feedback only for a newly added contact point, to better simulate user experience of inputting by using the physical keyboard. In addition, the feedback is generated only for the newly added contact point. It is easier to establish a memory relationship between the user and the newly added contact point, further reducing difficulty in touch typing training on the touchscreen.

In a possible embodiment of the first aspect, the method further includes: If the first virtual key is a non-anchor point key, the electronic device performs a second feedback operation. The second feedback operation is used to prompt that the first virtual key is a non-anchor point key, and the first feedback operation and the second feedback operation are different feedback operations. In this embodiment, feedback operations are performed in both cases in which the first virtual key is an anchor point key or the first virtual key is a non-anchor point key. The first feedback operation and the second feedback operation are different feedback operations. When the user uses the physical keyboard, each key provides feedback for the user. In the foregoing manner, a similarity between the virtual keyboard and the physical keyboard can be increased. In addition, different feedback operations are provided for the anchor point key and the non-anchor point key. This can also help the user remember different types of keys, and help the user implement touch typing on the virtual keyboard.

In a possible embodiment of the first aspect, the first feedback operation is emitting a first type of vibration wave by using the touchscreen, and the second feedback operation is emitting a second type of vibration wave by using the touchscreen. The first type of vibration wave and the second type of vibration wave are different types of vibration waves. If the electronic device emits a continuous vibration wave by using the vibration feedback element, different types of vibration waves are different in any one or more of the following characteristics: a vibration amplitude, a vibration frequency, vibration duration, or an envelope shape. If the electronic device emits a vibration wave in a pulse form by using the vibration feedback element, different types of vibration waves are different in any one or more of the following characteristics: a vibration amplitude, a vibration frequency, vibration duration, an envelope shape, or a frequency of a vibration wave in a pulse form that is emitted by the electronic device.

In a possible embodiment of the first aspect, before the electronic device performs the first feedback operation, the method further includes: The electronic device obtains, based on the first location information, a location type corresponding to the first contact point. The location type includes that the first contact point is located in a first location region (which may also be referred to as a characteristic region of an anchor point key) of the first virtual key and that the first contact point is located in a second location region (which may also be referred to as a side region of the anchor point key) of the first virtual key. The first location region is different from the second location region. That the electronic device performs a first feedback operation includes: The electronic device performs the first feedback operation by using the touchscreen based on the location type corresponding to the first contact point. A feedback operation corresponding to the first location region is different from a feedback operation corresponding to the second location region.

In this embodiment, all location regions of the anchor point key and/or the non-anchor point key are divided into the first location region and the second location region. If the first contact point is located in the first location region, and if the first contact point is located in the second location region, the electronic device emits different types of vibration waves by using at least one first vibration feedback element. This helps the user remember a boundary of the virtual key, in other words, helps the user establish a muscle memory for different regions of the virtual key, to further reduce difficulty in implementing touch typing on the touchscreen.

In a possible embodiment of the first aspect, a feedback operation corresponding to a first location region of an anchor point key is the same as a feedback operation corresponding to a first location region of a non-anchor point key, and a feedback operation corresponding to a second location region of the anchor point key is different from a feedback operation corresponding to a second location region of the non-anchor point key. Alternatively, a feedback operation corresponding to a first location region of an anchor point key is different from a feedback operation corresponding to a first location region of a non-anchor point key, and a feedback operation corresponding to a second location region of the anchor point key is the same as a feedback operation corresponding to a second location region of the non-anchor point key. Alternatively, a feedback operation corresponding to a first location region of an anchor point key is different from a feedback operation corresponding to a first location region of a non-anchor point key, and a feedback operation corresponding to a second location region of the anchor point key is different from a feedback operation corresponding to a second location region of the non-anchor point key.

In a possible embodiment of the first aspect, the first contact operation is a press operation, and the method further includes: The electronic device detects a second contact operation acting on the touchscreen, and obtains second location information of a second contact point corresponding to the second contact operation, where the second contact operation is a touch operation. The electronic device changes a tactile characteristic of the second contact point on the touchscreen in response to the second contact operation. The tactile characteristic includes any one or more of the following characteristics: a sliding friction coefficient, a stick slip property, and a temperature.

In a possible embodiment of the first aspect, before the electronic device detects the first contact operation acting on the touchscreen, the method further includes: The electronic device detects a first gesture operation acting on the touchscreen, and selects, in response to the first gesture operation, a first type of virtual keyboard corresponding to the first gesture operation from a plurality of types of virtual keyboards. Virtual keys included in different types of virtual keyboards in the plurality of types of virtual keyboards are not completely the same. The electronic device displays the first type of virtual keyboard by using the touchscreen. A location of the first type of virtual keyboard on the touchscreen is fixed in the process of displaying the first type of virtual keyboard. That the electronic device detects a first contact operation acting on the touchscreen includes: The electronic device detects the first contact operation acting on the touchscreen in the process of displaying the first type of virtual keyboard. Meaning of the nouns, specific embodiment operations, and beneficial effects in this embodiment are described in the following seventh aspect. Details are not described herein.

According to a second aspect, an embodiment of this application provides an electronic device, which may be used in the field of virtual keyboards. The electronic device is provided with a touchscreen. The touchscreen includes a tactile sensing module and a vibration feedback module. The vibration feedback module includes a plurality of vibration feedback elements. The tactile sensing module is configured to obtain first location information of a first contact point on the touchscreen. The tactile sensing module may be specifically represented as a tactile sensing film, and the tactile sensing film may be specifically a capacitive tactile sensing film, a pressure tactile sensing film, a temperature tactile sensing film, or another type of film. The first vibration feedback element is configured to emit a vibration wave if a first virtual key corresponding to the first contact point is an anchor point key. The vibration wave is used to prompt that the first virtual key is an anchor point key. The first vibration feedback element is any one type of the following: a piezoelectric ceramic sheet, a linear motor, or a piezoelectric film. The first virtual key is a virtual key on a virtual keyboard. The first vibration feedback element is a vibration feedback element that matches the first virtual key in the plurality of vibration feedback elements.

In a possible embodiment of the second aspect, the first contact point is obtained based on a press operation acting on the touchscreen. The touchscreen further includes a cover and an ultrasonic module. The ultrasonic module is configured to emit an ultrasonic wave to change a tactile characteristic of the cover. Specifically, the tactile sensing module is further configured to obtain second location information of a second contact point on the touchscreen. The ultrasonic module is specifically configured to emit an ultrasonic wave if the second contact point is obtained based on a touch operation acting on the touchscreen, to change the tactile characteristic of the cover. Alternatively, the touchscreen further includes a cover and an electrostatic module. The electrostatic module is configured to generate an electrical signal to change a tactile characteristic of the cover. Specifically, the tactile sensing module is further configured to obtain second location information of a second contact point on the touchscreen. The electrostatic module is specifically configured to generate an electrical signal if the second contact point is obtained based on a touch operation acting on the touchscreen, to change the tactile characteristic of the cover. The tactility characteristic includes any one or more of the following characteristics: a sliding friction coefficient, a stick slip property, and a temperature.

In this embodiment, the touchscreen may further change the tactile characteristic of the cover by disposing the ultrasonic module or the electrostatic module, to provide more abundant tactile feedback. In this way, the user may implement touch typing training on the touchscreen based on the more abundant tactile feedback, to further reduce difficulty in implementing touch typing on the touchscreen.

In a possible embodiment of the second aspect, the touchscreen further includes a pressure sensing module. The pressure sensing module and the vibration feedback module are integrated. The vibration feedback element is a piezoelectric ceramic sheet, a piezoelectric polymer, or a piezoelectric composite. The pressure sensing module is configured to collect a pressure value corresponding to a first contact operation, to determine whether the first contact operation is a press operation or a touch operation. Specifically, in one case, a plurality of vibration feedback elements included in the vibration feedback module (which may also be referred to as the pressure sensing module) may be classified. A second vibration feedback element in the plurality of vibration feedback elements is configured to collect a pressure value. A third vibration feedback element in the plurality of vibration feedback elements is configured to emit a vibration wave to perform vibration feedback. The second vibration feedback element and the third vibration feedback element are different vibration feedback elements. In another case, a plurality of vibration feedback elements in the vibration feedback module (which may also be referred to as the pressure sensing module) are configured to collect the pressure value in a first time period, and are configured to emit a vibration wave in a second time period. The first time period is different from the second time period.

In this embodiment, the touchscreen is further provided with the pressure sensing module for collecting the pressure value. In this way, both the location information and the pressure value of the contact point can be obtained, so that further detailed management may be performed on the contact operation obtained by using the touchscreen. In addition, the pressure sensing module and the vibration feedback module are integrated. This helps reduce a thickness of the touchscreen, further improving convenience of the electronic device.

For concepts of the nouns, specific embodiment operations and beneficial effects in the second aspect and some possible embodiments of the second aspect of embodiments of this application, refer to the descriptions in the possible embodiments of the first aspect. Details are not described herein again.

According to a third aspect, an embodiment of this application provides an electronic device, which may be used in the field of virtual keyboards. The electronic device includes a touchscreen, a memory, one or more processors, and one or more programs. The touchscreen is provided with a plurality of vibration feedback elements. The one or more programs are stored in the memory. When the one or more processors execute the one or more programs, the electronic device is enabled to perform the following operations: detecting a first contact operation acting on the touchscreen; obtaining, in response to the first contact operation, first location information of a first contact point corresponding to the first contact operation, where the first location information corresponds to a first virtual key on the virtual keyboard; if the first virtual key is an anchor point key, obtaining a first vibration feedback element from the plurality of vibration feedback elements, where the first vibration feedback element is a vibration feedback element that matches the first virtual key; and indicating the first vibration feedback element to emit a vibration wave, to perform a first feedback operation, where the first feedback operation is used to prompt that the first virtual key is an anchor point key.

In the third aspect of embodiments of this application, the electronic device may further perform the operations performed by the electronic device in the possible embodiments of the first aspect. For a specific embodiment of a specific operation in the third aspect and the possible embodiments of the third aspect of embodiments of this application, and a beneficial effect of each possible embodiment, refer to the descriptions in the possible embodiments of the first aspect. Details are not described herein again.

According to a fourth aspect, an embodiment of this application provides a computer program. When the computer program is run on a computer, the computer is enabled to perform the feedback method according to the first aspect.

According to a fifth aspect, an embodiment of this application provides an electronic device, including a processor. The processor is coupled to a memory. The memory is configured to store a program. The processor is configured to execute the program in the memory, so that an execution device is enabled to perform the feedback method according to the first aspect.

According to a sixth aspect, an embodiment of this application provides a computer-readable storage medium. The computer-readable storage medium stores a computer program, and when the computer program is run on a computer, the computer is enabled to perform the feedback method according to the first aspect.

According to a seven aspect, an embodiment of this application provides a chip system. The chip system includes a processor, configured to implement functions in the first aspect, for example, sending or processing of data and/or information in the foregoing method. In a possible design, the chip system further includes a memory. The memory is configured to store program instructions and data that are necessary for a server or a communication device. The chip system may include a chip, or may include a chip and another discrete component.

According to an eighth aspect, an embodiment of this application provides a virtual keyboard processing method, which may be applied to the field of human-computer interaction. The method is applied to an electronic device, where the electronic device is provided with a display. The method includes: The electronic device detects a first gesture operation acting on the display, and selects, in response to the detected first gesture operation, a first type of virtual keyboard corresponding to the first gesture operation from a plurality of types of virtual keyboards. Virtual keys included in different types of virtual keyboards in the plurality of types of virtual keyboards are not completely the same. The electronic device displays the first type of virtual keyboard by using the display.

In this embodiment, the electronic device is provided with a plurality of different types of virtual keyboards, and the virtual keys included in the different types of virtual keyboards are not completely the same. A user can enable different types of virtual keyboards through different gesture operations. In other words, the virtual keyboard no longer displays only 26 letters, but provides more virtual keys for the user by using the different types of virtual keyboards. This improves flexibility of a process in which the user enables the virtual keyboard, and helps provide more abundant virtual keys, so that an additional physical keyboard does not need to be provided.

In a possible embodiment of the eighth aspect, that the electronic device selects a first type of virtual keyboard corresponding to the first gesture operation from a plurality of types of virtual keyboards includes: The electronic device selects, according to a first rule, the first type of virtual keyboard corresponding to the first gesture operation from the plurality of types of virtual keyboards. The first rule indicates a correspondence between a plurality of types of gesture operations and the plurality of types of virtual keyboards. In this embodiment, the first rule is preconfigured for the electronic device. The first rule indicates the correspondence between the plurality of types of gesture operations and the plurality of types of virtual keyboards. After detecting the first gesture operation acting on the display, the electronic device may obtain, according to the first rule, the first type of virtual keyboard corresponding to the specific first gesture operation. This can improve efficiency of a matching process of the virtual keyboard.

In a possible embodiment of the eighth aspect, in one case, the first rule directly includes the correspondence between the plurality of types of gesture operations and the plurality of types of virtual keyboards. The first rule includes a correspondence between a plurality of pieces of first identification information and a plurality of pieces of second identification information. The first identification information uniquely indicates one type of gesture operation, and the second identification information uniquely indicates one type of virtual keyboard. In another case, the first rule includes a correspondence between a plurality of groups of conditions and the plurality of types of virtual keyboards. Each group of conditions in the plurality of groups of conditions corresponds to one type of gesture operation. In other words, each group of conditions in the plurality of groups of conditions is a restrictive condition of a gesture parameter corresponding to a gesture operation, and each group of conditions corresponds to one type of gesture operation.

In a possible embodiment of the eighth aspect, before the electronic device selects the first type of virtual keyboard corresponding to the first gesture operation from the plurality of types of virtual keyboards, the method further includes: The electronic device obtains a first gesture parameter corresponding to the first gesture operation. The first gesture parameter includes any one or more of the following parameters: location information of a contact point corresponding to the first gesture operation, quantity information of the contact point corresponding to the first gesture operation, area information of the contact point corresponding to the first gesture operation, relative angle information of a hand corresponding to the first gesture operation, location information of the hand corresponding to the first gesture operation, quantity information of the hand corresponding to the first gesture operation, and shape information of the hand corresponding to the first gesture operation. That the electronic device selects a first type of virtual keyboard corresponding to the first gesture operation from a plurality of types of virtual keyboards includes: The electronic device selects, based on the first gesture parameter, the first type of virtual keyboard from the plurality of types of virtual keyboards.

In this embodiment, the first gesture parameter includes location information of each contact point and quantity information of a plurality of contact points, and also includes area information of each contact point. The area information of the contact point can distinguish a contact point triggered based on a palm from the plurality of contact points. This helps accurately estimate a type of the first gesture operation, avoids displaying an incorrect virtual keyboard, and improves accuracy of a display process of the virtual keyboard. After secondary processing is performed on the obtained first gesture parameter, information such as relative angle information of the hand, location information of the hand, quantity information of the hand, or shape information of the hand may be obtained. In other words, more abundant information about the first gesture operation may be obtained based on the first gesture parameter, increasing flexibility of a matching process of the virtual keyboard.

In a possible embodiment of the eighth aspect, the method further includes: The electronic device obtains a first angle in response to the first gesture operation. The first angle indicates a relative angle between the hand corresponding to the first gesture operation and a side of the display. Alternatively, the first angle indicates a relative angle between the hand corresponding to the first gesture operation and a center line of the display. That the electronic device displays the first type of virtual keyboard by using the display includes: The electronic device obtains a first display angle of the first type of virtual keyboard based on the first angle, and displays the first type of virtual keyboard based on the first display angle by using the display. The first display angle indicates a relative angle between a side of the first type of virtual keyboard and the side of the display. Alternatively, the first display angle indicates a relative angle between a side of the first type of virtual keyboard and the center line of the display.

In this embodiment, a relative angle (namely, the first angle) between the hand of the user and a side or a center line of a display interface is obtained, and the display angle of the virtual keyboard is determined based on the first angle. In this way, the display angle of the keyboard is more suitable for a placement angle of the hand of the user, and it is more comfortable and convenient for the user to input by using the virtual keyboard.

In a possible embodiment of the eighth aspect, the first type of virtual keyboard is a full-size keyboard, and the full-size keyboard is classified into a first sub-keyboard and a second sub-keyboard. Then the first angle includes a relative angle of a left hand and a relative angle of a right hand, the first sub-keyboard and the second sub-keyboard include different virtual keys on the full-size keyboard, and the first display angle includes a display angle of the first sub-keyboard and a display angle of the second sub-keyboard. If the first angle indicates the relative angle between the hand corresponding to the first gesture operation and the side of the display, the display angle of the first sub-keyboard indicates a relative angle between a side of the first sub-keyboard and the side of the display, and the display angle of the second sub-keyboard indicates a relative angle between a side of the second sub-keyboard and the side of the display. If the first angle indicates the relative angle between the hand in the first gesture corresponding to the first gesture operation and the center line of the display, the display angle of the first sub-keyboard indicates a relative angle between a side of the first sub-keyboard and the center line of the display, and the display angle of the second sub-keyboard indicates a relative angle between a side of the second sub-keyboard and the center line of the display.

In a possible embodiment of the eighth aspect, in one case, the electronic device determines whether the first angle is greater than or equal to a preset angle threshold. If the first angle is greater than or equal to the preset angle threshold, the electronic device obtains the first display angle, and displays the first type of virtual keyboard at the first display angle by using the display. A value of the preset angle threshold may be 25 degrees, 28 degrees, 30 degrees, 32 degrees, 35 degrees, another value, or the like. This is not limited herein. In another case, after obtaining the first angle, the electronic device determines the first display angle of the first type of virtual keyboard as the first angle, and displays the first type of virtual keyboard based on the first angle by using the display.

According to a possible embodiment of the eighth aspect, the different types of virtual keyboards in the plurality of types of virtual keyboards have different functions. The virtual keyboards with different functions include a combination of any two or more types of the following virtual keyboards: a numeric keyboard, a function key keyboard, a full-size keyboard, and a custom keyboard. The function key keyboard is formed by function keys. In this embodiment, the different types of virtual keyboards have the different functions, so that the virtual keyboards with the different functions may be provided for the user. This improves flexibility of a process in which the user uses the virtual keyboard, to enhance user viscosity.

In a possible embodiment of the eighth aspect, if the first gesture operation is a one-hand operation, the first type of virtual keyboard is any one type of the following virtual keyboards: a mini keyboard, a numeric keyboard, a function keyboard, a function key keyboard, a round keyboard, an arc keyboard, and a custom keyboard. The mini keyboard includes 26 alphabet keys. The function keyboard is displayed in an application. A virtual key included on the function keyboard corresponds to a function of the application. It should be noted that a mini keyboard, a numeric keyboard, a function keyboard, a function key keyboard, a round keyboard, an arc keyboard, and a custom keyboard do not need to be all configured in a same electronic device. The example herein is only used to prove that a one-hand operation in one electronic device may trigger any one type of the mini keyboard, the numeric keyboard, the function keyboard, the function key keyboard, the round keyboard, the arc keyboard, or the custom keyboard. In this embodiment, a plurality of specific representation forms of the virtual keyboard displayed by using the display are provided in both cases in which the first gesture operation is the one-hand operation or a two-hand operation. This improves embodiment flexibility of this solution and expands an application scenario of this solution.

In a possible embodiment of the eighth aspect, if the first gesture operation is a two-hand operation, the first type of virtual keyboard is a full-size keyboard. The full-size keyboard includes at least 26 alphabet keys, and a size of the full-size keyboard is larger than that of a mini keyboard. That the electronic device displays the first type of virtual keyboard by using the display includes: If a distance between two hands is less than or equal to a first distance threshold, the electronic device displays the full-size keyboard in an integrated manner by using the display; or if a distance between two hands is greater than a first distance threshold, the electronic device displays a first sub-keyboard by using a second region on the display, and displays a second sub-keyboard by using a third region on the display. The second region and the third region are different regions on the display. The first sub-keyboard and the second sub-keyboard include different virtual keys on the full-size keyboard. A value of the first distance threshold may be 70 millimeters, 75 millimeters, 80 millimeters, or the like. This is not limited herein.

In this embodiment, whether to display the virtual keyboard in an integrated manner or in a separated manner may be determined based on the distance between the two hands of the user. This further improves flexibility of a process of displaying the virtual keyboard, facilitates the user to use the displayed virtual keyboard, and further enhances user viscosity of this solution.

In a possible embodiment of the eighth aspect, if the first gesture operation is a first one-hand operation, the first type of virtual keyboard is a mini keyboard. In this embodiment, if the first gesture operation is the one-hand operation, the first type of virtual keyboard is the mini keyboard. This helps improve flexibility of a process of inputting a letter by the user.

In a possible embodiment of the eighth aspect, the one-hand operation includes a left-hand operation and a right-hand operation. If the first gesture operation is the right-hand operation, the first type of virtual keyboard is a numeric keyboard. If the first gesture operation is the left-hand operation, the first type of virtual keyboard is a function keyboard. A virtual key included on the function keyboard corresponds to a function of the application. For example, if the first gesture operation is obtained from a game application, the function keyboard may be a game keyboard, and the game keyboard is provided with keys commonly used for a game. For another example, if the first gesture operation is obtained from a drawing application, the function keyboard may be a common key in drawing software, and the like.

In this embodiment, if the first gesture operation is the right-hand operation, the first type of virtual keyboard is the numeric keyboard; or if the first gesture operation is the left-hand operation, the first type of virtual keyboard is the function keyboard. This better satisfies a habit of using a physical keyboard by the user, to reduce a difference between the virtual keyboard and the physical keyboard and enhance user viscosity.

In a possible embodiment of the eighth aspect, if the first gesture operation is a one-hand operation in a first region on the display, the first type of virtual keyboard is a function key keyboard, and the first region is located in a lower left corner or a lower right corner of the display. In this embodiment, the function key is configured in the lower left corner or the lower right corner of the physical keyboard. If the first gesture operation is the one-hand operation in the first region on the display, the first type of virtual keyboard is a function key keyboard. Because a triggering gesture is the same as a habit of using a physical keyboard by the user, it is convenient for the user to remember the triggering gesture. This reduces implementation difficulty of this solution, and enhances user viscosity.

In a possible embodiment of the eighth aspect, the method further includes: The electronic device obtains a contact operation on a first virtual key on a function key keyboard. For example, the first virtual key may be a Ctrl key, or may include both a Ctrl key and a Shift key. The electronic device highlights a second virtual key on the display in response to the contact operation on the first virtual key on the function key keyboard. The second virtual key is a key other than the first virtual key in a shortcut key combination. Highlighting includes but is not limited to highlight display, bold display, or flash display. This is not limited herein. For example, in a drawing application, a key combination of a Ctrl key, a Shift key, and an I key can provide a function of color inversion of a currently processed image. In this case, the first virtual key includes the Ctrl key and the Shift key, and the second virtual key is the virtual I key.

In this embodiment of this application, in the process of displaying the function key keyboard on the display, the electronic device obtains the contact operation on the first virtual key on the function key keyboard and highlights the second virtual key on the display in response to the contact operation. The second virtual key is the key other than the first virtual key in the shortcut key combination. Because the function key keyboard occupies a small area, an area required for displaying the virtual keyboard is reduced. When the user performs the contact operation on the first virtual key on the function key keyboard, the second virtual key in the shortcut key combination can be automatically displayed. This ensures a requirement of the user for the shortcut keys and avoids waste of a display area on the display.

In a possible embodiment of the eighth aspect, if the first gesture operation is a contact operation obtained by using the display, the first gesture parameter includes quantity information of a contact point corresponding to the first gesture operation. If the first gesture operation is a one-hand operation with less than three contact points, the first type of virtual keyboard is a round keyboard or an arc keyboard. In this embodiment, when the first gesture operation is the one-hand operation with less than three contact points, the round keyboard or the arc keyboard may be further provided. In this way, both a keyboard existing in a physical keyboard and a keyboard that does not exist in the physical keyboard can be provided. This enriches keyboard types, provides more choices for the user, and further enhances selection flexibility of the user.

In a possible embodiment of the eighth aspect, the first rule includes a first sub-rule. The first sub-rule is obtained by performing a custom operation on at least one type of gesture operation and/or at least one type of virtual keyboard. In this embodiment, the user may customize a type of a triggering gesture and/or a virtual keyboard, so that a display process of the virtual keyboard better meets expectation of the user, and user viscosity of this solution is further increased.

In a possible embodiment of the eighth aspect, the display is provided with a plurality of vibration feedback elements. A location of the first type of virtual keyboard on the display is fixed in the process of displaying the first type of virtual keyboard. After the first type of virtual keyboard is displayed by using the display, the method further includes: The electronic device detects a first contact operation acting on the display, and obtains, in response to the first contact operation, first location information of a first contact point corresponding to the first contact operation. The first location information corresponds to a first virtual key on the virtual keyboard. If the first virtual key is an anchor point key, the electronic device obtains a first vibration feedback element from the plurality of vibration feedback elements. The first vibration feedback element is a vibration feedback element that matches the first virtual key. The electronic device indicates the first vibration feedback elements that match the first virtual key to emit a vibration wave, to perform a first feedback operation. The first feedback operation is used to prompt that the first virtual key is an anchor point key. For meaning of the nouns such as the first contact operation, the first contact point, the first location information, the first virtual key, and the first vibration feedback element in this embodiment, specific embodiment operations, and beneficial effects, refer to the descriptions in the possible embodiments of the first aspect. Details are not described herein again.

In the eighth aspect of embodiments of this application, the electronic device may further perform the operations performed by the electronic device in the possible embodiments of the first aspect. For a specific embodiment of a specific operation in the eighth aspect and the possible embodiments of the eighth aspect of embodiments of this application, and a beneficial effect of each possible embodiment, refer to the descriptions in the possible embodiments of the first aspect. Details are not described herein again.

According to a ninth aspect, an embodiment of this application provides an electronic device, which may be used in the field of human-computer interaction. The electronic device includes a display, a memory, one or more processors, and one or more programs. The one or more programs are stored in the memory, and when the one or more processors execute the one or more programs, the electronic device is enabled to perform the following operations: selecting, in response to a detected first gesture operation, a first type of virtual keyboard corresponding to the first gesture operation from a plurality of types of virtual keyboards, where virtual keys included in different types of virtual keyboards in the plurality of types of virtual keyboards are not completely the same; and displaying the first type of virtual keyboard by using the display.

In the ninth aspect of embodiments of this application, the electronic device may further perform the operations performed by the electronic device in the possible embodiments of the eighth aspect. For a specific embodiment of a specific operation in the ninth aspect and the possible embodiments of the ninth aspect of embodiments of this application, and a beneficial effect of each possible embodiment, refer to the descriptions in the possible embodiments of the eighth aspect. Details are not described herein again.

According to a tenth aspect, an embodiment of this application provides a computer program. When the computer program is run on a computer, the computer is enabled to perform the virtual keyboard processing method according to the eighth aspect.

According to an eleventh aspect, an embodiment of this application provides an electronic device, including a processor. The processor is coupled to a memory. The memory is configured to store a program. The processor is configured to execute the program in the memory, so that the electronic device is enabled to perform the virtual keyboard processing method according to the eighth aspect.

According to a twelfth aspect, an embodiment of this application provides a computer-readable storage medium. The computer-readable storage medium stores a computer program, and when the computer program is run on a computer, the computer is enabled to perform the virtual keyboard processing method according to the eighth aspect.

According to a thirteenth aspect, an embodiment of this application provides a chip system. The chip system includes a processor, configured to implement functions in the foregoing aspects, for example, sending or processing of data and/or information in the foregoing methods. In a possible design, the chip system further includes a memory. The memory is configured to store program instructions and data that are necessary for a server or a communication device. The chip system may include a chip, or may include a chip and another discrete component.

According to a fourteenth aspect, an embodiment of this application provides an application interface processing method, which may be applied to the field of human-computer interaction. The method is applied to an electronic device, and the electronic device includes a first display and a second display. The method includes: The electronic device displays a first application interface by using the first display. The electronic device changes a mode type corresponding to the first application interface to handwriting input in response to a detected first operation. The electronic device triggers, in response to the handwriting input mode, display of the first application interface on the second display, to obtain handwriting content for the first application interface by using the second display. Specifically, an operating system runs on the electronic device. The electronic device may display the first application interface on the second display by invoking a move to function in the operating system, or by invoking a Set Window Position function in the operating system, or by invoking a Set Window Placement function in the operating system.

In this embodiment, the electronic device displays the first application interface on the first display. If the electronic device detects that the mode type corresponding to the first application interface is handwriting input, the electronic device triggers display of the first application interface on the second display, to directly perform input by using the first application interface displayed on the second display. According to the foregoing manner, if a user places the second display in a direction convenient for writing, the user does not need to perform any operation, and the electronic device can automatically display, on the second display convenient for writing, an application interface for writing input. This improves efficiency of an entire input process, avoids redundant operations, simplifies the operation, and helps enhance user viscosity.

In a possible embodiment of the fourteenth aspect, after the electronic device triggers display of the first application interface on the second display in response to the handwriting input mode, the method further includes: If the electronic device detects that the mode type corresponding to the first application interface is changed to keyboard input, the electronic device triggers, in response to the keyboard input mode, display of the first application interface on the first display and display of a virtual keyboard on the second display, to obtain input content for the first application interface by using the virtual keyboard on the second display. Alternatively, if the electronic device detects that the mode type corresponding to the first application interface is changed to keyboard input, the electronic device triggers, in response to the keyboard input mode, display of the first application interface on the first display, and display of a virtual keyboard and an application control bar on the second display.

In this embodiment, in the process of displaying the application interface, when the application interface is changed from another mode type to handwriting input, a layout of the application interface on different displays of the electronic device can be automatically adjusted. When the mode type of the application interface is changed to keyboard input, the layout of the application interface on different displays of the electronic device can also be automatically adjusted, and the virtual keyboard can be automatically displayed. In this way, when the mode type of the application interface is changed to keyboard input, the user does not need to manually adjust the layout of the application interface on different displays, but can directly perform keyboard input. The operations are simple, and user viscosity in this solution is further increased.

In a possible embodiment of the fourteenth aspect, the method may further include: The electronic device detects a second operation acting on the second display; and in response to the second operation, changes a first display area of the application control bar to a second display area, and changes a first control key group included in the application control bar to a second control key group. Both the first control key group and the second control key group are control key sets corresponding to a target application. Specific meaning of the nouns in the foregoing operations and the specific embodiments of the foregoing operations are described in the following twentieth aspect. Details are not described herein again.

In a possible embodiment of the fourteenth aspect, the first application interface includes a first control key. The method may further include: The electronic device detects a second operation on the first target application interface; and in response to the second operation, displays the first control key in the application control bar, and hides the first control key in the first application interface. Specific meaning of the nouns in the foregoing operations and the specific embodiments of the foregoing operations are described in the following twenty-first aspect. Details are not described herein again.

In a possible embodiment of the fourteenth aspect, the displaying a virtual keyboard on the second display includes: displaying a second type of virtual keyboard on the second display. The method further includes: The electronic device detects a first gesture operation acting on the second display, and selects, in response to the detected first gesture operation, a first type of virtual keyboard corresponding to the first gesture operation from a plurality of types of virtual keyboards. Virtual keys included in different types of virtual keyboards in the plurality of types of virtual keyboards are not completely the same. The electronic device displays the first type of virtual keyboard by using the second display. The first type of virtual keyboard and the second type of virtual keyboard are different types of virtual keyboards in the plurality of types of virtual keyboards. For specific meaning of the nouns in the foregoing operations and the specific embodiments of the foregoing operations, refer to the descriptions of the eighth aspect. In the fourteenth aspect of embodiments of this application, the electronic device may further perform the operations performed by the electronic device in the possible embodiments of the eighth aspect. For a specific embodiment of a specific operation in the fourteenth aspect and the possible embodiments of the fourteenth aspect of embodiments of this application, and a beneficial effect of each possible embodiment, refer to the descriptions in the possible embodiments of the eighth aspect. Details are not described herein again.

In a possible embodiment of the fourteenth aspect, after the electronic device triggers display of the first application interface on the second display in response to the handwriting input mode, the method further includes: If the electronic device detects that the mode type corresponding to the first application interface is changed to a browsing mode, the electronic device triggers, in response to the browsing mode, display of the first application interface on the first display and stops displaying the first application interface on the second display. In this embodiment, when the mode type of the application interface is changed to the browsing mode, a layout of the application interface on different displays can also be automatically adjusted. Therefore, when the mode type of the application interface is changed to the browsing mode, the user does not need to manually adjust the layout of the application interface on different displays, in other words, in a plurality of different application scenarios, operations can be simplified, and user viscosity of this solution is further increased.

In a possible embodiment of the fourteenth aspect, the electronic device detects that the first operation includes any one or a combination of the following five items: If the electronic device detects that a holding posture of an electronic pen meets a first preset condition, the electronic device determines that the first operation is detected, where the holding posture includes any one or a combination of the following: a holding location, holding force, and a holding angle, and the first preset condition includes any one or a combination of the following: the holding location falls within a first location range, the holding force falls within a first force range, and the holding angle falls within a first angle range. Alternatively, the electronic device obtains a trigger instruction for handwriting input by using a first icon, where the first icon is displayed on the first application interface; if the electronic device detects a preset tapping operation or a preset track operation, the electronic device determines that the first operation is detected, where the preset tapping operation may be a tap operation, a double-tap operation, a triple-tap operation, or a touch and hold operation, and the preset track operation may be a "Z"-shaped track operation, a slide down operation, a "tick"-shaped track operation, or a "circle"-shaped track operation; if the electronic device detects that an electronic pen is located in a preset range of the second display, the electronic device determines that the first operation is detected; or if the electronic device detects that an electronic pen changes from a first preset state to a second preset state, the electronic device determines that the first operation is detected. That an electronic pen changes from a first preset state to a second preset state may be that the electronic pen changes from a static state to a moving state, or the electronic pen changes from an unheld state to a held state.

In this embodiment, a plurality of determining manners of the mode type corresponding to the first application interface are provided. This improves implementation flexibility of this solution and expands an application scenario of this solution. Further, the mode type corresponding to the first application interface is determined based on the holding posture of the electronic pen, so that the user can change the mode type of the first application interface without performing another operation. In addition, the mode type corresponding to the first application interface is determined based on the posture of holding the electronic pen by the user. This can reduce an error rate in a process of determining the mode type corresponding to the first application interface, reduce a probability of incorrectly placing the first application interface, avoid waste of computer resources, and help enhance user viscosity.

In a possible embodiment of the fourteenth aspect, the first operation is a slide operation in a first direction obtained by using the second display. The slide operation in the first direction is a slide operation of sliding from an upper side of the second display to a lower side of the second display. A distance between the upper side of the second display and the first display is shorter than a distance between the lower side of the second display and the first display. Specifically, the electronic device obtains the slide operation in the first direction by using the second display, and in response to the slide operation in the first direction, the virtual keyboard displayed on the second display is moved in the first direction toward the lower side of the second display. When an upper side of the virtual keyboard reaches the lower side of the second display, the electronic device determines that the mode type corresponding to the first application interface is changed to handwriting input. In this embodiment, the virtual keyboard displayed on the second display can accompany a slide down operation of the user. When the upper side of the virtual keyboard reaches the lower side of the second display, the electronic device determines that the mode type corresponding to the first application interface is changed to handwriting input. This increases interest in a process of changing from keyboard input to handwriting input, and helps enhance user viscosity.

In a possible embodiment of the fourteenth aspect, after the electronic device triggers display of the first application interface on the second display, the method further includes: The electronic device obtains a start operation for the second application interface, and determines, based on the start operation, a mode type corresponding to the second application interface. The second application interface and the first application interface are different application interfaces. If the mode type corresponding to the second application interface is handwriting input, the electronic device triggers, in response to the handwriting input mode, display of the second application interface on the second display. Alternatively, if the mode type corresponding to the second application interface is keyboard input, the electronic device triggers, in response to the keyboard input mode, display of the second application interface on the first display, and display of the virtual keyboard on the second display. Alternatively, if the mode type corresponding to the second application interface is a browsing mode, the electronic device triggers, in response to the browsing mode, display of the second application interface on the first display.

In this embodiment, in a process of using the application interface by the user, the mode type corresponding to the application interface can be automatically detected, to adjust a display location of the application interface based on the mode type corresponding to the application interface. In addition, when the application interface is opened, the mode type corresponding to the application interface may be determined based on the start operation, to determine the display location of the application interface, so that the user can directly use the application interface after performing the start operation, without performing a location movement operation on the application interface. This further improves convenience of this solution, and enhances user viscosity of this solution.

In a possible embodiment of the fourteenth aspect, that the electronic device determines, based on the start operation, a mode type corresponding to the second application interface includes: If the start operation is obtained by using the first display, the electronic device determines that the mode type corresponding to the second application interface is keyboard input or a browsing mode. Alternatively, if the start operation is obtained by using the second display, the electronic device determines that the mode type corresponding to the second application interface is handwriting input.

In a possible embodiment of the fourteenth aspect, that the electronic device determines, based on the start operation, a mode type corresponding to the second application interface includes: If the start operation is obtained by using an electronic pen, the electronic device determines that the mode type corresponding to the second application interface is handwriting input. Alternatively, if the start operation is obtained by using a mouse or a finger, the electronic device determines that the mode type corresponding to the second application interface is keyboard input or a browsing mode.

According to a fifteenth aspect, an embodiment of this application provides an electronic device, which may be used in the field of human-computer interaction. The electronic device includes a first display, a second display, a memory, one or more processors, and one or more programs. The one or more programs are stored in the memory. When the one or more processors execute the one or more programs, the electronic device is enabled to perform the following operations: displaying a first application interface by using the first display; changing a mode type corresponding to the first application interface to handwriting input in response to a detected first operation; and triggering, in response to the handwriting input mode, display of the first application interface on the second display, to obtain handwriting content for the first application interface by using the second display. For concepts of the nouns and specific embodiment operations in the second aspect and some possible embodiments of the second aspect of embodiments of this application, and a beneficial effect of each possible embodiment, refer to the descriptions in the possible embodiments of the first aspect. Details are not described herein again.

In the fifteenth aspect of embodiments of this application, the electronic device may further perform the operations performed by the electronic device in the possible embodiments of the fourteenth aspect. For a specific embodiment of a specific operation in the fifteenth aspect and the possible embodiments of the fifteenth aspect of embodiments of this application, and a beneficial effect of each possible embodiment, refer to the descriptions in the possible embodiments of the fourteenth aspect. Details are not described herein again.

According to a sixteenth aspect, an embodiment of this application provides a computer program. When the computer program is run on a computer, the computer is enabled to perform the application interface processing method according to the fourteenth aspect.

According to a seventeenth aspect, an embodiment of this application provides an electronic device, including a processor. The processor is coupled to a memory. The memory is configured to store a program. The processor is configured to execute the program in the memory, so that the electronic device is enabled to perform the application interface processing method according to the fourteenth aspect.

According to an eighteenth aspect, an embodiment of this application provides a computer-readable storage medium. The computer-readable storage medium stores a computer program, and when the computer program is run on a computer, the computer is enabled to perform the application interface processing method according to the fourteenth aspect.

According to a nineteenth aspect, an embodiment of this application provides a chip system. The chip system includes a processor, configured to implement functions in the foregoing aspects, for example, sending or processing of data and/or information in the foregoing methods. In a possible design, the chip system further includes a memory. The memory is configured to store program instructions and data that are necessary for a server or a communication device. The chip system may include a chip, or may include a chip and another discrete component.

According to a twentieth aspect, an embodiment of the present invention provides a screen display method, applied to an electronic device including a first display and a second display. The screen display method includes:

displaying a target application interface on the first display;

displaying an application control bar on the second display; and changing a first display area of the application control bar to a second display area in response to a received first operation.

When a display area of the application control bar is the first display area, the application control bar includes a first control key group.

When a display area of the application control bar is the second display area, the application control bar includes a second control key group.

Both the first control key group and the second control key group are control key sets for controlling the target application, and control keys included in the first control key group and the second control key group are not completely the same.

The electronic device may be an electronic device having two displays connected together (for example, connected through a shaft). The two displays may be two independent displays, or may be two displays divided from a flexible folding screen or a curved screen, and may be used to perform different functions. The electronic device may be an electronic device that works independently as a whole, for example, a personal notebook computer, or may be an electronic device formed by connecting two electronic devices that can work independently and work together, for example, a dual-screen electronic device formed by splicing two mobile phones or two tablet computers.

The first operation may be an operation directly acting on the application control bar. For example, the first operation may be changing the display area of the application control bar through a touchscreen gesture. Alternatively, the first operation may be changing the display area of the application control bar by tapping or clicking (finger tapping, mouse clicking, or the like) a zoom-in or zoom-out key of the application control bar. Alternatively, the first operation may be changing the display area of the application control bar by dragging a boundary of the application control bar by using a mouse. The first operation may alternatively be an operation indirectly performed on the application control bar. For example, the first operation may directly act on a control region in the foregoing three manners, to change the display area of the application control bar by changing a display area of the control region. Alternatively, the first operation may directly act on another application display interface or an input module (such as a virtual keyboard or a handwriting input region) in the second display in the foregoing three manners, to change the display area of the application control bar by changing a display area of another display module in the second display. Alternatively, the first operation may be an operation performed by a user on the target application in the first display. For example, when a quantity of control keys displayed in the application control bar corresponding to the first user operation is different from a quantity of control keys displayed in the application control bar before the first operation, the display area of the application control bar may be adaptively adjusted, so that the control key corresponding to the first operation can be better displayed.

The display area and the control key of the application control bar are flexibly changed based on an operation and/or a requirement of the user, so that the application control bar may be flexibly adjusted based on the operation or the requirement of the user, and a control key related to a current user operation is always displayed in the application control bar. This provides a more convenient input operation for the user and improves user experience.

With reference to the twentieth aspect, in a first possible embodiment of the twentieth aspect:

before the first display area of the application control bar is changed to the second display area, the virtual keyboard is displayed on the second display; and after the first display area of the application control bar is changed to the second display area, a display layout of the virtual keyboard is changed.

Specifically, when the second display area is greater than the first display area, a display area of the virtual keyboard correspondingly decreases, and a layout of keys on the virtual keyboard also changes with the change of the display area. For example, all or some keys may be zoomed out, or some keys may be omitted, or a spacing between keys may be reduced. When the second display area is smaller than the first display area, a display area of the virtual keyboard correspondingly increases, and a layout of keys on the virtual keyboard also changes with the change of the display area. For example, all or some keys may be zoomed in, or some keys may be added, or a spacing between keys may be increased, or another functional module such as a touchpad may be added to the virtual keyboard.

The application control bar is usually displayed on the second display together with another display module (an application module, an input module, or the like) on the second display. Therefore, when the display area of the application control bar changes, a display layout of the another display module is adaptively adjusted. In this way, nothing is missing or folded on the second display. This optimizes a display layout on the second display and improves user experience.

With reference to the twentieth aspect or the first possible embodiment of the twentieth aspect, in a second possible embodiment of the twentieth aspect:

before the first display area of the application control bar is changed to the second display area, a target application interface includes a third control key group;

the second display area is greater than the first display area;

the second control key group includes the first control key group and the third control key group; and after the first display area of the application control bar is changed to the second display area, a target application interface includes the third control key group.

When the user needs to display more control keys in the application control bar, or a quantity of control keys corresponding to a current user operation is large, a display area of the application control region is increased, and control keys displayed in the application control region are increased. This can provide more control keys for the user, and provide a more convenient input mode for the user. In addition, when the display area of the application control bar is increased, a control key on the first display is moved to the application control bar on the second display for displaying. This can save display space of the first display, and display content on the first display becomes more concise and clearer. In addition, after the control key displayed in the application control bar is not displayed on the first display, a size of original display content on the first display may be increased, or new display content may be added based on the original display content. This provides a more convenient operation for the user and improves user experience.

With reference to the second possible embodiment of the twentieth aspect, in a third possible embodiment of the twentieth aspect:

the third control key group is determined based on the second display area and a priority sequence of to-be-displayed control keys in a to-be-displayed control key set of the target application.

Specifically, the to-be-displayed control key set of the target application may be a to-be-displayed control key set that may be displayed in the application control bar and that is provided by an application. The priority sequence of the to-be-displayed control keys in the set may be specified by the application, or may be determined by an operating system based on a factor such as a function of the to-be-displayed control key or a use frequency of the user.

For the to-be-displayed control key set provided by the application, the application or the operating system may specify the priority sequence of the to-be-displayed control keys, the operating system may determine a control key to be added to the application control bar when the display area of the application control bar is increased, and determine a control key to be displayed in the application control bar in various display areas of the application control bar. This allows more flexible setting of the application control bar, and can support various operation manners and requirements of the user.

When the display area of the application control bar is increased, a display key to be added to the application control region is determined based on the priority sequence of the to-be-displayed control keys. In this way, if the display area of the application control bar is limited, a control key with a higher priority (higher importance, or a higher use frequency of the user) can be preferentially displayed in the application control bar. This can provide a more convenient operation for the user and improve user experience.

With reference to the second possible embodiment of the twentieth aspect or the third possible embodiment of the twentieth aspect, in a fourth possible embodiment of the twentieth aspect:

the third control key group is displayed at a location closer to the first display than the first control key group.

In the foregoing setting, the first control key group is displayed at a location closer to two hands of the user than the third control key group. In other words, each time the application control bar is expanded, a newly added control key is always displayed at the location close to the first display, and a control key originally displayed in the application control bar is displayed at the location closer to the two hands of the user, to facilitate a user operation. In a process of expanding the display area of the application control bar, a priority of the newly added control key is usually lower than that of the control key originally displayed in the application control bar. Therefore, a control key with a higher priority may be always displayed at a location closer to the two hands of the user, to provide a more convenient operation for the user and improve user experience.

With reference to the twentieth aspect or the first possible embodiment of the twentieth aspect, in a fifth possible embodiment of the twentieth aspect:
before the first display area of the application control bar is changed to the second display area, a target application interface does not include a fourth control key group, where the fourth control key group is a control key set for controlling the target application;
the second display area is less than the first display area;
the second control key group is the first control key group minus the fourth control key group; and
after the first display area of the application control bar is changed to the second display area, the target application interface includes some or all of the fourth control key group.

When the user wants to display a small quantity of control keys in the application control bar, or a quantity of control keys corresponding to a current user operation is small, or the user needs to enlarge a display area of another display module on the second display, the display area of the application control region is reduced, and control keys displayed in the application control region are decreased. This can decrease display controls on the second display, reduce visual interference with the user, and facilitate the user to quickly locate a required control key. In addition, after the fourth control key group is removed from the application control bar, some or all of control key groups in the fourth control key group are displayed on the first display. In this way, when the user needs to use these control keys, the user can still perform an operation on the first display. This compensates for impact on a user operation in the case of zooming out the application control bar, and improves user experience.

With reference to the fifth possible embodiment of the twentieth aspect, in a sixth possible embodiment of the twentieth aspect:
the fourth control key group is determined based on the second display area and a priority sequence of the control keys in the first control key group or a location relationship of the control keys in the first control key group.

The priority sequence of the control keys in the first control key group may be specified by an application, or may be specified by a system. A specific control key to be removed from the application control bar may be determined based on the priority sequence of the control keys when the display area of the application control bar is reduced. In this way, a control key with a high priority can be reserved in the application control bar, to improve operation experience of the user. The user performs an operation of reducing the display area of the application control bar, to hide display of a specific region of the application control bar. For example, the user hides a part of display content through a drag operation, a specific control key to be hidden may be determined based on a location of the control key, to achieve an operation objective of the user.

With reference to any one of the twentieth aspect, or the first two possible embodiments of the twentieth aspect, or the fifth possible embodiment of the twentieth aspect, in a seventh possible embodiment of the twentieth aspect:
the second control key group is a control key group corresponding to the second display area of the application control bar.

The control key group corresponding to the second display area of the application control bar may be provided by an application. For example, the application may define corresponding control key groups for display areas of several fixed sizes of the application control bar. When the display area of the application control bar corresponds to a display area of a fixed size, a control key group corresponding to the display area is displayed in the application control bar. Alternatively, the application may further define corresponding control key groups separately for several size change ranges of the display area of the application control bar. When an actual display area of the application control bar falls within a specific size range, a control key group corresponding to the size range is displayed in the application control bar.

The control key displayed in the application control bar is determined in the foregoing manner. This can greatly reduce a calculation amount of an operating system, greatly shorten reaction time for performing the first operation by the operating system, and improve operation efficiency.

With reference to any one of the twentieth aspect, or the foregoing seven possible embodiments of the twentieth aspect, in an eighth possible embodiment of the twentieth aspect:
the first operation is a gesture operation;
in response to the received first operation, the first display area of the application control bar is changed to the second display area which specifically includes:
in response to a gesture operation, a first type of virtual keyboard corresponding to the gesture operation is selected from a plurality of types of virtual keyboards, where virtual keys included in different types of virtual keyboards in the plurality of types of virtual keyboards are not completely the same;
a first type of virtual keyboard is displayed by using the second display; and
the second display area is determined based on a display region of the first type of virtual keyboard.

The second display may display both the application control bar and an input mode such as the virtual keyboard. Different gestures may enable different gesture virtual keyboards. When a gesture virtual keyboard is enabled through a gesture, the display area and/or a display region of the application control bar may be determined based on a display region (a display area, a display location, and the like) of the gesture virtual keyboard. In this way, the application control bar can flexibly adapt to the gesture virtual keyboard, display on the second display is more appropriate, neat, and beautiful, and user experience is improved.

With reference to any one of the twentieth aspect, or the foregoing eight possible embodiments of the twentieth aspect, in a ninth possible embodiment of the twentieth aspect:
in response to a received second operation, a target application interface is displayed on the second display, to obtain handwriting content for the target application interface by using the second display, where the second operation indicates to enable a handwriting input mode of the target application; and
after the target application interface is displayed on the second display, the second display does not include the application control bar.

When it is detected that a user enables the handwriting input mode through the second operation, the target application interface may be displayed on the second display, to obtain handwriting content of the target application interface by using the second display. In this case, because the target application interface has been completely copied to the second display, the application control bar on the second display may be hidden, to decrease display controls on the second display. In this way, display content on the second display is more concise and clearer, and the application control bar does not cause interference with handwriting input.

With reference to any one of the twentieth aspect, or the foregoing nine possible embodiments of the twentieth aspect, in a tenth possible embodiment of the twentieth aspect:

the first operation is used to switch an input mode to a handwriting input mode;

in response to the received first operation, a handwriting input region or a control key group related to the handwriting input mode or both are displayed in the application control bar; and when a user switches the input mode to the handwriting input mode, the handwriting input region may be displayed in the application control bar, so that the user can perform a handwriting input operation more conveniently through the application control bar, and operation efficiency is improved. Alternatively, the control key group related to the handwriting input mode, such as a pen, an eraser, a color, and a font, may be displayed in the application control bar, so that the user can operate the handwriting input mode through the application control bar, and a more convenient operation is provided for the user. Alternatively, both the handwriting input region and the control key group related to the handwriting input mode may be displayed in the application control bar, to achieve the foregoing beneficial effects.

With reference to any one of the twentieth aspect, or the foregoing ten possible embodiments of the twentieth aspect, in an eleventh possible embodiment of the twentieth aspect, the method further includes:

obtaining a contact operation acting on the application control bar;

in response to the contact operation, obtaining a first control key corresponding to the contact operation, where the first control key is located in the application control bar;

obtaining at least one first vibration feedback element that matches the first control key from a plurality of vibration feedback elements; and indicating the first vibration feedback element to emit a vibration wave, to perform a first feedback operation, where the first feedback operation is used to prompt that the first control key is a key of the application control bar.

A control region displayed on the second display may include a system control bar and an application control bar. When a user touches a control key in the application control bar, a feedback operation is provided, so that the user can locate the application control bar and the control key in the application control bar in the control region without moving a line of sight to the second display. This helps the user quickly locate a to-be-located control key in a changing process of the display area and the control key of the application control bar, greatly improving operation efficiency. On the contrary, based on a use habit of the user, a feedback operation may be further set for a control key on the system control bar in the control region, so that the user can locate the system control bar and a control key in the system control bar in the control region without moving a line of sight to the second display, greatly improving operation efficiency. In addition, a feedback operation may be further set on a control key that has an important function or that is frequently used by the user in the application control bar, to help the user quickly locate a to-be-located control key in a changing process of the display area and the control key of the application control bar, greatly improving operation efficiency.

With reference to any one of the twentieth aspect, or the foregoing eleven possible embodiments of the twentieth aspect, in a twelfth possible embodiment of the twentieth aspect, the application control bar may be disabled in any one of the following manners:

disabling the application control bar based on a received instruction for disabling the virtual keyboard;

disabling the application control bar based on a key instruction of the virtual keyboard;

disabling the application control bar based on a gesture instruction; and disabling the application control bar based on a received instruction for disabling a full-screen mode of an application.

With reference to any one of the twentieth aspect, or the foregoing twelve possible embodiments of the twentieth aspect, in a thirteenth possible embodiment of the twentieth aspect, the application control bar may be enabled in any one of the following manners:

activating the application control bar based on a received instruction for activating the virtual keyboard;

activating the application control bar based on a key instruction of the virtual keyboard;

activating the application control bar based on a gesture instruction; and activating the application control bar based on a received instruction for enabling a full-screen mode of an application.

The foregoing manners of enabling and disabling the application control bar are only examples. The foregoing design enables a user to flexibly activate or disable the application control region if any content is displayed on the second display. This provides a more convenient operation for the user and improves user experience.

According to a twenty-first aspect, an embodiment of the present invention provides a screen display method. The screen display method is applied to an electronic device including a first display and a second display. The screen display method includes:

displaying a target application interface on the first display, where the target application interface includes a fifth control key group;

displaying an application control bar on the second display; and in response to a third operation on the target application interface, displaying the fifth control key group in the application control bar, and hiding the fifth control key group in the target application interface.

A control key corresponding to a user operation is displayed in the application control bar based on an operation performed by the user on the target application interface. A shortcut operation control key corresponding to a current user operation may be always displayed in the application control bar. This provides a more convenient operation for the user and improves user operation efficiency. In addition, after the control key is displayed in the application control bar, display of such control key on the first display is removed. This can save the display area of the first display, and display content on the first display becomes more concise and clearer. In addition, after the control key displayed in the application control bar is not displayed on the first display, a size of original display content on the first display may be increased, or new display content may be added based on the original display content. This provides a more convenient operation for the user and improves user experience.

With reference to the twenty-first aspect, in a first possible embodiment of the twenty-first aspect, the screen display method further includes:

in response to the third operation on the target application interface, changing a display area of the application control bar.

After the fifth control key group is displayed in the application control bar, a quantity of control keys in the application control bar may change. In this case, the display area of the application control bar may be adaptively adjusted, to optimize display of the control keys in the application control bar. In this way, display of the control keys in the application control bar better satisfies a use habit of the user, and user experience is improved.

With reference to the twenty-first aspect or the first possible embodiment of the twenty-first aspect, in a second possible embodiment of the twenty-first aspect, before the displaying the fifth control key group in the application control bar, the screen display method further includes:

the application control bar includes a sixth control key group, where the sixth control key group is an initial control key set for controlling a target application.

When the user starts the target application, an initial control key group for controlling the target application may be displayed in the application control bar. When the user performs an operation on the target application, the fifth control key group corresponding to a current user operation may be added based on the initial control key group, or some or all of the initial control key group may be replaced with the fifth control key group corresponding to the current user operation. In this way, the application control bar can always display a control key most related to the current user operation. This provides a more convenient operation for the user and improves user operation efficiency. In addition, after the initial control key group is displayed in the application control bar, these control keys in the target application interface may be removed. This can save the display area of the first display, and display content on the first display becomes more concise and clearer.

With reference to the twenty-first aspect or the first possible embodiment of the twenty-first aspect, in a third possible embodiment of the twenty-first aspect, after the displaying the fifth control key group in the application control bar, the screen display method further includes:

in response to a fourth operation on the target application interface, displaying a seventh control key group in the application control bar, and hiding the seventh control key group in the target application interface.

Specifically, based on the third operation on the target application interface, the user may continue to perform the fourth operation on the same target application interface. When the user performs the fourth operation on a target application, the seventh control key group corresponding to the fourth operation of the user may be added based on the fifth control key group in the application control bar, or some or all of control keys in the fifth control key group in the application control bar may be replaced with the seventh control key group corresponding to the fourth operation of the user. In addition, the fourth operation may further be displaying a new target application on the first display. The fourth operation may be implemented by starting the new target application, or may be displaying, on the first display through the fourth operation, the interface of the target application that originally runs in a background. When the new target application interface is displayed on the first display, an original target application interface on the first display may be hidden. In this case, the fifth control key group may be replaced with the seventh control key group. Alternatively, both the two target application interfaces may be displayed on the first display (for example, by using dual-screen display). In this case, the fifth control key group may be added based on the seventh control key group, in other words, the seventh control key group and the fifth control key group are both displayed in the application control bar.

The control key in the application control bar is flexibly changed based on a change of the user operation, and a control key most related to a user operation is always displayed in the application control bar. This provides a more convenient operation for the user and improves operation efficiency.

With reference to any one of the twenty-first aspect, or the foregoing three possible embodiments of the twenty-first aspect, in a fourth possible embodiment of the twenty-first aspect:

the third operation is selecting a target object in the target application interface; and the fifth control key group is a control key for operating a target object.

The third operation may be selecting the target object in the target application interface. For example, shading of the target object is deepened to indicate that the target object is selected. Alternatively, the third operation may be selecting the target object by moving a cursor to the target object. Specifically, the target object selected through the third operation may be a picture or text, and the fifth control key group may include a control key related to text or picture editing, so that the user can edit the text or the picture by using the control key in the application control bar. The target object selected through the third operation may be audio and a video, and the fifth control key group may include a control key group related to audio and video control, so that the user can control the audio and the video by using the control key in the application control bar.

With reference to any one of the twenty-first aspect, or the foregoing three possible embodiments of the twenty-first aspect, in a fifth possible embodiment of the twenty-first aspect:

the third operation is moving a cursor to a target location in the target application interface; and the fifth control key group is a control key in a menu bar that is displayed when a right mouse button is clicked at the target location.

When the user moves the cursor to the target location of the target application interface, the control key in the menu bar that is displayed when the user right-clicks at a location of the cursor is displayed in the application control bar. Right-clicking to display the control key in the menu bar is designed based on a user intention, and is likely to satisfy a current operation requirement of the user. In addition, directly right-clicking to display the control key in the menu bar can avoid secondary development of a developer, and shorten a development cycle.

With reference to any one of the twenty-first aspect, or the foregoing three possible embodiments of the twenty-first aspect, in a sixth possible embodiment of the twenty-first aspect:

the third operation is browsing content in a target region on the target application interface through a slide gesture or scrolling a mouse wheel; and the fifth control key group is a thumbnail of the target region and a locating box for quickly locating the target object in the thumbnail.

Based on the foregoing setting, the user can quickly locate required target content by using the thumbnail of the target region and the locating box of the target object in the thumbnail in the application control bar. This can improve user operation efficiency.

According to a twenty-second aspect, an embodiment of the present invention provides an electronic device, including:

a first display, a second display, a memory, one or more processors, and one or more programs, where the one or more programs are stored in the memory, and when the one or more processors execute the one or more programs, the electronic device is enabled to perform the following operations:

displaying a target application interface on the first display;

displaying an application control bar on the second display; and changing a first display area of the application control bar to a second display area in response to a received first operation.

When a display area of the application control bar is the first display area, the application control bar includes a first control key group.

When a display area of the application control bar is the second display area, the application control bar includes a second control key group.

Both the first control key group and the second control key group are control key sets for controlling the target application, and control keys included in the first control key group and the second control key group are not completely the same.

With reference to the twenty-second aspect, in a first possible embodiment of the twenty-second aspect, when the one or more processors execute the one or more programs, the electronic device is enabled to perform the following operations:

before the first display area of the application control bar is changed to the second display area, displaying a virtual keyboard on the second display; and after the first display area of the application control bar is changed to the second display area, changing a display layout of the virtual keyboard.

With reference to the twenty-second aspect or the first possible embodiment of the twenty-second aspect, in a second possible embodiment of the twenty-second aspect, when the one or more processors execute the one or more programs, the electronic device is enabled to perform the following operations:

before the first display area of the application control bar is changed to the second display area, the target application interface includes a third control key group;

the second display area is greater than the first display area;

the second control key group includes the first control key group and the third control key group; and after the first display area of the application control bar is changed to the second display area, a target application interface includes the third control key group.

With reference to the second possible embodiment of the twenty-second aspect, in a third possible embodiment of the twenty-second aspect, when the one or more processors execute the one or more programs, the electronic device is enabled to perform the following operation:

determining the third control key group based on the second display area and a priority sequence of to-be-displayed control keys in a to-be-displayed control key set of the target application.

With reference to the twenty-second aspect or the first possible embodiment of the twenty-second aspect, in a fourth possible embodiment of the twenty-second aspect, when the one or more processors execute the one or more programs, the electronic device is enabled to perform the following operations:

before the first display area of the application control bar is changed to the second display area, a target application interface does not include a fourth control key group, where the fourth control key group is a control key set for controlling the target application;

the second display area is less than the first display area;

the second control key group is the first control key group minus the fourth control key group; and after the first display area of the application control bar is changed to the second display area, the target application interface includes some or all of the fourth control key group.

With reference to the fourth possible embodiment of the twenty-second aspect, in a fifth possible embodiment of the twenty-second aspect, when the one or more processors execute the one or more programs, the electronic device is enabled to perform the following operation:

determining the fourth control key group based on the second display area and a priority sequence of control keys in the first control key group or a location relationship of the control keys in the first control key group.

With reference to any one of the twenty-second aspect, or the foregoing five possible embodiments of the twenty-second aspect, in a sixth possible embodiment of the twenty-second aspect, when the one or more processors execute the one or more programs, the electronic device is enabled to perform the following operations:

the first operation is a gesture operation;

in response to the received first operation, the first display area of the application control bar is changed to the second display area which specifically includes:

in response to a gesture operation, a first type of virtual keyboard corresponding to the gesture operation is selected from a plurality of types of virtual keyboards, where virtual keys included in different types of virtual keyboards in the plurality of types of virtual keyboards are not completely the same;

a first type of virtual keyboard is displayed by using the second display; and the second display area is determined based on a display region of the first type of virtual keyboard.

With reference to any one of the twenty-second aspect, or the foregoing six possible embodiments of the twenty-second aspect, in a seventh possible embodiment of the twenty-second aspect, when the one or more processors execute the one or more programs, the electronic device is enabled to perform the following operations:

in response to a received second operation, displaying a target application interface on the second display, to obtain handwriting content for the target application interface by using the second display, where the second operation indicates to enable a handwriting input mode of the target application; and after the target application interface is displayed on the second display, the second display does not include the application control bar.

The electronic device provided in the twenty-second aspect of embodiments of the present invention can implement various possible embodiments described in the twentieth aspect of embodiments of the present invention, and achieve all beneficial effects.

According to a twenty-third aspect, an embodiment of the present invention provides an electronic device, including:
- a first display, a second display, a memory, one or more processors, and one or more programs, where the one or more programs are stored in the memory, and when the one or more processors execute the one or more programs, the electronic device is enabled to perform the following operations:
- displaying a target application interface on the first display, where the target application interface includes a fifth control key group;
- displaying an application control bar on the second display; and
- in response to a third operation on the target application interface, displaying the fifth control key group in the application control bar, and hiding the fifth control key group in the target application interface.

With reference to the twenty-third aspect, in a first possible embodiment of the twenty-third aspect, when the one or more processors execute the one or more programs, before the displaying the fifth control key group in the application control bar, the electronic device is enabled to perform the following operations:
- the application control bar includes a sixth control key group, where the sixth control key group is an initial control key set for controlling a target application; and
- the target application interface does not include a sixth control key group.

With reference to the twenty-third aspect or the first possible embodiment of the twenty-third aspect, in a second possible embodiment of the twenty-third aspect, when the one or more processors execute the one or more programs, after the displaying the fifth control key group in the application control bar, the electronic device is enabled to perform the following operations:
- displaying a seventh control key group in the application control bar in response to a fourth operation on the target application interface; and
- the target application interface does not include the seventh control key.

With reference to any one of the twenty-third aspect, or the foregoing two possible embodiments of the twenty-third aspect, in a third possible embodiment of the twenty-third aspect:
- the third operation is selecting a target object in the target application interface; and
- the fifth control key group is a control key for operating a target object.

With reference to any one of the twenty-third aspect, or the foregoing two possible embodiments of the twenty-third aspect, in a fourth possible embodiment of the twenty-third aspect:
- the third operation is moving a cursor to a target location in the target application interface; and
- the fifth control key group is a control key in a menu bar that is displayed when a right mouse button is clicked at the target location.

With reference to any one of the twenty-third aspect, or the foregoing two possible embodiments of the twenty-third aspect, in a fifth possible embodiment of the twenty-third aspect:
- the third operation is browsing content in a target region on the target application interface through a slide gesture or scrolling a mouse wheel; and
- the fifth control key group is a thumbnail of the target region and a locating box for quickly locating the target object in the thumbnail.

The electronic device provided in the twenty-third aspect of embodiments of the present invention can implement various possible embodiments described in the twenty-first aspect of embodiments of the present invention, and achieve all beneficial effects.

According to a twenty-fourth aspect, an embodiment of the present invention provides a computer storage medium. The computer readable medium stores a program. When the program is run on a computer, the computer is enabled to perform the screen display method according to any one of the twentieth aspect or the foregoing eleven possible embodiments of the twentieth aspect, or implement the screen display method according to any one of the twenty-first aspect or the sixth possible embodiment of the twenty-first aspect, and achieve all the foregoing beneficial effects.

According to a twenty-fifth aspect, an embodiment of the present invention provides a computer program product. When the computer program product is run on a computer, the computer is enabled to perform the screen display method according to any one of the twentieth aspect or the foregoing eleven possible embodiments of the twentieth aspect, or implement the screen display method according to any one of the twenty-first aspect or the sixth possible embodiment of the twenty-first aspect, and achieve all the foregoing beneficial effects.

BRIEF DESCRIPTION OF DRAWINGS

FIG. 76A-1 to FIG. 76A-3 show a method for changing a display area and a control key of an application control bar based on a user operation according to an embodiment of the present invention;

FIG. 76B-1 to FIG. 76B-3 show shows another method for changing a display area and a control key of an application control bar based on a user operation according to an embodiment of the present invention;

DESCRIPTION OF EMBODIMENTS

In the specification, claims, and accompanying drawings of this application, the terms "first", "second", and the like are intended to distinguish between similar objects but do not necessarily indicate a specific order or sequence. It should be understood that the terms used in such a way are interchangeable in proper circumstances, and this is only a discrimination manner for describing objects having a same attribute in embodiments of this application. In addition, the terms "include", "contain" and any other variants mean to cover a non-exclusive inclusion, so that a process, method, system, product, or device that includes a series of units is not necessarily limited to those units, but may include other units not expressly described or inherent to such a process, method, system, product, or device.

The following describes embodiments of this application with reference to the accompanying drawings. A person of ordinary skill in the art may learn that, with development of technologies and emergence of a new scenario, the technical solutions provided in embodiments of this application are also applicable to a similar technical problem.

Embodiment 1

This embodiment of this application may be applied to various application scenarios in which input is performed by using a virtual keyboard. For example, in an application scenario such as using a text input application, producing a power point (PPT), browsing a web page, playing a video, playing music, and using a navigation application, a user may input by using the virtual keyboard. In the foregoing scenario, it is a difficult task to implement touch typing on a touchscreen.

To resolve the foregoing problem, an embodiment of this application provides a feedback method. The feedback method is applied to an electronic device provided with a touchscreen. The electronic device obtains first location information of a first contact point on the touchscreen, obtains, based on the first location information, a first virtual key corresponding to the first contact point. If the first virtual key is an anchor point key, the electronic device performs a first feedback operation, to prompt that the first virtual key is an anchor point key. This helps the user cultivate a muscle memory for the anchor point key. Touch typing training is performed based on the muscle memory for the anchor point key, to reduce difficulty in implementing touch typing on the touchscreen.

Figure 1:
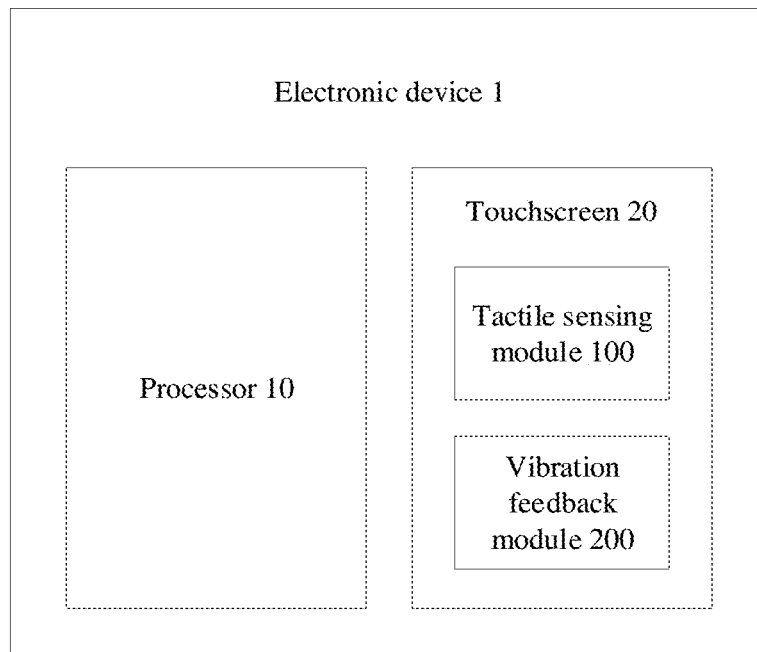
FIG. 1 is a schematic diagram of a structure of an electronic device according to an embodiment of this application.
Figure 2:
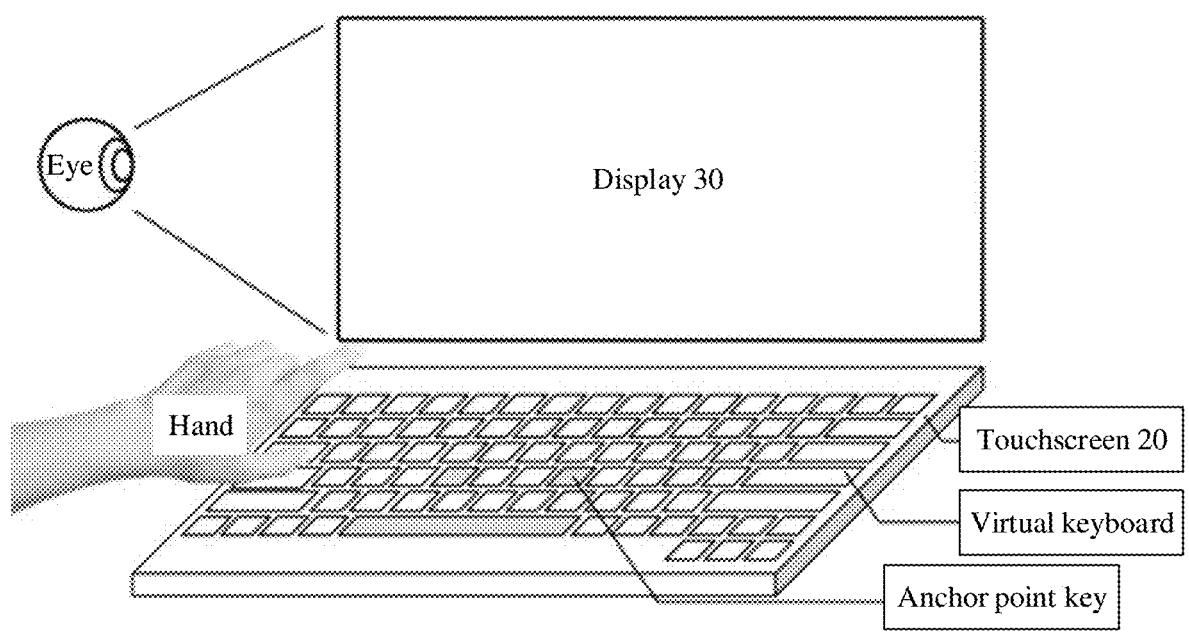
FIG. 2 is another schematic diagram of a structure of an electronic device according to an embodiment of this application.

The feedback method provided in this embodiment of this application may be applied to an electronic device shown in FIG. 1. FIG. 1 and FIG. 2 show two schematic diagrams of a structure of an electronic device according to an embodiment of this application. First refer to FIG. 1. An electronic device 1 includes a processor 10 and a touchscreen 20. The touchscreen 20 includes a tactile sensing module 100 and a vibration feedback module 200. The vibration feedback module 200 includes a plurality of vibration feedback elements.

Specifically, the processor 10 obtains first location information of a first contact point on the touchscreen by using the tactile sensing module 100. If the processor 10 determines that a first virtual key corresponding to the first contact point is an anchor point key, the processor 10 obtains, from the plurality of vibration feedback elements included in the vibration feedback module 200, a vibration feedback element that matches the first virtual keyboard, and emits a vibration wave by using the vibration feedback element that matches the first virtual key. In this case, vibration feedback is sent at the first contact point (that is, within a preset range around the first contact point on the touchscreen) by using the touchscreen, to prompt that the first virtual key touched by a user is an anchor point key. It should be noted that the vibration feedback is not full-screen vibration feedback, but vibration feedback for the first contact point, and a vibration feedback intensity at the first contact point is the largest.

In some application scenarios, as shown in FIG. 2, an electronic device 1 includes a display 30 and a touchscreen 20. A virtual keyboard is displayed on the touchscreen 20. There is an anchor point key on the virtual keyboard. In other words, the touchscreen 20 needs to have functions of displaying the virtual keyboard and performing vibration feedback. In this case, a display module further needs to be disposed on the touchscreen 20. In some other application scenarios, the electronic device 1 may alternatively be a virtual reality (VR) device, an augmented reality (AR) device, a mixed reality (MR) device, or the like. In other words, the touchscreen 20 may not need to display a virtual keyboard, and only needs to perform vibration feedback. In this case, no display module needs to be disposed in the touchscreen 20. It should be understood that in subsequent embodiments, only an example in which the display module is disposed in the touchscreen 20 is used for description.

Figure 3:
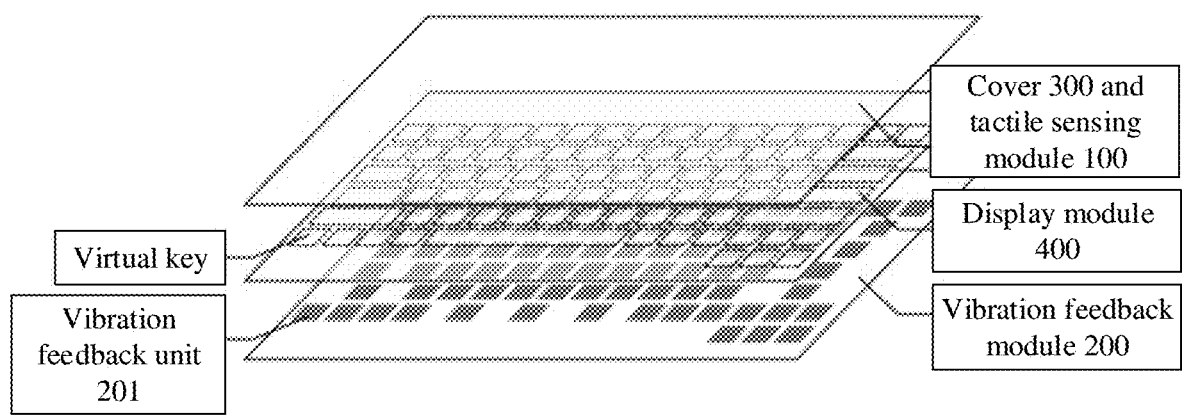
FIG. 3 is a schematic diagram of a structure of a touchscreen according to an embodiment of this application.

Further, FIG. 3 is a schematic diagram of a structure of a touchscreen according to an embodiment of this application. The touchscreen 20 may further include a cover 300 and a display module 400. FIG. 3 shows an example in which the cover 300 and a tactile sensing module 100 are integrated. The cover 300 and the tactile sensing module 100 may alternatively be separated from each other.

The cover 300 may be made of a glass-type transparent rigid material, a flexible transparent organic material, another material, or the like. The tactile sensing module 100 may be specifically represented as a tactile sensing film. The tactile sensing film may be specifically a capacitive tactile sensing film, a pressure tactile sensing film, a temperature tactile sensing film, another type of film, or the like. Further, for example, the tactile sensing film may be specifically made of indium tin oxide (ITO) wire mesh, carbon nanotube mesh with bumps, or another material, which is not exhaustively described herein. In this embodiment of this application, a plurality of specific representation forms of the vibration feedback element are provided, improving embodiment flexibility of this solution.

The display module 400 is configured to display a virtual keyboard. The display module 400 and the tactile sensing module 100 may be integrated, or may be separated from each other. FIG. 3 shows only an example in which the display module 400 and the tactile sensing module 100 are separated from each other. The display module 400 may be specifically represented as a display panel. The display panel may be specifically a liquid crystal display (LCD), an active-matrix organic light-emitting diode (AMOLED) panel, another type of display panel, or the like, which is not exhaustively described herein.

In an embodiment, as shown in FIG. 3, a vibration feedback module 200 may be specifically represented as a vibration feedback layer. The vibration feedback layer is located below the tactile sensing module 100, and may be specifically located above the display module 400, or may be located below the display module 400.

The vibration feedback module 200 is provided with a plurality of vibration feedback units 201. Each dark gray diamond in FIG. 3 represents one vibration feedback unit. One vibration feedback unit 201 may include one or more vibration feedback elements. In one case, the vibration feedback layer may be specifically represented as a vibration feedback film, and the vibration feedback film is partitioned into a plurality of vibration feedback elements. In another case, the vibration feedback element may be specifically represented as a piezoelectric ceramic sheet, a linear motor, or another type of electronic element, which is not exhaustively described herein.

Further, the plurality of vibration feedback units 201 may be arranged in a plurality of manners. In one case, refer to FIG. 3. A layout of the virtual keyboard is completely the same as that of a physical keyboard. The physical keyboard may be a keyboard including 61 keys, a keyboard having 87 keys, a keyboard having 104 keys, a keyboard having 108 keys, an ergonomic keyboard, another type of physical keyboard, or the like. A specific virtual keyboard may be flexibly designed with reference to an actual application scenario. The plurality of vibration feedback units 201 may be arranged in a one-to-one correspondence with a plurality of virtual keys. In other words, each virtual key corresponds to one vibration feedback unit 201 in location.

Figure 4:
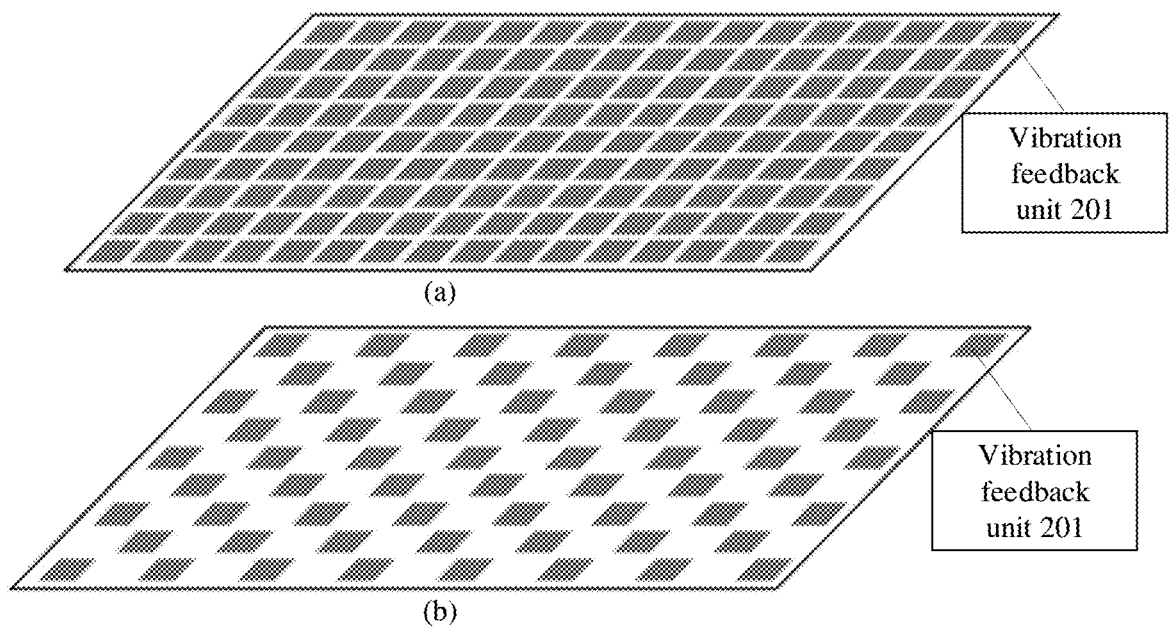
FIG. 4 is a schematic diagram of two arrangements of a plurality of vibration feedback units in an electronic device according to an embodiment of this application.

In another case, FIG. 4 is a schematic diagram of two arrangements of a plurality of vibration feedback units in an electronic device according to an embodiment of this application. FIG. 4 includes a schematic subdiagram (a) and a schematic subdiagram (b). First refer to the schematic subdiagram (a) in FIG. 4, a plurality of vibration feedback units 201 are arranged in a matrix manner. Refer to the schematic subdiagram (b) in FIG. 4. The plurality of vibration feedback units 201 are arranged in a form similar to a chess board. Each gray box in the schematic subdiagram (a) in FIG. 4 and the schematic subdiagram (b) in FIG. 4 represents one vibration feedback unit 201.

Figure 5:
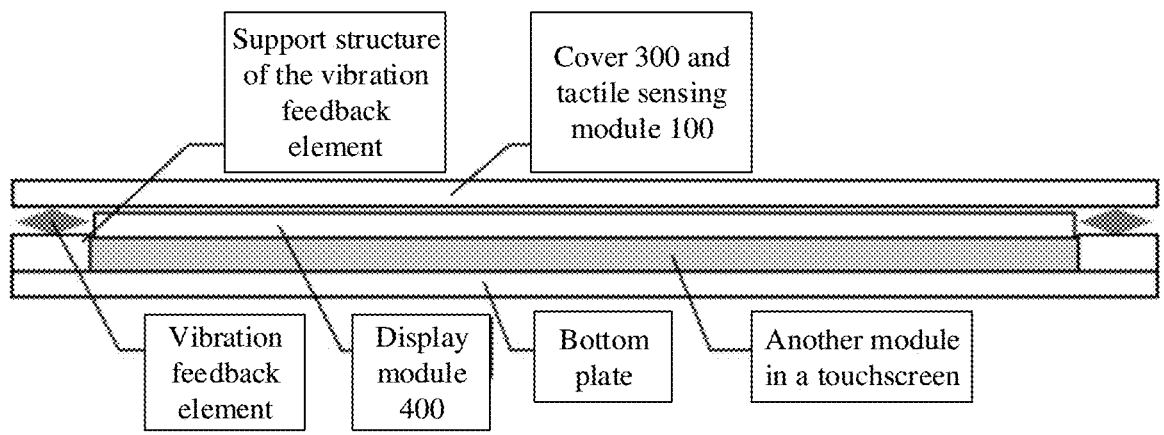
FIG. 5 is a schematic cross-sectional view of a touchscreen according to an embodiment of this application.
Figure 6:
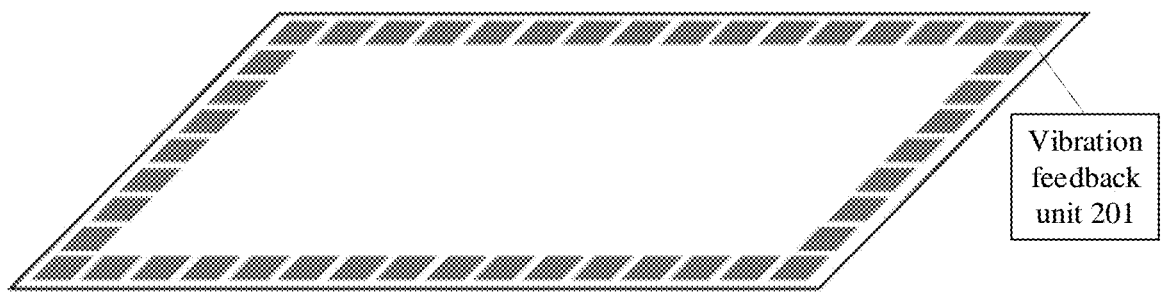
FIG. 6 is a schematic diagram of an arrangement layout of a plurality of vibration feedback units included in a vibration feedback module according to an embodiment of this application.

In another embodiment, as shown in FIG. 5 and FIG. 6, a plurality of vibration feedback units 201 (namely, a plurality of vibration feedback elements) may be located around a display module 400. FIG. 5 is a schematic cross-sectional view of a touchscreen according to an embodiment of this application. FIG. 6 is a schematic diagram of an arrangement layout of a plurality of vibration feedback units included in a vibration feedback module according to an embodiment of this application. First refer to FIG. 5. The touchscreen 20 includes a cover 300, a tactile sensing module 100, a display module 400, a vibration feedback element, a support structure of the vibration feedback element, another module in the touchscreen, and a bottom plate. FIG. 5 shows an example in which the cover 300 and the tactile sensing module 100 are integrated. A plurality of vibration feedback elements are parallel to the display module 400, and may directly support the cover 300. It should be noted that, in another embodiment, the cover 300 and the tactile sensing module 100 may alternatively be independent of each other, and a plurality of vibration feedback units may be parallel to the tactile sensing module 100. With reference to FIG. 5 and FIG. 6, it can be learned that the plurality of vibration feedback units 201 are arranged in an encircling manner. In other words, the plurality of vibration feedback units 201 encircle the display module 400. Correspondingly, in another embodiment, the plurality of vibration feedback units 201 may alternatively encircle the tactile sensing module 100.

Further, there may be a gap layer between the display module 400 and the cover 300, to provide available activity space for the vibration feedback element to emit a vibration wave. The display module 400 and the cover 300 may alternatively be bonded by a transparent adhesive material. The support structure of the vibration feedback element and the bottom plate may be integrated, or may be separated from each other. This embodiment of this application provides a plurality of arrangement layout manners of the plurality of vibration feedback units, improving embodiment flexibility of this solution.

It should be noted that the foregoing enumeration of arrangement layout manners of the plurality of vibration feedback units is only for ease of understanding of this solution. The plurality of vibration feedback units may alternatively be arranged in another manner. A specific embodiment should be determined with reference to an actual product form, and is not exhaustively described herein.

Optionally, the touchscreen 20 may further include a pressure sensing module. The pressure sensing module is configured to detect a pressure change and location on the touchscreen.

In an embodiment, the pressure sensing module and the vibration feedback module 200 may be two independent modules. In this case, the pressure sensing module may be disposed above the vibration feedback module 200, or may be disposed below the vibration feedback module 200. The pressure sensing module may be specifically represented as a pressure sensing film, a distributed pressure sensor, or another form, which is not exhaustively described herein.

In another embodiment, the pressure sensing module and the vibration feedback module 200 may alternatively be integrated. In this case, the vibration feedback module 200 may also be referred to as a pressure sensing module, and the vibration feedback element may also be referred to as a pressure sensing element. In this embodiment, the vibration feedback element may be specifically a piezoelectric ceramic sheet, a piezoelectric polymer (for example, a piezoelectric film), a piezoelectric composite, another type of element, or the like. The piezoelectric composite is a composite material obtained by using the piezoelectric ceramic sheet and the piezoelectric polymer. Further, in one case, a plurality of vibration feedback elements included in the vibration feedback module 200 (which may also be referred to as the pressure sensing module) may be classified. A second vibration feedback element in the plurality of vibration feedback elements is configured to collect a pressure value. A third vibration feedback element in the plurality of vibration feedback elements is configured to emit a vibration wave to perform vibration feedback. The second vibration feedback element and the third vibration feedback element are different vibration feedback elements. For example, one vibration feedback unit 201 includes two vibration feedback elements. One vibration feedback element in the same vibration feedback unit 201 is configured to collect a pressure value, and the other vibration feedback element is configured to emit a vibration wave to perform vibration feedback.

In another case, a plurality of vibration feedback elements in the vibration feedback module 200 (which may also be referred to as the pressure sensing module) are configured to collect a pressure value in a first time period, and are configured to emit a vibration wave in a second time period. The first time period is different from the second time period. For example, the plurality of vibration feedback elements in the vibration feedback module 200 (which may also be referred to as the pressure sensing module) may be configured to collect a pressure value in a default state. When a first pressure value threshold is reached (that is, if it is determined that a press operation is received), the plurality of vibration feedback elements are configured to emit a vibration wave to perform vibration feedback.

In this embodiment of this application, the touchscreen is further provided with the pressure sensing module for collecting the pressure value. In this way, both the location information and the pressure value of the contact point can be obtained, so that further detailed management may be performed on the contact operation obtained by using the touchscreen. In addition, the pressure sensing module and the vibration feedback module are integrated. This helps reduce a thickness of the touchscreen, further improving convenience of the electronic device.

Optionally, a tactile characteristic of the cover 300 of the touchscreen 20 is changeable. The tactile characteristic includes any one or more of the following characteristics: a sliding friction coefficient, a stick slip property, a temperature, another tactile characteristic, or the like. Further, the stick slip property represents a change speed of the sliding friction coefficient. Further, the tactile characteristic of the entire cover 300 may be changed, or only a tactile characteristic of a contact point on the cover 300 may be changed.

Figure 7:
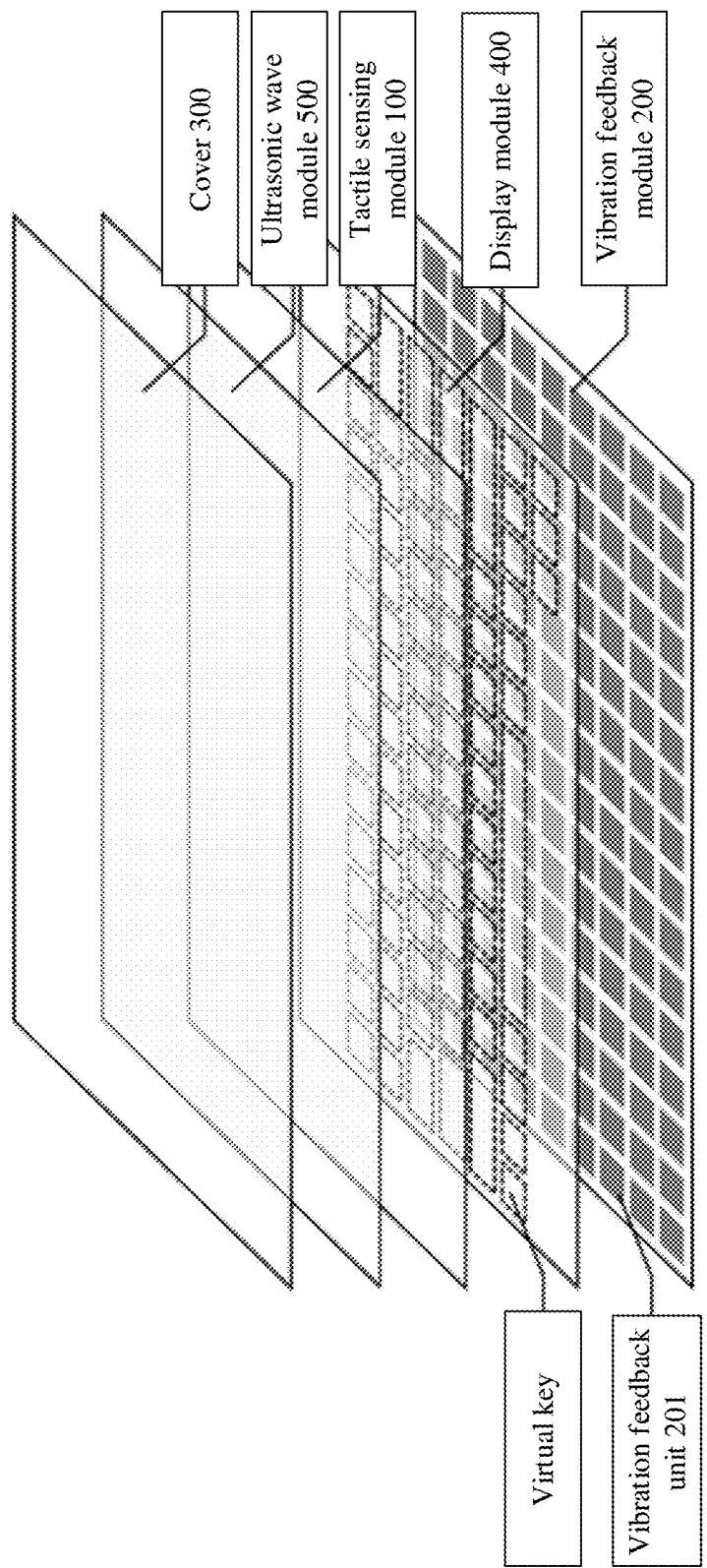
FIG. 7 is a schematic diagram of another structure of a touchscreen according to an embodiment of this application.

Specifically, in an embodiment, FIG. 7 is a schematic diagram of a structure of a touchscreen according to an embodiment of this application. The touchscreen 20 may further include an ultrasonic module 500. The ultrasonic module 500 is configured to emit an ultrasonic wave to change a tactile characteristic of a cover 300. This may be specifically implemented by using an ultrasonic vibration film, a piezoelectric film, a speaker, another component, or the like, which is not exhaustively described herein. The ultrasonic module 500 may be configured below the cover 300, and may be specifically configured above a tactile sensing module 100 or a display module 400, or may be configured below the tactile sensing module 100 or the display module 400. FIG. 7 shows an example in which the ultrasonic module 500 is configured above the tactile sensing module 100. It should be understood that the example in FIG. 7 is only for ease of understanding of this solution, and is not intended to limit this solution.

Figure 8:
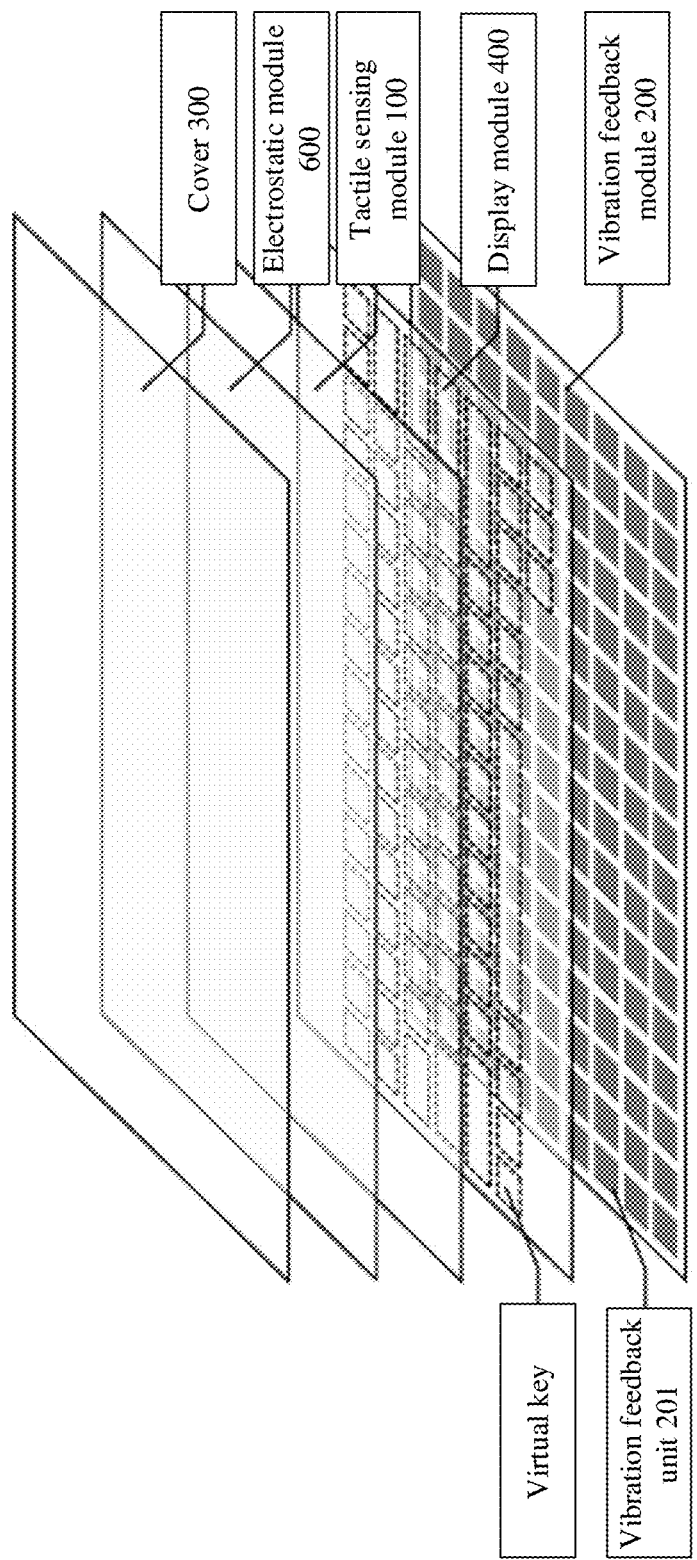
FIG. 8 is a schematic diagram of still another structure of a touchscreen according to an embodiment of this application.

In another embodiment, FIG. 8 is a schematic diagram of a structure of a touchscreen according to an embodiment of this application. The touchscreen 20 further includes an electrostatic module 600. The electrostatic module 600 is configured to generate an electrical signal, to change a tactile characteristic of a cover. The electrostatic module 600 may be specifically represented as an electrostatic film layer, and may be configured below a cover 300, and may be specifically configured above a tactile sensing module 100 or a display module 400, or may be configured below a tactile sensing module 100 or a display module 400. FIG. 8 shows an example in which the electrostatic module 600 is configured above the tactile sensing module 100. It should be understood that the example in FIG. 8 is only for ease of understanding of this solution, and is not intended to limit this solution.

In this embodiment of this application, the touchscreen may further change a tactile characteristic of the cover by disposing the ultrasonic module or the electrostatic module, to provide more abundant tactile feedback. In this way, the user may implement touch typing training on the touchscreen based on the more abundant tactile feedback, to further reduce difficulty in implementing touch typing on the touchscreen.

Figure 9:
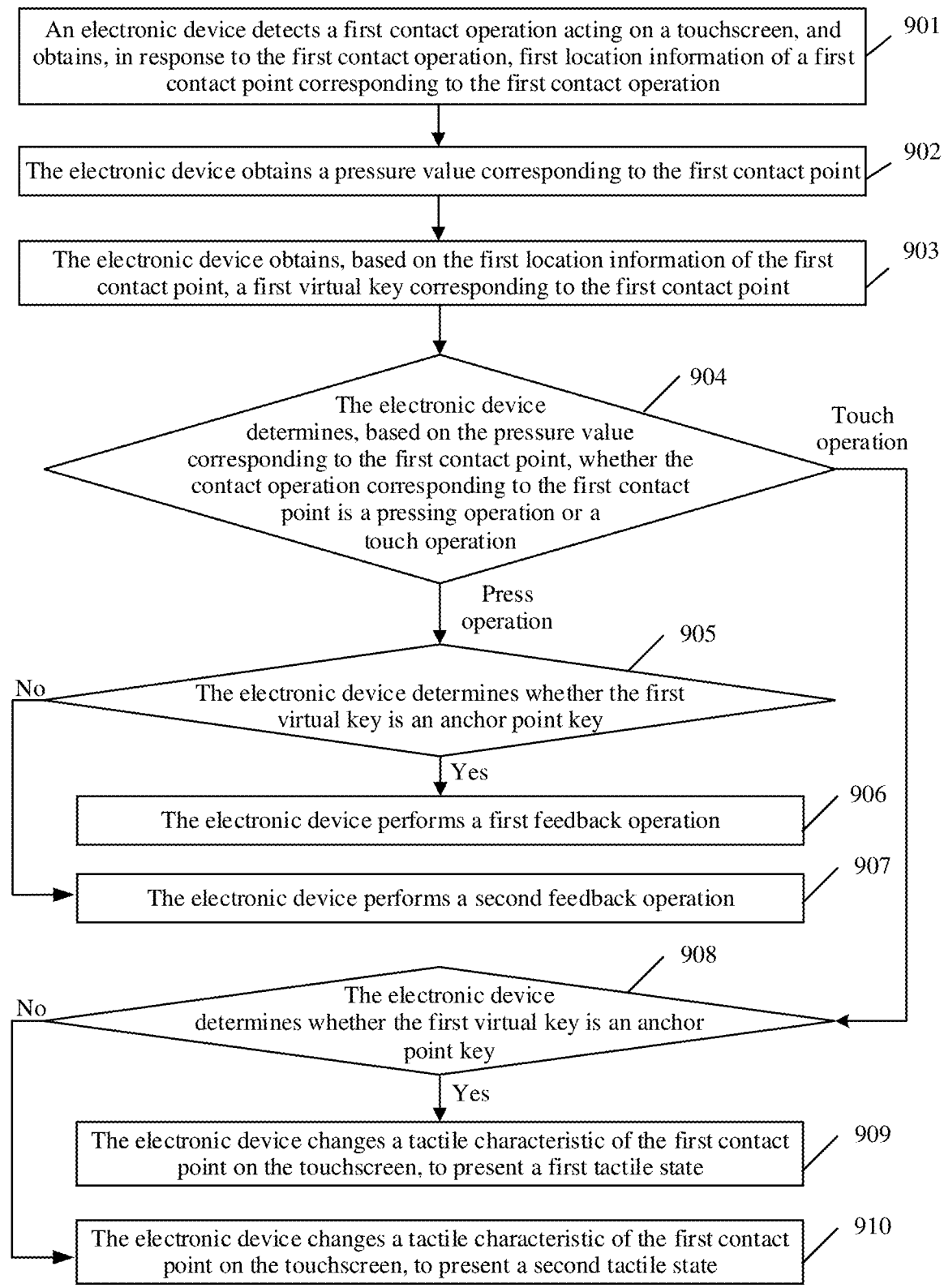
FIG. 9 is a schematic flowchart of a feedback method according to an embodiment of this application.

Based on the foregoing descriptions, an embodiment of this application provides a feedback method, which may be applied to the electronic devices shown in FIG. 1 to FIG. 8. Specifically, FIG. 9 is a schematic flowchart of a feedback method according to an embodiment of this application. The feedback method provided in this embodiment of this application may include the following operations.

901: An electronic device detects a first contact operation acting on a touchscreen, and obtains, in response to the first contact operation, first location information of a first contact point corresponding to the first contact operation.

In this embodiment of this application, the electronic device may detect, in real time, the first contact operation acting on the touchscreen. When detecting, by using the touchscreen, the first contact operation input by the user, the electronic device may obtain, in response to the first contact operation, a quantity of at least one first contact point on the touchscreen and first location information of each first contact point that are collected by using a tactile sensing module on the touchscreen. The at least one first contact point may include only a newly added contact point on the touchscreen, or may include all contact points on the touchscreen. The first location information is established based on a touchscreen coordinate system. A central point of the touchscreen, an upper left corner vertex, a lower left corner vertex, an upper right corner vertex, a lower right corner vertex, any location point on the touchscreen, or another location point may be used as an origin of the coordinate system.

More specifically, if the at least one first contact point may include only the newly added contact point on the touchscreen, when a virtual keyboard on the electronic device is enabled, a touch signal corresponding to each contact point on the touchscreen is continuously detected by using the tactile sensing module on the touchscreen. If a contact signal of a new contact point on the touchscreen is detected, location information of the at least one newly added first contact point is collected in time. For example, when a user starts a text entry application and invokes the virtual keyboard, a plurality of new first contact points on the touchscreen may be obtained from a time point when two hands are not in contact with the touchscreen to a time point when two hands are placed in a standard finger location. For another example, when the user performs keyboard input, when one finger leaves a virtual key location, moves down or slides into a key location of another virtual key location, a plurality of new first contact points appear on the touchscreen, and a new first contact point on the touchscreen may be obtained. It should be understood that, the foregoing examples are only for ease of understanding of this solution, and are not intended to limit this solution. In this embodiment of this application, the virtual keyboard may be represented as any type of keyboard. For example, the virtual keyboard may be a full-size keyboard, a numeric keyboard, a function keyboard. Alternatively, the virtual keyboard may be a collective name of all operation keys on the touchscreen.

It should be noted that anti-accidental touch processing further needs to be performed in operation 901. Specifically, a finger of the user may generate a contact point on the touchscreen, and a palm, a small arm, or a back of a hand of the user, a capacitive pen, or the like may also generate a contact point on the touchscreen. In other words, the electronic device may collect, by using the tactile sensing module of the touchscreen, a touch signal of the contact point that is generated by the palm, the small arm, or the back of the hand of the user, the capacitive pen, or the like instead of the finger of the user. After obtaining a touch signal corresponding to each newly added contact point on the touchscreen, a processor of the electronic device needs to perform filtering analysis, to filter out the obtained touch signals of the newly added contact points except a touch signal of a newly added contact point triggered by the finger. In other words, the first contact point includes only the newly added contact point triggered by the finger of the user.

In this embodiment of this application, when using a physical keyboard, the user usually focuses on an actual key that is newly touched. This solution generates feedback only for a newly added contact point, to better simulate user experience of inputting by using the physical keyboard. In addition, the feedback is generated only for the newly added contact point. It is easier to establish a memory relationship between the user and the newly added contact point, further reducing difficulty in touch typing training on the touchscreen.

Optionally, the touchscreen may be further provided with a proximity sensing module. When the virtual keyboard in the electronic device is enabled, the electronic device senses a movement track of the finger of the user on the touchscreen by using the proximity sensing module on the touchscreen, and estimates an estimated contact point between the finger and the touchscreen.

Optionally, before operation 901, the electronic device may further select, in response to a detected first gesture operation, a first type of virtual keyboard corresponding to the first gesture operation from a plurality of types of virtual keyboards. Virtual keys included in different types of virtual keyboards in the plurality of types of virtual keyboards are not completely the same. The electronic device displays the first type of virtual keyboard by using the touchscreen. A location of the first type of virtual keyboard on the touchscreen is fixed in the process of displaying the first type of virtual keyboard. If the electronic device determines that the first type of virtual keyboard is a virtual keyboard whose display location is fixed in a display process, the electronic device obtains the first location information of the first contact point on the touchscreen in real time, that is, triggers operation 901. Concepts of the first gesture operation and the plurality of types of virtual keyboards, and the specific embodiments of the foregoing operations are all described in following Embodiment 2. Details are not described herein again.

902: The electronic device obtains a pressure value corresponding to the first contact point.

In some embodiments of this application, when obtaining, by using the touchscreen, the first contact operation input by the user, the electronic device may further collect, by using a pressure sensing module on the touchscreen, a pressure value corresponding to the at least one first contact point on the touchscreen. The pressure value corresponding to the at least one first contact point on the touchscreen may include a pressure value of each of the at least one first contact point, or may be shared by the at least one first contact point.

Specifically, in one case, if the pressure sensing module on the touchscreen is independent, the pressure sensing module may directly collect the pressure value of each of the at least one first contact point.

In another case, if the pressure sensing module and the vibration feedback module are integrated, and the vibration feedback units included in the vibration feedback module are in a one-to-one correspondence with virtual keys on the virtual keyboard, the pressure sensing module may also directly collect the pressure value of each of the at least one first contact point.

In another case, the pressure sensing module and the vibration feedback module are integrated, and the vibration feedback units are not in a one-to-one correspondence with the virtual keys. For example, a plurality of vibration feedback units are arranged in the plurality of arrangement manners shown in FIG. 4 to FIG. 6. In other words, the plurality of vibration feedback units are arranged in a matrix manner, a chess manner, or an encircling manner. The electronic device may obtain a reading of each pressure sensing element (which may also be referred to as a vibration feedback element) in the pressure sensing module. Further, in an embodiment, the electronic device may obtain the pressure value of each (namely, each pressure central point) of the at least one first contact point (namely, each pressure central point) based on a coordinate location of each pressure sensing element and a pressure value collected by each pressure sensing unit according to a principle of same moments.

In another embodiment, the electronic device may alternatively calculate a pressure value of the entire touchscreen based on the pressure value collected by each pressure sensing element, and determine a pressure value of each of the at least one contact point as the pressure value of the entire touchscreen.

903: The electronic device obtains, based on the first location information of the first contact point, a first virtual key corresponding to the first contact point.

In some embodiments of this application, after obtaining first location information of each of the at least one first contact point, the electronic device may obtain, one by one, a first virtual key corresponding to each first contact point. The first virtual key is a virtual key on the virtual keyboard.

Figure 10:
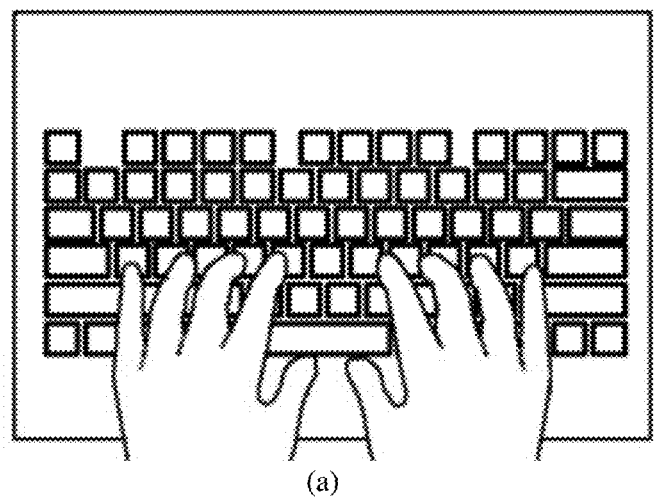
FIG. 10 shows two schematic diagrams of a virtual keyboard in a feedback method according to an embodiment of this application.
Figure 10:
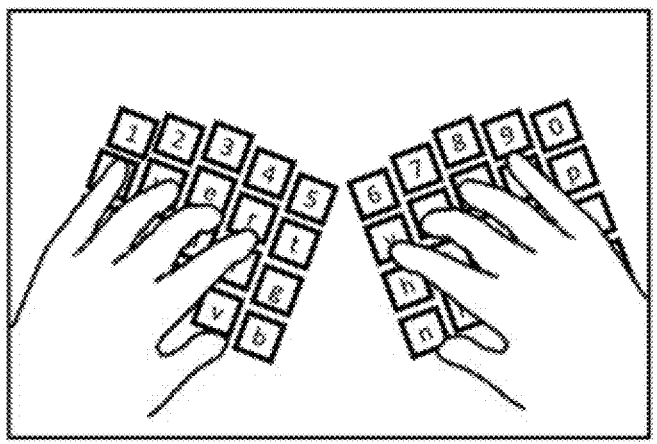

Specifically, the following describes a process of obtaining the first virtual key corresponding to the first contact point. Because the electronic device may display one or more types of virtual keyboards, the electronic device may store location information of each virtual key on each type of virtual keyboard. The electronic device determines a currently displayed virtual keyboard from the plurality of types of virtual keyboards, obtains location information of each virtual key on the currently displayed virtual keyboard, and matches the first location information of the first contact point with the location information of each virtual key on the currently displayed virtual keyboard, to determine the first virtual key corresponding to the first contact point. For more intuitive understanding of this solution, refer to FIG. 10. FIG. 10 shows two schematic diagrams of a virtual keyboard in a feedback method according to an embodiment of this application. A schematic subdiagram (a) in FIG. 10 and a schematic subdiagram (b) in FIG. 10 show two types of virtual keyboards on the touchscreen. The schematic subdiagram (a) in FIG. 10 shows a virtual keyboard corresponding to a physical keyboard with 74 keys, and the schematic subdiagram (b) in FIG. 10 shows an ergonomic keyboard. It should be understood that the example in FIG. 10 is only for ease of understanding the virtual keyboard in this solution, and is not intended to limit this solution.

For example, a currently displayed virtual keyboard is an ergonomic keyboard. After determining the first location information of the first contact point on the touchscreen by using the tactile sensing module of the touchscreen, the electronic device compares the first location information with location information of each virtual key on the ergonomic keyboard, to determine that the first contact point is located in a location region of a virtual key K. Then, the electronic device determines that the first virtual key corresponding to the first contact point is the key K. It should be understood that the examples herein are only for ease of understanding, and are not intended to limit this solution.

More specifically, in an embodiment, the first contact point may be represented as a location region in an actual situation, and then the first location information may describe a location region. Therefore, the electronic device may obtain coordinates of a central point of the first location information, and match the coordinates of the central point of the first location information with location information of each virtual key on the currently displayed virtual keyboard, to determine the first virtual key corresponding to the first contact point.

In another embodiment, the electronic device may further directly match the first location information of the first contact point with the location information of each virtual key on the currently displayed virtual keyboard, and select the first virtual key from the virtual keys. The location information of the first virtual key has a largest intersection with the first location information.

904: The electronic device determines, based on the pressure value corresponding to the first contact point, whether the contact operation corresponding to the first contact point is a press operation or a touch operation. If the contact operation is a press operation, operation 905 is performed; or if the contact operation is a touch operation, operation 908 is performed.

In some embodiments of this application, the electronic device may preset a first pressure value threshold and a second pressure value threshold. The first pressure value threshold is a threshold of a press operation, and the second pressure value threshold is a threshold of a touch operation. For any first contact point in the at least one first contact point, after obtaining the pressure value corresponding to the first contact point, the electronic device may determine whether the pressure value corresponding to the first contact point is greater than or equal to the first pressure value threshold. If the pressure value corresponding to the first contact point is greater than or equal to the first pressure value threshold, the electronic device determines that the contact operation corresponding to the first contact point is a press operation. If the pressure value corresponding to the first contact point is greater than or equal to the second pressure value threshold and is less than the first pressure value threshold, the electronic device determines that the contact operation corresponding to the first contact point is a touch operation. If the pressure value corresponding to the first contact point is less than the second pressure value threshold, the electronic device determines that the contact operation corresponding to the first contact point is an idle operation, and does not perform feedback.

A value of the first pressure value threshold is greater than a value of the second pressure value threshold. For example, a value range of the first pressure value threshold may be 50 gram-force to 60 gram-force. For example, the value of the first pressure value threshold is 55 gram-force, 60 gram-force, or another value. A value range of the second pressure value threshold may be 0 gram-force to 30 gram-force. For example, the value of the first pressure value threshold is 15 gram-force, or 20 gram-force. These are not limited herein.

905: The electronic device determines whether the first virtual key is an anchor point key. If the first virtual key is an anchor point key, operation 906 is performed; or if the first virtual key is not an anchor point key, operation 908 is performed.

In this embodiment of this application, in one case, a location of the first type of virtual keyboard is fixed in the process of displaying the first type of virtual keyboard; in another case, a location of the first type of virtual keyboard can be moved in the process of displaying the first type of virtual keyboard.

If the location of the first type of virtual keyboard is fixed in the process of displaying the first type of virtual keyboard, in an embodiment, the electronic device may prestore a specific key as an anchor point key and a specific key as a non-anchor point key. In this case, operation 903 is a mandatory operation. After determining the first virtual key corresponding to the first contact point in operation 903, the electronic device may determine whether the first virtual key is an anchor point key. In another embodiment, the electronic device may prestore a specific location region on the touchscreen as a location region of the anchor point key, and a specific location region on the touchscreen as a location region of the non-anchor point key. In this case, operation 903 is an optional operation. The electronic device directly determines, based on the first location information of the first contact point obtained in operation 901, whether the first contact point is located in the location region of the anchor point key, in other words, determines whether the first virtual key corresponding to the first location information is an anchor point key.

If the location of the first type of virtual keyboard can be moved in the process of displaying the first type of virtual keyboard, operation 903 is a mandatory operation. The electronic device may store location information of each virtual key on the first type of virtual keyboard. After obtaining the first location information of the first contact point, the electronic device obtains the first virtual key corresponding to the first contact point based on the first location information, and then determines whether the first virtual key is an anchor point key.

In this embodiment of this application, the first virtual key corresponding to the first contact point can be obtained in real time based on the first location information. In this way, this solution is compatible with both a virtual keyboard whose location is fixed and a virtual keyboard whose location is movable. This expands an application scenario of this solution.

It should be noted that meaning of the anchor point key is not equivalent to that of a positioning key, that is, the anchor point key means a key used to prompt a user. After a currently displayed virtual keyboard is determined, a specific virtual key may be preconfigured as an anchor point key in the electronic device, in other words, a specific virtual key may be predetermined as an anchor point key. Alternatively, a specific virtual key may be customized by the user as an anchor point key, that is, the user may define a specific virtual key as an anchor point key in a "setting" interface of the electronic device. Further, a same electronic device may provide a plurality of different types of virtual keys, and anchor point keys in the different types of virtual keys may also be different.

For example, the anchor point key may be a key "F" and a key "J", or the anchor point key may further include a space key. For another example, the anchor point key may further include common function keys such as an ESC key, a Backspace key, an Enter key, and a Ctrl key, and number keys. For another example, the virtual keyboard uses a "DVORAK" layout mode, and the anchor point key may include eight standard finger location keys "AOEUHTNS". For another example, the virtual keyboard adopts an "AZERTY" layout mode, and the anchor point keys may further include eight keys "QSDFJKLM". For another example, the anchor point keys may further include six keys "AZERTY", and the like. The anchor point keys are not exhaustively described herein.

906: The electronic device performs a first feedback operation.

In this embodiment of this application, if the contact operation corresponding to the first contact point is a press operation, and the first virtual key is an anchor point key, the electronic device performs the first feedback operation. The first feedback operation is used to prompt that the first virtual key is an anchor point key.

Specifically, in an embodiment, the first feedback operation may be in a form of vibration feedback. In this case, operation 906 may include: The electronic device obtains a first vibration feedback element from a plurality of vibration feedback elements, where the touchscreen is provided with the first vibration feedback element, the first vibration feedback element is a vibration feedback element that matches the first virtual key, and vibration feedback elements that match different virtual keys are not completely the same; and emits a first type of vibration wave by using the first vibration feedback element, to perform the first feedback operation. The vibration wave emitted by the vibration feedback element is a non-ultrasonic wave, and a frequency is usually less than or equal to 500 hertz.

More specifically, the following describes a process of obtaining the first vibration feedback element that matches the first virtual key. Before the electronic device is delivered from a factory, a location of each of the plurality of vibration feedback elements included in the touchscreen is fixed. Therefore, a first mapping relationship may be configured before the electronic device is delivered from the factory. In an embodiment, the entire touchscreen may be divided into a plurality of location regions, and the first mapping relationship stored in the electronic device includes a correspondence between each of the plurality of location regions on the touchscreen and at least one vibration feedback element. Therefore, regardless of whether the location of the first type of virtual keyboard is fixed or can be moved in the process of displaying the first type of virtual keyboard, the electronic device may obtain, based on the first location information that is obtained in operation 901 and the first mapping relationship, at least one first vibration feedback element that matches the first virtual key (in other words, matches the first location information) from the plurality of vibration feedback elements. In this embodiment of this application, at least one first vibration feedback element that matches the first virtual key can be obtained based on the first location information and the first mapping relationship. This is convenient and helps improve efficiency of a matching process of the vibration feedback element. In addition, the first mapping relationship can indicate a correspondence between the first location information and one first vibration feedback element. In this way, this solution is compatible with both a virtual keyboard whose location is fixed and a virtual keyboard whose location is movable. This ensures that vibration feedback can be provided in various scenarios.

In another embodiment, if the location of the first type of virtual keyboard is fixed in the process of displaying the first type of virtual keyboard, the electronic device may be preconfigured with a plurality of mapping relationships that are in a one-to-one correspondence with a plurality of virtual keyboards. Each mapping relationship includes a correspondence between each virtual key of the plurality of virtual keys and at least one vibration feedback element. Therefore, the electronic device first obtains, from the plurality of mapping relationships, a first mapping relationship that matches a currently displayed virtual keyboard. The first mapping relationship includes a correspondence between each virtual key on the currently displayed virtual keyboard and the at least one first vibration feedback element. The electronic device obtains, based on the first mapping relationship and the first virtual key determined in operation 903, one or more first vibration feedback elements that match the first virtual key.

In this embodiment of this application, the first mapping relationship is preconfigured, so that after the first virtual key is obtained, at least one first vibration feedback element that matches the first virtual key can be obtained based on the first mapping relationship. This is convenient and helps improve efficiency of a matching process of the vibration feedback element. The operation of determining the vibration feedback element is split, so that when a fault occurs, a fault location can be precisely located.

In another embodiment, the electronic device is preconfigured with location information of each vibration feedback element. The electronic device determines, based on first location information of the first virtual key and the location information of each vibration feedback element in the vibration feedback module, whether there is a vibration feedback element configured to generate a vibration wave below the first virtual key. If there is the vibration feedback element that is configured to generate the vibration wave below the first virtual key, the electronic device obtains at least one vibration feedback element located below the first virtual key. The at least one vibration feedback element located below the first virtual key means a vibration feedback element whose location region intersects a projection of the first virtual key on the vibration feedback module. If there is no vibration feedback element that is configured to generate a vibration wave below the first virtual key, the electronic device searches, by using central point coordinates of the first location information of the first virtual key as a central point, for a vibration feedback element that is configured to generate a vibration wave and that is located in a preset region. The preset region may be a circle, a square, a rectangle, or the like. A size of the preset region may be determined with reference to factors such as an arrangement layout of the vibration feedback element and an element type used by the vibration feedback element. This is not limited herein.

The following describes a process of emitting the vibration wave by using the first vibration feedback element to perform the first feedback operation. Specifically, after the electronic device determines the at least one first vibration feedback element that matches the virtual key, the electronic device emits a first type of vibration wave by using the at least one first vibration feedback element.

Optionally, the electronic device may further obtain, based on the first location information of the first contact point, a location type corresponding to the first contact point. The location type includes that the first contact point is located in a first location region of the anchor point key and the first contact point is located in a second location region of the anchor point key, where the first location region is different from the second location region. That is, all location regions of one anchor point key are further divided into the first location region (which may also be referred to as a characteristic region of the anchor point key) and the second location region (which may also be referred to as a side region of the anchor point key). A division manner of the first location region and the second location region in different virtual keys may be different.

Figure 11:
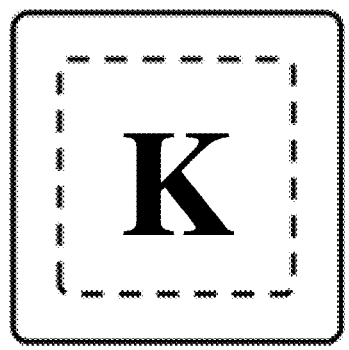
FIG. 11 shows two schematic diagrams of a first location region and a second location region in a feedback method according to an embodiment of this application.
Figure 11:
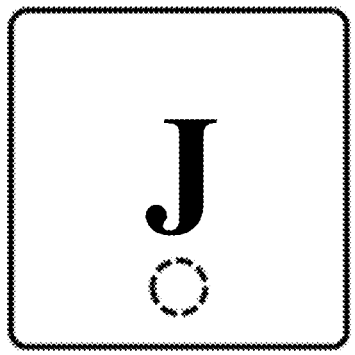
Figure 12:
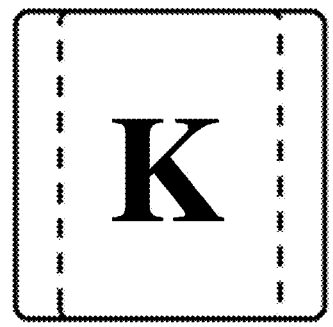
FIG. 12 is another schematic diagram of a first location region and a second location region in a feedback method according to an embodiment of this application.
Figure 13:
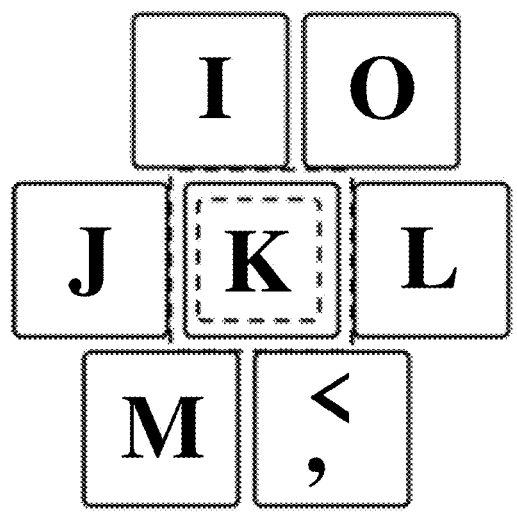
FIG. 13 is still another schematic diagram of a first location region and a second location region in a feedback method according to an embodiment of this application.

For more intuitive understanding of this solution, refer to FIG. 11 to FIG. 13. FIG. 11 to FIG. 13 show four schematic diagrams of a first location region and a second location region in a feedback method according to an embodiment of this application. FIG. 11 includes two schematic subdiagrams (a) and (b). A region inside a dashed box in the schematic subdiagram (a) in FIG. 11 represents a first location region of a virtual key K (which may also be a characteristic location region of the key K), and a region outside the dashed box in the schematic subdiagram (a) in FIG. 11 represents a second location region of the virtual key K (which may also be a side location region of the key K). A region inside a dashed box in the schematic subdiagram (b) in FIG. 11 represents a first location region of a virtual key J, and a region outside the dashed box in the schematic subdiagram (b) in FIG. 11 represents a second location region of the virtual key J. The schematic subdiagram (b) in FIG. 11 may show a division manner of a first location region and a second location region of a virtual key corresponding to a button having a small bump in a physical keyboard.

Still refer to FIG. 12. A region inside a dashed box in FIG. 12 represents a first location region of a virtual key K, and a region outside the dashed box in FIG. 12 represents a second location region of the virtual key K. FIG. 12 and the schematic subdiagram (a) in FIG. 11 show two different region division manners. A division manner in FIG. 12 is to simulate a keycap having a concave arc surface in a physical keyboard. Refer to FIG. 13. In FIG. 13, the region inside the dashed box of the virtual key K represents the first location region of the virtual key K. In FIG. 13, a region between two dashed boxes of the virtual key K represents the second location region of the virtual key K. FIG. 13, FIG. 12, and the schematic subdiagram (a) in FIG. 11 show different region division manners. If the virtual key is an anchor point key, the second location region (which may also be referred to as the side location region of the virtual key) of the virtual key K is extended beyond a side of the virtual key K, and covers a key gap around the virtual key K. This can further enhance a tactile difference degree of the anchor point key. It should be understood that the division manners of the first location region and the second location region shown in FIG. 11 to FIG. 13 are only for ease of understanding of concepts of the first location region and the second location region. In an actual case, the first location region and the second location region may be divided with reference to factors such as an actual application product form and a user habit. This is not limited herein.

The electronic device may determine, based on the location type corresponding to the first contact point, a type of the vibration wave emitted by the first vibration feedback element. If the first contact point is located in the first location region of the anchor point key, and if the first contact point is located in the second location region of the anchor point key, a type of a vibration wave emitted by the electronic device by using the at least one first vibration feedback element may be different. If the electronic device emits a continuous vibration wave by using the vibration feedback element, different types of vibration waves are different in any one or more of the following characteristics: a vibration amplitude, a vibration frequency, vibration duration, or a vibration waveform. If the electronic device emits a vibration wave in a pulse form by using the vibration feedback element, different types of vibration waves are different in any one or more of the following characteristics: a vibration amplitude, a vibration frequency, vibration duration, a vibration waveform, or a frequency of a vibration wave in a pulse form that is emitted by the electronic device.

Further, vibration waves with different vibration amplitudes may be implemented by using different trigger voltages. A vibration amplitude of a vibration wave generated when a 300 V voltage is input to the vibration feedback element is different from a vibration amplitude of a vibration wave generated when a 400 V voltage is input to the vibration feedback element. A vibration frequency of the vibration wave emitted by the vibration feedback element corresponding to the anchor point key may be between 200 hertz and 400 hertz, for example, 240 hertz, 260 hertz, 300 hertz, 350 hertz, 380 hertz, or another value, which is not exhaustively described herein. The vibration duration may be 10 milliseconds, 15 milliseconds, 20 milliseconds, 25 milliseconds, 30 milliseconds, or the like. The vibration wave emitted by the vibration feedback element corresponding to the anchor point key may be in a single basic waveform, or may be a superposition of a plurality of different basic waveforms. The foregoing basic waveform includes but is not limited to a square wave, a sine wave, a sawtooth wave, a triangular wave, another type of basic waveform, or the like. For example, a vibration wave emitted by one first vibration feedback element may be a sine wave that is generated by using a 350 V voltage (which determines a vibration amplitude), whose vibration frequency is 290 hertz, and whose duration is 20 milliseconds. It should be understood that the examples herein are only for ease of understanding of this solution, and are not intended to limit this solution.

Optionally, at least one first vibration feedback element in the touchscreen matches the first virtual key, and there is still a second virtual key on the virtual keyboard. A quantity of vibration feedback elements of the second virtual key and a quantity of vibration feedback elements corresponding to the first virtual key may be different or the same, in other words, quantities of vibration feedback elements corresponding to different virtual keys may be the same or different. For example, a quantity of vibration feedback elements corresponding to the virtual key K may be 3, and a quantity of vibration feedback elements corresponding to the virtual key J may be 2.

To ensure that a difference between a vibration feedback intensity corresponding to the first virtual key and a vibration feedback intensity corresponding to the second virtual key falls within a preset intensity range, in other words, to enable a difference between a total vibration feedback intensity (namely, a vibration feedback intensity that can be sensed by the user) corresponding to a different virtual key to fall within the preset intensity range, the electronic device obtains a vibration intensity of a vibration wave corresponding to each of the at least one first vibration feedback element. The vibration intensity of the vibration wave of each of the at least one first vibration feedback element is related to a first quantity. The first quantity is a quantity of the vibration feedback elements that match the first virtual key. Further, the electronic device emits, based on the vibration intensity of the vibration wave corresponding to each first vibration feedback element, a first type of vibration wave by using each of the at least one first vibration feedback element. The preset intensity range may be an intensity difference within 2%, an intensity difference within 3%, an intensity difference within 4%, an intensity difference within 5%, another intensity range, or the like, which is not exhaustively described herein.

Specifically, in an embodiment, after determining the at least one first vibration feedback element that matches the first virtual key, the electronic device may directly determine, based on a quantity of first vibration feedback elements that match the first virtual key, the vibration intensity of the vibration wave corresponding to each of the at least one first vibration feedback element. The electronic device may determine the vibration intensity of the vibration wave of each first vibration feedback element based on any one or a combination of the following factors: the quantity of the first vibration feedback elements that match the first virtual key, a distance between each first vibration feedback unit and a central point of the first virtual key, a type of the vibration wave, whether the virtual key is an anchor point key, a location type of the first location information, another factor, or the like.

In another embodiment, the electronic device may pre-store a second mapping relationship. In one case, the second mapping relationship indicates a relationship between a vibration intensity of each first vibration feedback element corresponding to the first location information, and then the electronic device may obtain the vibration intensity of each first vibration feedback element based on the first location information obtained in operation 901 and the second mapping relationship. In another case, the second mapping relationship indicates a relationship between the first virtual key and a vibration intensity of each first vibration feedback element, and then the electronic device obtains the vibration intensity of each first vibration feedback element based on the first virtual key obtained in operation 903 and the second mapping relationship.

Further, in a process of measuring an intensity on a surface of the touchscreen, a probe of a vibration measurement instrument may be attached to a surface of one virtual key (namely, a detection point) on the touchscreen, to collect a vibration wave at the detection point and further obtain a waveform curve of the collected vibration wave. The waveform curve indicates a vibration feedback intensity corresponding to the detection point. Further, the difference between the vibration feedback intensity corresponding to the first virtual key and the vibration feedback intensity corresponding to the second virtual key may be obtained by comparing a waveform curve measured at a detection point of the first virtual key and a waveform curve measured at a detection point of the second virtual key.

In this embodiment of this application, different virtual keys may correspond to different quantities of vibration feedback elements. Therefore, the intensity of each vibration feedback element is determined based on a quantity of matched vibration feedback elements, so that a difference between vibration feedback intensities of the virtual keys falls within a preset range. When the user uses a physical key, force feedbacks provided by different keys are basically the same. Therefore, a difference between the virtual keyboard and the physical keyboard can be reduced, and user viscosity is enhanced.

In another embodiment, the first feedback operation may be in a form of sound feedback, and operation 907 may include: The electronic device sends a first alert tone. The first alert tone may be a sound such as "beeping", "buzzing", or "humming". A specific representation form of the first alert tone is not exhaustively described herein.

Optionally, the electronic device may further obtain, based on the first location information of the first contact point, the location type corresponding to the first contact point. If the first contact point is located in the first location region of the anchor point key, and if the first contact point is located in the second location region of the anchor point key, the electronic device sends different alert tones. For example, if the first contact point is located in the first location region of the anchor point key, the electronic device sends a "beeping" alert tone; or if the first contact point is located in the second location region of the anchor point key, the electronic device sends a "buzzing" alert tone.

The electronic device may further use another type of feedback manner other than sound feedback and vibration feedback. A specific type of feedback manner to be used may be determined with reference to an actual product form and an actual application scenario of a product, and is not exhaustively described herein.

907: The electronic device performs a second feedback operation.

In some embodiments of this application, if the contact operation corresponding to the first contact point is a press operation, and the first virtual key is not an anchor point key, the electronic device may perform the second feedback operation. The second feedback operation is used to prompt that the first virtual key is a non-anchor point key, and the first feedback operation and the second feedback operation are different feedback operations. In this embodiment of this application, feedback operations are performed in both cases in which the first virtual key is an anchor point key or the first virtual key is a non-anchor point key. The first feedback operation and the second feedback operation are different feedback operations. When the user uses the physical keyboard, each key provides feedback for the user. In the foregoing manner, a similarity between the virtual keyboard and the physical keyboard can be increased. In addition, different feedback operations are provided for the anchor point key and the non-anchor point key. This can also help the user remember different types of keys, and help the user implement touch typing on the virtual keyboard.

In an embodiment, the second feedback operation may be in a form of vibration feedback. In this case, operation 907 may include: The electronic device obtains the first vibration feedback element that matches the first virtual key, where the touchscreen is provided with the first vibration feedback element; and emits a second type of vibration wave by using the first vibration feedback element, to perform the second feedback operation. A difference between the first type of vibration wave and the second type of vibration wave includes any one or more of the following characteristics: a vibration amplitude, a vibration frequency, vibration duration, and a vibration waveform. This embodiment of this application provides a specific manner of distinguishing different types of vibration waves. Different types of vibration waves may be distinguished based on the vibration amplitude, the vibration frequency, the vibration duration, the vibration waveform, and/or the like. This improves embodiment flexibility of this solution.

Specifically, for a specific embodiment of obtaining, by the electronic device, the first vibration feedback element that matches the first virtual key, refer to the description in operation 906. Details are not described herein again.

The following describes a process of emitting the vibration wave by using the first vibration feedback element to perform the second feedback operation. Specifically, after the electronic device determines the at least one first vibration feedback element that matches the virtual key, the electronic device emits a second type of vibration wave by using the at least one first vibration feedback element.

Optionally, if the first virtual key is not an anchor point key, the electronic device may also obtain, based on the first location information of the first contact point, the location type corresponding to the first contact point. The location type includes that the first contact point is located in a first location region of the non-anchor point key and the first contact point is located in a second location region of the non-anchor point key, where the first location region is different from the second location region. That is, all location regions of one non-anchor point key are further divided into the first location region (which may also be referred to as a characteristic region of the anchor point key) and the second location region (which may also be referred to as a side region of the non-anchor point key). A division manner of the first location region and the second location region in different virtual keys may be different.

The electronic device may determine, based on the location type corresponding to the first contact point, a type of the vibration wave emitted by the first vibration feedback element. If the first contact point is located in the first location region of the non-anchor point key, and if the first contact point is located in the second location region of the non-anchor point key, a type of a vibration wave emitted by the electronic device by using the at least one first vibration feedback element may be different.

Further, in one case, a type of a vibration wave corresponding to the first location region of the anchor point key is the same as a type of a vibration wave corresponding to the first location region of the non-anchor point key, and a type of a vibration wave corresponding to the second location region of the anchor point key is different from a type of a vibration wave corresponding to the second location region of the non-anchor point key.

In another case, a type of a vibration wave corresponding to the first location region of the anchor point key is different from a type of a vibration wave corresponding to the first location region of the non-anchor point key, and a type of a vibration wave corresponding to the second location region of the anchor point key is the same as a type of a vibration wave corresponding to the second location region of the non-anchor point key.

In another case, a type of a vibration wave corresponding to the first location region of the anchor point key is different from a type of a vibration wave corresponding to the first location region of the non-anchor point key, and a type of a vibration wave corresponding to the second location region of the anchor point key is different from a type of a vibration wave corresponding to the second location region of the non-anchor point key.

In this embodiment of this application, all location regions of the anchor point key and/or the non-anchor point key are divided into the first location region and the second location region. If the first contact point is located in the first location region, and if the first contact point is located in the second location region, the electronic device emits different types of vibration waves by using at least one first vibration feedback element. This helps the user remember a boundary of the virtual key, in other words, helps the user establish a muscle memory for different regions of the virtual key, to further reduce difficulty in implementing touch typing on the touchscreen.

In another embodiment, the second feedback operation may be in a form of sound feedback, and operation 907 may include: The electronic device sends a second alert tone. The second alert tone and the first alert tone are different alert tones.

Optionally, the electronic device may further obtain, based on the first location information of the first contact point, the location type corresponding to the first contact point. If the first contact point is located in the first location region of the non-anchor point key, and if the first contact point is located in the second location region of the non-anchor point key, the electronic device sends different prompt tones.

It should be noted that operation 907 is an optional operation, and operation 907 may not be performed. In other words, if the electronic device determines that the first virtual key is not an anchor point key, feedback may not be performed.

908: The electronic device determines whether the first virtual key is an anchor point key. If the first virtual key is an anchor point key, operation 909 is performed; or if the first virtual key is not an anchor point key, operation 910 is performed.

In this embodiment of this application, for a specific embodiment of operation 908, refer to the foregoing description of operation 905. Details are not described herein again.

909: The electronic device changes the tactile characteristic of the first contact point on the touchscreen, to present a first tactile state.

In some embodiments of this application, if the contact operation corresponding to the first contact point is a press operation, and the first virtual key is an anchor point key, the electronic device changes the tactile characteristic of the first contact point on a cover of the touchscreen, to present the first tactile state. The tactile characteristic of the cover of the touchscreen includes any one or more of the following characteristics: a sliding friction coefficient, a stick slip property, a temperature, another type of tactile characteristic, and the like. The electronic device may change the tactile characteristic of the entire cover of the touchscreen to the first tactile state, to change the first contact point on the cover of the touchscreen to the first tactile state. Alternatively, the electronic device may change only the first contact point on the cover of the touchscreen to the first tactile state, without changing a tactile state of another region in the cover of the touchscreen.

Specifically, in an embodiment, if an ultrasonic module is integrated into the touchscreen of the electronic device, the electronic device changes the tactile characteristic of the first contact point on the cover of the touchscreen by emitting an ultrasonic wave by using the ultrasonic module on the touchscreen. In this case, the electronic device may emit different types of ultrasonic waves by using the ultrasonic module, so that the first contact point on the cover of the touchscreen presents different tactile characteristics. If the electronic device emits a single ultrasonic wave by using the ultrasonic module, different types of ultrasonic waves are different in any one or more of the following characteristics: a vibration amplitude, a vibration frequency, vibration duration, or a vibration waveform. Further, a frequency of the ultrasonic wave emitted by the ultrasonic module is greater than 20 kHz, and may be specifically 21 kHz, 22 kHz, 24 kHz, 25 kHz, another value, or the like. This is not limited herein. If the electronic device emits a pulse wave by using the ultrasonic module, different types of ultrasonic waves are different in any one or more of the following characteristics: a vibration amplitude, a vibration frequency, vibration duration, a vibration waveform, or a frequency at which the electronic device emits the pulse wave. The frequency at which the electronic device emits the pulse wave may also be referred to as a rhythm at which the electronic device emits the pulse wave. For example, the electronic device emits one ultrasonic wave in a pulse form at an interval of 3 milliseconds by using the ultrasonic module, and the electronic device emits an ultrasonic wave in a pulse form at an interval of 10 milliseconds by using the ultrasonic module. In the foregoing two cases, each frequency at which the electronic device emits the pulse wave is different. It should be understood that the examples herein are only for ease of understanding of this solution, and are not intended to limit this solution.

Therefore, operation 909 may include: The electronic device obtains a third type of ultrasonic wave corresponding to the anchor point key, and emits the third type of ultrasonic wave by using the ultrasonic module on the touchscreen, to change the tactile characteristic of the first contact point on the touchscreen to the first tactile state.

Optionally, if the contact operation corresponding to the first contact point is a press operation, and the first virtual key is an anchor point key, the electronic device may further obtain, based on the first location information of the first contact point, the location type corresponding to the first contact point. The electronic device may further determine, based on the location type corresponding to the first contact point, a type of an ultrasonic wave corresponding to the first location information, and further emit the foregoing type of ultrasonic wave by using the ultrasonic module on the touchscreen. If the first contact point is located in the first location region of the anchor point key, and if the first contact point is located in the second location region of the anchor point key, a type of the ultrasonic wave emitted by the electronic device by using the ultrasonic module may be different.

In another embodiment, if an electrostatic module is integrated into the touchscreen of the electronic device, the electronic device changes the tactile characteristic of the first contact point on the cover of the touchscreen by emitting static electricity by using the electrostatic module on the touchscreen. In this case, the electronic device may emit static electricity of different magnitudes by using the electrostatic module, so that the first contact point on the cover of the touchscreen presents different tactile characteristics. A volt value of static electricity emitted by the electrostatic module may range from 100 volts to 400 volts. For example, a volt value of static electricity emitted by the electrostatic module is 120 volts, 200 volts, 380 volts, or another value. This is not limited herein.

Therefore, operation 909 may include: The electronic device obtains a first volt value of static electricity corresponding to the anchor point key, and emits the static electricity of the first volt value by using the electrostatic module on the touchscreen, to change the tactile characteristic of the first contact point on the touchscreen to the first tactile state.

Optionally, if the contact operation corresponding to the first contact point is a press operation, and the first virtual key is an anchor point key, the electronic device may further obtain, based on the first location information of the first contact point, the location type corresponding to the first contact point. The electronic device determines, based on the location type corresponding to the first contact point, a volt value of a current corresponding to the first location information, and further emits the current of the volt value by using a current module on the touchscreen. If the first contact point is located in the first location region of the anchor point key, and if the first contact point is located in the second location region of the anchor point key, a volt value of the current emitted by the electronic device through the current module may be different.

It should be noted that the electronic device may further change the tactile characteristic of the cover on the touchscreen in another manner, which is not described one by one herein.

910: The electronic device changes the tactile characteristic of the first contact point on the touchscreen, to present a second tactile state.

In some embodiments of this application, if the contact operation corresponding to the first contact point is a press operation, and the first virtual key is a non-anchor point key, the electronic device changes the tactile characteristic of the first contact point on the cover of the touchscreen, to present the second tactile state. A tactile characteristic when the touchscreen presents the first tactile state may be different from a tactile characteristic when the touchscreen presents the second tactile state, in other words, a feeling of touching the anchor point key by the user may be different from a feeling of touching the non-anchor point key by the user. This can further assist the user in distinguishing the anchor point key and the non-anchor point key on the virtual keyboard, and further assist the user in locating the virtual key on the virtual keyboard.

Specifically, in an embodiment, if an ultrasonic module is integrated into the touchscreen of the electronic device, the electronic device changes the tactile characteristic of the first contact point on the cover of the touchscreen by emitting an ultrasonic wave by using the ultrasonic module on the touchscreen. Therefore, operation 910 may include: The electronic device obtains a fourth type of ultrasonic wave corresponding to the non-anchor point key, and emits the fourth type of ultrasonic wave by using the ultrasonic module on the touchscreen, to change the tactile characteristic of the first contact point on the touchscreen to the second tactile state.

Optionally, if the contact operation corresponding to the first contact point is a press operation, and the first virtual key is a non-anchor point key, the electronic device may further obtain the location type corresponding to the first contact point. The electronic device determines, based on the location type corresponding to the first contact point, the type of the ultrasonic wave corresponding to the first location information. If the first contact point is located in the first location region of the non-anchor point key, and if the first contact point is located in the second location region of the non-anchor point key, a type of the ultrasonic wave emitted by the electronic device by using the ultrasonic module may be different.

In another embodiment, if an electrostatic module is integrated into the touchscreen of the electronic device, the electronic device changes the tactile characteristic of the first contact point on the cover of the touchscreen by emitting static electricity by using the electrostatic module on the touchscreen. Therefore, operation 909 may include: The electronic device obtains a second volt value of static electricity corresponding to the anchor point key, and emits the static electricity of the second volt value by using the electrostatic module on the touchscreen, to change the tactile characteristic of the first contact point on the touchscreen to the second tactile state.

Optionally, if the contact operation corresponding to the first contact point is a press operation, and the first virtual key is an anchor point key, the electronic device may further obtain the location type corresponding to the first contact point. The electronic device determines, based on the location type corresponding to the first contact point, the volt value of the current corresponding to the first location information. If the first contact point is located in the first location region of the non-anchor point key, and if the first contact point is located in the second location region of the non-anchor point key, a volt value of the current emitted by the electronic device through the current module may be different.

It should be noted that operation 908 is an optional operation. If operation 908 is not performed, operations 909 and 910 may be combined. In other words, if the contact operation corresponding to the first contact point is a touch operation, regardless of whether the first virtual key is an anchor point key or a non-anchor point key, the tactile characteristic of the first contact point on the touchscreen may present a same tactile state.

In addition, operations 908 to 910 are all optional operations. After determining that the contact operation corresponding to the first contact point is not a press operation, the electronic device may not directly perform feedback. In other words, if the pressure value corresponding to the first contact point is less than the first pressure value threshold, the electronic device may not perform feedback.

In this embodiment of this application, when the user touches an anchor point key in the virtual key, the user performs a first feedback operation by using the touchscreen, to prompt the user that the user is currently touching an anchor point key, so that the user can sense a location of the anchor point key. This can reduce difficulty in implementing touch typing on the touchscreen. In addition, the touchscreen is provided with a plurality of vibration feedback elements. If the first virtual key is determined as an anchor point key, at least one first vibration feedback element that matches the first virtual key is obtained from the plurality of vibration feedback elements. The at least one first vibration feedback is indicated to emit a vibration wave. This can generate vibration feedback effect only around the first virtual key, in other words, vibration feedback is not performed on a full screen. All fingers are placed on the touchscreen during typing. If the full screen vibrates, all fingers feel vibration. The user is likely to be confused. However, if the vibration feedback effect is generated only around the first virtual key, the user is not likely to be confused. It is easier to help the user form a muscle memory at the finger, to assist the user in implementing touch typing on the touchscreen.

Figure 14:
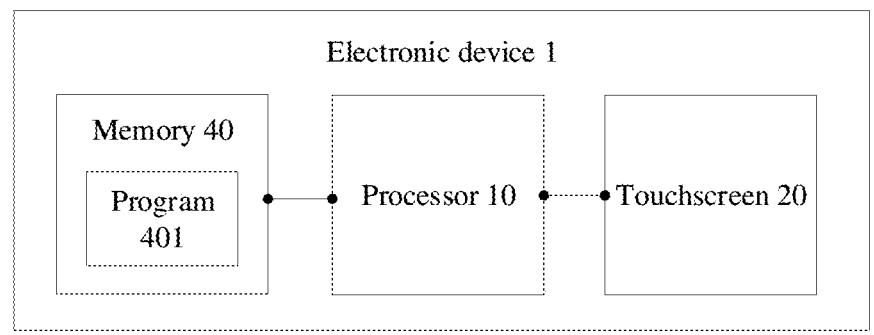
FIG. 14 is a schematic diagram of a structure of an electronic device according to an embodiment of this application.

According to the embodiments corresponding to FIG. 1 to FIG. 13, to better implement the foregoing solutions in embodiments of this application, the following further provides a related device used to implement the foregoing solutions. FIG. 14 is a schematic diagram of a structure of an electronic device according to an embodiment of this application. The electronic device 1 includes a touchscreen 20, a memory 40, one or more processors 10, and one or more programs 401. The touchscreen 20 is provided with a plurality of vibration feedback elements. The one or more programs 401 are stored in the memory 40. When the one or more processors 10 execute the one or more programs 401, the electronic device is enabled to perform the following operations: detecting a first contact operation acting on the touchscreen 20; obtaining, in response to the first contact operation, first location information of a first contact point corresponding to the first contact operation, where the first location information corresponds to a first virtual key on the virtual keyboard; if the first virtual key is an anchor point key, obtaining a first vibration feedback element from the plurality of vibration feedback elements, where the first vibration feedback element is a vibration feedback element that matches the first virtual key; and indicating the first vibration feedback element to emit a vibration wave, to perform a first feedback operation, where the first feedback operation is used to prompt that the first virtual key is an anchor point key.

In a possible design, the electronic device 1 is provided with a first mapping relationship. The first mapping relationship indicates a correspondence between virtual keys and vibration feedback elements. When the one or more processors 10 execute the one or more programs 401, the electronic device 1 is enabled to specifically perform the following operation: obtaining the first vibration feedback element based on the first mapping relationship and the first virtual key.

In a possible design, the electronic device 1 is provided with a first mapping relationship. The first mapping relationship indicates a correspondence between the location information and the vibration feedback element. When the one or more processors 10 execute the one or more programs 401, the electronic device 1 is enabled to specifically perform the following operation: obtaining the first vibration feedback element based on the first mapping relationship and the first location information.

In a possible design, when the one or more processors 10 execute the one or more programs 401, the electronic device 1 is enabled to further perform the following operation: obtaining a vibration intensity of a vibration wave corresponding to each of at least one first vibration feedback element. The vibration intensity of the vibration wave of each of the at least one first vibration feedback element is related to a first quantity. The first quantity is a quantity of the first vibration feedback elements. When the one or more processors 10 execute the one or more programs 401, the electronic device 1 is enabled to specifically perform the following operation: emitting, based on the vibration intensity of the vibration wave corresponding to each first vibration feedback element, the vibration wave by using the at least one first vibration feedback element, so that a difference between a vibration feedback intensity corresponding to the first virtual key and a vibration feedback intensity corresponding to a second virtual key falls within a preset intensity range. The second virtual key and the first virtual key are different virtual keys.

In a possible design, the first vibration feedback element is any one type of the following: a piezoelectric ceramic sheet, a linear motor, or a piezoelectric film.

In a possible design, when the one or more processors 10 execute the one or more programs 401, the electronic device 1 is enabled to further perform the following operation: obtaining, based on the first location information, a location type corresponding to the first contact point. The location type includes that the first contact point is located in a first location region of the first virtual key and the first contact point is located in a second location region of the first virtual key. The first location region is different from the second location region. When the one or more processors 10 execute the one or more programs 401, the electronic device 1 is enabled to specifically perform the following operation: performing the first feedback operation by using the touchscreen 20 based on the location type corresponding to the first contact point. A feedback operation corresponding to the first location region is different from a feedback operation corresponding to the second location region.

In a possible design, when the one or more processors 10 execute the one or more programs 401, the electronic device 1 is enabled to further perform the following operations: selecting, in response to a detected first gesture operation, a first type of virtual keyboard corresponding to the first gesture operation from a plurality of types of virtual keyboards, where virtual keys included in different types of virtual keyboards in the plurality of types of virtual keyboards are not completely the same; and displaying the first type of virtual keyboard by using the touchscreen 20. A location of the first type of virtual keyboard on the touchscreen 20 is fixed in the process of displaying the first type of virtual keyboard. When the one or more processors 10 execute the one or more programs 401, the electronic device 1 is enabled to specifically perform the following operation: detecting the first contact operation acting on the touchscreen 20 in the process of displaying the first type of virtual keyboard.

It should be noted that content such as information exchange and an execution process between the modules/elements in the electronic device 1 is based on a same concept as the method embodiments corresponding to FIG. 9 to FIG. 13 in this application. For specific content, refer to the descriptions in the foregoing method embodiments in this application. Details are not described herein again.

Figure 15:
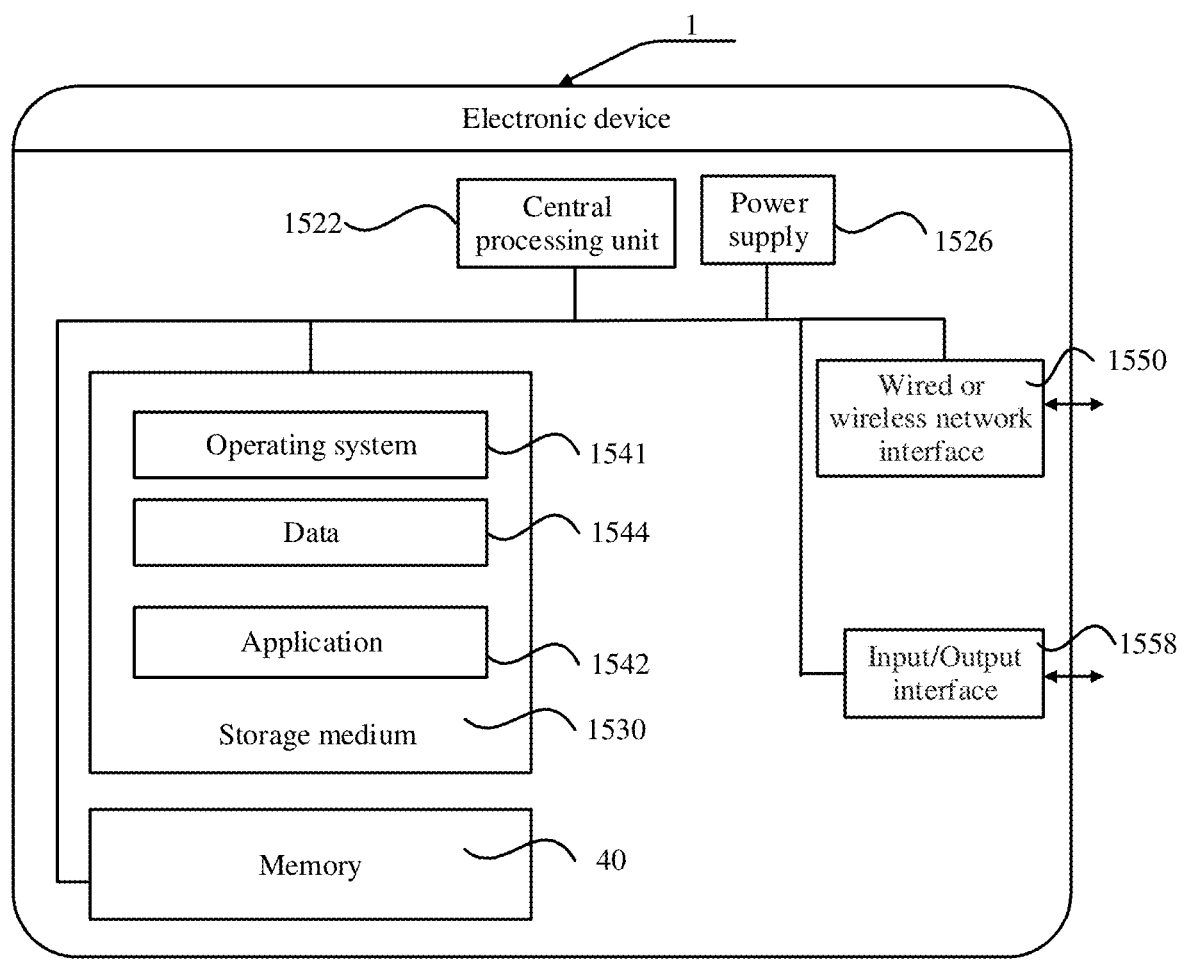
FIG. 15 is a schematic diagram of a structure of an electronic device according to an embodiment of this application.

An embodiment of this application further provides an electronic device. FIG. 15 is a schematic diagram of a structure of an electronic device according to an embodiment of this application. The electronic device 1 may be specifically represented as a mobile phone, a tablet computer, a notebook computer, another device provided with a touchscreen, or the like. This is not limited herein. The electronic device described in the embodiments corresponding to FIG. 1 to FIG. 8 may be deployed on the electronic device 1, and is configured to implement a function of the electronic device in the embodiments corresponding to FIG. 9 to FIG. 13. Specifically, the electronic device 1 may vary greatly with a configuration or performance, and may include one or more central processing units (CPU) 1522 (for example, one or more processors), a memory 40, and one or more storage media 1530 (for example, one or more mass storage devices) that store an application 1542 or data 1544. The memory 40 and the storage medium 1530 may be for temporary storage or permanent storage. The program stored in the storage medium 1530 may include one or more modules (which are not shown in the figure), and each module may include a series of instruction operations on the electronic device. Further, the central processing unit 1522 may be configured to communicate with the storage medium 1530, and perform, on the electronic device 1, the series of instruction operations in the storage medium 1530.

The electronic device 1 may further include one or more power supplies 1526, one or more wired or wireless network interfaces 1550, one or more input/output interfaces 1558, and/or one or more operating systems 1541, for example, Windows Server™, Mac OS X™, Unix™, Linux™, and FreeBSD™.

In this embodiment of this application, the central processing unit 1522 is configured to implement a function of the electronic device in the embodiments corresponding to FIG. 9 to FIG. 13. It should be noted that, for a specific embodiment in which the central processing unit 1522 performs the function of the electronic device in the embodiments corresponding to FIG. 9 to FIG. 13 and a beneficial effect of the function, refer to the descriptions in the method embodiments corresponding to FIG. 9 to FIG. 13. Details are not described herein again.

An embodiment of this application further provides a computer-readable storage medium. The computer-readable storage medium stores a computer program. When the program is run on a computer, the computer is enabled to perform the operations performed by the electronic device in the method described in the embodiments shown in FIG. 9 to FIG. 13.

An embodiment of this application further provides a computer program. When the computer program is run on a computer, the computer is enabled to perform the operations performed by the electronic device in the method described in the embodiments shown in FIG. 9 to FIG. 13.

An embodiment of this application further provides a circuit system. The circuit system includes a processing circuit, and the processing circuit is configured to perform the operations performed by the electronic device in the method described in the embodiments shown in FIG. 9 to FIG. 13.

The electronic device provided in this embodiment of this application may be specifically a chip. The chip includes a processing unit and a communication unit. The processing unit may be, for example, a processor. The communication unit may be, for example, an input/output interface, a pin, or a circuit. The processing unit may execute computer executable instructions stored in a storage unit, so that the chip performs the operations performed by the electronic device in the method described in the embodiments shown in FIG. 9 to FIG. 13. Optionally, the storage unit is a storage unit in the chip, for example, a register or a cache; or the storage unit may be a storage unit that is in a radio access device and that is located outside the chip, for example, a read-only memory (ROM), another type of static storage device that can store static information and instructions, or a random access memory (RAM).

The processor mentioned anywhere above may be a general-purpose central processing unit, a microprocessor, an application-specific integrated circuit (ASIC), or one or more integrated circuits that are configured to control program execution of the method according to the first aspect.

In addition, it should be noted that the described apparatus embodiments are only examples. The units described as separate parts may or may not be physically separate, and parts displayed as units may or may not be physical units, may be located in one location, or may be distributed on a plurality of network units. Some or all of the modules may be selected based on actual requirements to achieve the objectives of the solutions in embodiments. In addition, in the accompanying drawings of the apparatus embodiments provided by this application, connection relationships between modules indicate that the modules have communication connections with each other, which may be specifically implemented as one or more communication buses or signal cables.

Based on the description of the foregoing embodiments, a person skilled in the art may clearly understand that this application may be implemented by software in addition to necessary universal hardware, or certainly may be implemented by dedicated hardware, including a dedicated integrated circuit, a dedicated CLU, a dedicated memory, a dedicated component, and the like. Usually, any function implemented by a computer program may be easily implemented by using corresponding hardware. In addition, specific hardware structures used to implement a same function may be various, for example, an analog circuit, a digital circuit, or a dedicated circuit. However, in this application, a software program embodiment is a better embodiment in most cases. Based on such an understanding, the technical solutions of this application essentially or the part contributing to the conventional technology may be implemented in a form of a software product. The computer software product is stored in a readable storage medium, such as a floppy disk, a universal serial bus (USB) flash drive, a removable hard disk, a ROM, a RAM, a magnetic disk, or an optical disc of a computer, and includes several instructions for instructing a computer device (which may be a personal computer, a server, or a network device) to perform the methods described in embodiments of this application.

All or some of the foregoing embodiments may be implemented by software, hardware, firmware, or any combination thereof. When software is used to implement the foregoing embodiments, all or some of the embodiments may be implemented in a form of a computer program.

The computer program includes one or more computer instructions. When the computer program instructions are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to a computer, or a data storage device integrating one or more usable media, for example, a server or a data center. The usable medium may be a magnetic medium (for example, a floppy disk, a hard disk, or a magnetic tape), an optical medium (for example, a DVD), a semiconductor medium (for example, a solid state drive (SSD)), or the like.

Embodiment 2

This embodiment of this application may be applied to various application scenarios in which input is performed by using a virtual keyboard. For example, in an application for editing text, content such as text, a number, and a character is to be input by using the virtual keyboard. For another example, in an application for producing a power point (PPT), content such as text, a number, and a character is also to be input by using the virtual keyboard. For still another example, in a game application, a function such as moving a virtual character, changing a character name, and performing instant messaging with a game friend may also be performed by using the virtual keyboard. It should be understood that this embodiment of this application may be further applied to another application scenario in which input is performed by using the virtual keyboard, which is not exhaustively described herein. In the foregoing various scenarios, there is a problem that a quantity of keys of a virtual keyboard is limited, and an additional physical keyboard needs to be provided to meet an input requirement of a user.

To resolve the foregoing problem, this embodiment of this application provides a virtual keyboard processing method. The method is applied to an electronic device shown in FIG. 16. The electronic device is provided with a plurality of types of virtual keyboards. The user can enable different types of virtual keyboards through different gesture operations. In other words, the virtual keyboard no longer displays only 26 letters, but provides more virtual keys for the user by using the different types of virtual keyboards. This improves flexibility of a process in which the user enables the virtual keyboard, and helps provide more abundant virtual keys, so that an additional physical keyboard does not need to be provided.

Figure 16:
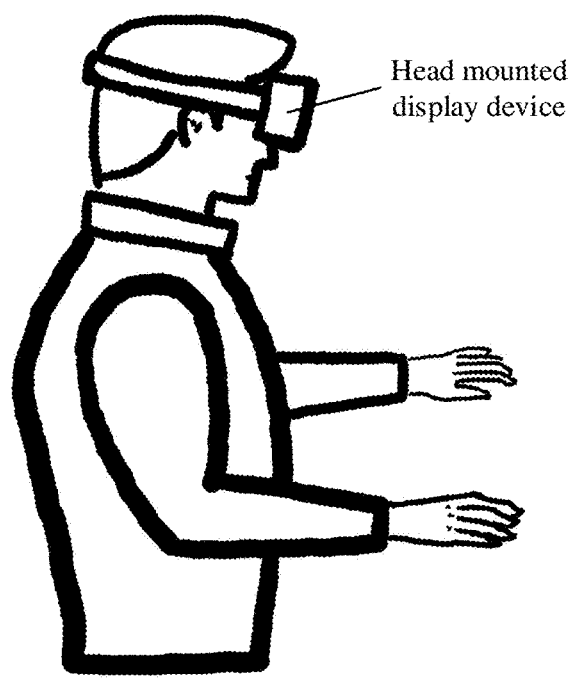
FIG. 16 is a schematic diagram of an electronic device according to an embodiment of this application.

FIG. 16 is a schematic diagram of an electronic device according to an embodiment of this application. In some application scenarios, as shown in FIG. 2, the electronic device 1 includes at least one display, and the display is one touchscreen (namely, the touchscreen 20 in FIG. 2). In this case, the electronic device 1 may obtain, by using the display, various types of gesture operations input by a user, and display various types of virtual keyboards by using the display.

In some other application scenarios, as shown in FIG. 16, the electronic device 2 may be represented as a virtual reality device such as a VR, an AR, or an MR. The electronic device 2 collects various types of gesture operations of a user by using a camera configured on a head mounted display device, and displays various types of virtual keyboards to the user by using the head mounted display device.

Figure 17:
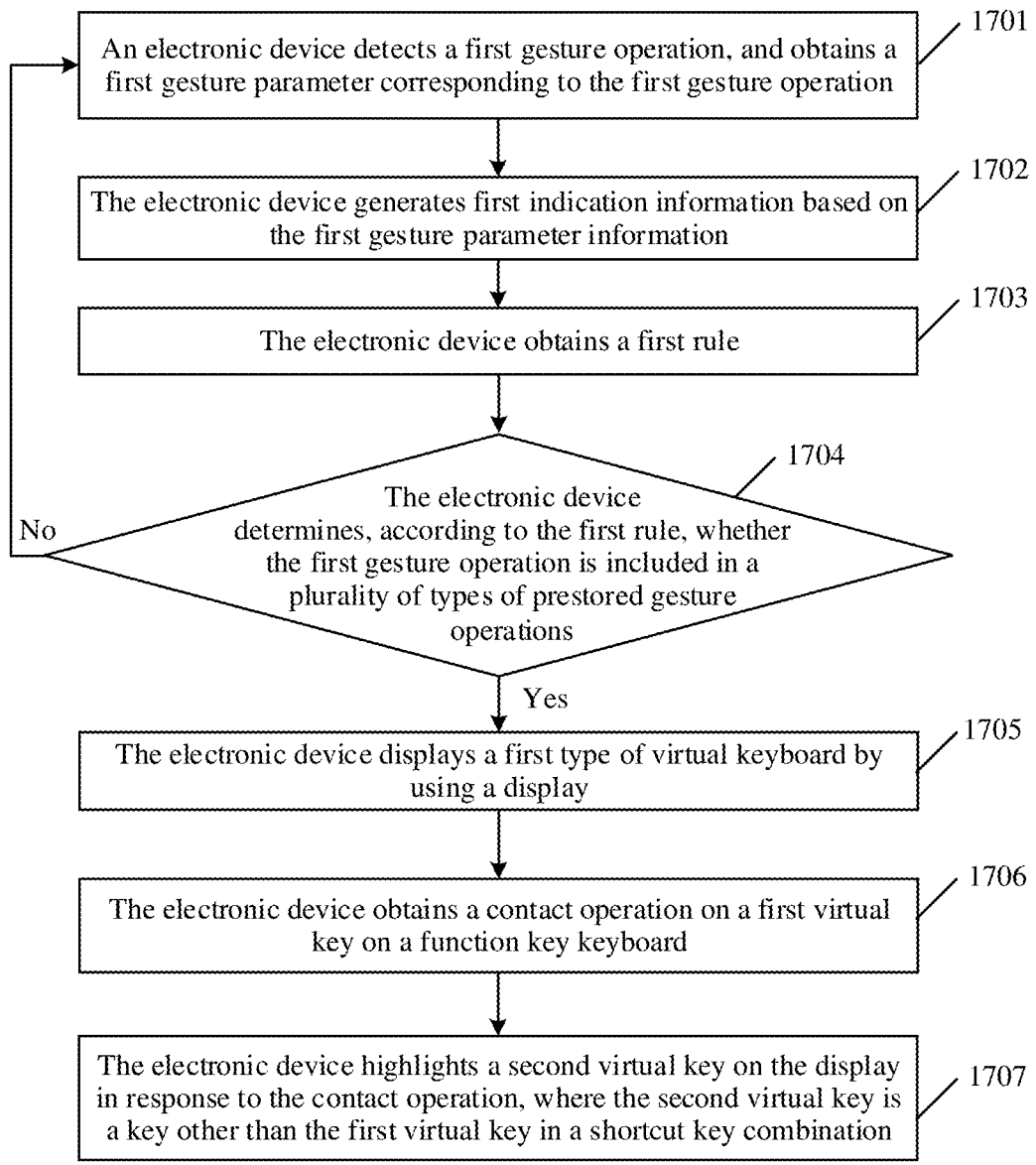
FIG. 17 is a schematic flowchart of a virtual keyboard processing method according to an embodiment of this application.

With reference to the foregoing descriptions, FIG. 17 is a schematic flowchart of a virtual keyboard processing method according to an embodiment of this application. The virtual keyboard processing method provided in this embodiment of this application may include the following operations.

1701: The electronic device detects a first gesture operation, and obtains a first gesture parameter corresponding to the first gesture operation.

In this embodiment of this application, the electronic device may detect in real time whether a user inputs a gesture operation, and when detecting the first gesture operation input by the user, the electronic device generates the first gesture parameter corresponding to the first gesture operation. Specifically, in some application scenarios, the electronic device is provided with a touchscreen, and the electronic device obtains, in real time by using the touchscreen, the first gesture operation input by the user. In some other application scenarios, the electronic device may collect, by using a camera configured on a head mounted display device, the first gesture operation input by the user, to generate the first gesture parameter corresponding to the first gesture operation. In this application scenario, the electronic device may be represented as a virtual reality device such as a VR, an AR, or an MR. This is not limited herein.

If the first gesture operation is obtained by using a display configured on the electronic device, the first gesture parameter includes any one or more of the following parameters: location information of a contact point corresponding to the first gesture operation, quantity information of the contact point corresponding to the first gesture operation, area information of the contact point corresponding to the first gesture operation, another type of parameter information, or the like. This embodiment of this application describes specific information included in the first gesture parameter. The first gesture parameter includes location information of each contact point and quantity information of a plurality of contact points, and also includes area information of each contact point. The area information of the contact point can distinguish a contact point triggered based on a palm from the plurality of contact points. This helps accurately estimate a type of the first gesture operation, avoids displaying an incorrect virtual keyboard, and improves accuracy of a display process of the virtual keyboard.

Further, the location information of the contact point corresponding to the first gesture operation may be represented by using coordinate information, a function, or other information. An origin of a coordinate system corresponding to the location information may be a central point of the display, an upper left corner vertex of the display, a lower left corner vertex of the display, an upper right corner vertex of the display, a lower right corner vertex of the display, another location point, or the like. The origin of the coordinate system may be specifically determined based on an actual application scenario.

Figure 18:
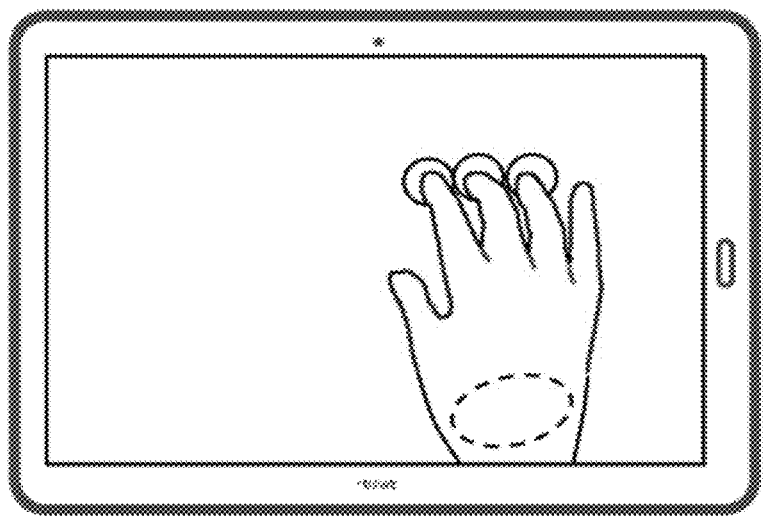
FIG. 18 is a schematic diagram of a first gesture parameter in a virtual keyboard processing method according to an embodiment of this application.

Specifically, the display of the electronic device may be a touchscreen, and the touchscreen may be provided with a tactile sensing module. The electronic device collects, by using the tactile sensing module configured on the display, the first gesture parameter corresponding to the first gesture operation. For more intuitive understanding of this solution, refer to FIG. 18. FIG. 18 is a schematic diagram of the first gesture parameter in the virtual keyboard processing method according to an embodiment of this application. FIG. 18 uses an example in which the first gesture operation is a one-hand operation. As shown in the figure, four contact points may be obtained on the display, areas of three of the four contact points generated by fingers are small, and an area of a remaining contact point generated by a palm is large. It should be understood that the example in FIG. 18 is only for ease of understanding of this solution, and is not intended to limit this solution.

If an electronic device is a virtual reality device, the virtual keyboard may be visually presented in stereoscopic space. The electronic device may detect a gesture operation in space in real time, to obtain, when the first gesture operation is detected, the first gesture parameter corresponding to the first gesture operation.

Specifically, in one case, the electronic device may track a hand of a user in real time by using a handheld device or a hand wearable device of the user, to monitor the first gesture operation of the user. In another case, the electronic device includes a head mounted display device, and obtains the first gesture operation by using a camera configured on the head mounted display device. The first gesture parameter may be specifically represented as an image corresponding to the first gesture operation. The electronic device may input the image corresponding to the first gesture operation into a neural network used for image recognition, to generate the first gesture parameter corresponding to the first gesture operation.

1702: The electronic device generates first indication information based on the first gesture parameter information.

In this embodiment of this application, after collecting the first gesture parameter corresponding to the first gesture operation, the electronic device may further perform secondary processing based on the obtained first gesture parameter, to generate the first indication information corresponding to the first gesture parameter. The first indication information may also be considered as a gesture parameter obtained through secondary processing. The first indication information includes any one or more of the following (in other words, the first gesture parameter indicates any one or more of the following): relative angle information of a hand corresponding to the first gesture operation, location information of the hand corresponding to the first gesture operation, quantity information of the hand corresponding to the first gesture operation, shape information of the hand corresponding to the first gesture operation, and the like. A specific type of information that may be included in the first indication information may be flexibly set with reference to an actual application scenario, and is not limited herein. In this embodiment of this application, after secondary processing is performed on the obtained first gesture parameter, information such as the relative angle information of the hand, the location information of the hand, the quantity information of the hand, or the shape information of the hand may be obtained. In other words, more abundant information about the first gesture operation may be obtained based on the first gesture parameter. This increases flexibility of a matching process of the virtual keyboard.

Specifically, in some application scenarios, the first gesture parameter is collected by using the display of the electronic device. Then the relative angle information of the hand corresponding to the first gesture operation may include any one or more of the following: a relative angle between the hand corresponding to the first gesture operation and any side of the display, a relative angle between the hand corresponding to the first gesture operation and a center line of the display, a relative angle between the hand corresponding to the first gesture operation and a diagonal line of the display, and the like. This is not limited herein.

More specifically, if the electronic device determines that the first gesture operation is a one-hand operation (that is, a quantity of hands corresponding to the first gesture operation is 1), the electronic device obtains at least two first contact points (namely, contact points generated by fingers) from a plurality of contact points corresponding to the first gesture operation, and connects the at least two first contact points, or connects two first contact points that are farthest from each other in the at least two first contact points. Then, the electronic device generates a straight line corresponding to the first gesture operation, and further calculates a relative angle between the straight line and a preset line. The preset line includes any one or more of the following: any side of the display, the center line of the display, the diagonal line of the display, and the like. In this case, the electronic device obtains the relative angle information of the hand corresponding to the first gesture operation.

If the electronic device determines that the first gesture operation is a two-hand operation (that is, a quantity of hands corresponding to the first gesture operation is 2), the electronic device obtains at least two first contact points from a plurality of contact points corresponding to the first gesture operation, and connects at least two first contact points corresponding to a left hand, or connects two first contact points that are farthest from each other in the at least two first contact points corresponding to the left hand. Then, the electronic device generates a first straight line corresponding to the left hand. The electronic device connects at least two first contact points corresponding to a right hand, or connects two first contact points that are farthest from each other in the at least two first contact points corresponding to the right hand. Then, the electronic device generates a second straight line corresponding to the right hand. Further, the electronic device separately calculates a first sub-angle between the first straight line and a preset line, and calculates a second sub-angle between the second straight line and the preset line, to obtain the relative angle information of the hand corresponding to the first gesture operation.

Figure 19:
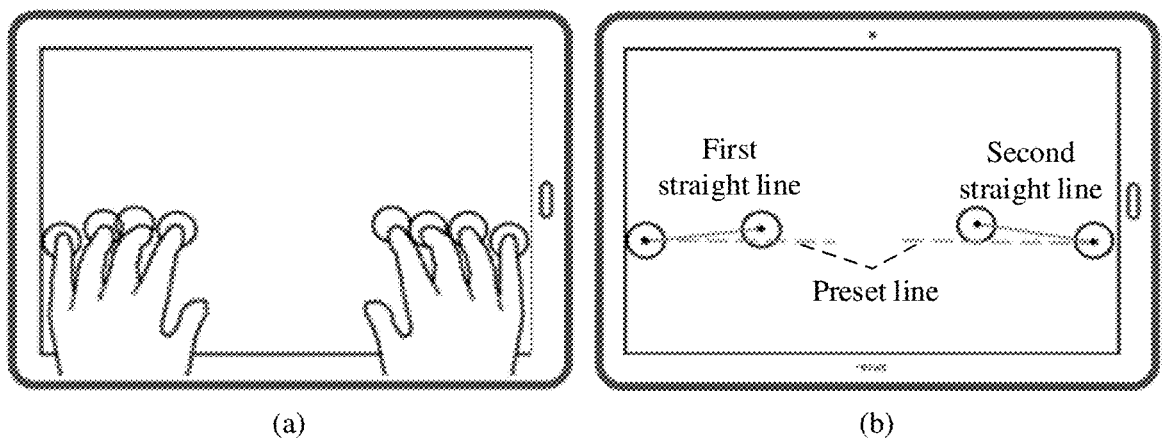
FIG. 19 is a schematic diagram of relative angle information in a virtual keyboard processing method according to an embodiment of this application.

For more intuitive understanding of this solution, refer to FIG. 19. FIG. 19 is a schematic diagram of the relative angle information in the virtual keyboard processing method according to an embodiment of this application. FIG. 19 uses an example in which the first gesture operation is a two-hand operation. FIG. 19 includes two schematic subdiagrams (a) and (b). The schematic subdiagram (a) in FIG. 19 shows locations of contact points corresponding to the two-hand operation. The schematic subdiagram (b) in FIG. 19 shows an example in which the preset line is a bottom side of the display. Two contact points that are farthest from each other in four contact points corresponding to the left hand are connected to generate the first straight line, and two contact points that are farthest from each other in four contact points corresponding to the right hand are connected to generate the second straight line, to obtain the first sub-angle and the second sub-angle. It should be understood that the example in FIG. 19 is only for ease of understanding of this solution, and is not intended to limit this solution.

Figure 20:
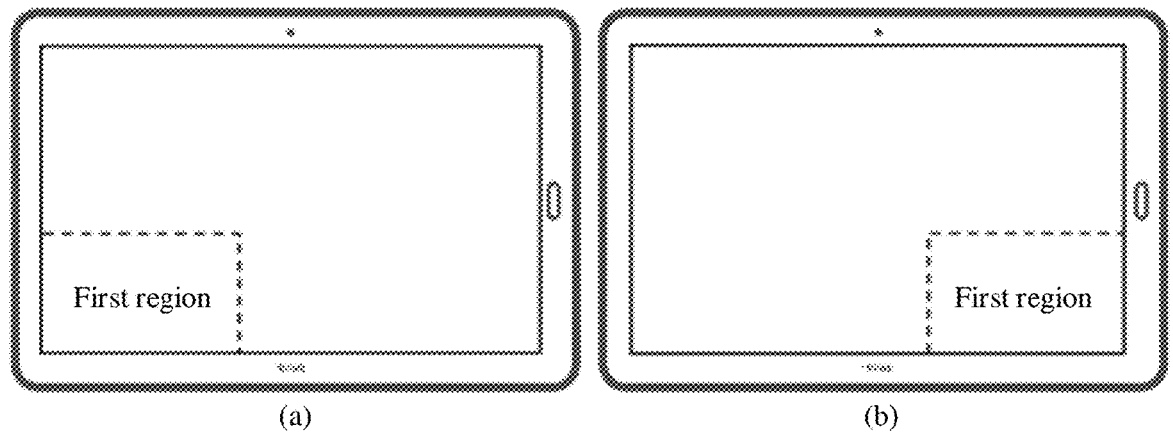
FIG. 20 shows two schematic diagrams of a first region in a virtual keyboard processing method according to an embodiment of this application.

The following describes a process of determining location information of the hand. The electronic device first determines, based on the obtained first gesture parameter, the quantity of hands corresponding to the first gesture operation. If the first gesture operation is a two-hand operation, a hand location corresponding to the first gesture operation includes a distance between the two hands; or if the first gesture operation is a one-hand operation, a hand location corresponding to the first gesture operation includes a first region and a fourth region. The first region is located in a lower left corner or a lower right corner of the display, and the fourth region is a region other than the first region on the display panel. Further, a width of the first region may be a value such as 3 centimeters, 4 centimeters, or 5 centimeters. A bottom side of the first region coincides with a bottom side of the display. For more intuitive understanding of this solution, refer to FIG. 20. FIG. 20 shows two schematic diagrams of the first region in the virtual keyboard processing method according to an embodiment of this application. A schematic subdiagram (a) and a schematic subdiagram (b) in FIG. 20 separately show two schematic diagrams of the first region. It should be understood that the example in FIG. 20 is only for ease of understanding of this solution, and is not intended to limit this solution.

If the first gesture operation is a two-hand operation, the electronic device may determine a distance between a left index finger and a right index finger as the distance between the two hands; or may determine a shortest distance between the left hand and the right hand as the distance between the two hands; or may generate shapes of the left hand and the right hand based on the plurality of contact points, to generate a distance between a left-hand boundary and a right-hand boundary. Manners of determining the distance between the two hands are not exhaustively described herein.

If the first gesture operation is a one-hand operation, the electronic device selects, based on the first gesture parameter corresponding to the first gesture operation, a plurality of first contact points from the plurality of contact points corresponding to the first gesture operation, and determines, based on locations of the plurality of first contact points, a location of the hand corresponding to the first gesture operation. In an embodiment, if all first contact points in at least one first contact point are located in the first region, it is determined that the location of the hand is the first region; or if a first contact point outside the first region exists in the at least one first contact point, it is determined that the location of the hand is the fourth region. In another embodiment, if a first contact point located in the first region exists in the at least one first contact point, it is determined that the location of the hand is the first region; or if all first contact points in the at least one first contact point are located in the fourth region, it is determined that the location of the hand is the fourth region.

The following describes a process of determining the quantity of hands. The first gesture operation obtained by the electronic device may be a one-hand operation, or may be a two-hand operation. The electronic device may determine, based on a quantity of the contact point and location information of the contact point, the quantity of hands corresponding to the first gesture parameter. In an embodiment, the electronic device determines whether a quantity of the plurality of contact points is greater than or equal to a first value, and whether two contact points whose distance is greater than a second distance threshold exist in the plurality of contact points. If the quantity of the plurality of contact points is greater than the first value, and the two contact points whose distance is greater than the second distance threshold exist in the plurality of contact points, the electronic device determines that the quantity of hands corresponding to the first gesture operation is 2. If the quantity of the plurality of contact points is less than the first value, or the two contact points whose distance is greater than the second distance threshold do not exist in the plurality of contact points, the electronic device determines that the quantity of hands corresponding to the first gesture operation is 1. A value of the first value may be 2, 3, 4, 5, or another value, or may be customized by the user. A value of the second distance threshold may be 22 millimeters, 25 millimeters, 26 millimeters, another value, or the like, or may be customized by the user. Specifically, the value of the second distance threshold may be determined with reference to factors such as a size of the display and a size of the hand of the user. This is not limited herein.

In another embodiment, the electronic device determines whether a first subset and a second subset exist in the plurality of contact points. If the first subset and the second subset exist, the electronic device determines that the quantity of hands corresponding to the first gesture operation is 2. If the first subset or the second subset does not exist, the electronic device determines that the quantity of hands corresponding to the first gesture operation is 1. A quantity of contact points included in each of the first subset and the second subset is greater than or equal to a first value. A distance between any two contact points in the first subset is less than a second distance threshold. A distance between any two contact points in the second subset is less than the second distance threshold. A distance between any contact point in the first subset and any contact point in the second subset is greater than or equal to the second distance threshold.

Figure 21:
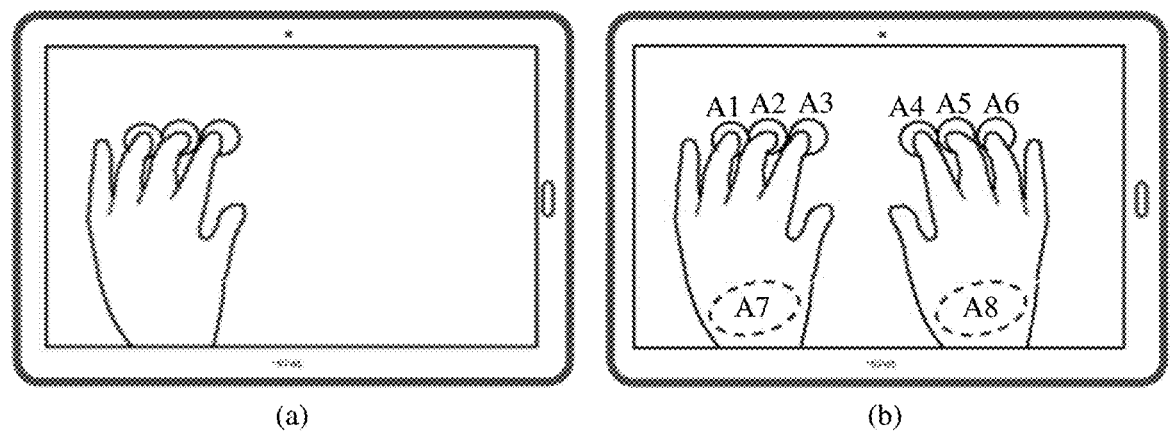
FIG. 21 is a schematic diagram of a first gesture operation in a virtual keyboard processing method according to an embodiment of this application.

For more intuitive understanding of this solution, refer to FIG. 21. FIG. 21 is a schematic diagram of a first gesture operation in a virtual keyboard processing method according to an embodiment of this application. FIG. 21 uses an example in which the value of the first value is 3. FIG. 21 includes two schematic subdiagrams (a) and (b). The schematic subdiagram (a) in FIG. 21 shows a case in which the quantity of hands corresponding to the first gesture operation is 1 (in other words, the first gesture operation is a one-hand operation). The electronic device may obtain three contact points in the schematic subdiagram (a) in FIG. 21, and a distance between the three contact points is less than 25 millimeters. The schematic subdiagram (b) in FIG. 21 shows a case in which the quantity of hands corresponding to the first gesture operation is 2 (in other words, the first gesture operation is a two-hand operation). The electronic device may obtain eight contact points (A1, A2, A3, A4, A5, A6, A7, and A8 in FIG. 21). The contact points represented by A7 and A8 are contact points generated by a palm. A1, A2, A3, A4, A5, and A6 are contact points generated by a finger. A1, A2, and A3 form a first subset, and A4, A5, and A6 form a second subset. Each distance between the three contact points A1, A2, and A3 is less than 25 millimeters. Each distance between the three contact points A4, A5, and A6 is less than 25 millimeters. A distance between the first subset and the second subset is greater than 25 millimeters. It should be understood that the example in FIG. 21 is only for ease of understanding of this solution, and is not intended to limit this solution.

Optionally, the electronic device may further divide, based on the first gesture parameter corresponding to the first gesture operation, the plurality of contact points corresponding to the first gesture operation into a first contact point and a second contact point. The first contact point is generated by the finger of the user, and the second contact point is generated by the palm of the user. Further, the electronic device may determine whether a quantity of first contact points in the plurality of contact points is greater than or equal to the first value, and whether two contact points whose distance is greater than the second distance threshold exist in the at least one first contact point, to determine the quantity of hands corresponding to the first gesture operation. Specifically, in an embodiment, the electronic device may determine whether an area of each contact point is greater than or equal to a first area threshold. If the area is greater than or equal to the first area threshold, the contact point is determined as the second contact point (namely, the contact point generated by the palm), or if the area is less than the first area threshold, the contact point is determined as the first contact point (namely, the contact point generated by the finger). A value of the first area threshold may be preset, or may be customized by the user. The value of the first area threshold may be determined with reference to factors such as the size of the hand of the user, and is not limited herein. It should be noted that, an example in which whether the contact point is the first contact point or the second contact point is determined based on the area of the contact point is only for ease of understanding of this solution, and is not intended to limit this solution.

Figure 22:
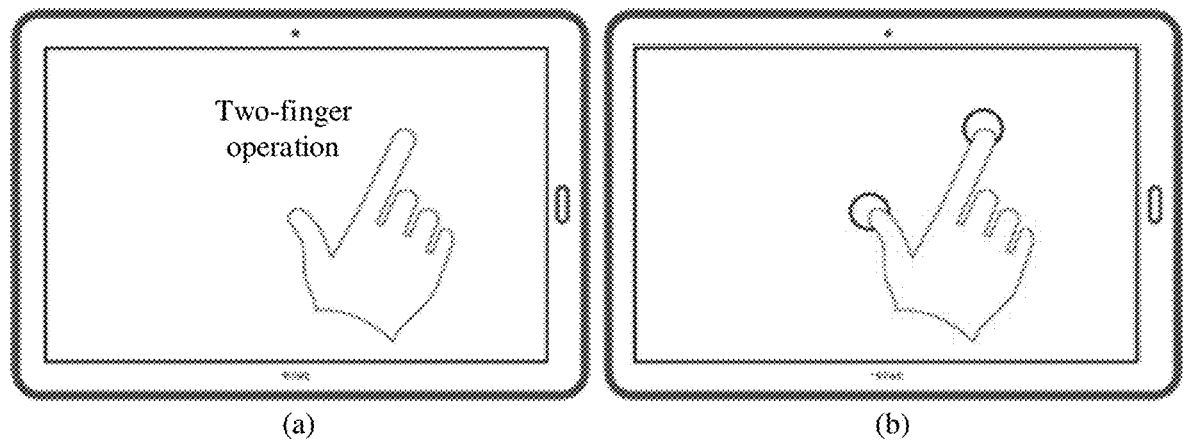
FIG. 22 is another schematic diagram of a first gesture operation in a virtual keyboard processing method according to an embodiment of this application.

The following describes a process of determining the shape information of the hand. The first gesture operation may be a static gesture operation, and the shape information of the hand corresponding to the first gesture operation may be specifically a left hand, a right hand, two fingers, a fist, other shape information, or the like. Optionally, if the first gesture operation may alternatively be a dynamic slide operation, the shape information of the hand may be specifically a "Z" shape, a tick shape, a circle shape, or the like, which is not exhaustively described herein. Specifically, if the quantity of the plurality of contact points obtained by the electronic device is two, it may be determined that the shape information corresponding to the first gesture operation is two fingers. For more direct understanding of this solution, FIG. 22 is a schematic diagram of a first gesture operation in a virtual keyboard processing method according to an embodiment of this application. FIG. 22 includes two schematic subdiagrams (a) and (b). The schematic subdiagram (a) in FIG. 22 shows the first gesture operation of a two-finger operation, and the schematic subdiagram (b) in FIG. 22 shows two contact points corresponding to the two-finger operation. It should be understood that the example in FIG. 22 is only for ease of understanding of this solution, and is not intended to limit this solution.

If the quantity of the plurality of touch points obtained by the electronic device is greater than or equal to three, the electronic device needs to determine whether the quantity of the hands corresponding to the first gesture operation is 1 or 2. If the electronic device determines that the first gesture operation is a one-hand operation, the electronic device needs to determine, based on the obtained first gesture parameter, whether a shape of the hand corresponding to the first gesture operation is the left hand or the right hand. Specifically, in an embodiment, if the plurality of touch points corresponding to the first gesture operation are all located on a left side of the center line of the display, the shape of the hand corresponding to the first gesture operation is the left hand; or if the plurality of touch points corresponding to the first gesture operation are all located on a right side of the center line of the display, the shape of the hand corresponding to the first gesture operation is the right hand. It should be noted that the manner of determining the left hand or the right hand herein is only for ease of understanding of feasibility of this solution, and is not intended to limit this solution.

In some other application scenarios, the first gesture parameter is generated based on the image corresponding to the first gesture operation. Then, the electronic device may input the image corresponding to the first gesture operation into a neural network used for image recognition, to directly generate the first indication information.

1703: The electronic device obtains a first rule.

In this embodiment of this application, the first rule may be preconfigured for the electronic device. The first rule indicates a correspondence between a plurality of types of gesture operations and a plurality of types of virtual keyboards. A first type of virtual keyboard is one type of the plurality of types of virtual keyboards. In one case, different types of virtual keyboards in the plurality of types of virtual keyboards have different functions. The virtual keyboards with different functions may include a combination of any two or more types of the following virtual keyboards: a numeric keyboard, a function key keyboard, a full-size keyboard, and a custom keyboard. The function key keyboard is formed by function keys. In this embodiment of this application, the different types of virtual keyboards have the different functions, so that the virtual keyboards with the different functions may be provided for the user. This improves flexibility of a process in which the user uses the virtual keyboard, to enhance user viscosity.

In another case, different types of virtual keyboards may include a combination of any two or more types of the following virtual keyboards: a mini keyboard, a numeric keyboard, a function keyboard, a function key keyboard, a round keyboard, an arc keyboard, a custom keyboard, and a full-size keyboard.

The first rule indicates the following information: If the first gesture operation is a one-hand operation, the first type of virtual keyboard is any one type of the following virtual keyboards: a mini keyboard, a numeric keyboard, a function keyboard, a function key keyboard, a round keyboard, an arc keyboard, and a custom keyboard. The mini keyboard includes 26 alphabet keys. The function keyboard is displayed in an application. A virtual key included on the function keyboard corresponds to a function of the application. It should be noted that a mini keyboard, a numeric keyboard, a function keyboard, a function key keyboard, a round keyboard, an arc keyboard, and a custom keyboard do not need to be all configured in a same electronic device. The example herein is only used to prove that a one-hand operation in one electronic device may trigger any one type of the mini keyboard, the numeric keyboard, the function keyboard, the function key keyboard, the round keyboard, the arc keyboard, or the custom keyboard. If the first gesture operation is a two-hand operation, the first type of virtual keyboard is a full-size keyboard. The full-size keyboard includes at least 26 alphabet keys, and a size of the full-size keyboard is larger than that of a mini keyboard. In this embodiment of this application, a plurality of specific representation forms of the virtual keyboard displayed by using the display are provided in both cases in which the first gesture operation is the one-hand operation or a two-hand operation. This improves embodiment flexibility of this solution and expands an application scenario of this solution.

Further, correspondences between a gesture operation and different types of virtual keyboards in different electronic devices may be different. A same electronic device may include a combination of at least two of the following five items:

(1) If the first gesture operation is a first one-hand operation, the first type of virtual keyboard is a mini keyboard.

Figure 23:
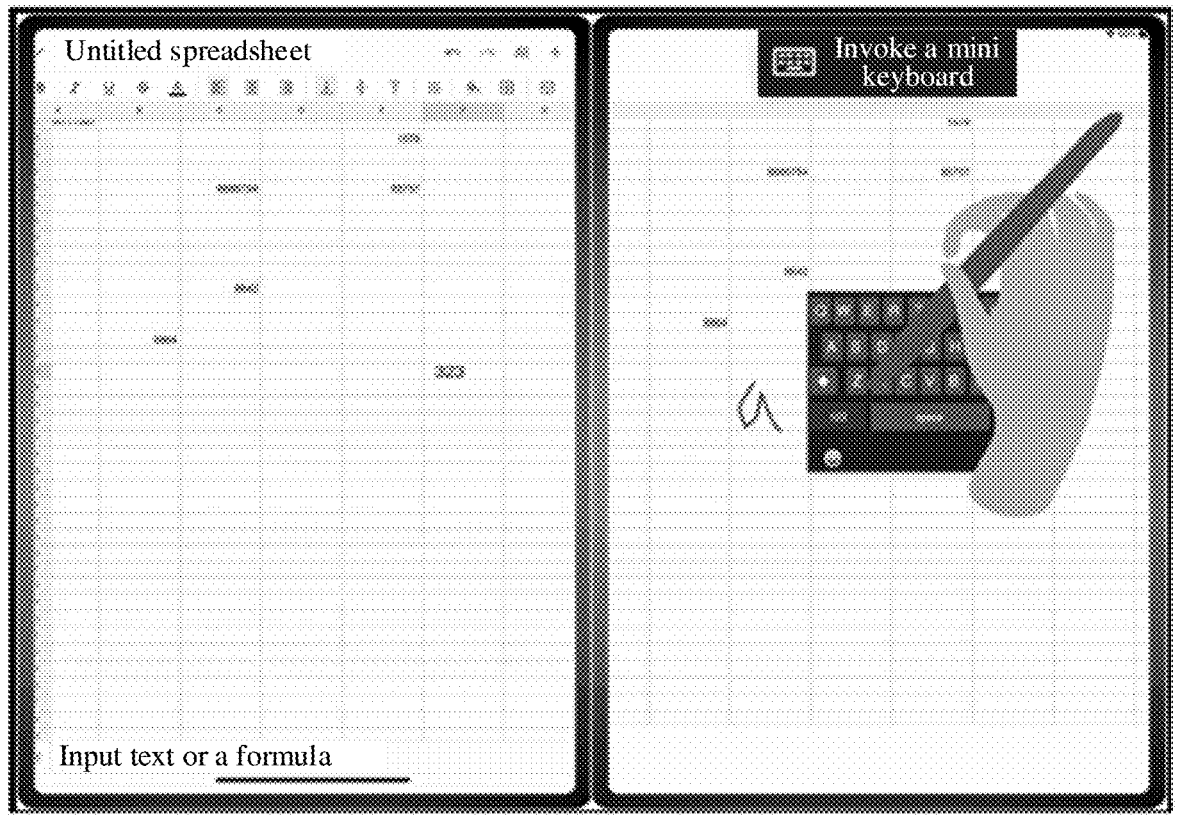
FIG. 23 is a schematic diagram of a first type of virtual keyboard in a virtual keyboard processing method according to an embodiment of this application.

The first one-hand operation may be a left-hand operation, or may be a right-hand operation. The first one-hand operation may be a one-hand operation with a stylus held, or may be a one-hand operation without a stylus. For more intuitive understanding of this solution, refer to FIG. 23. FIG. 23 is a schematic diagram of the first type of virtual keyboard in the virtual keyboard processing method according to an embodiment of this application. FIG. 23 uses an example in which the first one-hand operation is holding the stylus by the user. The electronic device detects that the first gesture operation is the first one-hand operation, and a corresponding first type of virtual keyboard is a mini keyboard. The mini keyboard includes 26 alphabet keys, and a size of the mini keyboard is smaller than that of a full-size keyboard. It should be understood that the example in FIG. 23 is only for ease of understanding of this solution, and is not intended to limit this solution.

In this embodiment of this application, if the first gesture operation is the one-hand operation, the first type of virtual keyboard is the mini keyboard. This helps improve flexibility of a process of inputting a letter by the user.

(2) If the first gesture operation is the right-hand operation, the first type of virtual keyboard is the numeric keyboard; or if the first gesture operation is the left-hand operation, the first type of virtual keyboard is the function keyboard.

A virtual key included on the function keyboard corresponds to a function of the application. For example, if the first gesture operation is obtained from a game application, the function keyboard may be a game keyboard, and the game keyboard is provided with keys commonly used for a game. For another example, if the first gesture operation is obtained from a drawing application, the function keyboard may be a common key in drawing software, and the like, which is not exhaustively described herein.

Figure 24:
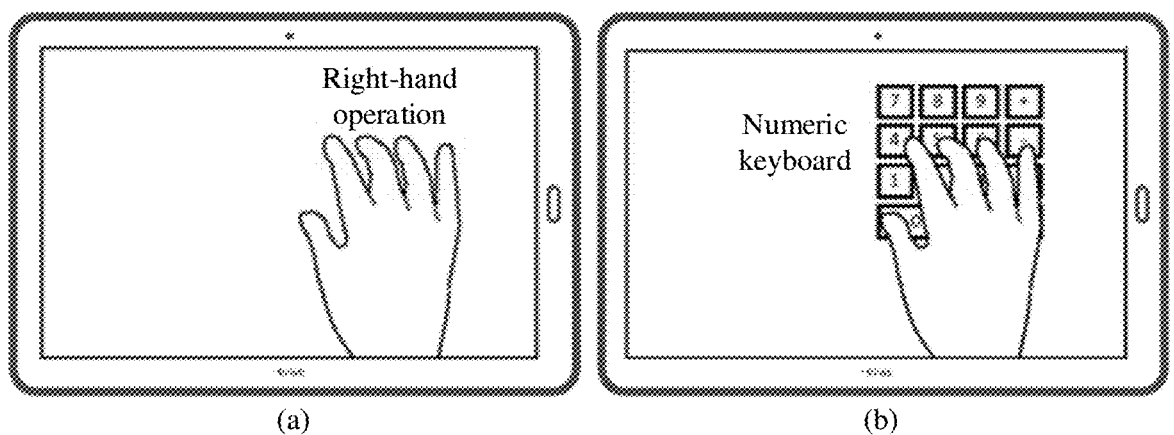
FIG. 24 is another schematic diagram of a first type of virtual keyboard in a virtual keyboard processing method according to an embodiment of this application.
Figure 25:
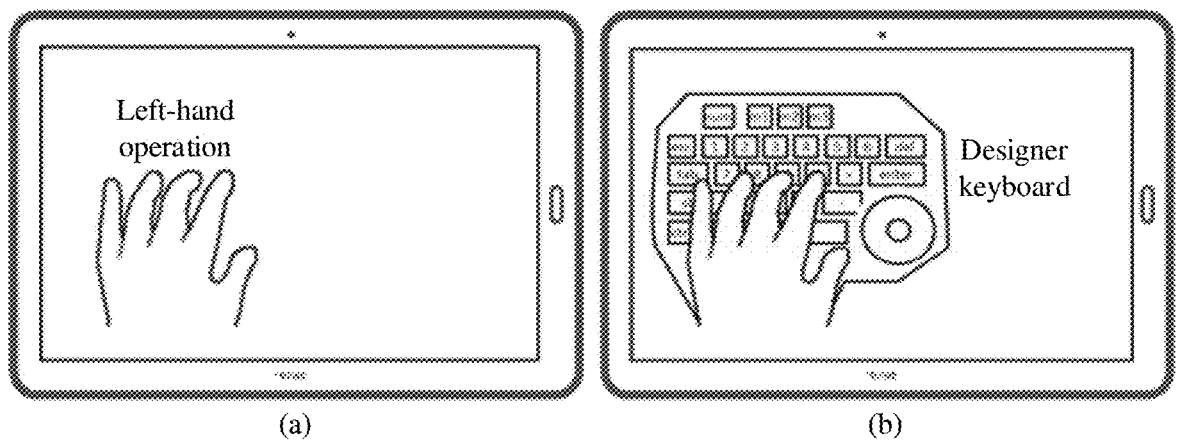
FIG. 25 is still another schematic diagram of a first type of virtual keyboard in a virtual keyboard processing method according to an embodiment of this application.

For more intuitive understanding of this solution, refer to FIG. 24 and FIG. 25. FIG. 24 and FIG. 25 show two schematic diagrams of the first type of virtual keyboard in the virtual keyboard processing method according to an embodiment of this application. FIG. 24 and FIG. 25 both include two schematic subdiagrams (a) and (b). First refer to FIG. 24. The schematic subdiagram (a) in FIG. 24 shows that the first gesture operation is a right-hand operation, and the schematic subdiagram (b) in FIG. 24 shows that the first type of virtual keyboard is specifically represented as a numeric keyboard. Refer to FIG. 25. The schematic subdiagram (a) in FIG. 25 shows that the first gesture operation is a left-hand operation, and the schematic subdiagram (b) in FIG. 25 shows that the first type of virtual keyboard is specifically represented as a designer keyboard. It should be understood that examples in FIG. 24 and FIG. 25 are only for ease of understanding of this solution, and are not intended to limit this solution.

In this embodiment of this application, if the first gesture operation is the right-hand operation, the first type of virtual keyboard is the numeric keyboard; or if the first gesture operation is the left-hand operation, the first type of virtual keyboard is the function keyboard. This better satisfies a habit of using a physical keyboard by the user, to reduce a difference between the virtual keyboard and the physical keyboard and enhance user viscosity.

(3) If the first gesture operation is a one-hand operation in a first region on the display, the first type of virtual keyboard is a function key keyboard, and the first region is located in a lower left corner or a lower right corner of the display. For a concept of the first region, refer to the description in operation 202, and details are not described herein again.

Figure 26:
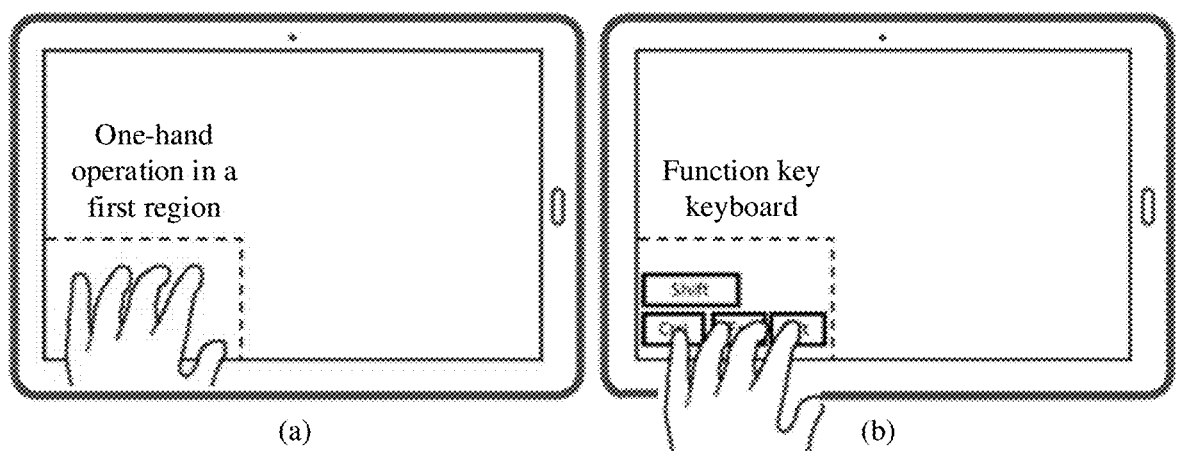
FIG. 26 is further still another schematic diagram of a first type of virtual keyboard in a virtual keyboard processing method according to an embodiment of this application.
Figure 27:
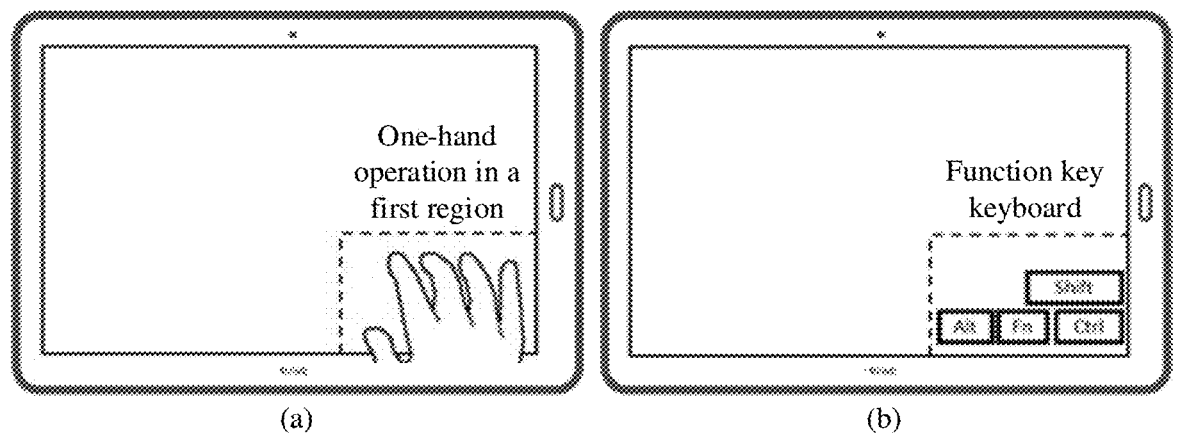
FIG. 27 is still another schematic diagram of a first type of virtual keyboard in a virtual keyboard processing method according to an embodiment of this application.

One or more function keys are shown in the function key keyboard. The function key keyboard includes but is not limited to a Shift key, a Ctrl key, an Alt key, an Fn (an abbreviation of function) key, a Delete key, and the like. Specific function keys included in the function key keyboard may be limited with reference to an actual application scenario, and are not limited herein. The Fn key is a modified key used on a computer keyboard, and a main function of the Fn key is to define more two sense keys in a key combination manner on a compact keyboard. For more intuitive understanding of this solution, refer to FIG. 26 and FIG. 27. FIG. 26 and FIG. 27 show two schematic diagrams of the first type of virtual keyboard in the virtual keyboard processing method according to an embodiment of this application. FIG. 26 and FIG. 27 include two schematic subdiagrams (a) and (b). FIG. 26 shows a case in which the first region is located in the lower left corner of the display. As shown in the schematic subdiagram (a) in FIG. 26, when the user places one hand in the first region on the display, the schematic subdiagram (b) in FIG. 26 is triggered to be displayed. The first type of virtual keyboard is a function key keyboard. Still refer to FIG. 27. FIG. 27 shows a case in which the first region is located in the lower right corner of the display. As shown in the schematic subdiagram (a) in FIG. 27, when the user places one hand in the first region on the display, the schematic subdiagram (b) in FIG. 27 is triggered to be displayed. The first type of virtual keyboard is a function key keyboard. It should be understood that examples in FIG. 26 and FIG. 27 are only for ease of understanding, and are not intended to limit the solution.

In this embodiment of this application, the function key is configured in the lower left corner or the lower right corner of the physical keyboard. If the first gesture operation is the one-hand operation in the first region on the display, the first type of virtual keyboard is a function key keyboard. Because a triggering gesture is the same as a habit of using a physical keyboard by the user, it is convenient for the user to remember the triggering gesture. This reduces embodiment difficulty of this solution, and enhances user viscosity.

(4) If the first gesture operation is a one-hand operation with less than three contact points, the first type of virtual keyboard is a round keyboard or an arc keyboard.

Figure 28:
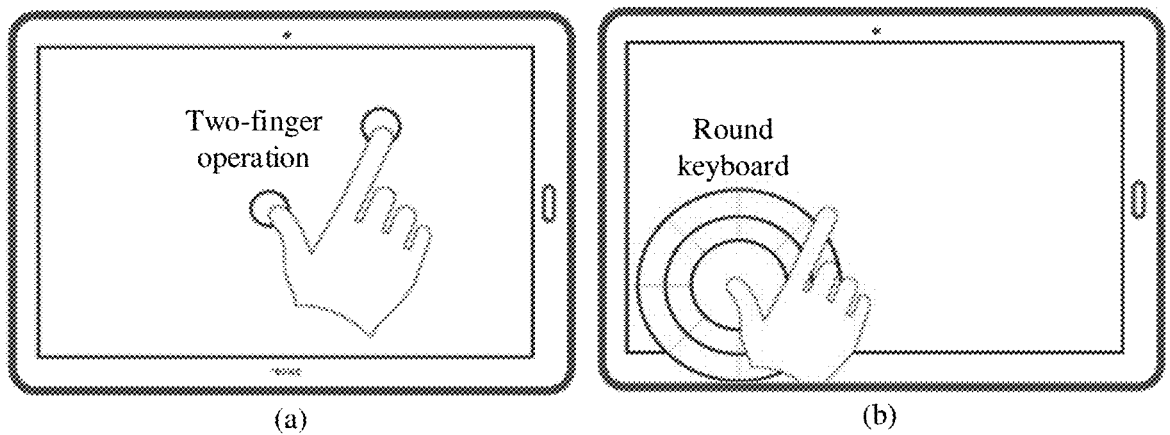
FIG. 28 is further still another schematic diagram of a first type of virtual keyboard in a virtual keyboard processing method according to an embodiment of this application.

The round keyboard means a keyboard with a round shape, and the arc keyboard means a keyboard with an arc shape. Optionally, if the first gesture operation is a one-hand operation with two contact points, and the distance between the two contact points is greater than a third distance threshold, the first type of virtual key is a round keyboard or an arc keyboard, and a value of the third distance threshold may be 58 millimeters, 60 millimeters, 62 millimeters, or the like, which is not exhaustively described herein. For more intuitive understanding of this solution, refer to FIG. 28. FIG. 28 is a schematic diagram of the first type of virtual keyboard in the virtual keyboard processing method according to an embodiment of this application. FIG. 28 includes two schematic subdiagrams (a) and (b). The schematic subdiagram (a) in FIG. 28 shows that the first gesture operation is a one-hand operation with two contact points (namely, less than three contact points). The schematic subdiagram (b) in FIG. 28 shows that the first type of virtual keyboard is a round keyboard. It should be understood that the example in FIG. 28 is only for ease of understanding of this solution, and is not intended to limit this solution.

In this embodiment of this application, when the first gesture operation is the one-hand operation with less than three contact points, the round keyboard or the arc keyboard may be further provided. In this way, both a keyboard existing in a physical keyboard and a keyboard that does not exist in the physical keyboard can be provided. This enriches keyboard types, provides more choices for the user, and further enhances selection flexibility of the user.

(5) If the first gesture operation is a two-hand operation, the first type of virtual keyboard is a full-size keyboard.

Figure 29:
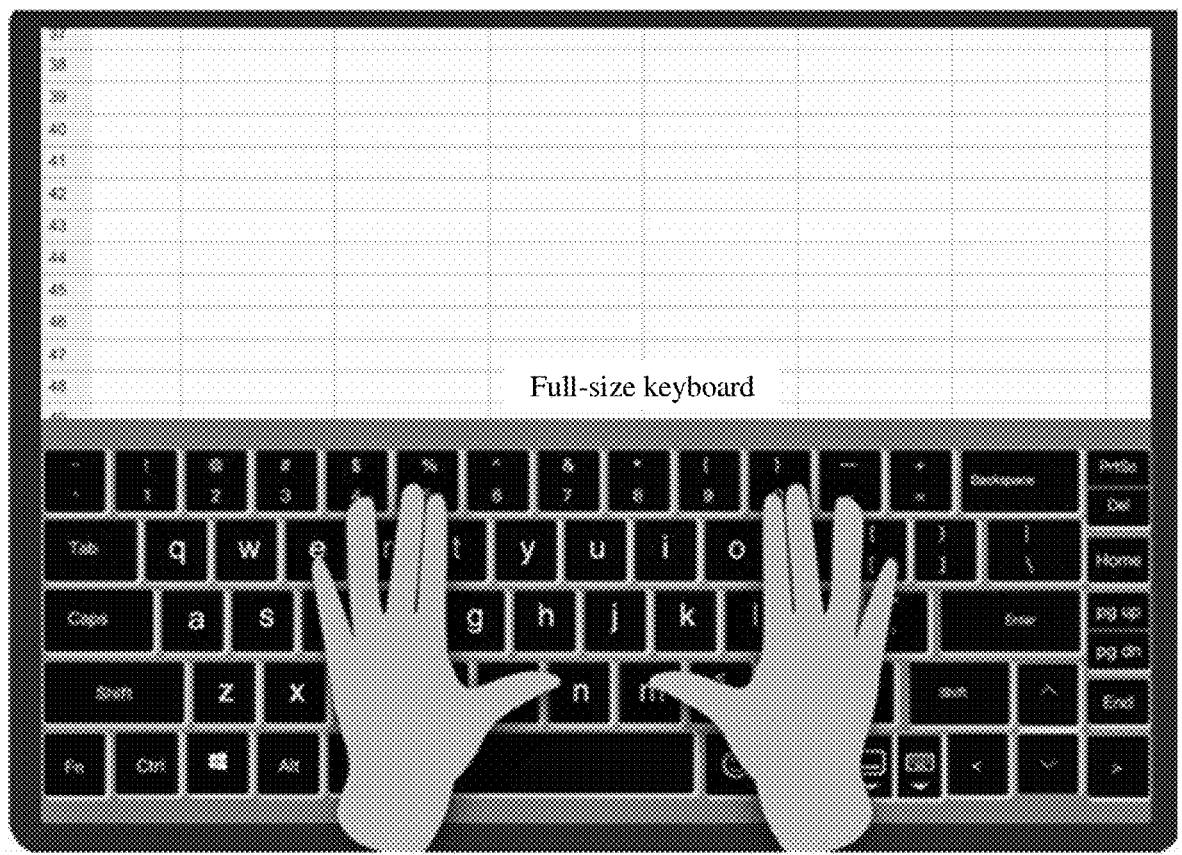
FIG. 29 is still another schematic diagram of a first type of virtual keyboard in a virtual keyboard processing method according to an embodiment of this application.

For more intuitive understanding of this solution, refer to FIG. 29. FIG. 29 is a schematic diagram of the first type of virtual keyboard in the virtual keyboard processing method according to an embodiment of this application. FIG. 29 shows that a virtual keyboard corresponding to the two-hand operation is a full-size keyboard. The full-size keyboard includes at least 26 alphabet keys. It can be learned by comparing FIG. 29 and FIG. 23 that a size of the full-size keyboard is greater than that of a mini keyboard. It should be understood that the example in FIG. 29 is only for ease of understanding of this solution, and is not intended to limit this solution.

It should be noted that, in the foregoing items (1) to (5), items (1) and (2) are incompatible with each other, and cannot be configured in a same electronic device. Other items may be randomly combined.

Further, in an embodiment, the first rule directly includes the correspondence between the plurality of types of gesture operations and the plurality of types of virtual keyboards, as shown in the foregoing items (1) to (5). The first rule includes a correspondence between a plurality of pieces of first identification information and a plurality of pieces of second identification information. The first identification information uniquely indicates one type of gesture operation, and the second identification information uniquely indicates one type of virtual keyboard.

In another embodiment, the first rule includes a correspondence between a plurality of groups of conditions and the plurality of types of virtual keyboards. Each group of conditions in the plurality of groups of conditions corresponds to one type of gesture operation. That is, each group of conditions in the plurality of groups of conditions is used to limit one type of gesture operation.

Specifically, if the first gesture parameter is collected by using the display, one group of conditions used to limit the one-hand operation may be that the quantity of touch points is greater than or equal to the first value, and each distance between the plurality of touch points is less than the second distance threshold. For values of the first value and the second distance threshold, refer to the foregoing descriptions. Optionally, one group of conditions used to limit the one-hand operation may be that a quantity of contact points whose areas are less than the first area threshold is greater than or equal to the first value, and each distance between the plurality of contact points whose areas are less than the first area threshold is less than the second distance threshold.

One group of conditions used to limit the left-hand operation may be that a quantity of contact points is greater than or equal to the first value, each distance between the plurality of contact points is less than the second distance threshold, and the plurality of contact points are all located on a left side of the center line of the display. Alternatively, one group of conditions used to limit the left-hand operation may be that a quantity of contact points is greater than or equal to the first value, each distance between the plurality of contact points is less than the second distance threshold, and the plurality of contact points are all located on a right side of the center line of the display.

One group of conditions used to limit the one-hand operation in the first region may be that a quantity of contact points is greater than or equal to the first value, each distance between the plurality of contact points is less than the second distance threshold, and the plurality of contact points are all located in the first region on the display. Alternatively, one group of conditions used to limit the one-hand operation in the first region may be that a quantity of contact points is greater than or equal to the first value, each distance between the plurality of contact points is less than the second distance threshold, and at least one of the plurality of contact points is located in the first region on the display.

One group of conditions used to limit the two-hand operation may be that a plurality of contact points include the first subset and the second subset, quantities of contact points in the first subset and the second subset are both greater than or equal to the first value, each distance between the plurality of contact points in the first subset is less than the second distance threshold, and each distance between the plurality of contact points in the second subset is less than the second distance threshold, a distance between any contact point in the first subset and any contact point in the second subset is greater than the second distance threshold. Optionally, one group of conditions used to limit a two-hand operation may be that a plurality of contact points whose areas are less than the first area threshold include the first subset and the second subset.

It should be noted that the foregoing provides a plurality of groups of conditions used to limit a plurality of types of gesture operations. However, a specific type of gesture operation configured in one electronic device and a specific restrictive condition corresponding to each type of gesture operation may be flexibly set with reference to an actual application scenario. This is not limited herein.

Optionally, the first rule includes a first sub-rule. The first sub-rule is obtained by performing a custom operation on at least one type of gesture operation and/or at least one type of virtual keyboard. In this embodiment of this application, the user may customize a type of a triggering gesture and/or a virtual keyboard, so that a display process of the virtual keyboard better meets expectation of the user, and user viscosity of this solution is further increased.

Figure 30:
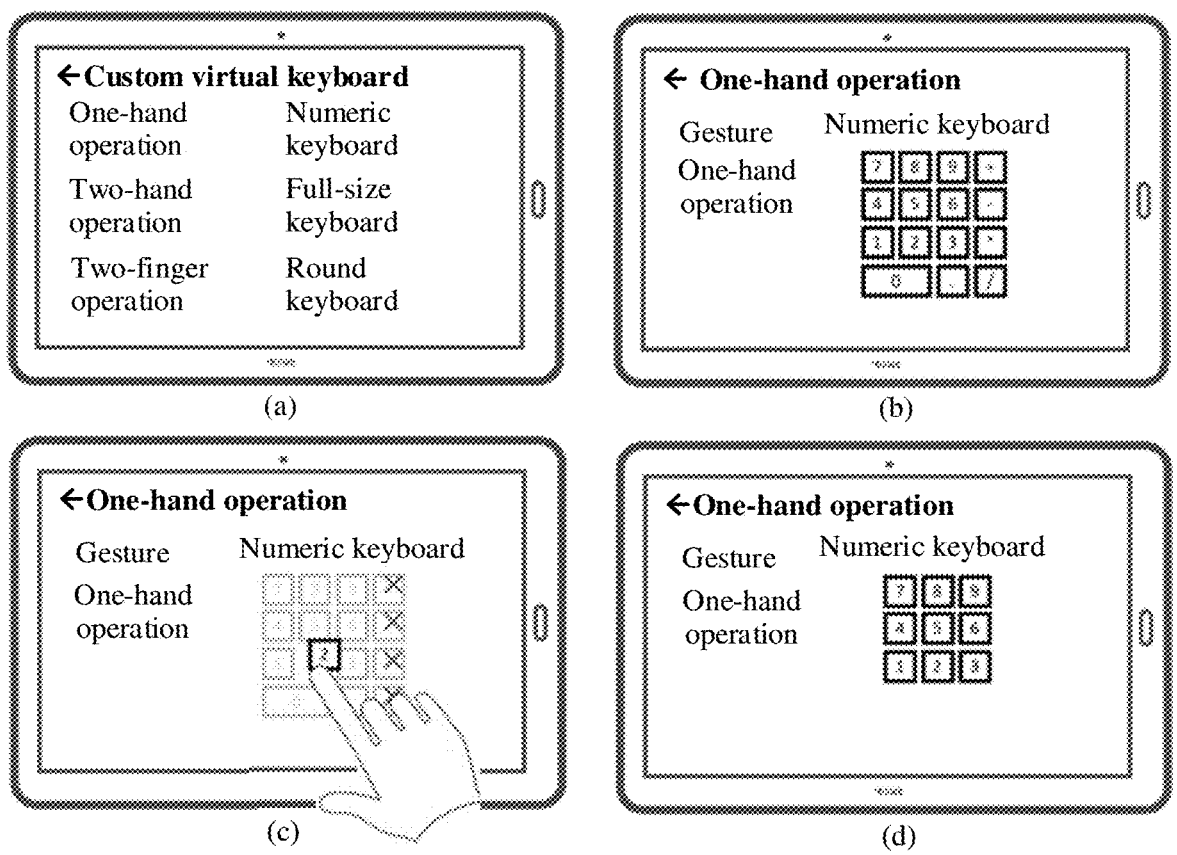
FIG. 30 is a schematic diagram of a first setting interface in a virtual keyboard processing method according to an embodiment of this application.
Figure 31:
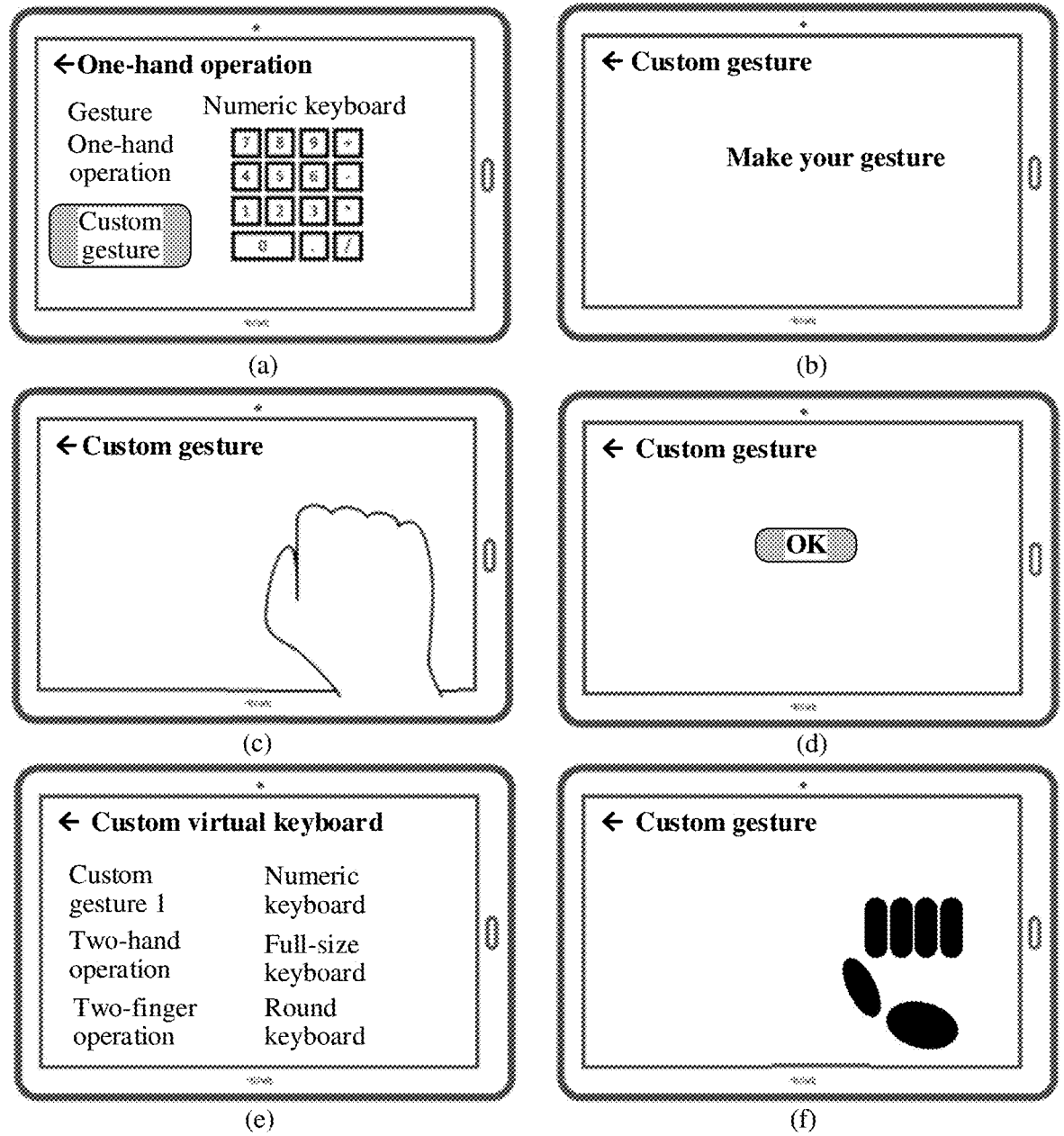
FIG. 31 is another schematic diagram of a first setting interface in a virtual keyboard processing method according to an embodiment of this application.
Figure 32:
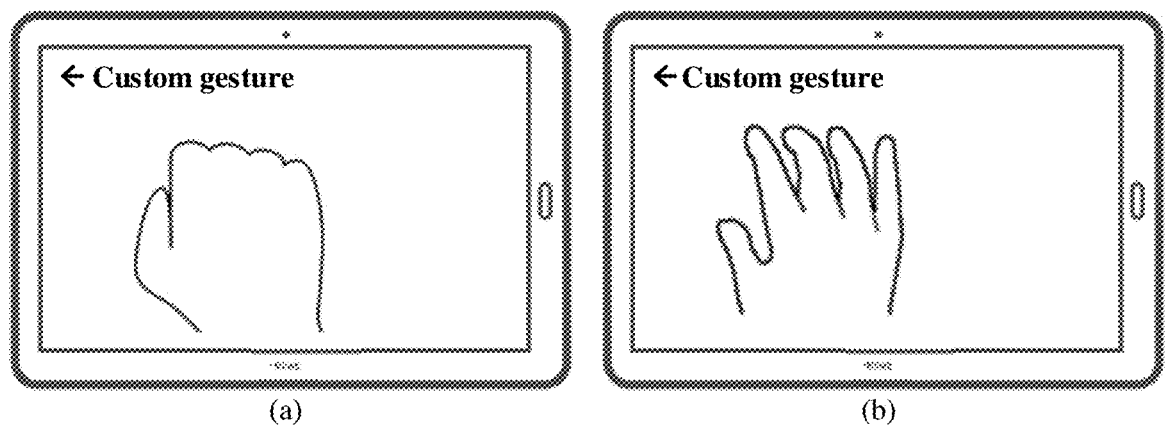
FIG. 32 is a schematic diagram of a custom gesture operation in a virtual keyboard processing method according to an embodiment of this application.

Specifically, the electronic device has a "setting" function, and a first setting interface for the first rule is configured for the "setting" function, so that the user may customize, by using the first setting interface, any one or more of the following: a gesture operation, a virtual keyboard, and a correspondence between the gesture operation and the virtual keyboard. For more intuitive understanding of this solution, refer to FIG. 30 to FIG. 32. FIG. 30 and FIG. 31 are schematic diagrams of the first setting interface in the virtual keyboard processing method according to an embodiment of this application. FIG. 32 is a schematic diagram of a custom gesture operation in the virtual keyboard processing method according to an embodiment of this application. FIG. 30 includes four schematic subdiagrams (a), (b), (c), and (d). The schematic subdiagram (a) in FIG. 30 represents the correspondence between the plurality of types of gesture operations and the plurality of types of virtual keyboards that is preconfigured in the electronic device. As shown in the schematic subdiagram (a) in FIG. 30, a one-hand operation triggers display of a numeric keyboard, a two-hand operation triggers display of a full-size keyboard, and a two-finger operation triggers display of a round keyboard. When the user taps "Numeric keyboard" (a type of virtual keyboard), the schematic subdiagram (b) in FIG. 30 is triggered to be displayed. That is, a custom operation is performed on the "Numeric keyboard". In the schematic subdiagram (b) in FIG. 30, the user performs a touch and hold operation, a double-tap operation, a triple-tap operation, or another type of contact operation on any key on the numeric keyboard. In FIG. 30, the touch and hold operation on a key 2 on the numeric keyboard is used as an example herein. Delete icons (namely, "x" symbols shown in FIG. 30) appear on some keys on the numeric keyboard, that is, the schematic subdiagram (c) in FIG. 30 is triggered to be displayed. In the schematic subdiagram (c) in FIG. 30, a key with a "x" symbol is a key that can be deleted. In addition, the user may further move a location of a key on the numeric keyboard by pressing and holding the key and dragging the key. The foregoing operations of deleting a key and moving a location of a key may be executed for a plurality of times. As shown in the schematic subdiagram (d) in FIG. 30, the user deletes number keys except 1 to 9, to implement customization of the numeric keyboard. It should be noted that, the example in FIG. 30 is only for ease of understanding of this solution, and the deleting or moving operation on the virtual key on the virtual keyboard may alternatively be implemented through another operation. In addition, FIG. 30 only uses customization of the numeric keyboard as an example, and customization of another type of virtual keyboard may also be performed.

Still refer to FIG. 31. FIG. 31 needs to be described with reference to FIG. 30. When the user taps "One-hand operation" in the schematic subdiagram (a) in FIG. 30, a schematic subdiagram (a) in FIG. 31 is displayed. A "Custom gesture" icon is displayed in the schematic subdiagram (a) in FIG. 31. The user taps the icon, and a schematic subdiagram (b) in FIG. 31 is displayed. The user inputs a custom gesture based on a prompt of the schematic subdiagram (b) in FIG. 31. That is, a "fist-shaped" gesture is input as shown in a schematic subdiagram (c) in FIG. 31. In an embodiment, the electronic device may preset a first duration threshold, where the first duration threshold is a total duration threshold for inputting the custom gesture. When the input duration threshold is reached, a schematic subdiagram (d) in FIG. 31 is displayed. In another embodiment, the electronic device may alternatively preset a second duration threshold, where the second duration threshold is a threshold for the user to stop inputting a gesture. When the electronic device detects that duration in which the user stops inputting a gesture reaches the second duration threshold, the schematic subdiagram (d) in FIG. 31 is displayed. The manners of displaying the schematic subdiagram (d) in FIG. 31 are not exhaustively described herein. In the schematic subdiagram (d) in FIG. 31, an icon used to indicate "OK" and an icon used to indicate "Re-input a custom gesture" are displayed on the display. If the user taps the "OK" icon, the electronic device determines a gesture operation obtained in the schematic subdiagram (c) in FIG. 31 as a custom gesture 1. The electronic device updates the first rule, and updates a correspondence between the one-hand operation and the numeric keyboard to a correspondence between the custom gesture 1 and the numeric keyboard. A schematic subdiagram (e) in FIG. 31 is displayed. In this way, the custom gesture 1 is confirmed as a triggering gesture of the numeric keyboard, and customization of the triggering gesture is completed. In addition, a schematic subdiagram (f) in FIG. 31 represents a shape (namely, a "fist" shape) of the custom gesture 1 obtained by the electronic device. It should be understood that the example in FIG. 31 is only for ease of understanding of this solution, and is not intended to limit this solution. The user may further set another shape of custom gesture. This is not limited herein.

Still refer to FIG. 32. FIG. 32 needs to be described with reference to FIG. 31. The user starts to input a custom gesture based on the prompt in the schematic subdiagram (b) in FIG. 31, that is, a schematic subdiagram (a) in FIG. 32 and a schematic subdiagram (b) in FIG. 32 are displayed. FIG. 32 shows an example in which the custom gesture is a dynamic gesture. In FIG. 32, the custom gesture is a dynamic gesture of extending fingers after making a fist. After the electronic device determines that the user completes inputting the custom gesture, the schematic diagram (d) in FIG. 31 may be displayed. For subsequent operations, refer to the foregoing descriptions of FIG. 31. Details are not described herein again.

1704: The electronic device determines, according to the first rule, whether the first gesture operation is included in a plurality of types of prestored gesture operations. If the first gesture operation is one of the plurality of types of prestored gesture operations, operation 1705 is performed; or if the first gesture parameter is not included in the plurality of types of prestored gesture operations, operation 1701 is performed again.

In this embodiment of this application, if the first rule includes the correspondence between the plurality of types of gesture operations and the plurality of types of virtual keyboards, the electronic device needs to generate the first indication information by performing operation 1702. The first indication information needs to include quantity information of a hand corresponding to the first gesture operation, location information of the hand corresponding to the first gesture operation, and shape information of the hand corresponding to the first gesture operation. After obtaining the first indication information, the electronic device may determine whether the first gesture operation is one of the plurality of types of gesture operations preconfigured in the electronic device.

If the first rule includes a plurality of groups of conditions, after obtaining the first gesture parameter corresponding to the first gesture operation by performing operation 1701, the electronic device may directly determine whether the first gesture operation meets any one of the plurality of groups of conditions included in the first rule. For descriptions of the plurality of groups of conditions, refer to the descriptions in operation 1703.

1705: The electronic device displays the first type of virtual keyboard by using the display.

In this embodiment of this application, after determining, according to the first rule, that the first gesture operation is a target type of gesture operation in the plurality of types of gesture operations prestored in the electronic device, the electronic device may obtain the first type of virtual keyboard corresponding to the target type of gesture operation (that is, obtain the first type of virtual keyboard corresponding to the first gesture operation). Further, the electronic device displays the first type of virtual keyboard by using the display. In this embodiment of this application, the first rule is preconfigured for the electronic device. The first rule indicates the correspondence between the plurality of types of gesture operations and the plurality of types of virtual keyboards. After detecting the first gesture operation acting on the display, the electronic device may obtain, according to the first rule, the first type of virtual keyboard corresponding to the specific first gesture operation. This can improve efficiency of a matching process of the virtual keyboard.

Specifically, in an embodiment, a location of the first type of virtual keyboard on the display is fixed in the process of displaying the first type of virtual keyboard. In another embodiment, a location of the first type of virtual keyboard on the display can be moved with a hand of the user in the process of displaying the first type of virtual keyboard.

In another embodiment, the plurality of types of virtual keyboards are divided into a third subset and a fourth subset. The third subset and the fourth subset each include at least one type of virtual keyboard. A location of each type of virtual keyboard in the third subset is fixed in a display process. A location of each type of virtual keyboard in the fourth subset can be moved with a hand of the user in the display process. In other words, in the plurality of types of virtual keyboards, locations of some types of virtual keyboards are fixed in the process of displaying the virtual keyboards, and locations of the other types of virtual keys is moved with the hand of the user in the process of displaying the virtual keyboards.

Optionally, if the first type of virtual keyboard is a mini keyboard, a numeric keyboard, or a function keyboard, the first type of virtual keyboard can be moved with the hand of the user, in other words, the third subset includes any one or a combination of the following: a mini keyboard, a numeric keyboard, and a function keyboard. If the first type of virtual keyboard is a round keyboard, an arc keyboard, or a full-size keyboard, the location of the first type of virtual keyboard can be fixed in the display process, in other words, the fourth subset includes any one or a combination of the following: a round keyboard, an arc keyboard, or a full-size keyboard.

Further, for the virtual keyboard that is moved with the hand of the user, when the user wants to disable a movement function of the virtual keyboard, the user may input a second gesture operation by using the display. The second gesture operation may be a double-tap operation, a triple-tap operation, a tap operation, another operation, or the like. This is not limited herein.

The following describes an initial display location of the virtual keyboard. The initial display location of the first type of virtual keyboard may be preset, or may be determined by the electronic device based on a finger location. For example, if the first type of virtual keyboard is a numeric keyboard, when the numeric keyboard is initially displayed, a key corresponding to a number 5 may be configured under an index finger. For another example, if the first type of virtual keyboard is a mini keyboard, the initial display location of the mini keyboard may be under a hand. The examples herein are only for ease of understanding, and are not intended to limit the solution.

The following describes a size of the virtual keyboard. In an embodiment, a size of each type of virtual keyboard in the electronic device is fixed. In another embodiment, a same type of virtual keyboard may have a different size to adapt to a different size of finger/hand. Specifically, a same type of virtual keyboard of at least two different sizes may be prestored in the electronic device, and a correspondence between a size of a contact point and a different size is prestored in the electronic device. After determining the first type of virtual keyboard, the electronic device may obtain a target size corresponding to the size of the contact point, and display a first type of virtual keyboard of the target size.

Optionally, before the electronic device displays the first type of virtual keyboard by using the display, the electronic device may further obtain a first angle based on the first indication information generated in operation 1702. The first angle indicates a relative angle between the hand in the first gesture corresponding to the first gesture operation and a side of the display. Alternatively, the first angle indicates a relative angle between the hand in the first gesture corresponding to the first gesture operation and a center line of the display. Operation 1705 may include: The electronic device obtains a first display angle of the first type of virtual keyboard based on the first angle, and displays the first type of virtual keyboard based on the first display angle by using the display. The first display angle indicates a relative angle between a side of the first type of virtual keyboard and the side of the display. Alternatively, the first display angle indicates a relative angle between a side of the first type of virtual keyboard and the center line of the display.

Specifically, in an embodiment, the electronic device determines whether the first angle is greater than or equal to a preset angle threshold. If the first angle is greater than or equal to the preset angle threshold, the electronic device obtains the first display angle, and displays the first type of virtual keyboard at the first display angle by using the display. A value of the preset angle threshold may be 25 degrees, 28 degrees, 30 degrees, 32 degrees, 35 degrees, another value, or the like. This is not limited herein.

Further, if the first type of virtual keyboard is a full-size keyboard, the first angle includes a relative angle of a left hand and a relative angle of a right hand. The full-size keyboard is divided into a first sub-keyboard and a second sub-keyboard. The first sub-keyboard and the second sub-keyboard include different virtual keys on the full-size keyboard, and the first display angle includes a display angle of the first sub-keyboard and a display angle of the second sub-keyboard. If the first angle indicates the relative angle between the hand in the first gesture corresponding to the first gesture operation and the side of the display, the first display angle indicates a relative angle between a bottom side of the virtual keyboard and the side of the display. Further, the display angle of the first sub-keyboard indicates a relative angle between a side of the first sub-keyboard and the side of the display, and the display angle of the second sub-keyboard indicates a relative angle between a side of the second sub-keyboard and the side of the display. If the first angle indicates the relative angle between the hand in the first gesture corresponding to the first gesture operation and the center line of the display, the first display angle indicates a relative angle between a bottom side of the virtual keyboard and the center line of the display. Further, the display angle of the first sub-keyboard indicates a relative angle between a side of the first sub-keyboard and the center line of the display, and the display angle of the second sub-keyboard indicates a relative angle between a side of the second sub-keyboard and the center line of the display.

Figure 33:
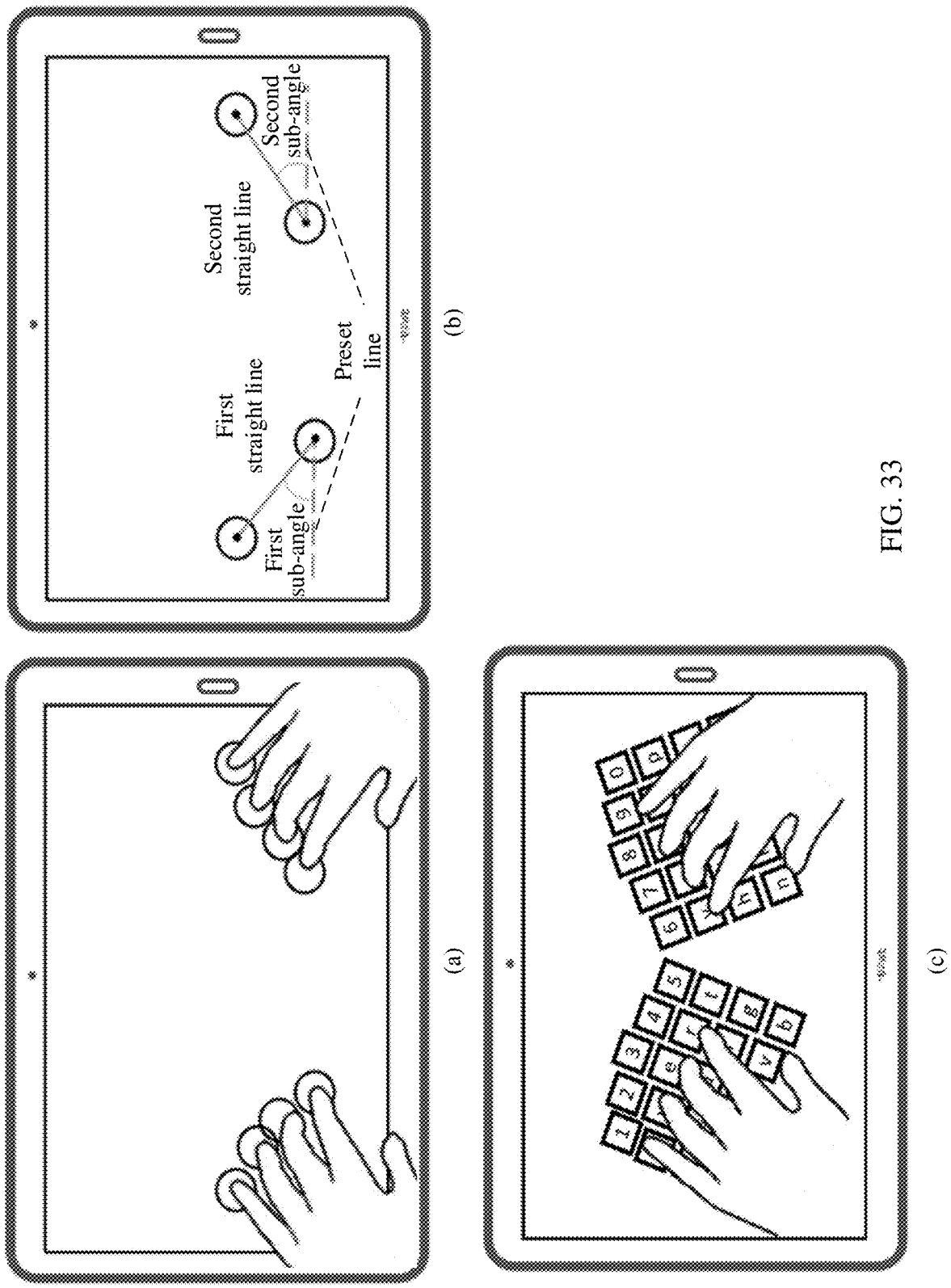
FIG. 33 is further still another schematic diagram of a first type of virtual keyboard in a virtual keyboard processing method according to an embodiment of this application.

For more intuitive understanding of this solution, refer to FIG. 33. FIG. 33 is a schematic diagram of the first type of virtual keyboard in the virtual keyboard processing method according to an embodiment of this application. FIG. 33 shows an example in which the value of the preset angle threshold is 30. FIG. 33 includes three schematic subdiagrams (a), (b), and (c). The schematic subdiagram (a) in FIG. 33 represents eight first contact points corresponding to a two-hand operation (one type of first gesture operation). The schematic subdiagram (b) in FIG. 33 separately shows the first sub-angle (namely, the relative angle of the left hand) formed by the first straight line and the bottom side of the display and the second sub-angle (namely, the relative angle of the right hand) formed by the second straight line and the bottom side of the display, where values of the first sub-angle and the second sub-angle are both 32 degrees. The schematic subdiagram (c) in FIG. 33 represents the first type of virtual keyboard that is displayed at the first display angle by using the display. It should be understood that the example in FIG. 33 is only for ease of understanding of this solution, and is not intended to limit this solution.

If the first type of virtual keyboard is a mini keyboard, a numeric keyboard, a function keyboard, or a function key keyboard, the first angle is a one-hand angle, and the first display angle is a relative angle of the entire virtual keyboard.

In another embodiment, after obtaining the first angle, the electronic device determines the first display angle of the first type of virtual keyboard as the first angle, and displays the first type of virtual keyboard based on the first angle by using the display. If the first angle indicates the relative angle between the hand in the first gesture corresponding to the first gesture operation and the side of the display, the first display angle indicates the relative angle between the bottom side of the virtual keyboard and the side of the display. If the first angle indicates the relative angle between the hand in the first gesture corresponding to the first gesture operation and the side of the display, the first display angle indicates the relative angle between the bottom side of the virtual keyboard and the center line of the display.

In this embodiment of this application, a relative angle (namely, the first angle) between the hand of the user and a side or a center line of a display interface is obtained, and the display angle of the virtual keyboard is determined based on the first angle. In this way, the display angle of the keyboard is more suitable for a placement angle of the hand of the user, and it is more comfortable and convenient for the user to input by using the virtual keyboard.

Optionally, if the electronic device determines that the first gesture parameter is a two-hand operation, that is, determines that the first type of virtual keyboard is a full-size keyboard, the electronic device further obtains the distance between the two hands, and determines whether the distance between the two hands is greater than or equal to a first distance threshold. If the distance between the two hands is less than or equal to the first distance threshold, the electronic device displays the first type of virtual keyboard in an integrated manner by using the display; or if the distance between the two hands is greater than the first distance threshold, the electronic device displays the first sub-keyboard by using a second region on the display, and displays the second sub-keyboard by using a third region on the display. The second region and the third region are different regions on the display. The first sub-keyboard and the second sub-keyboard include different virtual keys on the full-size keyboard. A value of the first distance threshold may be 70 millimeters, 75 millimeters, 80 millimeters, or the like. This is not limited herein.

Figure 34:
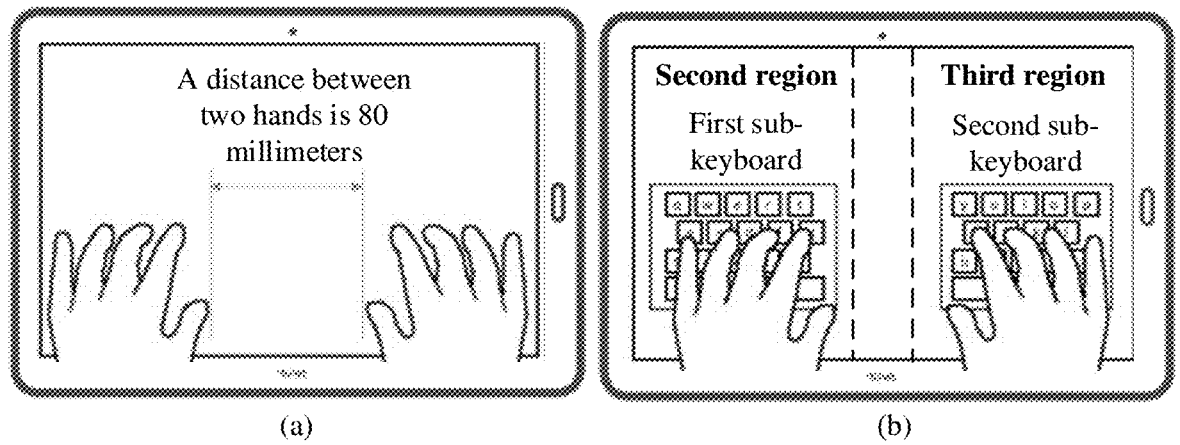
FIG. 34 is still another schematic diagram of a first type of virtual keyboard in a virtual keyboard processing method according to an embodiment of this application.

For more intuitive understanding of this solution, refer to FIG. 34. FIG. 34 is a schematic diagram of the first type of virtual keyboard in the virtual keyboard processing method according to an embodiment of this application. FIG. 34 shows an example in which the value of the first distance threshold is 75 millimeters. FIG. 34 includes two schematic subdiagrams (a) and (b). The schematic subdiagram (a) in FIG. 34 shows that the distance between the two hands in a two-hand operation is 80 millimeters. Because 80 millimeters are greater than 75 millimeters, the schematic subdiagram (b) in FIG. 34 separately displays the first sub-keyboard in the second region of the display, and the second sub-keyboard in the third region on the display. It should be understood that the example in FIG. 34 is only for ease of understanding of this solution, and is not intended to limit this solution.

In this embodiment of this application, whether to display the virtual keyboard in an integrated manner or in a separated manner may be determined based on the distance between the two hands of the user. This further improves flexibility of a process of displaying the virtual keyboard, facilitates the user to use the displayed virtual keyboard, and further enhances user viscosity of this solution.

Further, optionally, if the electronic device determines that the first gesture parameter is a two-hand operation, that is, determines that the first type of virtual keyboard is a full-size keyboard, the electronic device further obtains the distance between the two hands, and determines whether the distance between the two hands is less than a fourth distance threshold. If the distance between the two hands is less than the fourth distance threshold, the electronic device displays prompt information to indicate the user to adjust the distance between the two hands, and/or the electronic device directly displays the full-size keyboard in an integrated manner. Optionally, the electronic device displays a full-size keyboard of a minimum size in an integrated manner. The foregoing prompt information may be a text prompt, a voice prompt, a vibration prompt, another type of prompt, or the like. The display manner of the prompt information is not exhaustively described herein.

Figure 35:
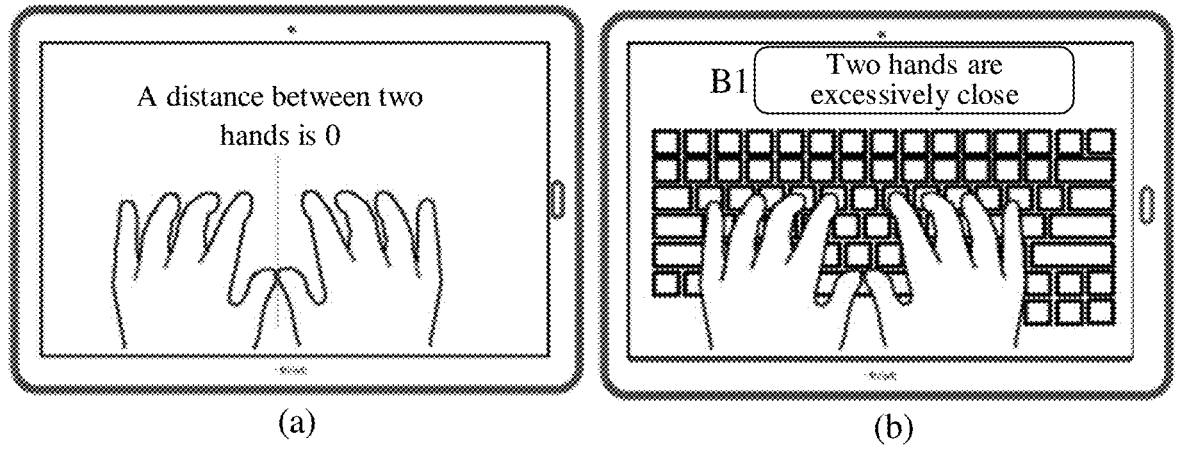
FIG. 35 is further still another schematic diagram of a first type of virtual keyboard in a virtual keyboard processing method according to an embodiment of this application.

For more intuitive understanding of this solution, refer to FIG. 35. FIG. 35 is a schematic diagram of the first type of virtual keyboard in the virtual keyboard processing method according to an embodiment of this application. FIG. 35 includes two schematic subdiagrams (a) and (b). The schematic subdiagram (a) in FIG. 35 shows that the distance between the two hands in a two-hand operation is 0 millimeters. Because the distance between the two hands is excessively small, B1 in the schematic subdiagram (b) in FIG. 35 represents the prompt information, to prompt the user that the two hands are excessively close, and the full-size keyboard is displayed in an integrated manner. It should be understood that the example in FIG. 35 is only for ease of understanding of this solution, and is not intended to limit this solution.

Optionally, the display is further provided with a plurality of vibration feedback elements. If the location of the first type of virtual keyboard on the display is fixed in the process of displaying the first type of virtual keyboard, after the electronic device displays the first type of virtual keyboard by using the display, the electronic device may further detect a first contact operation acting on the display, and obtains, in response to the first contact operation, first location information of a first contact point corresponding to the first contact operation. The first location information corresponds to a first virtual key on the virtual keyboard. If the first virtual key is an anchor point key, the electronic device obtains a first vibration feedback element from the plurality of vibration feedback elements. The first vibration feedback element is a vibration feedback element that matches the first virtual key. The electronic device indicates the first vibration feedback elements that match the first virtual key to emit a vibration wave, to perform a first feedback operation. The first feedback operation is used to prompt that the first virtual key is an anchor point key. It should be noted that, for meaning of the nouns in the foregoing descriptions, specific embodiments of the operations, and beneficial effects, refer to the descriptions in Embodiment 1. Details are not described herein again. A purpose of setting the anchor point key is to help the user remember a location of the anchor point key, to help the user implement touch typing on various types of virtual keyboards. Therefore, a specific virtual key on each type of virtual keyboard may be flexibly configured as the anchor point key.

For further understanding of this solution, the following gives examples of the anchor point key on each type of virtual keyboard with reference to various types of virtual keyboards shown above. For example, the first type of virtual keyboard is a numeric keyboard shown in FIG. 24, and the anchor point key may be a virtual key indicated by the number "5". For another example, if the first type of virtual keyboard is a function key keyboard shown in FIG. 26, the anchor point key may be a Ctrl key and a Shift key. It should be understood that the examples herein are only for ease of understanding of a concept of the anchor point key on various types of virtual keyboards. Specifically, a specific virtual key on each type of virtual keyboard may be flexibly set as the anchor point key by a developer with reference to an actual application scenario, or may be customized by the user. This is not limited herein.

1706: The electronic device obtains a contact operation on a first virtual key on a function key keyboard.

In some embodiments of this application, the first type of virtual keyboard displayed by the electronic device is a function key keyboard. Then, the electronic device may further obtain a contact operation on one or more first virtual keys on the function key keyboard. The contact operation may be a press operation or a touch operation. For example, the first virtual key may be a Ctrl key, or may include both a Ctrl key and a Shift key. This is not limited herein.

1707: The electronic device highlights a second virtual key on the display in response to the contact operation, where the second virtual key is a key other than the first virtual key in a shortcut key combination.

In some embodiments of this application, the electronic device highlights at least one second virtual key on the display in response to the contact operation. Each second virtual key in the at least one second virtual key can form shortcut keys together with the first virtual key, and the second virtual key is the key other than the first virtual key in the shortcut key combination. Highlighting includes but is not limited to highlight display, bold display, flash display, or the like. This is not limited herein. For example, in a drawing application, a key combination of a Ctrl key, a Shift key, and an I key can provide a function of color inversion of a currently processed image. In this case, the first virtual key includes the Ctrl key and the Shift key, and the second virtual key is the virtual I key. Color inversion of a currently processed image means changing a color of the currently processed image to a complementary color of the currently processed image. It should be understood that the example herein is only for ease of understanding, and is not intended to limit this solution.

Figure 36:
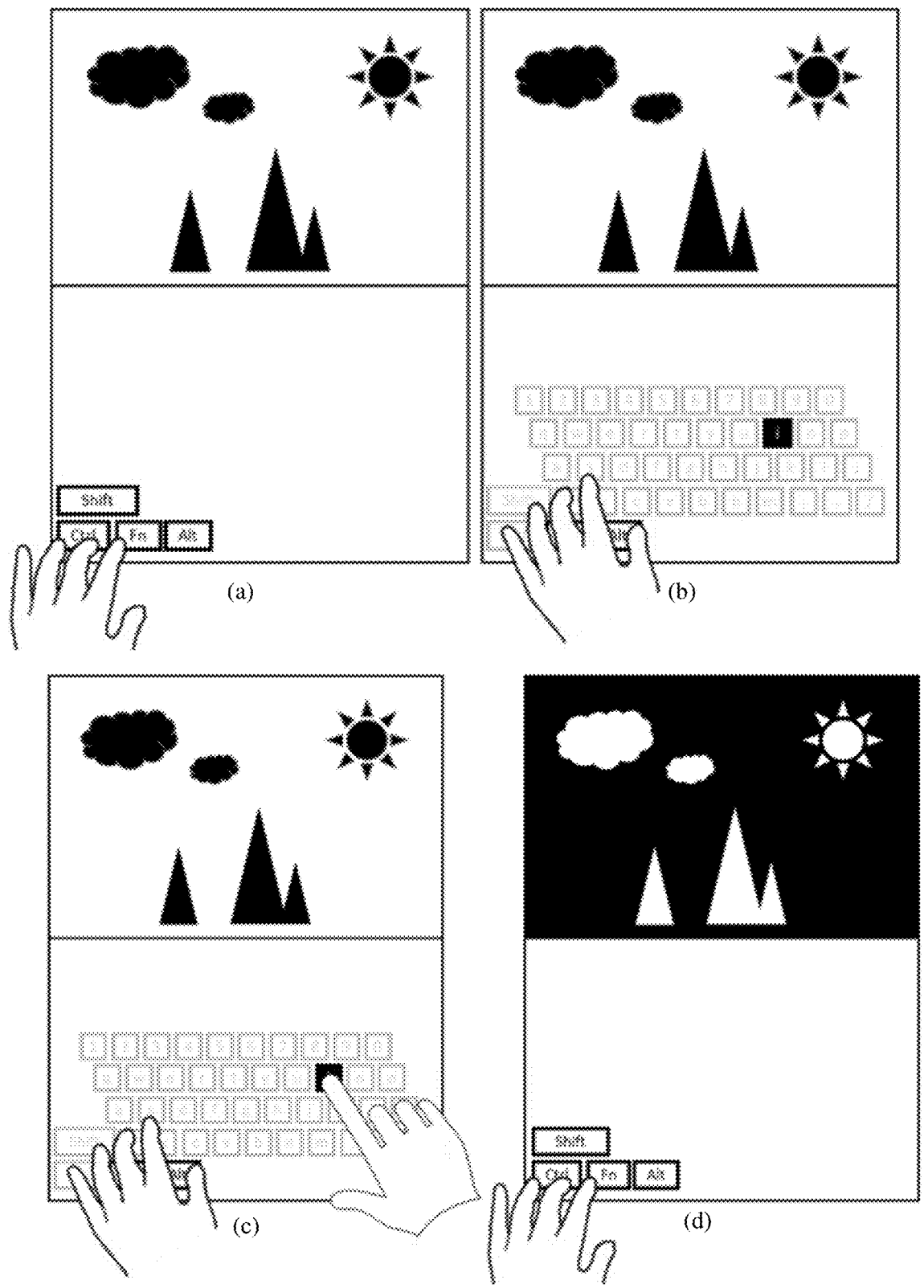
FIG. 36 is a schematic diagram of a second virtual key in a virtual keyboard processing method according to an embodiment of this application.

For more intuitive understanding of this solution, refer to FIG. 36. FIG. 36 is a schematic diagram of the second virtual key in the virtual keyboard processing method according to an embodiment of this application. FIG. 36 shows an example in which a current application is a drawing application. FIG. 36 includes four schematic subdiagrams (a), (b), (c), and (d). The schematic subdiagram (a) in FIG. 36 shows that a function key keyboard is displayed on the display. The schematic subdiagram (b) in FIG. 36 shows that the user performs a press operation on the Ctrl key and the Shift key, to trigger the electronic device to highlight, on the display, a key on which a letter I is located. The schematic subdiagram (c) in FIG. 36 shows that the user taps the key on which the letter I is located, to trigger display of the schematic subdiagram (d) in FIG. 36, in other words, to trigger color inversion of a currently displayed image. It should be understood that the example in FIG. 36 is only for ease of understanding of this solution, and is not intended to limit this solution.

Optionally, in response to the contact operation, the electronic device highlights the second virtual key on the display, and further displays a function of a shortcut key corresponding to each second virtual key.

Figure 37A:
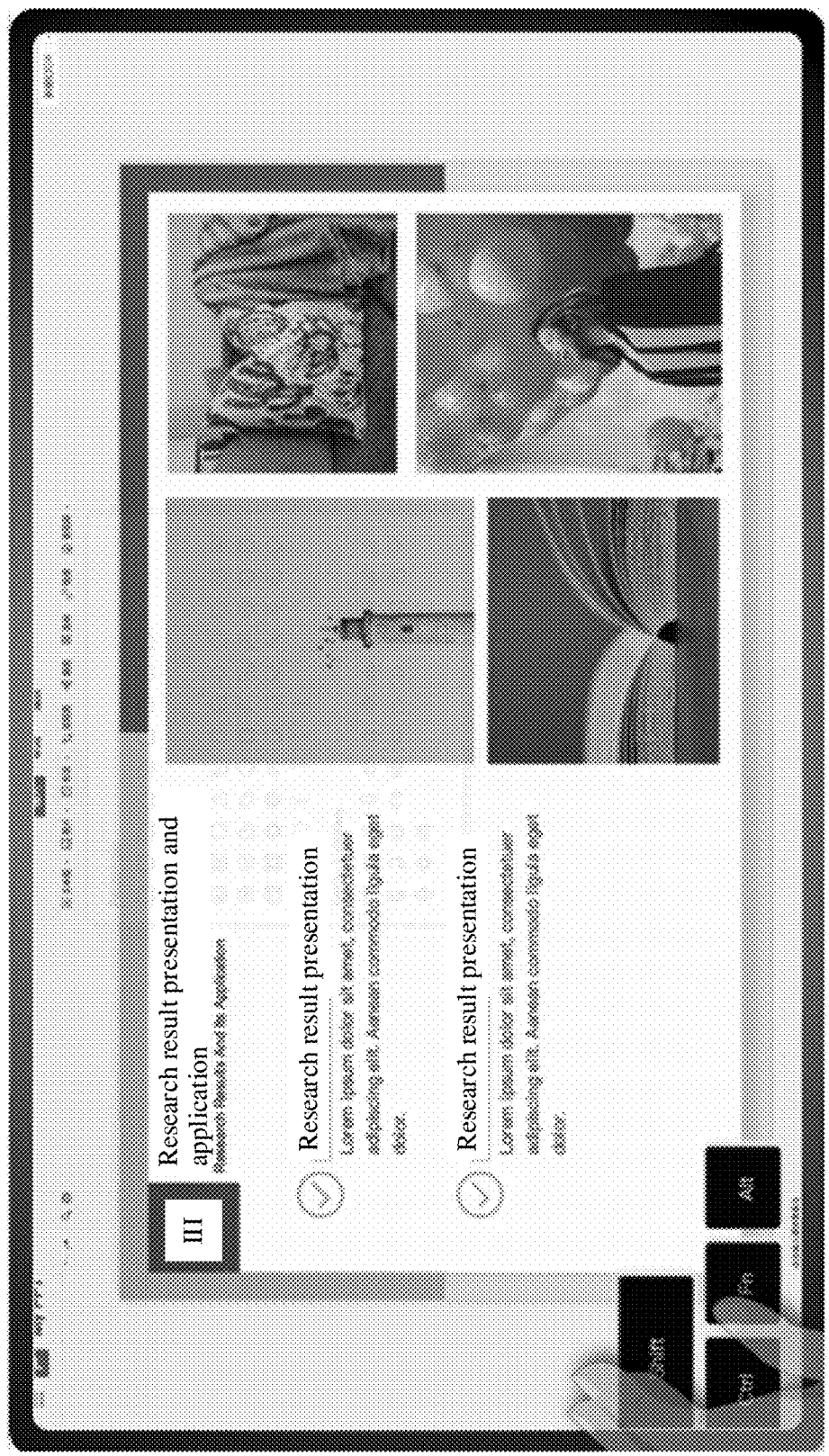
FIG. 37(*a*) to FIG. 37(*c*) show another schematic diagram of a second virtual key in a virtual keyboard processing method according to an embodiment of this application.
Figure 37B:
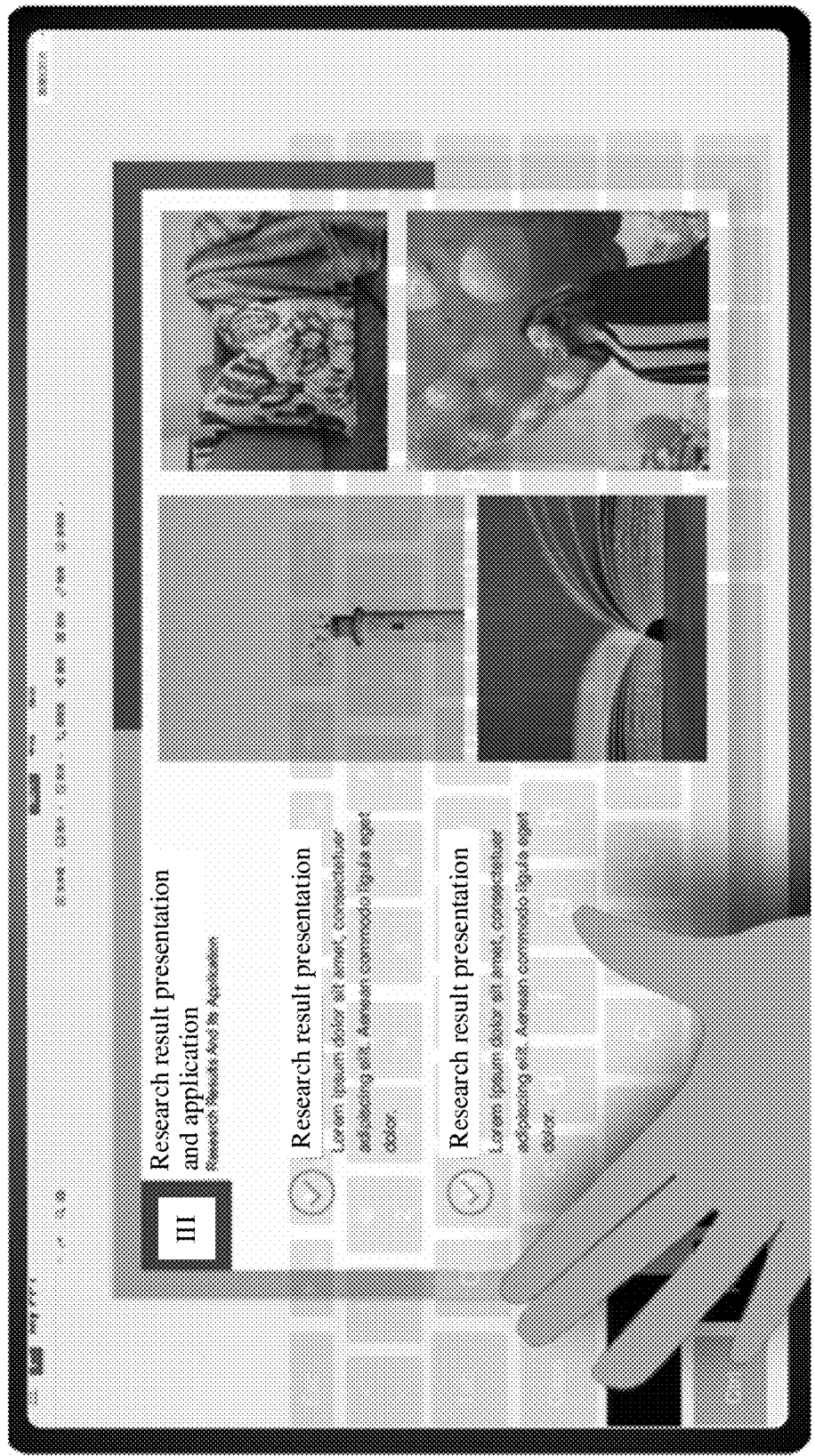
Figure 37C:
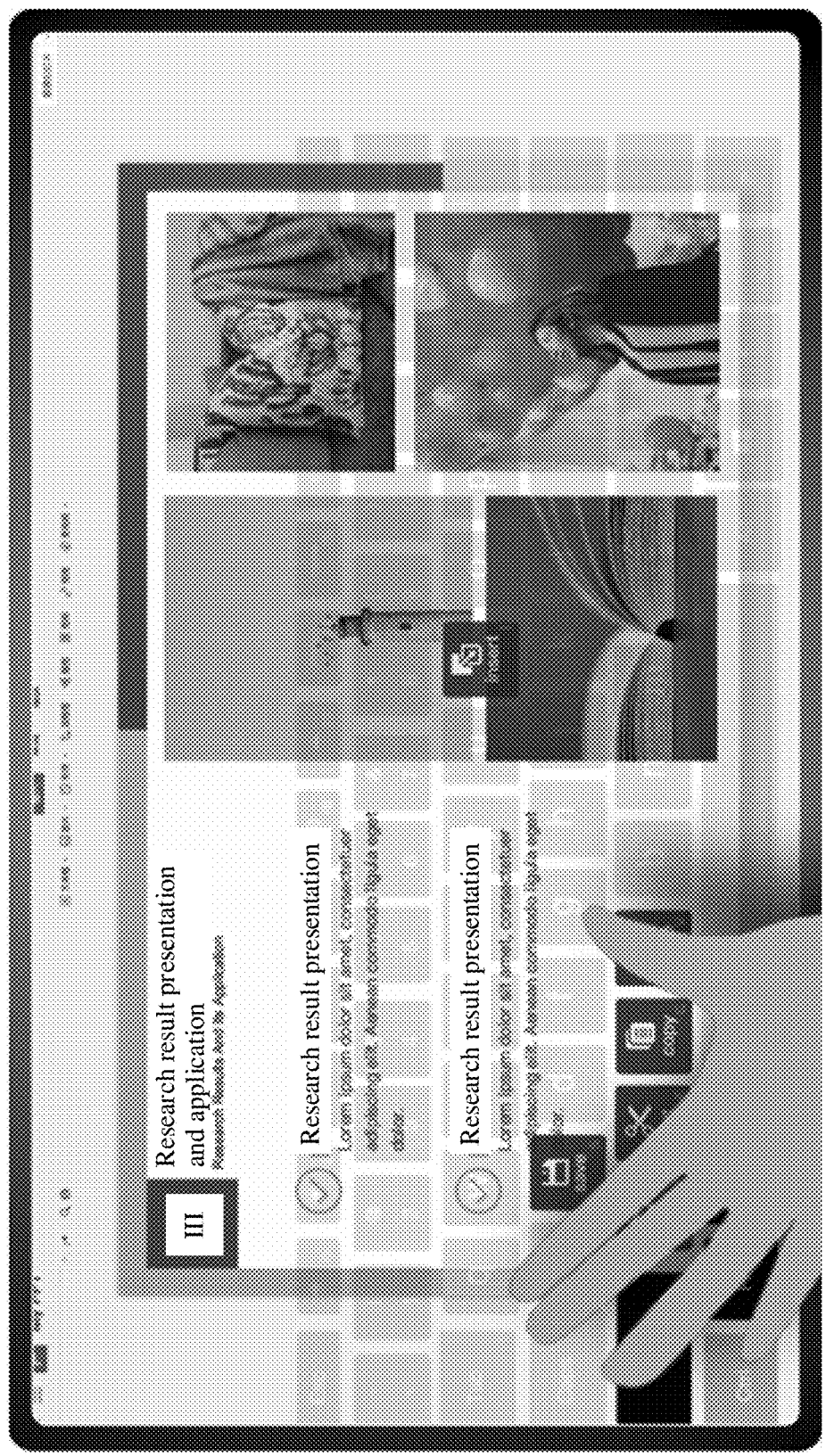

For more intuitive understanding of this solution, refer to FIG. 37(a) to FIG. 37(c). FIG. 37(a) to FIG. 37(c) show a schematic diagram of the second virtual key in the virtual keyboard processing method according to an embodiment of this application. FIG. 37(a) to FIG. 37(c) show an example in which a current application is a power point display application, and the virtual keyboard floats on a power point display interface. FIG. 37(a) to FIG. 37(c) are three schematic subdiagrams. The schematic subdiagram FIG. 37(a) shows that a function key keyboard is displayed on the display. The schematic subdiagram FIG. 37(b) shows that the user performs a press operation on the Ctrl key, and the schematic subdiagram FIG. 37(c) is triggered to be displayed. That is, the electronic device highlights a plurality of second virtual keys on the display, and further displays the function of the shortcut key corresponding to each second virtual key, to enable five shortcut functions: save, cut (corresponding to a scissors icon in FIG. 37(c)), copy, paste, and insert. It should be understood that the example in FIG. 37(a) to FIG. 37(c) is only for ease of understanding of this solution, and is not intended to limit this solution.

In this embodiment of this application, in the process of displaying the function key keyboard on the display, the electronic device obtains the contact operation on the first virtual key on the function key keyboard and highlights the second virtual key on the display in response to the contact operation. The second virtual key is the key other than the first virtual key in the shortcut key combination. Because the function key keyboard occupies a small area, an area required for displaying the virtual keyboard is reduced. When the user performs the contact operation on the first virtual key on the function key keyboard, the second virtual key in the shortcut key combination can be automatically displayed. This ensures a requirement of the user for the shortcut keys and avoids waste of a display area on the display.

Figure 38:
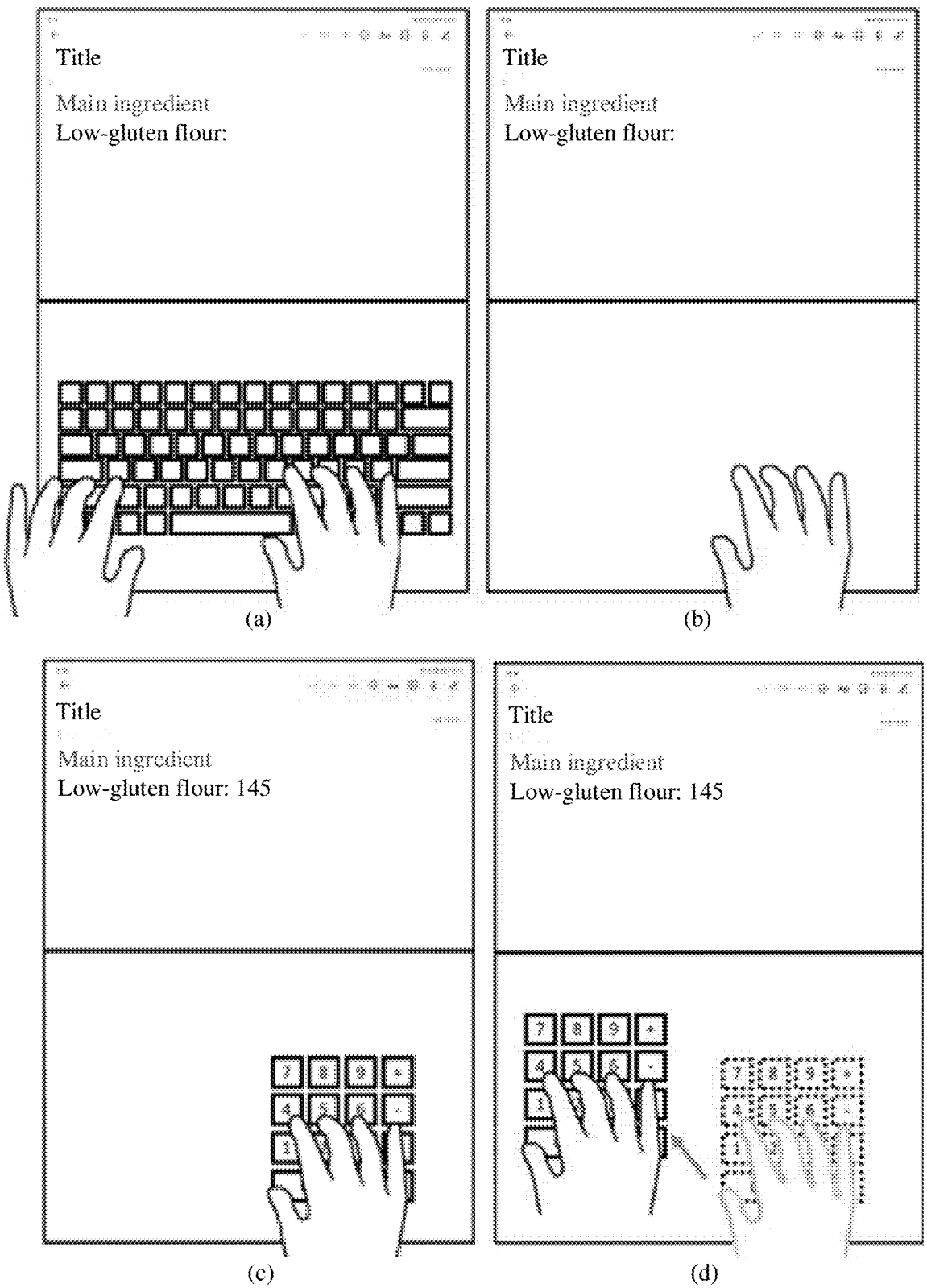
FIG. 38 is another schematic flowchart of a virtual keyboard processing method according to an embodiment of this application.

For more intuitive understanding of this solution, refer to FIG. 38. FIG. 38 is a schematic flowchart of the virtual keyboard processing method in this embodiment of this application. FIG. 38 shows an example in which this embodiment of this application is applied to a text editing application. FIG. 38 includes four schematic subdiagrams (a), (b), (c), and (d). In the schematic subdiagram (a) in FIG. 38, the electronic device obtains the first gesture parameter corresponding to a two-hand operation, obtains, based on the first rule and the first gesture parameter corresponding to the two-hand operation, the full-size keyboard corresponding to the two-hand operation, and displays the full-size keyboard by using the display. The user inputs content "Main ingredient Low-gluten flour:" by using the full-size keyboard. In the schematic subdiagram (b) in FIG. 38, the electronic device detects that the user lifts one hand, and stops displaying the full-size keyboard on the display. The electronic device obtains a first gesture parameter corresponding to a right-hand operation, obtains, based on the first rule and the first gesture parameter corresponding to the right-hand operation, a numeric keyboard corresponding to the right-hand operation, and displays the numeric keyboard by using the display. That is, as shown in schematic subdiagram (c) in FIG. 38, the numeric keyboard is displayed below the hand of the user, and the user inputs content "145" by using the numeric keyboard. As shown in the schematic subdiagram (d) in FIG. 38, in the process of displaying the numeric keyboard, the electronic device detects that the hand of the user moves above the display, the electronic device obtains a movement track of the hand, and controls the numeric keyboard to be moved with the hand of the user. When the user inputs a double-tap operation by using the display, a location of the numeric keyboard is fixed. It should be noted that the example in FIG. 38 is only for ease of understanding a manner of switching between the plurality of types of virtual keyboards, and is not intended to limit this solution.

In this embodiment of this application, the electronic device is provided with a plurality of different types of virtual keyboards, and the virtual keys included in the different types of virtual keyboards are not completely the same. A user can enable different types of virtual keyboards through different gesture operations. In other words, the virtual keyboard no longer displays only 26 letters, but provides more virtual keys for the user by using the different types of virtual keyboards. This improves flexibility of a process in which the user enables the virtual keyboard, and helps provide more abundant virtual keys, so that an additional physical keyboard does not need to be provided.

Figure 39:
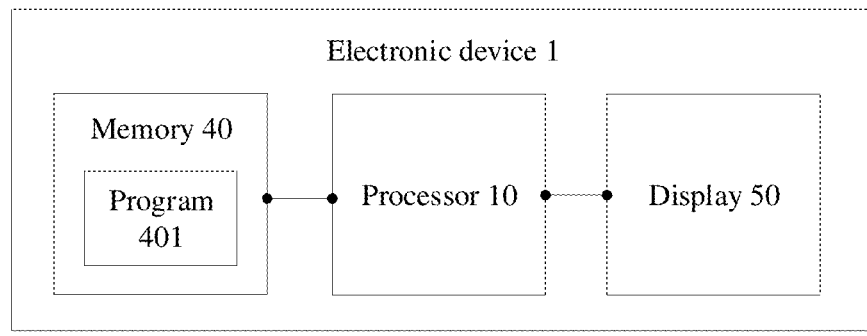
FIG. 39 is a schematic diagram of a structure of an electronic device according to an embodiment of this application.

According to the embodiments corresponding to FIG. 1 to FIG. 38, to better implement the foregoing solutions in embodiments of this application, the following further provides a related device used to implement the foregoing solutions. FIG. 39 is a schematic diagram of a structure of an electronic device according to an embodiment of this application. The electronic device 1 includes a display 50, a memory 40, one or more processors 10, and one or more programs 401. The display 50 in FIG. 39 and the touchscreen 20 in FIG. 1 to FIG. 29 may be a same element. The one or more programs 401 are stored in the memory 40. When the one or more processors 10 execute the one or more programs 401, the electronic device is enabled to perform the following operations: selecting, in response to a detected first gesture operation, a first type of virtual keyboard corresponding to the first gesture operation from a plurality of types of virtual keyboards, where virtual keys included in different types of virtual keyboards in the plurality of types of virtual keyboards are not completely the same; and displaying the first type of virtual keyboard by using the display 50.

In a possible design, when the one or more processors 10 execute the one or more programs 401, the electronic device is enabled to specifically perform the following operation: selecting, according to a first rule, a first type of virtual keyboard corresponding to a first gesture operation from a plurality of types of virtual keyboards, where the first rule indicates a correspondence between a plurality of types of gesture operations and the plurality of types of virtual keyboards.

In a possible design, when the one or more processors 10 execute the one or more programs 401, the electronic device is further enabled to perform the following operation: obtaining a first gesture parameter corresponding to the first gesture operation. The first gesture parameter includes any one or more of the following parameters: location information of a contact point corresponding to the first gesture operation, quantity information of the contact point corresponding to the first gesture operation, area information of the contact point corresponding to the first gesture operation, relative angle information of a hand corresponding to the first gesture operation, location information of the hand corresponding to the first gesture operation, quantity information of the hand corresponding to the first gesture operation, and shape information of the hand corresponding to the first gesture operation. When the one or more processors 10 execute the one or more programs 401, the electronic device is enabled to specifically perform the following operation: selecting, based on the first gesture parameter, the first type of virtual keyboard from the plurality of types of virtual keyboards.

In a possible design, when the one or more processors 10 execute the one or more programs 401, the electronic device is further enabled to perform the following operation: obtaining a first angle in response to the first gesture operation. The first angle indicates a relative angle between the hand corresponding to the first gesture operation and a side of the display 50. Alternatively, the first angle indicates a relative angle between the hand corresponding to the first gesture operation and a center line of the display 50. When the one or more processors 10 execute the one or more programs 401, the electronic device is enabled to specifically perform the following operations: obtaining a display angle of the first type of virtual keyboard based on the first angle, and displaying the first type of virtual keyboard based on the display angle by using the display 50. The display angle indicates a relative angle between a side of the first type of virtual keyboard and the side of the display 50. Alternatively, the display angle indicates a relative angle between a side of the first type of virtual keyboard and the center line of the display 50.

In a possible design, different types of virtual keyboards in the plurality of types of virtual keyboards have different functions. The virtual keyboards with different functions include a combination of any two or more types of the following virtual keyboards: a numeric keyboard, a function key keyboard, a full-size keyboard, and a custom keyboard. The function key keyboard is formed by function keys.

In a possible design, if the first gesture operation is a one-hand operation, the first type of virtual keyboard is any one type of the following virtual keyboards: a mini keyboard, a numeric keyboard, a function keyboard, a function key keyboard, a round keyboard, an arc keyboard, and a custom keyboard. The mini keyboard includes 26 alphabet keys. The function keyboard is displayed in an application 401. A virtual key included on the function keyboard corresponds to a function of the application 401.

In a possible design, if the first gesture operation is a two-hand operation, the first type of virtual keyboard is a full-size keyboard, and the full-size keyboard includes at least 26 alphabet keys; and when the one or more processors 10 execute the one or more programs 401, the electronic device is enabled to specifically perform the following operation: if a distance between two hands is less than or equal to a first distance threshold, displaying the full-size keyboard in an integrated manner by using the display 50; or if a distance between two hands is greater than a first distance threshold, displaying a first sub-keyboard by using a second region on the display 50, and a second sub-keyboard by using a third region on the display 50. The second region and the third region are different regions of the display 50, and the first sub-keyboard and the second sub-keyboard include different virtual keys on the full-size keyboard.

In a possible design, the one-hand operation includes a left-hand operation and a right-hand operation. If the first gesture operation is the right-hand operation, the first type of virtual keyboard is the numeric keyboard; or if the first gesture operation is the left-hand operation, the first type of virtual keyboard is the function keyboard.

In a possible design, the display 50 is provided with a plurality of vibration feedback elements. The location of the first type of virtual keyboard on the display 50 is fixed in the process of displaying the first type of virtual keyboard. When the one or more processors 10 execute the one or more programs 401, the electronic device is further enabled to perform the following operations: detecting a first contact operation acting on the display 50; obtaining, in response to the first contact operation, first location information of a first contact point corresponding to the first contact operation, where the first location information corresponds to a first virtual key on the virtual keyboard; if the first virtual key is an anchor point key, obtaining a first vibration feedback element from the plurality of vibration feedback elements, where the first vibration feedback element is a vibration feedback element that matches the first virtual key; and indicating the first vibration feedback element to emit a vibration wave, to perform a first feedback operation, where the first feedback operation is used to prompt that the first virtual key is an anchor point key.

It should be noted that content such as information exchange and an execution process between the modules/units in the electronic device 1 is based on a same concept as the method embodiments corresponding to FIG. 17 to FIG. 38 in this application. For specific content, refer to the descriptions in the foregoing method embodiments in this application. Details are not described herein again.

Figure 40:
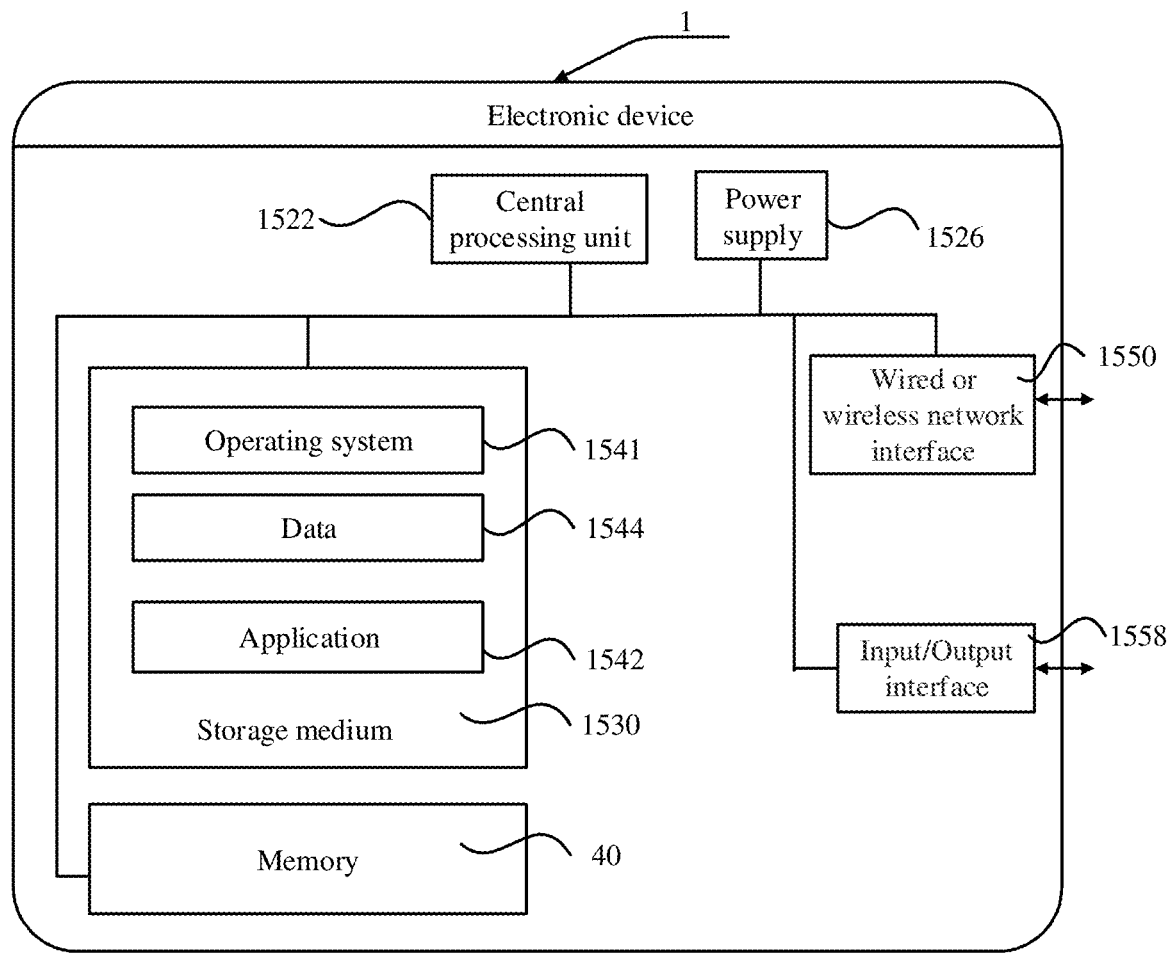
FIG. 40 is a schematic diagram of a structure of an electronic device according to an embodiment of this application.

An embodiment of this application further provides an electronic device. FIG. 40 is a schematic diagram of a structure of an electronic device according to an embodiment of this application. The electronic device 1 may be specifically represented as a mobile phone, a tablet computer, a notebook computer, another device provided with a display, or the like. This is not limited herein. The electronic device described in the embodiment corresponding to FIG. 39 may be deployed on the electronic device 1 and is configured to implement a function of the electronic device in the embodiments corresponding to FIG. 17 to FIG. 38. Specifically, the electronic device 1 may vary greatly with a configuration or performance, and may include one or more central processing units (CPU) 1522 (for example, one or more processors), a memory 40, and one or more storage media 1530 (for example, one or more mass storage devices) that store an application 1542 or data 1544. The memory 40 and the storage medium 1530 may be for temporary storage or permanent storage. The program stored in the storage medium 1530 may include one or more modules (which are not shown in the figure), and each module may include a series of instruction operations on the electronic device. Further, the central processing unit 1522 may be configured to communicate with the storage medium 1530, and perform, on the electronic device 1, the series of instruction operations in the storage medium 1530.

The electronic device 1 may further include one or more power supplies 1526, one or more wired or wireless network interfaces 1550, one or more input/output interfaces 1558, and/or one or more operating systems 1541, for example, Windows Server™, Mac OS X™, Unix™, Linux™, and FreeBSD™.

In this embodiment of this application, the central processing unit 1522 is configured to implement a function of the electronic device in the embodiments corresponding to FIG. 17 to FIG. 38. It should be noted that, for a specific embodiment in which the central processing unit 1522 performs the function of the electronic device in the embodiments corresponding to FIG. 17 to FIG. 38 and a beneficial effect of the function, refer to the descriptions in the method embodiment corresponding to FIG. 17 to FIG. 38. Details are not described herein again.

An embodiment of this application further provides a computer-readable storage medium. The computer-readable storage medium stores a computer program. When the program is run on a computer, the computer is enabled to perform the operations performed by the electronic device in the method described in the embodiments shown in FIG. 17 to FIG. 38.

An embodiment of this application further provides a computer program. When the computer program is run on a computer, the computer is enabled to perform the operations performed by the electronic device in the method described in the embodiments shown in FIG. 17 to FIG. 38.

An embodiment of this application further provides a circuit system. The circuit system includes a processing circuit, and the processing circuit is configured to perform the operations performed by the electronic device in the method described in the embodiments shown in FIG. 17 to FIG. 38.

The electronic device provided in this embodiment of this application may be specifically a chip. The chip includes a processing unit and a communication unit. The processing unit may be, for example, a processor. The communication unit may be, for example, an input/output interface, a pin, or a circuit. The processing unit may execute computer executable instructions stored in a storage unit, so that the chip performs the operations performed by the electronic device in the method described in the embodiments shown in FIG. 17 to FIG. 38. Optionally, the storage unit is a storage unit in the chip, for example, a register or a cache; or the storage unit may be a storage unit that is in a radio access device and that is located outside the chip, for example, a read-only memory (ROM), another type of static storage device that can store static information and instructions, or a random access memory (RAM).

The processor mentioned anywhere above may be a general-purpose central processing unit, a microprocessor, an ASIC, or one or more integrated circuits that are configured to control program execution of the method according to the first aspect.

In addition, it should be noted that the described apparatus embodiments are only examples. The units described as separate parts may or may not be physically separate, and parts displayed as units may or may not be physical units, may be located in one location, or may be distributed on a plurality of network units. Some or all of the modules may be selected based on actual requirements to achieve the objectives of the solutions in embodiments. In addition, in the accompanying drawings of the apparatus embodiments provided by this application, connection relationships between modules indicate that the modules have communication connections with each other, which may be specifically implemented as one or more communication buses or signal cables.

Based on the description of the foregoing embodiments, a person skilled in the art may clearly understand that this application may be implemented by software in addition to necessary universal hardware, or certainly may be implemented by dedicated hardware, including a dedicated integrated circuit, a dedicated CLU, a dedicated memory, a dedicated component, and the like. Usually, any function implemented by a computer program may be easily implemented by using corresponding hardware. In addition, specific hardware structures used to implement a same function may be various, for example, an analog circuit, a digital circuit, or a dedicated circuit. However, in this application, a software program embodiment is a better embodiment in most cases. Based on such an understanding, the technical solutions of this application essentially or the part contributing to the conventional technology may be implemented in a form of a software product. The computer software product is stored in a readable storage medium, such as a floppy disk, a USB flash drive, a removable hard disk, a ROM, a RAM, a magnetic disk, or an optical disc of a computer, and includes several instructions for instructing a computer device (which may be a personal computer, a server, or a network device) to perform the methods described in embodiments of this application.

All or some of the foregoing embodiments may be implemented by software, hardware, firmware, or any combination thereof. When software is used to implement the foregoing embodiments, all or some of the embodiments may be implemented in a form of a computer program.

The computer program includes one or more computer instructions. When the computer program instructions are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to a computer, or a data storage device integrating one or more usable media, for example, a server or a data center. The usable medium may be a magnetic medium (for example, a floppy disk, a hard disk, or a magnetic tape), an optical medium (for example, a DVD), a semiconductor medium (for example, a solid state drive (SSD)), or the like.

Embodiment 3

Figure 41:
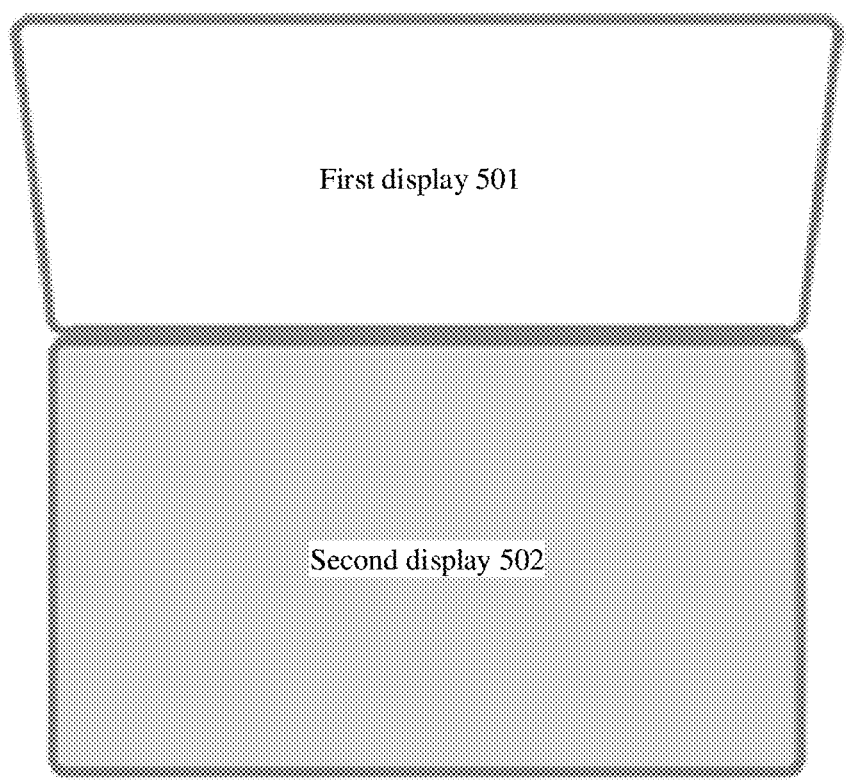
FIG. 41 is a schematic diagram of a structure of an electronic device according to an embodiment of this application.

An application interface processing method provided in this embodiment of this application may be applied to an electronic device shown in FIG. 41. FIG. 41 is a schematic diagram of a structure of the electronic device according to an embodiment of this application. The electronic device includes a first display 501 and a first display 502. A difference between the first display 501 and the first display 502 lies in that: The first display 502 is a display configured to obtain handwriting input of a user, and the first display 501 is not a display configured to obtain handwriting input by the user. In this case, the first display 502 is a touchscreen, and the first display 502 needs to have both functions of receiving input and displaying output. It should be understood that, FIG. 41 shows an example in which the electronic device includes only one first display 501 and one first display 502. However, in an actual case, one electronic device may further include at least two first displays 501, or include at least two first displays 502. A specific quantity of first displays 501 and first displays 502 included in the electronic device may be determined based on an actual application scenario, and is not limited herein.

In an embodiment, the electronic device is preconfigured with at least two displays, including the display (namely, the second display) configured to obtain handwriting input by the user and the display (namely, the first display) not configured to obtain handwriting input by the user. In this way, the user may place the preset second display at a location convenient for handwriting by the user.

In another embodiment, the electronic device determines, based on a placement direction of each of the at least two included displays, the display (namely, the second display) configured to obtain handwriting input by the user and the display (namely, the first display) not configured to obtain handwriting input by the user. Specifically, the electronic device may obtain an included angle between a placement angle of each of the at least two displays and a horizontal direction, and then the electronic device may select, from the at least two included displays, a display that has a smallest included angle with the horizontal direction as the first display 502, and use a remaining display in the at least two displays as the first display 501. Alternatively, the electronic device may select, from the at least two displays included in the electronic device, at least one display whose included angle with the horizontal direction is less than a first angle threshold as the first display 502, and use a remaining display in the at least two displays as the first display 501. The first angle threshold may be 25 degrees, 30 degrees, 40 degrees, another value, or the like, and is not exhaustively described herein.

Further, in one case, the first display 501 and the first display 502 may be screens independent of each other, and the first display 501 and the first display 502 are connected through a data interface. Alternatively, the first display 501 and the first display 502 are connected through a bus. In another case, the first display 501 and the first display 502 are integrated in one flexible screen, and the first display 501 and the first display 502 are two different regions in the flexible screen.

Optionally, the electronic device may be further provided with an electronic pen. The electronic pen may be specifically an electronic pen using an electromagnetic touchscreen technology (EMR), an electronic pen using an active electrostatic solution (AES) technology, another type of electronic pen, or the like. This is not limited herein.

Based on the electronic device shown in FIG. 41, the following describes an application scenario of this embodiment of this application. For example, in an application scenario in which a student takes a note in a class, in a process of typing and taking the note by using a virtual keyboard (in other words, a current application interface is in a keyboard input mode), the student may need to use a handwriting input mode, to draw a schematic diagram on a blackboard. For another example, in a process in which the user browses a novel or a picture (in other words, a current application interface is in a browsing mode), the user may need to use a handwriting input mode, to add an annotation to the novel or the picture. For still another example, in a process in which the user writes a report by using a virtual keyboard (in other words, a current application interface is in a keyboard input mode), the user may suddenly need to draw an idea with a pen (in other words, a current application interface needs to use a handwriting input mode). The application scenario of this embodiment of this application is not exhaustively described herein. In the foregoing various scenarios, an operation is complex in a handwriting input process.

To resolve the foregoing problem, an embodiment of this application provides an application interface processing method. The application interface processing method is applied to the electronic device shown in FIG. 41. The electronic device displays a first application interface by using the first display. If the electronic device detects that a mode type corresponding to a first application interface is changed to handwriting input, the electronic device triggers, in response to the handwriting input mode, display of the first application interface on the second display, to obtain handwriting input content for the first application interface by using the second display. In other words, in the case in which the electronic device detects that the current mode type corresponding to the first application interface is the handwriting input mode, the electronic device automatically displays the first application interface on the second display, to directly obtain the handwriting input content for the first application interface by using the second display. That is, another mode can be directly switched to the handwriting input mode without performing operations such as copying and pasting. This avoids complex operations and greatly improves handwriting input efficiency.

Further, in some application scenarios, one application interface can be switched only between the keyboard input mode and the handwriting input mode. In another application scenario, one application interface can be switched only between the keyboard input mode and the browsing mode. Because specific embodiment procedures are different in the foregoing two application scenarios, the following separately describes the specific embodiment procedures.

1. Switching Between the Keyboard Input Mode and the Handwriting Input Mode.

Figure 42A:
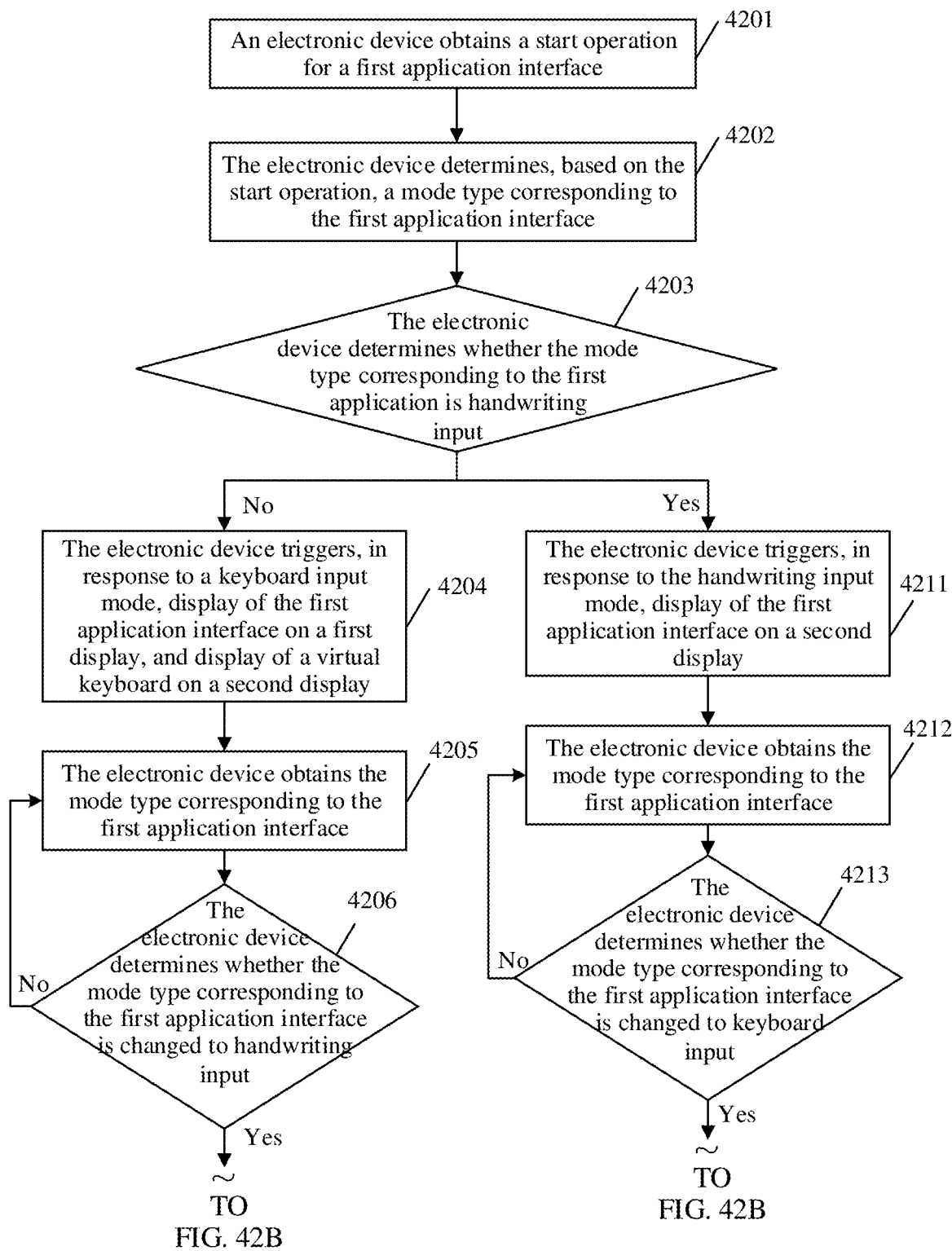
FIG. 42A and FIG. 42B show a schematic flowchart of an application interface processing method according to an embodiment of this application.
Figure 42B:
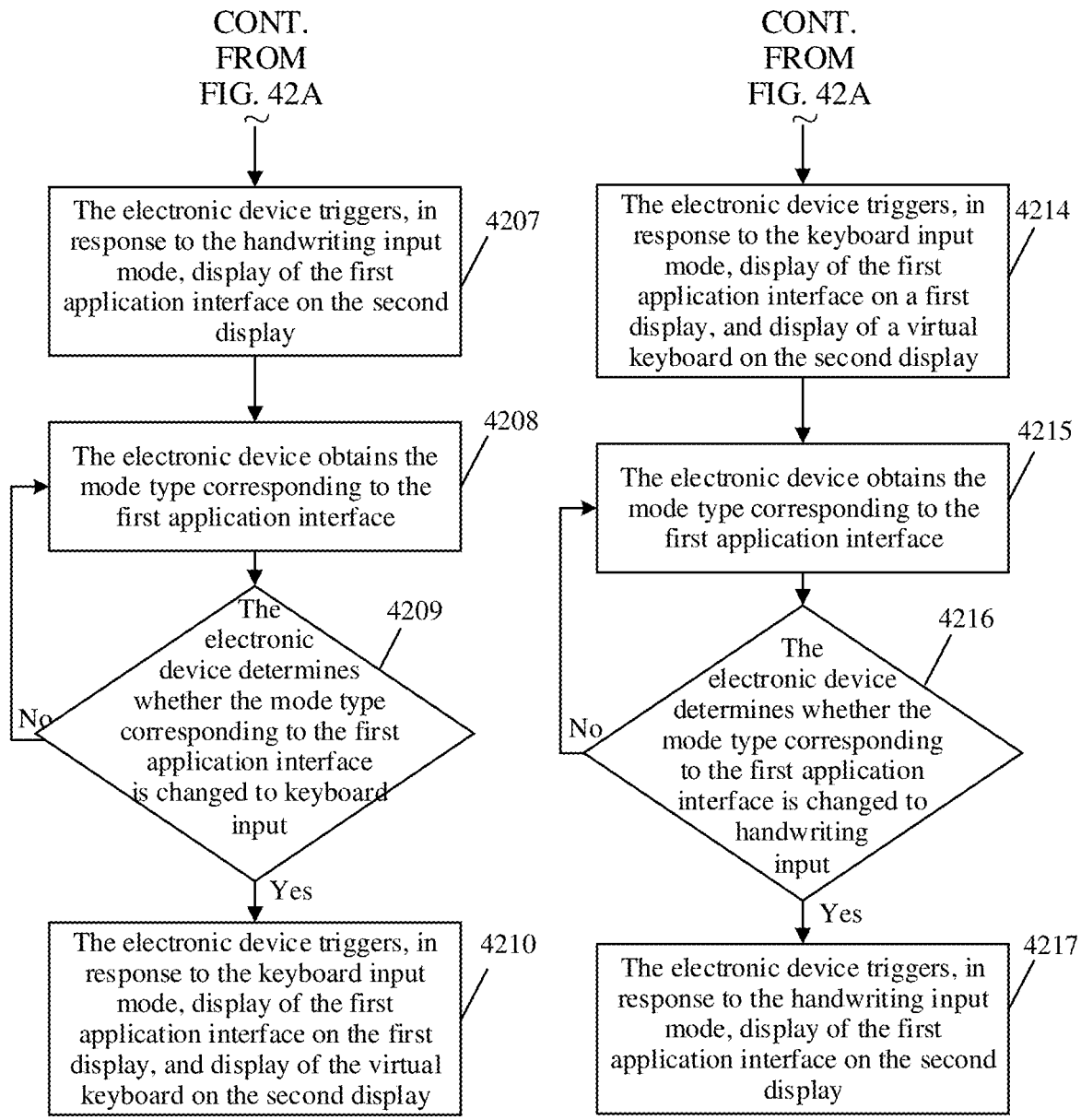

In this embodiment of this application, FIG. 42A and FIG. 42B show a schematic flowchart of the application interface processing method according to an embodiment of this application. The application interface processing method provided in this embodiment of this application may include the following operations.

4201: The electronic device obtains a start operation for the first application interface.

In this embodiment of this application, the electronic device obtains the start operation for the first application interface. A target application (APP) may include one or more application interfaces. The first application interface means any of at least one application interface included in the target application. That is, the first application interface may be an interface that appears when the target application is started, or may be a new interface that is opened in a process of using the target application.

Specifically, operation 4201 may include: The electronic device obtains the start operation for the first application interface by using the first display, or the electronic device obtains the start operation for the first application interface by using the second display. Further, the electronic device obtains the start operation for the first application interface by using an electronic pen, a mouse, or a finger.

4202: The electronic device determines, based on the start operation, the mode type corresponding to the first application interface.

In some embodiments of this application, the electronic device determines, based on the obtained start operation, the mode type corresponding to the first application interface. The mode type corresponding to the first application interface is handwriting input or keyboard input.

In an embodiment, the electronic device determines, based on an obtaining location corresponding to the start operation, the mode type corresponding to the first application interface. Specifically, in the case in which the start operation is obtained by using the first display, it may be proved that the user usually displays the first application interface on the first display. In this case, the electronic device determines that the mode type corresponding to the first application interface is keyboard input. In other words, an initial mode type of the first application interface is keyboard input. In the case in which the start operation is obtained by using the second display, it is proved that the user usually uses the first application interface on the second display. In this case, the electronic device determines that the mode type corresponding to the first application interface is handwriting input. In other words, an initial mode type of the first application interface is handwriting input. For a difference between the first display and the second display, refer to the foregoing description of FIG. 41. Details are not described herein again.

In this embodiment of this application, the mode type corresponding to the first application interface is determined based on the location of the start operation obtained by the electronic device. This is simple in operation and easy to implement.

In another embodiment, the electronic device determines, based on a start manner corresponding to the start operation, the mode type corresponding to the first application interface. Specifically, if the start operation is obtained by using the electronic pen, the electronic device determines that the mode type corresponding to the first application interface is handwriting input. For example, if the electronic device obtains that the user taps an application icon of the target application by using the electronic pen to open the first application interface, the electronic device may determine that the mode type corresponding to the first application interface is handwriting input. If the start operation is obtained by using the mouse or the finger, the electronic device determines that the mode type corresponding to the first application interface is keyboard input.

This embodiment of this application provides still another embodiment of determining, based on the start operation, the mode type corresponding to the first application interface. This helps improve embodiment flexibility of this solution, and is easy to implement and operate.

In another embodiment, the electronic device may determine, based on the obtaining location corresponding to the start operation and the start manner corresponding to the start operation, the mode type corresponding to the first application interface. Specifically, in one case in which the start operation is obtained by using the electronic pen, or the start operation is obtained by using the second display, the electronic device determines that the mode type corresponding to the first application interface is handwriting input. If the start operation is obtained by using the mouse or the finger, and the start operation is obtained by using the first display, the electronic device determines that the mode type corresponding to the first application interface is keyboard input.

In one case in which the start operation is obtained by using the electronic pen and the second display, the electronic device determines that the mode type corresponding to the first application interface is handwriting input. If the start operation is obtained by using the mouse or the finger, or the start operation is obtained by using the first display, the electronic device determines that the mode type corresponding to the first application interface is keyboard input.

It should be noted that, the electronic device may alternatively determine the initial mode type of the first application interface in another manner, and details are not described one by one herein.

4203: The electronic device determines whether the mode type corresponding to the first application is handwriting input. If the mode type corresponding to the first application is keyboard input, operation 4204 is performed; or if the mode type corresponding to the first application is handwriting input, operation 4211 is performed.

4204: The electronic device triggers, in response to the keyboard input mode, display of the first application interface on the first display, and display of the virtual keyboard on the second display.

In this embodiment of this application, if the electronic device determines that the mode type corresponding to the first application interface is not handwriting input but keyboard input, the electronic device triggers, in response to the keyboard input mode, display of the first application interface on the first display, and display of the virtual keyboard on the second display, to obtain input content for the first application interface by using the virtual keyboard on the second display.

Figure 43:
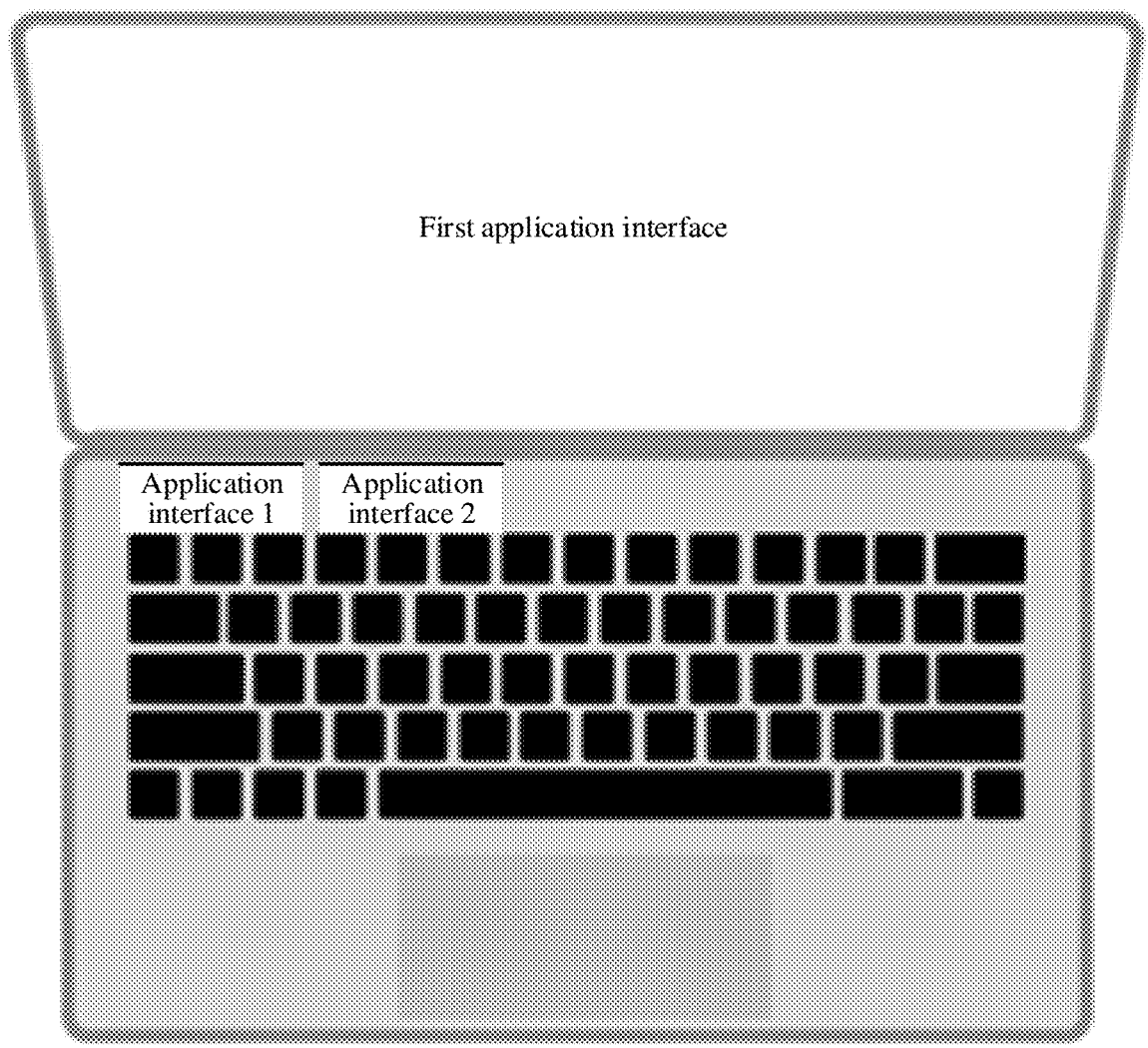
FIG. 43 is a schematic diagram of a display interface of a second display in an application interface processing method according to an embodiment of this application.

Further, if a receiving interface of handwriting input of another application interface is further displayed on the second display when the virtual keyboard is displayed on the second display, in an embodiment, the electronic device may set, on a top or at a bottom of the second display, a start icon that is in a one-to-one correspondence with each application, to switch between the virtual keyboard displayed on the second display and the another application interface. For more intuitive understanding of this solution, refer to FIG. 43. FIG. 43 shows a schematic interface diagram of a display interface of the second display in the application interface processing method according to an embodiment of this application. FIG. 43 shows a start icon of an application interface 1, a start icon of an application interface 2, and the display interface (corresponding to the first application interface shown on the first display) of the virtual keyboard, so that the user can switch between the virtual keyboard and the application interface 1 by tapping the start icon of the application interface 1. The user can switch between the virtual keyboard and the application interface 2 by tapping the start icon of the application interface 2. It should be understood that the example in FIG. 43 is only for ease of understanding of this solution, and is not intended to limit this solution.

In another embodiment, the electronic device may further set zoom icons on the display interface of the virtual keyboard on the second display. When the user taps a zoom-out icon with the electronic pen, the finger, the mouse, or the like, the virtual keyboard displayed on the second display is collapsed. When the user taps a zoom-in icon by using the pen, the finger, the mouse, or the like, the virtual keyboard displayed on the second display is expanded. In another embodiment, the user may further switch between the virtual keyboard displayed on the second display and the another application interface by inputting a slide operation on the second display. The slide operation may be a slide operation in a left-right direction, a slide operation in an up-down direction, or the like. The electronic device may further switch between the virtual keyboard and the another application interface in another manner, which is not exhaustively described herein.

Figure 44:
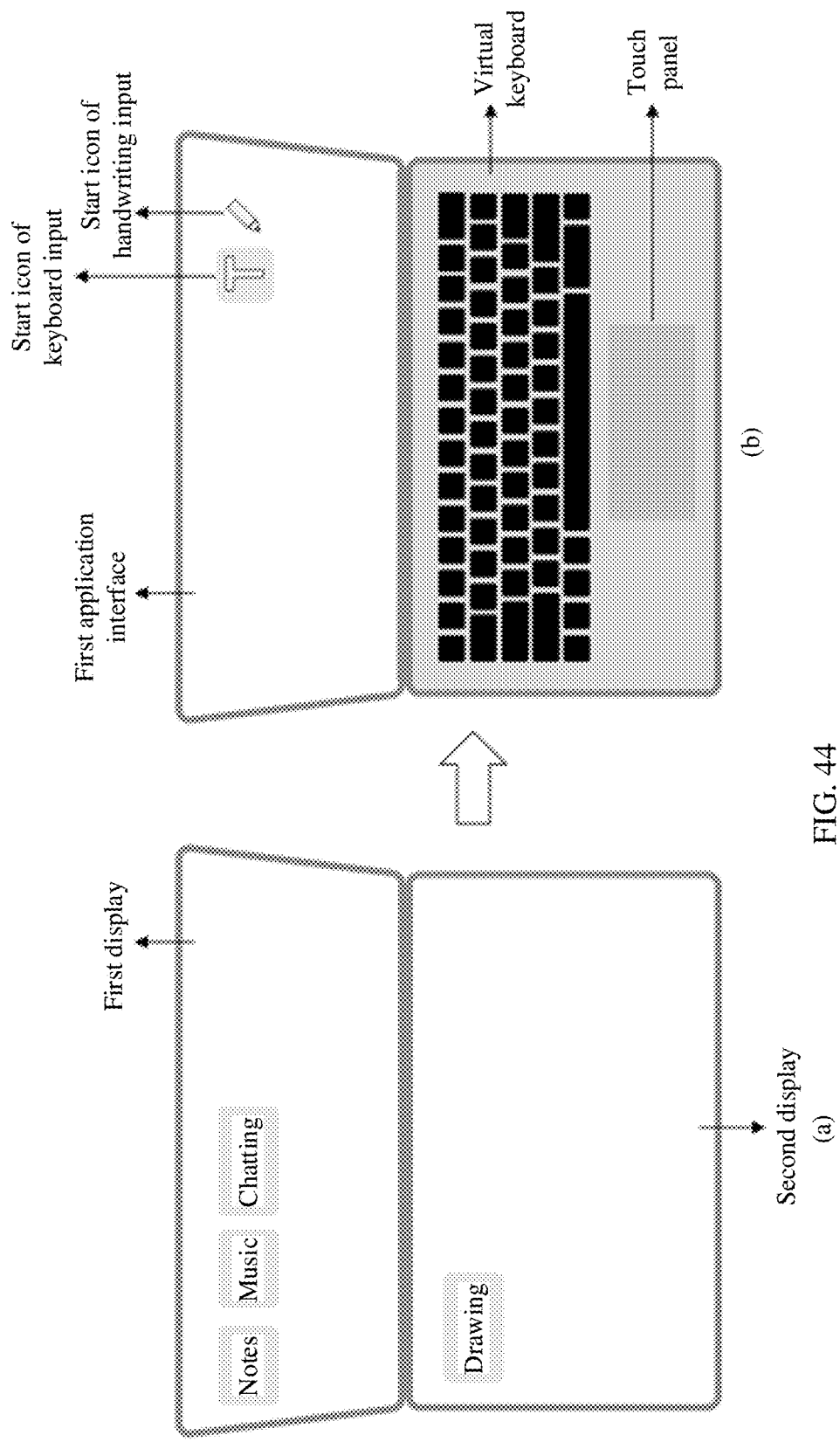
FIG. 44 is a schematic flowchart of an application interface processing method according to an embodiment of this application.
Figure 45:
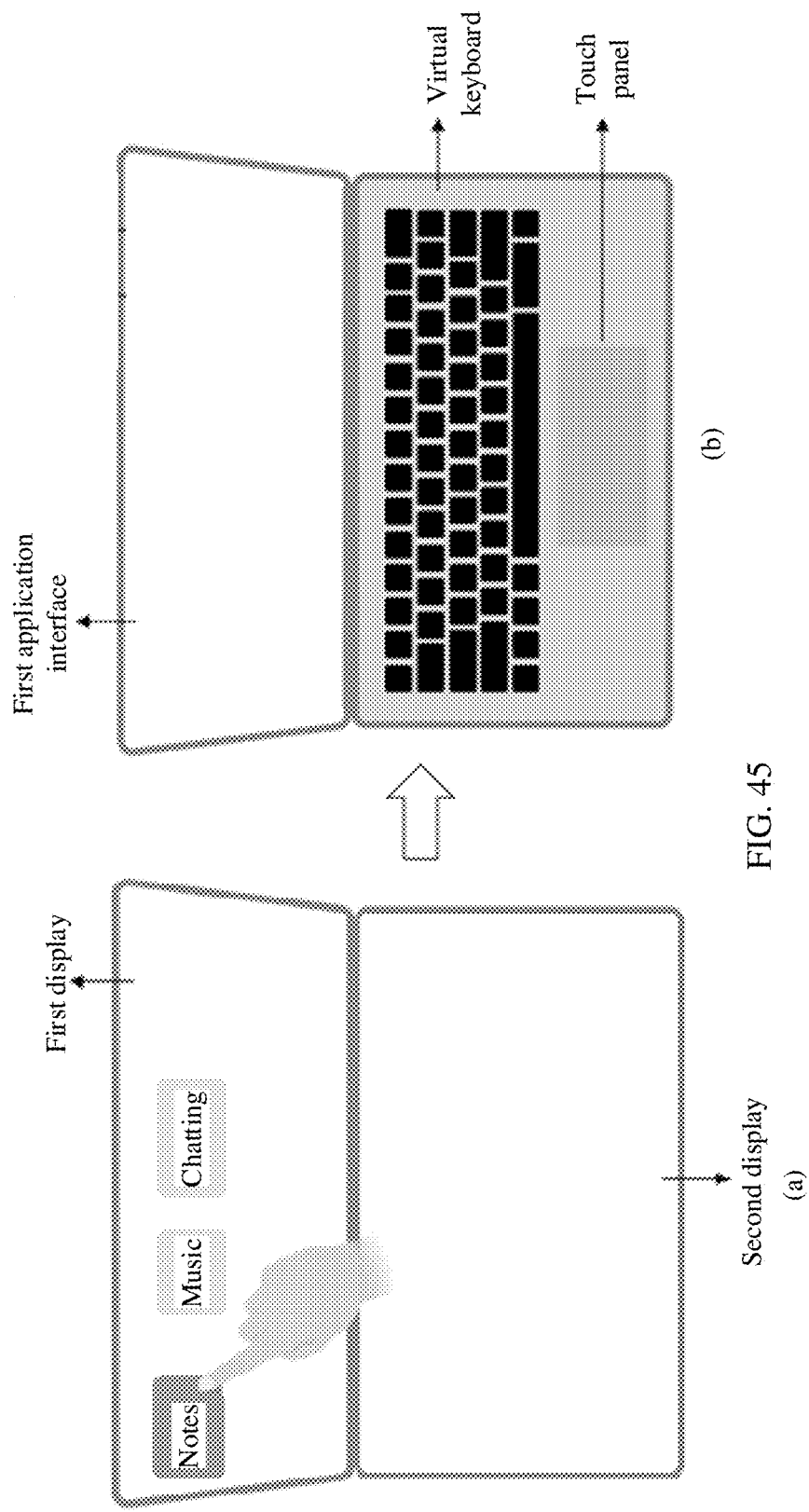
FIG. 45 is another schematic flowchart of an application interface processing method according to an embodiment of this application.

For more intuitive understanding of this solution, refer to FIG. 44 and FIG. 45. FIG. 44 and FIG. 45 separately show schematic flowcharts of the application interface processing method according to an embodiment of this application. First refer to FIG. 44. FIG. 44 includes two schematic subdiagrams (a) and (b). In the schematic subdiagram (a) in FIG. 44, the electronic device obtains the start operation for the target application (namely, an application "Note" in the figure) by using the first display. Because the start operation is input by using the first display, the electronic device determines that the mode type corresponding to the first application interface is keyboard input, and the electronic device displays the schematic subdiagram (b) in FIG. 44. The electronic device displays the first application interface (namely, an initial application interface of the application "Note") on the first display, and displays the virtual keyboard and a touchpad region on the second display.

Still refer to FIG. 45. FIG. 45 includes two schematic subdiagrams (a) and (b). In the schematic subdiagram (a) in FIG. 45, the electronic device obtains the start operation for the target application (namely, an application "Note" in the figure) by using the first display. Because the start operation is obtained by using the finger, the electronic device determines that the mode type corresponding to the first application interface is keyboard input, and the electronic device displays the schematic subdiagram (b) in FIG. 45. The electronic device displays the first application interface on the first display, and displays the virtual keyboard and the touchpad region on the second display. It should be noted that the second displays in FIG. 44 and FIG. 45 may display only the virtual keyboard, but not the touchpad region. It should be understood that examples in FIG. 44 and FIG. 45 are only for ease of understanding of this solution, and are not intended to limit this solution.

Optionally, operation 4204 may include: displaying the virtual keyboard and an application control bar on the second display. The method may further include: The electronic device detects a second operation acting on the second display; in response to the second operation, changes a first display area of the application control bar to a second display area, and changes a first control key group included in the application control bar to a second control key group. Both the first control key group and the second control key group are control key sets corresponding to a target application. Specific meaning of the nouns in the foregoing operations and specific embodiments of the foregoing operations are all described in the following Embodiment 4. Details are not described herein again.

Optionally, the first application interface includes a first control key, and operation 4204 may include: displaying the virtual keyboard and the application control bar on the second display. The method may further include: The electronic device detects a second operation on the first target application interface; and in response to the second operation, displays the first control key in the application control bar, and hides the first control key in the first application interface. Specific meaning of the nouns in the foregoing operations and specific embodiments of the foregoing operations are all described in the following Embodiment 4. Details are not described herein again.

Optionally, operation 4204 may include: The electronic device displays a second type of virtual keyboard (which may also be referred to as a default type of virtual keyboard) on the second display. The method further includes: The electronic device detects a first gesture operation acting on the second display, and selects, in response to the detected first gesture operation, a first type of virtual keyboard corresponding to the first gesture operation from a plurality of types of virtual keyboards. Virtual keys included in different types of virtual keyboards in the plurality of types of virtual keyboards are not completely the same. The electronic device displays the first type of virtual keyboard by using the second display. The first type of virtual keyboard and the second type of virtual keyboard are different types of virtual keyboards in the plurality of types of virtual keyboards. In other words, after the electronic device displays the second type of virtual keyboard on the second display, the user may change, by inputting a different gesture operation, a type of the virtual keyboard displayed on the second display. For meaning of the nouns such as the first gesture operation and the different types of virtual keyboards, and specific embodiments of the foregoing operations, refer to descriptions in Embodiment 2. Details are not described herein again.

4205: The electronic device obtains the mode type corresponding to the first application interface.

In this embodiment of this application, after the electronic device opens the first application interface, that is, in a running process of the first application interface, the electronic device further detects and obtains, in real time, the mode type corresponding to the first application interface, to determine whether the mode type corresponding to the first application interface changes. Specifically, if the electronic device can detect a first operation, the mode type corresponding to the first application interface is changed to handwriting input in response to the first operation; if the electronic device does not detect the first operation, the mode type corresponding to the first application interface is keyboard input, and the electronic device continuously detects and obtains the mode type corresponding to the first application interface.

More specifically, in an embodiment, the electronic device determines, based on a posture of holding the electronic pen by the user, the mode type corresponding to the first application interface. Specifically, in one case, the electronic device prestores a first preset condition, and the electronic device obtains, in real time, the posture of holding the electronic pen by the user, and determines whether the posture of holding the electronic pen by the user meets the first preset condition. If the posture of holding the electronic pen by the user meets the first preset condition, the electronic device determines that the first operation of the user is detected, and changes the mode type corresponding to the first application interface to the handwriting input mode. If the posture of holding the electronic pen by the user does not meet the first preset condition, the electronic device determines that the mode type corresponding to the first application interface is the keyboard input mode.

The holding posture includes any one or a combination of the following: a holding location, holding force, a holding angle, another holding-related factor, or the like. This is not limited herein. The first preset condition includes any one or a combination of the following: The holding location falls within a first location range, the holding force falls within the first force range, the holding angle falls within the first angle range, another preset condition, or the like.

In this embodiment of this application, in addition to writing, the electronic pen may further perform another operation, for example, perform some operations performed by using the mouse, such as a slide operation and a selection operation. Alternatively, the user may only unconsciously hold the electronic pen, and does not want to perform a writing operation or the like, which is not exhaustively described herein. The electronic device does not roughly determine that once the user uses the electronic pen, the mode type corresponding to the first application is a writing mode, but further determines, based on the posture of holding the electronic pen by the user, the mode type corresponding to the first application interface. This can reduce an error rate in a process of determining the mode type corresponding to the first application interface, reduce a probability of incorrectly placing the first application interface, avoid waste of computer resources, and enhance user viscosity.

Further, the electronic pen may be configured in the electronic device. After the electronic pen is taken out by the user from the electronic device, a communication interface may be configured between the electronic pen and the electronic device. The electronic pen may collect, in real time, a holding parameter corresponding to the holding posture, and send the holding parameter to the electronic device, so that the electronic device determines whether the posture of holding the electronic pen by the user meets the first preset condition. The holding parameter includes any one or a combination of the following: a location of a contact point corresponding to a holding operation, holding force, a tilt angle of the electronic pen, another parameter, or the like.

A tactile sensing module may be disposed in the electronic pen. The tactile sensing module of the electronic pen collects a location of each contact point between the user and the electronic pen in real time (that is, determines a location at which the user holds the electronic pen), and sends the location of each contact point to the electronic device. The electronic device determines, based on the location of each contact point, whether the location at which the user holds the electronic pen falls within a first location range. The tactile sensing module may be specifically represented as a tactile sensing film. The tactile sensing film may be specifically a capacitive tactile sensing film, a pressure tactile sensing film, a temperature tactile sensing film, another type of film, or the like, which is not exhaustively described herein.

A pressure sensing module may be disposed in the electronic pen. The pressure sensing module of the electronic pen collects, in real time, force of holding the electronic pen by the user, and sends the force of holding the electronic pen by the user to the electronic device, so that the electronic device determines whether the force of holding the electronic pen by the user falls within the first force range. The pressure sensing module may be specifically represented as a pressure sensing film, a distributed pressure sensor, or another form, which is not exhaustively described herein.

An angle measurement module may be disposed in the electronic pen. The angle measurement module of the electronic pen collects the tilt angle of the electronic pen in real time (that is, determines an angle at which the user holds the electronic pen), and sends the tilt angle of the electronic pen to the electronic device. The electronic device determines whether the angle at which the user holds the electronic pen falls within the first angle range. The angle measurement module may be specifically represented as a gyroscope, another type of angle measurement module, or the like. This is not limited herein.

Still further, in an embodiment, the electronic device may record in advance a posture of holding the electronic pen by the user during handwriting input, and further determine the first preset condition based on the holding posture recorded by the user. Optionally, the electronic device may further collect a posture of holding the electronic pen by the user in a writing process, that is, collect a location of a contact point between the finger of the user and the electronic pen, holding force of the user, a tilt angle of the electronic pen, and the like, to adjust the first preset condition. In another embodiment, the first preset condition in the electronic device may be preset.

Figure 46:
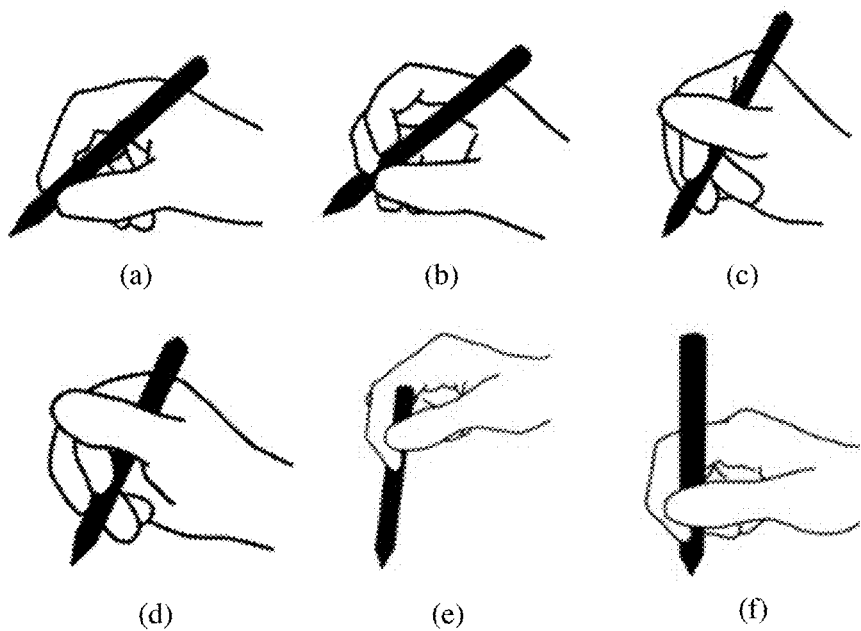
FIG. 46 is a schematic diagram of various holding postures in an application interface processing method according to an embodiment of this application.

For more intuitive understanding of this solution, refer to FIG. 46. FIG. 46 is a schematic diagram of various holding postures in an application interface processing method according to an embodiment of this application. FIG. 46 shows six schematic subdiagrams (a), (b), (c), (d), (e), and (f). The schematic subdiagrams (a), (b), (c), and (d) in FIG. 46 separately show four postures of holding the electronic pen by the user for writing. The schematic subdiagrams (e) and (f) in FIG. 46 show two gestures of holding the electronic pen by the user not for writing. It should be understood that the example in FIG. 46 is only for ease of understanding of a concept of the posture of holding the electronic pen by the user, and is not intended to limit this solution.

In another embodiment, the electronic device may set, on the first application interface or the display interface of the virtual keyboard, a trigger icon that is in a one-to-one correspondence with each of the keyboard input mode and the handwriting input mode. When the user taps the handwriting input icon on the first application interface, the electronic device can obtain a trigger instruction for handwriting input, in other words, the electronic device detects the first operation of the user. When the user taps the keyboard input icon on the first application interface, the electronic device can obtain a trigger instruction for keyboard input. Alternatively, a switching icon for switching between the keyboard input mode and the handwriting input mode may be set on the first application interface of the electronic device. When the switching icon is in a first state, it is considered that the user inputs a trigger operation for handwriting input. When the switching icon is in a second state, it is considered that the user inputs a trigger operation for keyboard input, and the like. The manner of obtaining the trigger instruction for handwriting input by the electronic device is not exhaustively described herein. In response to the trigger instruction for handwriting input, the electronic device determines that the mode type corresponding to the first application interface is the handwriting input mode.

Figure 47:
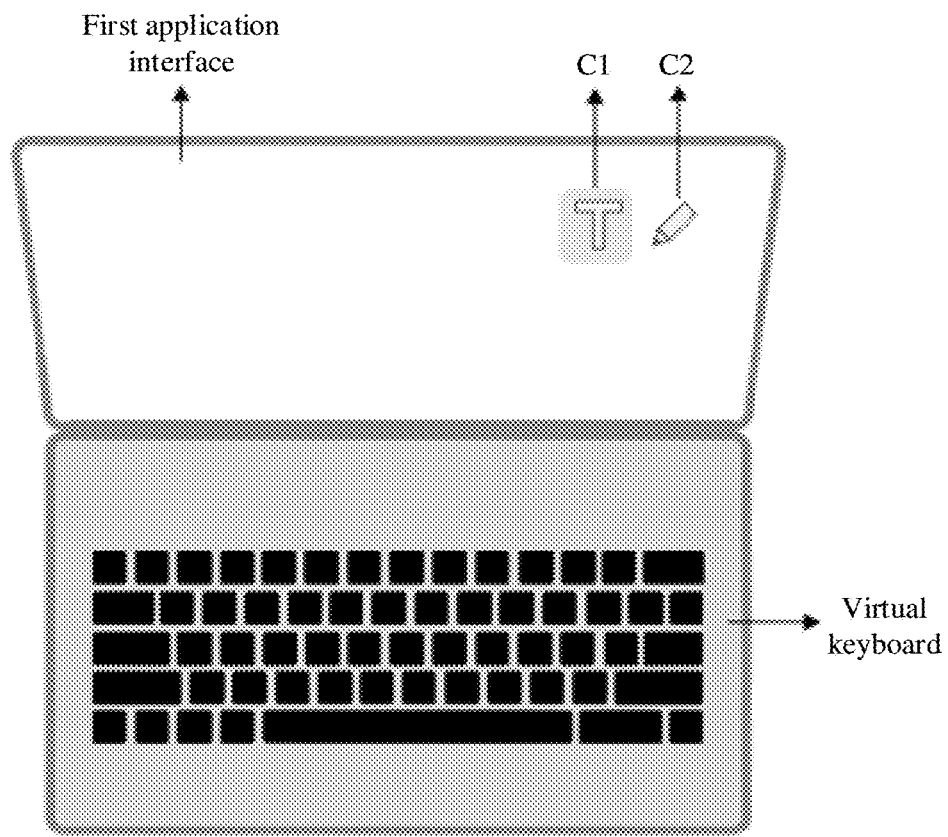
FIG. 47 is an interface schematic diagram of a first application interface in an application interface processing method according to an embodiment of this application.
Figure 48:
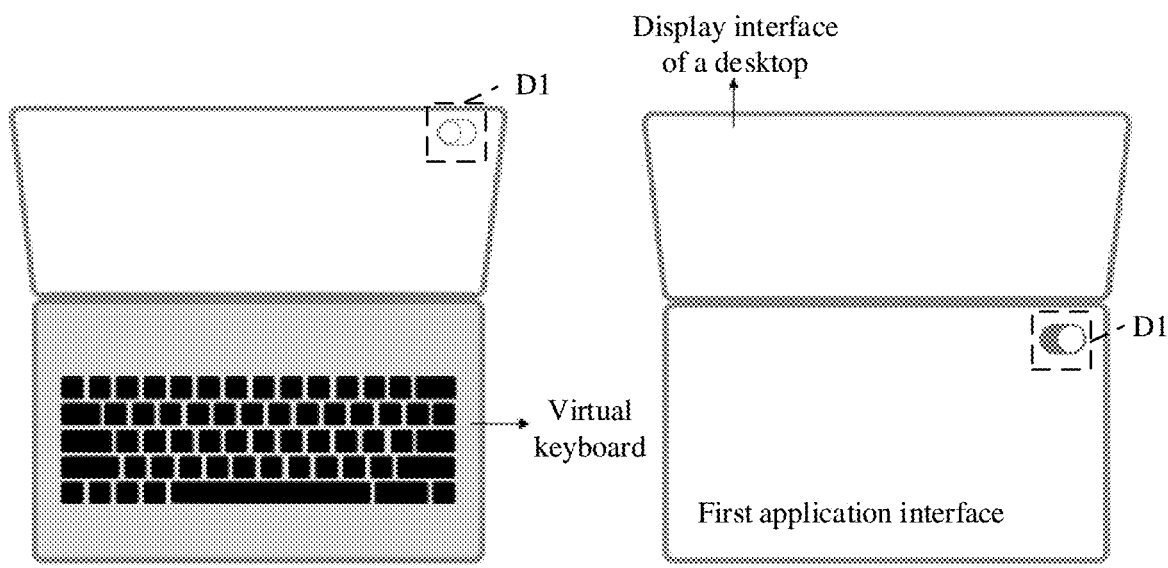
FIG. 48 shows two interface schematic diagrams of a first application interface in an application interface processing method according to an embodiment of this application.

For more intuitive understanding of this solution, refer to FIG. 47 and FIG. 48. FIG. 47 is a schematic diagram of one type of first application interface in the application interface processing method according to an embodiment of this application. FIG. 48 is a schematic diagram of two types of first application interfaces in the application interface processing method according to an embodiment of this application. First refer to FIG. 47. Two icons are set on the first application interface. C1 represents a trigger icon corresponding to the keyboard input mode, and C2 represents a trigger icon corresponding to the handwriting input mode. Therefore, when the user taps C2 on the first application interface, the electronic device can obtain the trigger instruction for handwriting input.

Still refer to FIG. 48. FIG. 48 includes two schematic subdiagrams (a) and (b). In the schematic subdiagram (a) and the schematic subdiagram (b) in FIG. 48, D1 represents a switching icon for switching between the keyboard input mode and the handwriting input mode. In the schematic subdiagram (a) in FIG. 48, the switching icon is in a first state, and the mode type corresponding to the first application interface is the keyboard input mode. In the schematic subdiagram (b) in FIG. 48, the switching icon is in a second state, and the mode type corresponding to the first application interface is the handwriting input mode. It should be understood that examples in FIG. 47 and FIG. 48 are only for ease of understanding of this solution, and are not intended to limit this solution.

In another embodiment, the electronic device may further obtain, by using the first application interface displayed on the first display or by using the interface of the virtual keyboard displayed on the second display, the first contact operation that is input by the user. If the first contact operation is detected, the electronic device determines that the first operation is detected, and further changes the mode type corresponding to the first application interface to the handwriting input mode. The first contact operation is a tap operation or a preset track operation. Further, the first contact operation may be a tap operation, a double-tap operation, a triple-tap operation, a touch and hold operation, a "Z"-shaped track operation, a slide down operation, a "tick"-shaped track operation, a "circle"-shaped track operation, another contact operation, or the like, which is not exhaustively described herein.

Further, operation 4205 may include: The electronic device obtains a slide operation in a first direction by using the second display. The slide operation in the first direction is a slide operation of sliding from an upper side of the second display to a lower side of the second display. A distance between the upper side of the second display and the first display is shorter than a distance between the lower side of the second display and the first display. In response to the slide operation in the first direction, the virtual keyboard displayed on the second display is moved in the first direction toward the lower side of the second display. When an upper side of the virtual keyboard reaches the lower side of the second display, the electronic device determines that the mode type corresponding to the first application interface is changed to handwriting input. In this embodiment of this application, the virtual keyboard displayed on the second display can accompany a slide down operation of the user. When the upper side of the virtual keyboard reaches the lower side of the second display, the electronic device determines that the mode type corresponding to the first application interface is changed to handwriting input. This increases interest in a process of changing from keyboard input to handwriting input, and helps enhance user viscosity.

Figure 49:
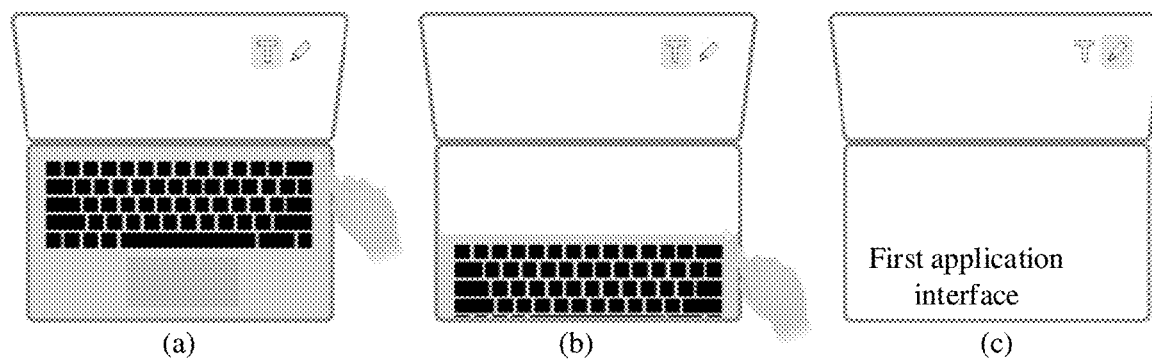
FIG. 49 is a schematic diagram of a first contact operation in an application interface processing method according to an embodiment of this application.

For more intuitive understanding of this solution, refer to FIG. 49. FIG. 49 is a schematic diagram of the first contact operation in the application interface processing method according to an embodiment of this application. FIG. 49 includes three schematic subdiagrams (a), (b), and (c). FIG. 49 shows an example in which the first contact operation is a slide down operation input by using the second display. As shown in the schematic subdiagram (a) in FIG. 49 and the schematic subdiagram (b) in FIG. 49, when the user inputs the slide down operation by using the display interface of the virtual keyboard on the second display, the virtual keyboard on the second display is folded. When the virtual keyboard on the second display is completely folded, it is considered that the first contact operation is obtained by using the second display, and the electronic device determines that the mode type corresponding to the first application interface is the handwriting input mode. Then, the schematic subdiagram (c) in FIG. 49 is triggered to be displayed. In other words, the first application interface is triggered to be displayed on the second display. It should be understood that the example in FIG. 49 is only for ease of understanding of this solution, and is not intended to limit this solution.

In another embodiment, in the process of displaying the first application interface by using the first display, the electronic device may detect a distance between the electronic pen and the second display in real time. If the electronic pen is located in a preset range of the second display, the electronic device determines that the first operation is detected, and changes the mode type corresponding to the first application interface to the handwriting input mode. The preset range of the second display may be within 3 cm, 4 cm, 5 cm, another range, or the like that is exactly above the second display. This is not limited herein.

In another embodiment, the electronic device may collect a state of the electronic pen in real time. If the electronic pen changes from a first preset state to a second preset state, the electronic device determines that the first operation is detected, and changes the mode type corresponding to the first application interface to the handwriting input mode. If the electronic pen is not in a second preset state, the electronic device determines that the mode type corresponding to the first application interface is the keyboard input mode. That the electronic pen changes from a first preset state to a second preset state may be that the electronic pen changes from a static state to a moving state, the electronic pen changes from an unheld state to a held state, or the like, which is not exhaustively described herein.

For example, after the user opens the first application interface, in the process of displaying the first application interface, the user takes the electronic pen out of the electronic device (the electronic pen changes from an unheld state to a held state), or the user picks up the electronic pen from a location outside the electronic device (the electronic pen changes from an unheld state to a held state), and the electronic device may determine that the mode type corresponding to the first application interface is the handwriting input mode.

Further, after the electronic pen is taken out of the electronic device, the electronic pen establishes a communication connection to the electronic device. In this case, if the electronic device detects that the electronic pen changes from not establishing a communication connection to the electronic device to establishing a communication connection to the electronic device, it may be considered that the electronic device changes from an unheld state to a held state.

A vibration sensor (for example, a gyro sensor, an acceleration sensor, or another type of sensor) may be configured in the electronic pen. In this way, the electronic device may collect vibration data of the electronic pen in real time. The vibration data of the electronic pen is sent to the electronic device in real time by using a communication module. The electronic device determines whether the electronic pen changes from a static state to a moving state.

Taking the electronic pen out of the device may be sensed when a processing module of the device receives a signal indicating that the stylus is disconnected from an interface of the device or when a sensor module of the stylus senses disconnection from the device and then sends a disconnection signal to a screen device by using the communication module. However, a process in which the user picks up the stylus is sensed when the sensor module (such as a gyro sensor or an acceleration sensor) of the stylus senses vibration imposed on the stylus picked up by the user and then sends vibration data to a main device processing module by using the communication module.

In this embodiment of this application, a plurality of manners of determining the mode type corresponding to the first application interface are provided. This improves embodiment flexibility of this solution and expands an application scenario of this solution. Further, the mode type corresponding to the first application interface is determined based on the holding posture of the electronic pen, so that the user can change the mode type of the first application interface without performing another operation. In addition, the mode type corresponding to the first application interface is determined based on the posture of holding the electronic pen by the user. This can reduce an error rate in a process of determining the mode type corresponding to the first application interface, reduce a probability of incorrectly placing the first application interface, avoid waste of computer resources, and help enhance user viscosity.

4206: The electronic device determines whether the mode type corresponding to the first application interface is changed to handwriting input. If the mode type corresponding to the first application interface is changed to handwriting input, operation 4207 is performed; or if the mode type corresponding to the first application interface is not changed to handwriting input, operation 4205 is performed again.

In this embodiment of this application, after performing operation 4205, the electronic device performs operation 4206 to determine whether the mode type corresponding to the first application interface is changed from the keyboard input mode to the handwriting input mode. If the mode type corresponding to the first application interface is changed to handwriting input, operation 4207 is performed. If the mode type corresponding to the first application interface is not changed to handwriting input, operation 4205 is performed again, to continue to detect the mode type corresponding to the first application interface. It should be noted that in this embodiment of this application, operations 4205 and 4206 may intersect each other, and a relationship of performing times between operations 4205 and 4206 and operation 4207 is not limited. Operation 4207 may be performed once after operations 4205 and 4206 are performed for a plurality of times.

4207: The electronic device triggers, in response to the handwriting input mode, display of the first application interface on the second display.

In this embodiment of this application, if the electronic device obtains that the mode type corresponding to the first application interface changes from the keyboard input mode to the handwriting input mode, in response to the handwriting input mode, the electronic device triggers display of the first application interface on the second display, disables the virtual keyboard displayed on the second display, and obtains, by using the second display, handwriting content input by the user for the first application interface. When the electronic device displays the first application interface on the second display, the electronic device may move the first application interface to the second display for displaying, or the electronic device automatically performs a copying operation on the first application interface, and then displays the first application interface by using the second display.

Specifically, an operating system runs on the electronic device. The electronic device may display the first application interface on the second display by invoking a move to function in the operating system, or by invoking a Set Window Position function in the operating system, or by invoking a Set Window Placement function in the operating system.

More specifically, in one case, there is no other application interface on the second display of the electronic device. In an embodiment, the electronic device may disable the virtual keyboard displayed on the second display, move the first application interface to the second display (that is, not display the first application interface on the first display), and display the first application interface in a full screen mode by using the second display. In another embodiment, the electronic device may disable the virtual keyboard displayed on the second display, and copy the first application interface to the second display, to display the first application interface on both the first display and the second display.

Figure 50:
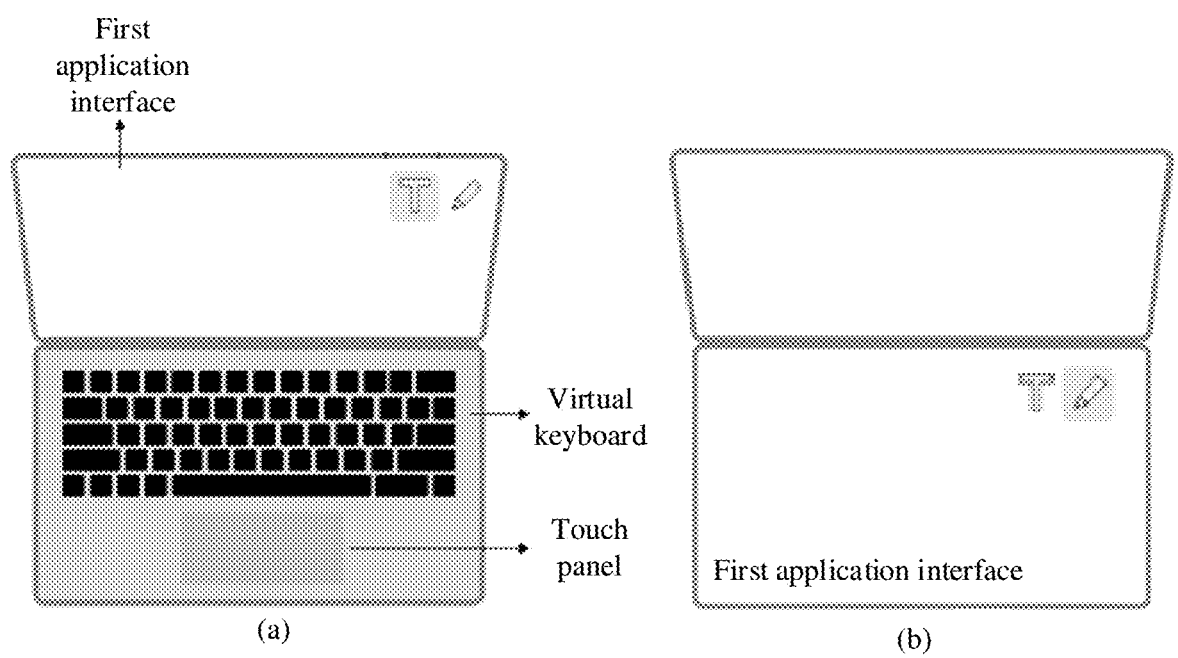
FIG. 50 is a schematic diagram of a display interface of a first application interface in an application interface processing method according to an embodiment of this application.

For more intuitive understanding of this solution, refer to FIG. 50. FIG. 50 is a schematic diagram of a display interface of the first application interface in the application interface processing method according to an embodiment of this application. FIG. 50 includes two schematic subdiagrams (a) and (b). The schematic subdiagram (a) in FIG. 50 shows a schematic diagram of the first display and the second display of the electronic device if the mode type corresponding to the first application interface is the keyboard input mode. If the electronic device obtains that the mode type corresponding to the first application interface is changed from the keyboard input mode to the handwriting input mode, the schematic subdiagram (a) in FIG. 50 is triggered to be switched into the schematic subdiagram (b) in FIG. 50. That is, the virtual keyboard displayed on the second display is disabled, and the first application interface is moved to the second display. It should be noted that, in addition to the first application interface, another application interface may be displayed on the first display of the electronic device. The example herein is only for ease of understanding of this solution, and is not intended to limit this solution.

In another case, another application interface is further displayed on the second display of the electronic device. In an embodiment, the electronic device may disable the virtual keyboard displayed on the second display, and display the first application interface and the another application interface on the second display in a matrix manner. In another embodiment, the electronic device may disable the virtual keyboard displayed on the second display, and display the first application interface on the second display in a form of a floating window. In another embodiment, the electronic device may disable the virtual keyboard displayed on the second display, and move the another application interface displayed on the second display to the first display, to display the first application interface, and the like in a full screen mode by using the second display. The manner of displaying the first application interface on the second display is not exhaustively described herein.

Further, in the foregoing embodiments, when displaying the first application interface on the second display, the electronic device may further display the first application interface on the first display, or may not display the first application interface on the first display.

Optionally, operation 4204 may include: displaying the first application interface and the application control bar on the second display. The method may further include: The electronic device detects a second operation acting on the second display; in response to the second operation, changes a first display area of the application control bar to a second display area, and changes a first control key group included in the application control bar to a second control key group. Both the first control key group and the second control key group are control key sets corresponding to a target application. Specific meaning of the nouns in the foregoing operations and specific embodiments of the foregoing operations are all described in the following Embodiment 4. Details are not described herein again.

Optionally, the first application interface includes a first control key, and operation 4204 may include: displaying the first application interface and the application control bar on the second display. The method may further include: The electronic device detects a second operation on the first target application interface; and in response to the second operation, displays the first control key in the application control bar, and hides the first control key in the first application interface. Specific meaning of the nouns in the foregoing operations and specific embodiments of the foregoing operations are all described in the following Embodiment 4. Details are not described herein again.

4208: The electronic device obtains the mode type corresponding to the first application interface.

In this embodiment of this application, for a specific embodiment of operation 4208, refer to the foregoing description of operation 4205. Details are not described herein again.

4209: The electronic device determines whether the mode type corresponding to the first application interface is changed to keyboard input. If the mode type corresponding to the first application interface is changed to keyboard input, operation 4210 is performed; or if the mode type corresponding to the first application interface is not changed to keyboard input, operation 4208 is performed again.

In this embodiment of this application, after performing operation 4208, the electronic device performs operation 4209 to determine whether the mode type corresponding to the first application interface is changed from the handwriting input mode to the keyboard input mode. If the mode type corresponding to the first application interface is changed to keyboard input, operation 4210 is performed. If the mode type corresponding to the first application interface is not changed to handwriting input, operation 4208 is performed again, to continue to detect the mode type corresponding to the first application interface. It should be noted that in this embodiment of this application, operations 4208 and 4209 may intersect each other, and a relationship of performing times between operations 4208 and 4209 and operation 4209 is not limited. Operation 4210 may be performed once after operations 4208 and 4209 are performed for a plurality of times.

4210: The electronic device triggers, in response to the keyboard input mode, display of the first application interface on the first display, and display of the virtual keyboard on the second display.

In this embodiment of this application, for a specific embodiment of operation 4210, refer to the foregoing description of operation 4204. Details are not described herein again. It should be noted that, after performing operation 4210, the electronic device may perform operation 4205 again to detect in real time whether the mode type corresponding to the first application interface is changed to handwriting input. In addition, operations 4205 to 4209 are all optional operations. If the user closes the first application interface in any one of operations 4205 to 4209, other operations do not need to be performed.

In this embodiment of this application, in the process of displaying the application interface, when the application interface is changed from another mode type to handwriting input, a layout of the application interface on different displays of the electronic device can be automatically adjusted. When the mode type of the application interface is changed to keyboard input, the layout of the application interface on different displays of the electronic device can also be automatically adjusted, and the virtual keyboard can be automatically displayed. In this way, when the mode type of the application interface is changed to keyboard input, the user does not need to manually adjust the layout of the application interface on different displays, but can directly perform keyboard input. The operations are simple, and user viscosity in this solution is further increased.

4211: The electronic device triggers, in response to the handwriting input mode, display of the first application interface on the second display.

In this embodiment of this application, if the electronic device determines that the mode type corresponding to the first application interface is handwriting input, the electronic device triggers, in response to the handwriting input mode, display of the first application interface on the second display, to obtain input content for the first application interface by using the first display. For a manner of displaying the first application interface on the second display, refer to the descriptions in operation 4207. Details are not described herein again.

Figure 51:
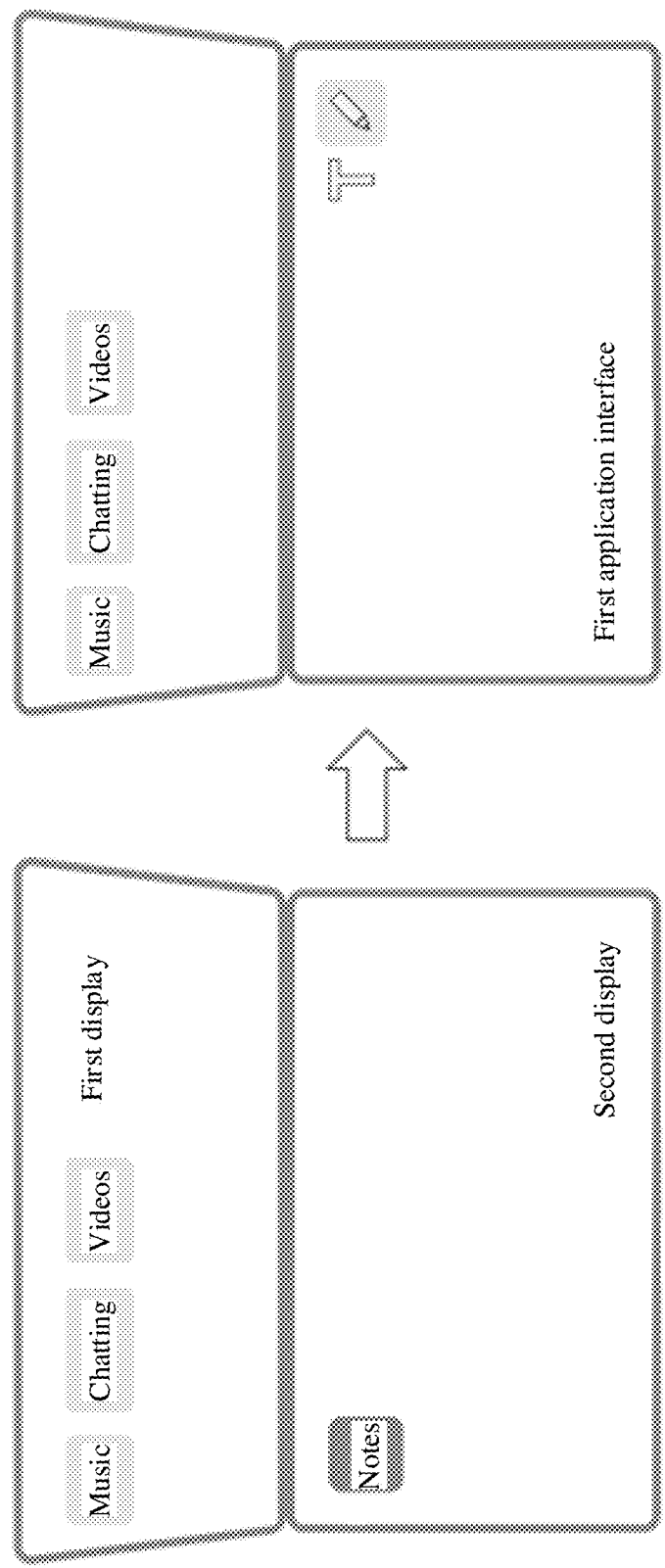
FIG. 51 is a schematic flowchart of an application interface processing method according to an embodiment of this application.
Figure 52:
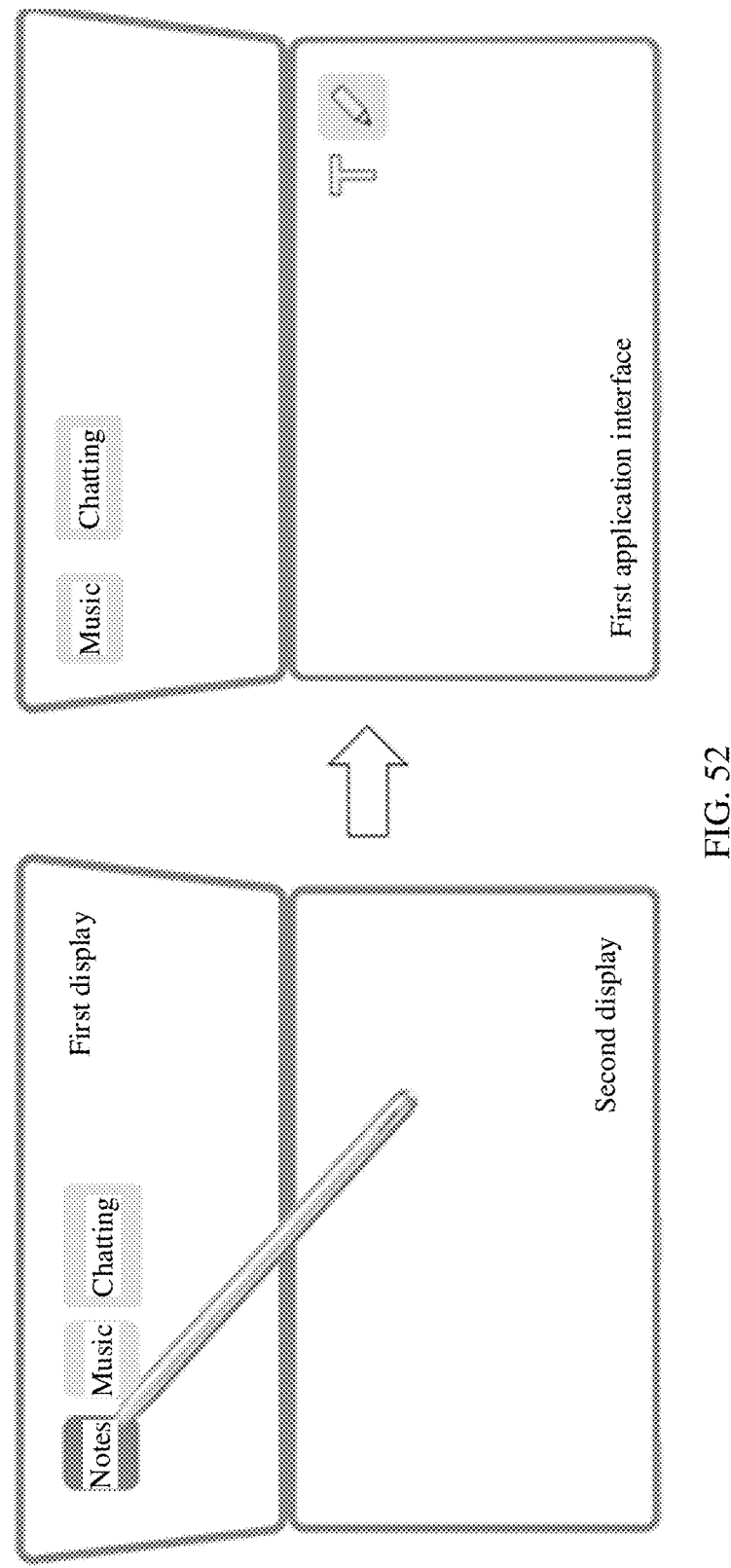
FIG. 52 is a schematic flowchart of an application interface processing method according to an embodiment of this application.

For more intuitive understanding of this solution, refer to FIG. 51 and FIG. 52. FIG. 51 and FIG. 52 separately show schematic flowcharts of the application interface processing method according to an embodiment of this application. First refer to FIG. 51. FIG. 51 includes two schematic subdiagrams (a) and (b). In the schematic subdiagram (a) in FIG. 51, the electronic device obtains the start operation for the target application (namely, an application "Note" in the figure) by using the second display. Because the start operation is input by using the second display, the electronic device determines that the mode type corresponding to the first application interface is handwriting input, and the electronic device displays the schematic subdiagram (b) in FIG. 51. The electronic device displays the first application interface (namely, an initial application interface of the application "Note") on the second display.

Still refer to FIG. 52. FIG. 52 includes two schematic subdiagrams (a) and (b). In the schematic subdiagram (a) in FIG. 52, the electronic device obtains the start operation for the target application (namely, an application "Note" in the figure) by using the first display. Because the start operation is obtained by using the electronic pen, the electronic device determines that the mode type corresponding to the first application interface is handwriting input, and the electronic device displays the schematic subdiagram (b) in FIG. 52. The electronic device displays the first application interface on the second display. It should be understood that examples in FIG. 51 and FIG. 52 are only for ease of understanding of this solution, and are not intended to limit this solution.

4212: The electronic device obtains the mode type corresponding to the first application interface.

4213: The electronic device determines whether the mode type corresponding to the first application interface is changed to keyboard input. If the mode type corresponding to the first application interface is changed to keyboard input, operation 4214 is performed; or if the mode type corresponding to the first application interface is not changed to keyboard input, operation 4212 is performed again.

4214: The electronic device triggers, in response to the keyboard input mode, display of the first application interface on the first display, and display of the virtual keyboard on the second display.

In this embodiment of this application, for specific embodiments of operations 4212 to 4214, refer to the foregoing descriptions of operations 4208 to 4210. Details are not described herein again.

4215: The electronic device obtains the mode type corresponding to the first application interface.

4216: The electronic device determines whether the mode type corresponding to the first application interface is changed to handwriting input. If the mode type corresponding to the first application interface is changed to handwriting input, operation 4217 is performed; or if the mode type corresponding to the first application interface is not changed to handwriting input, operation 4215 is performed again.

4217: The electronic device triggers, in response to the handwriting input mode, display of the first application interface on the second display.

In this embodiment of this application, for specific embodiments of operations 4215 to 4217, refer to the foregoing descriptions of operations 4205 to 4207. Details are not described herein again.

It should be noted that, after performing operation 4217, the electronic device may perform operation 4212 again to detect in real time whether the mode type corresponding to the first application interface is changed to keyboard input. In addition, operations 4212 to 4217 are all optional operations. If the user closes the first application interface in any one of operations 4212 to 4217, other operations do not need to be performed.

2. Switching Between the Handwriting Input Mode and the Browsing Mode.

Figure 53A:
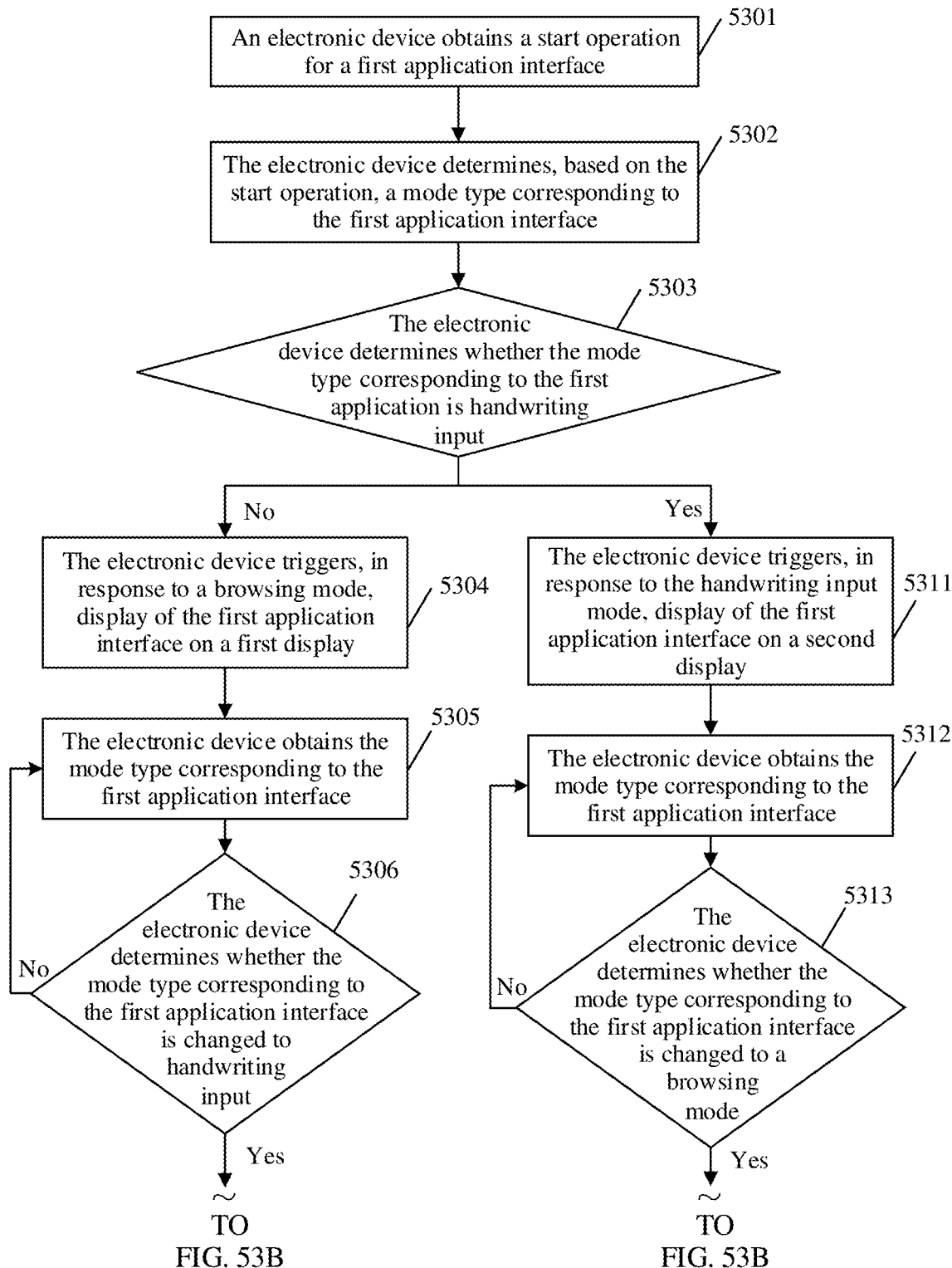
FIG. 53A and FIG. 53B show a schematic flowchart of an application interface processing method according to an embodiment of this application.
Figure 53B:
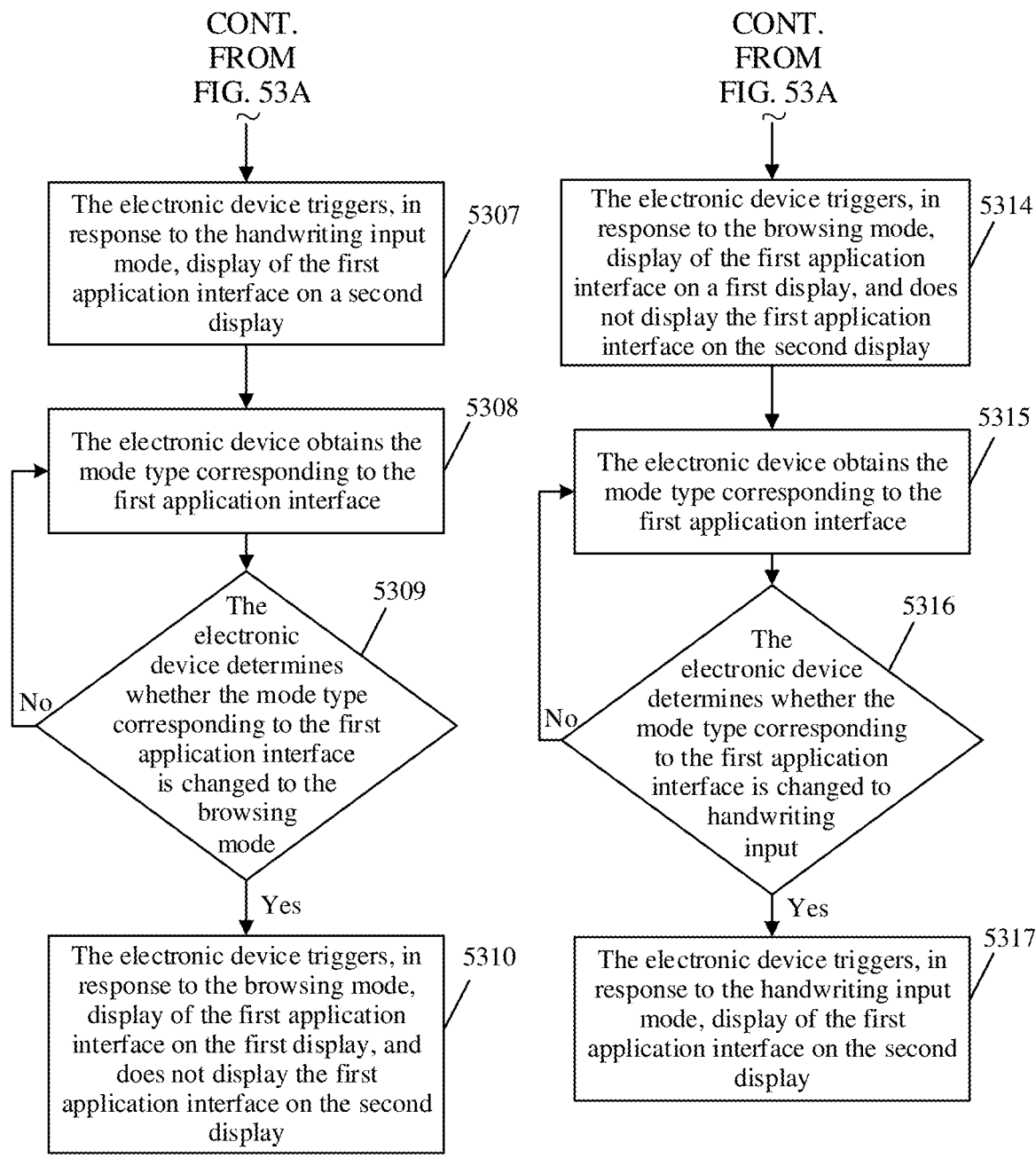

In this embodiment of this application, refer to FIG. 53A and FIG. 53B. FIG. 53A and FIG. 53B show is a schematic flowchart of the application interface processing method according to an embodiment of this application. The application interface processing method provided in this embodiment of this application may include the following operations.

5301: The electronic device obtains a start operation for the first application interface.

5302: The electronic device determines, based on the start operation, the mode type corresponding to the first application interface.

5303: The electronic device determines whether the mode type corresponding to the first application is handwriting input. If the mode type corresponding to the first application is a browsing mode, operation 5304 is performed; or if the mode type corresponding to the first application is handwriting input, operation 5311 is performed.

In this embodiment of this application, for specific embodiments of operations 5301 to 5303, refer to the descriptions of operations 4201 to 4203 in the embodiment corresponding to 42A and FIG. 42B. A difference lies in that the keyboard input mode in operations 4201 to 4203 is replaced with the browsing mode in operations 5301 to 5303. For details, refer to the descriptions in the embodiment corresponding to 42A and FIG. 42B. Details are not described herein again.

5304: The electronic device triggers, in response to the browsing mode, display of the first application interface on the first display.

In this embodiment of this application, if the electronic device determines that the mode type corresponding to the first application interface is not the handwriting input mode but the browsing mode, the electronic device triggers, in response to the browsing mode, display of only the first application interface on the first display.

5305: The electronic device obtains the mode type corresponding to the first application interface.

5306: The electronic device determines whether the mode type corresponding to the first application interface is changed to handwriting input. If the mode type corresponding to the first application interface is changed to handwriting input, operation 5307 is performed; or if the mode type corresponding to the first application interface is not changed to handwriting input, operation 5305 is performed again.

5307: The electronic device triggers, in response to the handwriting input mode, display of the first application interface on the second display.

In this embodiment of this application, for specific embodiments of operations 5305 to 5307, refer to descriptions of operations 205 to 207 in the embodiment corresponding to 42A and FIG. 42B. A difference lies in that the keyboard input mode in operations 205 to 207 is replaced with the browsing mode in operations 5305 to 5307. In addition, in the browsing mode, the virtual keyboard does not need to be displayed on the second display. Correspondingly, when the mode type corresponding to the first application interface changes from the browsing mode to the handwriting input mode, the virtual keyboard displayed on the second display does not need to be disabled either. For details, refer to descriptions in the embodiment corresponding to 42A and FIG. 42B. Details are not described herein.

Figure 54:
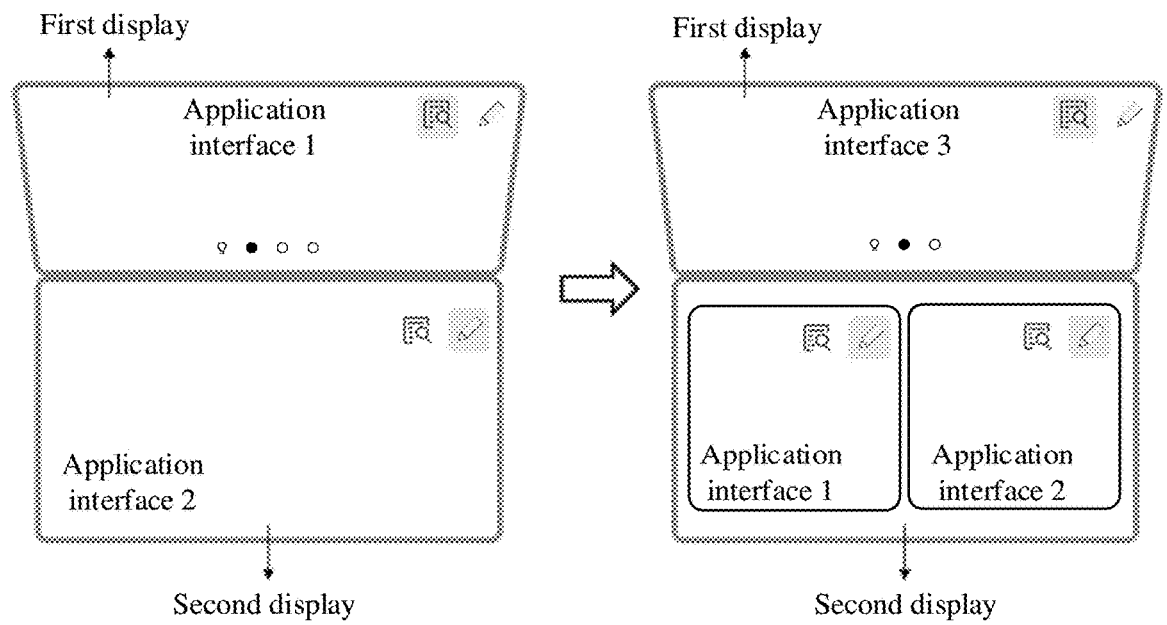
FIG. 54 is a schematic diagram of a display interface of a first application interface in an application interface processing method according to an embodiment of this application.

For more intuitive understanding of this solution, FIG. 54 to FIG. 57 show four schematic diagrams of the display interface of the first application interface in the application interface processing method according to an embodiment of this application. First refer to FIG. 54. FIG. 54 includes two schematic subdiagrams (a) and (b). In the schematic subdiagram (a) in FIG. 54, a bulb pattern and three circles are displayed at a bottom of the first display in FIG. 54. The bulb pattern represents a display interface of a desktop, and the three circles separately represent three different application interfaces. A current display interface of the first display is an application interface 1 (namely, an example of the first application interface). Two icons in an upper right corner of the first display separately represent the browsing mode and the handwriting mode. The second display displays an application interface 2. If the electronic device obtains that the mode type corresponding to the first application interface changes from the browsing mode to the handwriting input mode, the schematic subdiagram (a) in FIG. 54 is triggered to be switched into the schematic subdiagram (b) in FIG. 54. That is, the first application interface is moved to the second display. In the schematic subdiagram (b) in FIG. 54, the electronic device displays the application interface 1 and the application interface 2 in a matrix manner, and no longer displays the application interface 1 on the first display. In this case, the current display interface of the first display changes to an application interface 3. The user may tap the application interface 1 to trigger display of the application interface 1 in a full screen mode.

Figure 55:
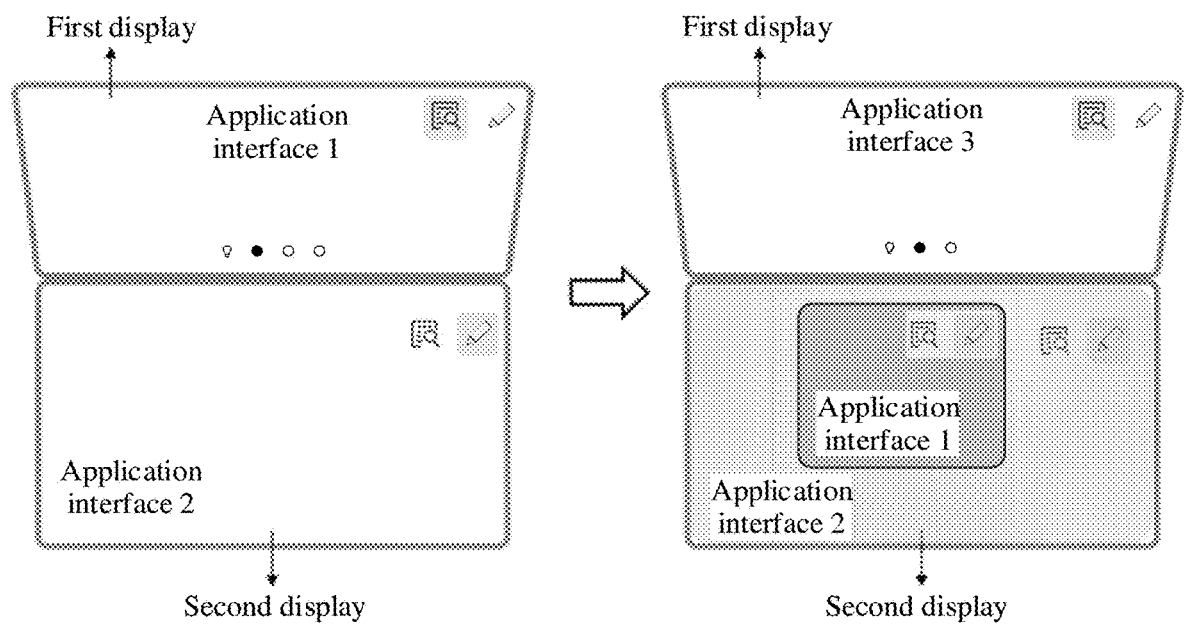
FIG. 55 is a schematic diagram of a display interface of a first application interface in an application interface processing method according to an embodiment of this application.

Still refer to FIG. 55. FIG. 55 includes two schematic subdiagrams (a) and (b). The schematic subdiagram (a) in FIG. 55 is consistent with the schematic subdiagram (a) in FIG. 54, and details are not described herein again. If the electronic device obtains that the mode type corresponding to the first application interface changes from the browsing mode to the handwriting input mode, the schematic subdiagram (b) in FIG. 55 is triggered to be displayed. In the schematic subdiagram (b) in FIG. 55, the electronic device displays the application interface 1 (namely, an example of the first application interface) in a form of a floating window. In addition, the application interface 1 is no longer displayed on the first display, and the current display interface of the first display changes to the application interface 3.

Figure 56:
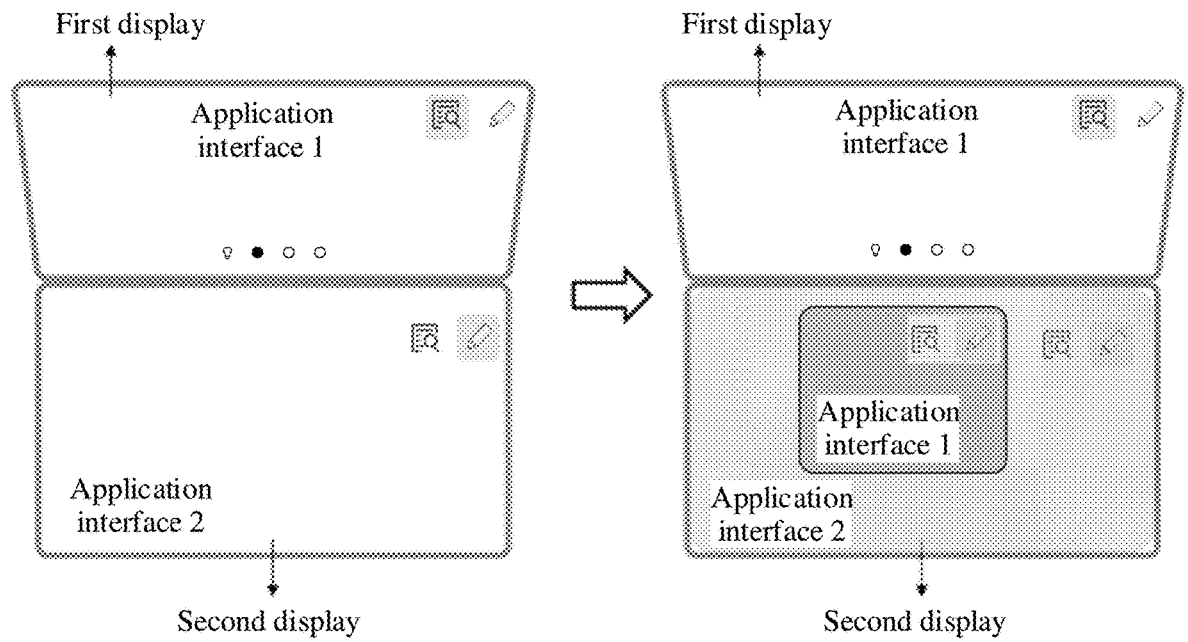
FIG. 56 is a schematic diagram of a display interface of a first application interface in an application interface processing method according to an embodiment of this application.

Still refer to FIG. 56. FIG. 56 includes two schematic subdiagrams (a) and (b). The schematic subdiagram (a) in FIG. 56 is consistent with the schematic subdiagram (a) in FIG. 54, and details are not described herein again. If the electronic device obtains that the mode type corresponding to the first application interface changes from the browsing mode to the handwriting input mode, the schematic subdiagram (b) in FIG. 56 is triggered to be displayed. In the schematic subdiagram (b) in FIG. 56, the electronic device displays the application interface 1 (namely, an example of the first application interface) in a form of a floating window. In addition, the application interface 1 is still displayed on the first display.

Figure 57:
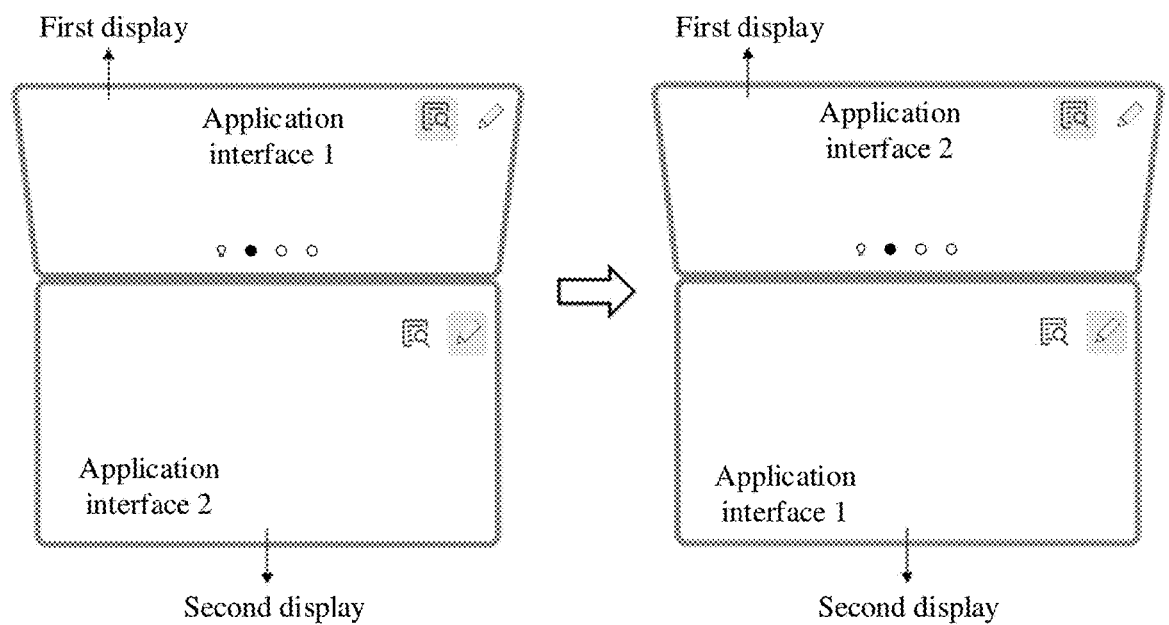
FIG. 57 is a schematic diagram of a display interface of a first application interface in an application interface processing method according to an embodiment of this application.

Still refer to FIG. 57. FIG. 57 includes two schematic subdiagrams (a) and (b). The schematic subdiagram (a) in FIG. 57 is consistent with the schematic subdiagram (a) in FIG. 54, and details are not described herein again. If the electronic device obtains that the mode type corresponding to the first application interface changes from the browsing mode to the handwriting input mode, the schematic subdiagram (b) in FIG. 57 is triggered to be displayed. In the schematic subdiagram (b) in FIG. 57, the electronic device displays the application interface 1 (namely, an example of the first application interface) in a full screen mode. In addition, the electronic device moves the application interface 2 displayed on the second display to the first display.

It should be noted that, in addition to the first application interface, another application interface may be displayed on the first display of the electronic device, and more application interfaces may also be displayed on the second display of the electronic device. Examples in FIG. 54 to FIG. 57 are only for ease of understanding of this solution, and are not intended to limit this solution.

5308: The electronic device obtains the mode type corresponding to the first application interface.

5309: The electronic device determines whether the mode type corresponding to the first application interface is changed to the browsing mode. If the mode type corresponding to the first application interface is changed to the browsing mode, operation 1530 is performed; or if the mode type corresponding to the first application interface is not changed to the browsing mode, operation 5308 is performed again.

5310: The electronic device triggers, in response to the browsing mode, display of the first application interface on the first display, and does not display the first application interface on the second display.

In this embodiment of this application, for specific embodiments of operations 5308 to 5310, refer to descriptions of operations 4208 to 4210 in the embodiment corresponding to FIG. 42A and FIG. 42B. A difference lies in that the keyboard input mode in operations 4208 to 4210 is replaced with the browsing mode in operations 5308 to 5310. In addition, when the mode type corresponding to the first application interface changes from the handwriting input mode to the browsing mode, the virtual keyboard does not need to be displayed on the second display. For details, refer to descriptions in the embodiment corresponding to FIG. 42A and FIG. 42B. Details are not described herein.

In this embodiment of this application, when the mode type of the application interface is changed to the browsing mode, a layout of the application interface on different displays can also be automatically adjusted. Therefore, when the mode type of the application interface is changed to the browsing mode, the user does not need to manually adjust the layout of the application interface on different displays, in other words, in a plurality of different application scenarios, operation operations can be simplified, and user viscosity of this solution is further increased.

It should be noted that, after performing operation 5310, the electronic device may perform operation 5305 again to detect in real time whether the mode type corresponding to the first application interface is changed to handwriting input. In addition, operations 5305 to 5310 are all optional operations. If the user closes the first application interface in any one of operations 5305 to 5310, other operations do not need to be performed.

5311: The electronic device triggers, in response to the handwriting input mode, display of the first application interface on the second display.

5312: The electronic device obtains the mode type corresponding to the first application interface.

5313: The electronic device determines whether the mode type corresponding to the first application interface is changed to the browsing mode. If the mode type corresponding to the first application interface is changed to the browsing mode, operation 5314 is performed; or if the mode type corresponding to the first application interface is not changed to the browsing mode, operation 5312 is performed again.

5314: The electronic device triggers, in response to the browsing mode, display of the first application interface on the first display, and does not display the first application interface on the second display.

5315: The electronic device obtains the mode type corresponding to the first application interface.

5316: The electronic device determines whether the mode type corresponding to the first application interface is changed to handwriting input. If the mode type corresponding to the first application interface is changed to handwriting input, operation 5317 is performed; or if the mode type corresponding to the first application interface is not changed to handwriting input, operation 5315 is performed again.

5317: The electronic device triggers, in response to the handwriting input mode, display of the first application interface on the second display.

In this embodiment of this application, for specific embodiments of operations 5311 to 5317, refer to descriptions of operations 4211 to 4217 in the embodiment corresponding to FIG. 42A and FIG. 42B. A difference lies in that the keyboard input mode in operations 4211 to 4217 is replaced with the browsing mode in operations 5311 to 5317. In addition, when the mode type corresponding to the first application interface changes from the handwriting input mode to the browsing mode, the virtual keyboard does not need to be displayed on the second display. When the mode type corresponding to the first application interface changes from the browsing mode to the handwriting input mode, the virtual keyboard displayed on the second display does not need to be disabled either. For details, refer to descriptions in the embodiment corresponding to FIG. 42A and FIG. 42B. Details are not described herein.

It should be noted that, after performing operation 5317, the electronic device may perform operation 5312 again to detect in real time whether the mode type corresponding to the first application interface is changed to the browsing mode. In addition, operations 5312 to 5317 are all optional operations. If the user closes the first application interface in any one of operations 5312 to 5317, other operations do not need to be performed.

In this embodiment of this application, in a process of using the application interface by the user, the mode type corresponding to the application interface can be automatically detected, to adjust a display location of the application interface based on the mode type corresponding to the application interface. In addition, when the application interface is opened, the mode type corresponding to the application interface may be determined based on the start operation, to determine the display location of the application interface, so that the user can directly use the application interface after performing the start operation, without performing a location movement operation on the application interface. This further improves convenience of this solution, and enhances user viscosity of this solution.

The electronic device displays the first application interface on the first display, and detects the mode type corresponding to the first application interface. If the electronic device detects that the mode type corresponding to the first application interface is handwriting input, the electronic device triggers display of the first application interface on the second display, to directly perform input by using the first application interface displayed on the second display. According to the foregoing manner, if a user places the second display in a direction convenient for writing, the user does not need to perform any operation, and the electronic device can automatically display, on the second display convenient for writing, an application interface for writing input. This improves efficiency of an entire input process, avoids redundant operations, simplifies the operation, and helps enhance user viscosity.

Figure 58:
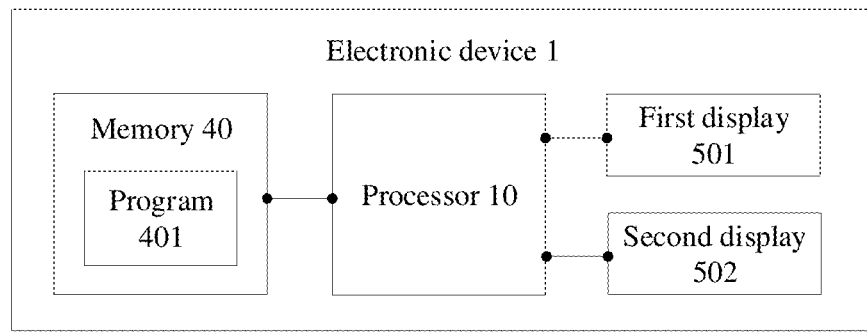
FIG. 58 is a schematic diagram of a structure of an electronic device according to an embodiment of this application.

According to the embodiments corresponding to FIG. 41 to FIG. 57, to better implement the foregoing solutions in embodiments of this application, the following further provides a related device used to implement the foregoing solutions. FIG. 58 is a schematic diagram of a structure of an electronic device according to an embodiment of this application. The electronic device 1 includes a first display 501, a second display 502, a memory 40, one or more processors 10, and one or more programs 401. The one or more programs 401 are stored in the memory 40. When the one or more processors 10 execute the one or more programs 401, the electronic device is enabled to perform the following operations: displaying a first application interface by using the first display 501; changing a mode type corresponding to the first application interface to handwriting input in response to a detected first operation; and triggering, in response to the handwriting input mode, display of the first application interface on the second display 502, to obtain handwriting content for the first application interface by using the second display 502.

In a possible design, when the one or more processors 10 execute the one or more programs 401, the electronic device is further enabled to perform the following operations: if the electronic device detects that the mode type corresponding to the first application interface is changed to keyboard input, triggering, in response to the keyboard input mode, display of the first application interface on the first display 501, and display of a virtual keyboard on the second display 502; or if the electronic device detects that the mode type corresponding to the first application interface is changed to the keyboard input mode, triggering, in response to the keyboard input mode, display of the first application interface on the first display 501, and display of the virtual keyboard and an application control bar on the second display 502.

In a possible design, when the one or more processors 10 execute the one or more programs 401, the electronic device is further enabled to perform the following operation: if the electronic device detects that the mode type corresponding to the first application interface is changed to a browsing mode, triggering, in response to the browsing mode, display of the first application interface on the first display 501.

In a possible design, when the one or more processors 10 execute the one or more programs 401, the electronic device is enabled to specifically perform any one or a combination of the following four items: if the electronic device detects that a holding posture of an electronic pen meets a first preset condition, determining that the first operation is detected, where the holding posture includes any one or a combination of the following: a holding location, holding force, and a holding angle; or obtaining a trigger instruction for handwriting input by using a first icon, where the first icon is displayed on the first application interface; or detecting a first contact operation, where the first contact operation is a preset tap operation or a preset track operation; or if the electronic device detects that an electronic pen is located in a preset range of the second display 502, determining that the first operation is detected; or if the electronic device detects that an electronic pen changes from a first preset state to a second preset state, determining that the first operation is detected.

In a possible design, the first operation is a slide operation in a first direction obtained by using the second display 502. The slide operation in the first direction is a slide operation of sliding from an upper side of the second display 502 to a lower side of the second display 502. A distance between the upper side of the second display 502 and the first display 501 is shorter than a distance between the lower side of the second display 502 and the first display 501.

In a possible design, when the one or more processors 10 execute the one or more programs 401, the electronic device is further enabled to perform the following operations: obtaining a start operation for the second application interface, and determining, based on the start operation, a mode type corresponding to the second application interface, where the second application interface and the first application interface are different application interfaces; if the mode type corresponding to the second application interface is handwriting input, triggering, in response to the handwriting input mode, display of the second application interface on the second display 502; or if the mode type corresponding to the second application interface is keyboard input, triggering, in response to the keyboard input mode, display of the second application interface on the first display 501, and display of the virtual keyboard on the second display 502; or if the mode type corresponding to the second application interface is a browsing mode, triggering, in response to the browsing mode, display of the second application interface on the first display 501.

It should be noted that content such as information exchange and an execution process between the modules/units in the electronic device 1 is based on a same concept as the method embodiments corresponding to FIG. 41 to FIG. 57 in this application. For specific content, refer to the descriptions in the foregoing method embodiments in this application. Details are not described herein again.

Figure 59:
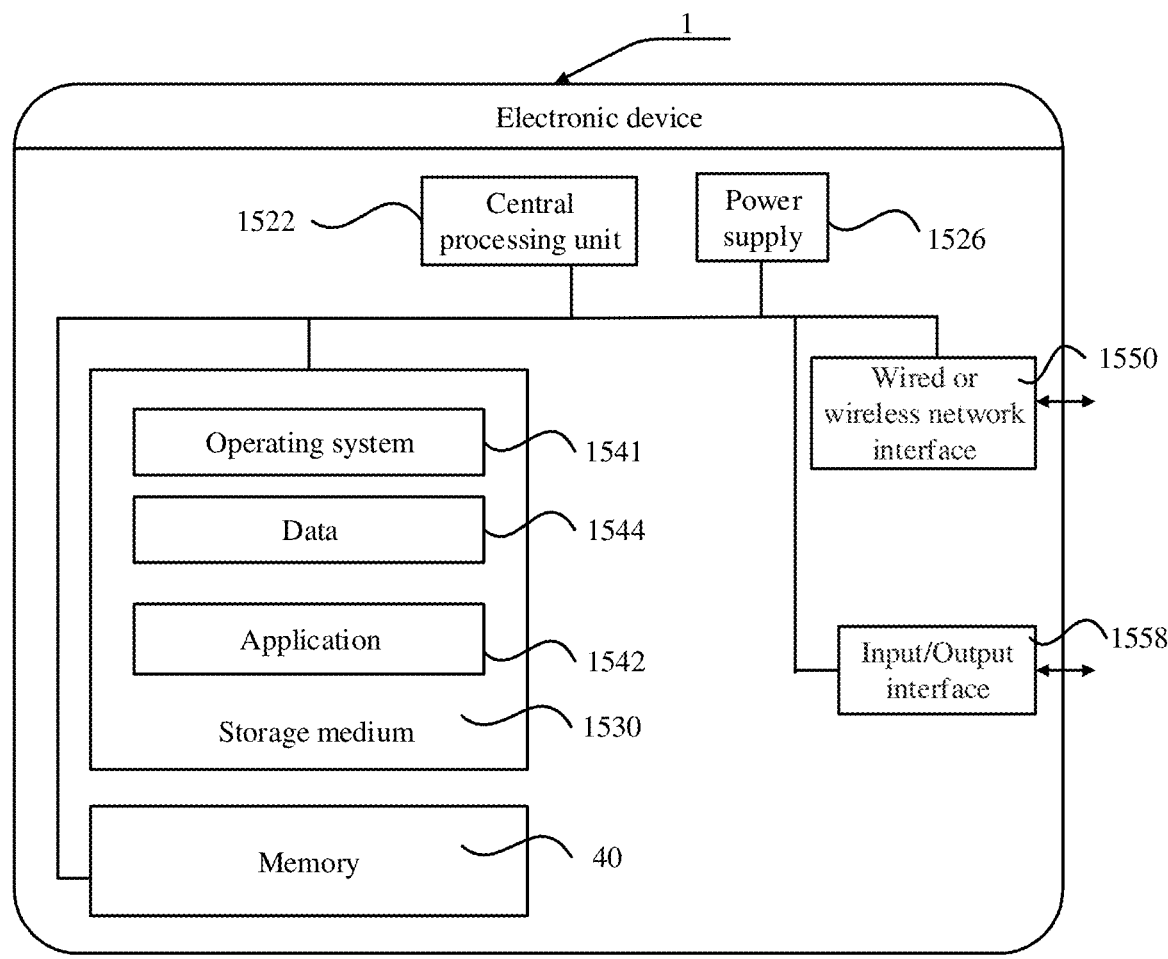
FIG. 59 is a schematic diagram of a structure of an electronic device according to an embodiment of this application.

An embodiment of this application further provides an electronic device. FIG. 59 is a schematic diagram of a structure of an electronic device according to an embodiment of this application. An electronic device 1 may be specifically represented as a mobile phone, a tablet computer, a notebook computer, another device provided with a display, or the like. This is not limited herein. The electronic device described in the embodiment corresponding to FIG. 58 may be deployed on the electronic device 1 and is configured to implement a function of the electronic device in the embodiments corresponding to FIG. 41 to FIG. 57. Specifically, the electronic device 1 may vary greatly with a configuration or performance, and may include one or more central processing units (CPU) 1522 (for example, one or more processors), a memory 40, and one or more storage media 1530 (for example, one or more mass storage devices) that store an application 1542 or data 1544. The memory 40 and the storage medium 1530 may be for temporary storage or permanent storage. The program stored in the storage medium 1530 may include one or more modules (which are not shown in the figure), and each module may include a series of instruction operations on the electronic device. Further, the central processing unit 1522 may be configured to communicate with the storage medium 1530, and perform, on the electronic device 1, the series of instruction operations in the storage medium 1530.

The electronic device 1 may further include one or more power supplies 1526, one or more wired or wireless network interfaces 1550, one or more input/output interfaces 1558, and/or one or more operating systems 1541, for example, Windows Server™, Mac OS X™, Unix™, Linux™, and FreeBSD™.

In this embodiment of this application, the central processing unit 1522 is configured to implement a function of the electronic device in the embodiments corresponding to FIG. 41 to FIG. 57. It should be noted that, for a specific embodiment in which the central processing unit 1522 performs the function of the electronic device in the embodiments corresponding to FIG. 41 to FIG. 57 and a beneficial effect of the function, refer to the descriptions in the method embodiment corresponding to FIG. 41 to FIG. 57. Details are not described herein again.

An embodiment of this application further provides a computer-readable storage medium. The computer-readable storage medium stores a computer program. When the program is run on a computer, the computer is enabled to perform the operations performed by the electronic device in the method described in the embodiments shown in FIG. 42A and FIG. 42B to FIG. 57.

An embodiment of this application further provides a computer program. When the computer program is run on a computer, the computer is enabled to perform the operations performed by the electronic device in the method described in the embodiments shown in FIG. 42A and FIG. 42B to FIG. 57.

An embodiment of this application further provides a circuit system. The circuit system includes a processing circuit, and the processing circuit is configured to perform the operations performed by the electronic device in the method described in the embodiments shown in FIG. 42A and FIG. 42B to FIG. 57.

The electronic device provided in this embodiment of this application may be specifically a chip. The chip includes a processing unit and a communication unit. The processing unit may be, for example, a processor. The communication unit may be, for example, an input/output interface, a pin, or a circuit. The processing unit may execute computer executable instructions stored in a storage unit, so that the chip performs the operations performed by the electronic device in the method described in the embodiments shown in FIG.

42A and FIG. 42B to FIG. 57. Optionally, the storage unit is a storage unit in the chip, for example, a register or a cache; or the storage unit may be a storage unit that is in a radio access device and that is located outside the chip, for example, a read-only memory (read-only memory, ROM), another type of static storage device that can store static information and instructions, or a random access memory (RAM).

The processor mentioned anywhere above may be a general-purpose central processing unit, a microprocessor, an ASIC, or one or more integrated circuits that are configured to control program execution of the method according to the first aspect.

In addition, it should be noted that the described apparatus embodiments are only examples. The units described as separate parts may or may not be physically separate, and parts displayed as units may or may not be physical units, may be located in one location, or may be distributed on a plurality of network units. Some or all of the modules may be selected based on actual requirements to achieve the objectives of the solutions in embodiments. In addition, in the accompanying drawings of the apparatus embodiments provided by this application, connection relationships between modules indicate that the modules have communication connections with each other, which may be specifically implemented as one or more communication buses or signal cables.

Based on the description of the foregoing embodiments, a person skilled in the art may clearly understand that this application may be implemented by software in addition to necessary universal hardware, or certainly may be implemented by dedicated hardware, including a dedicated integrated circuit, a dedicated CLU, a dedicated memory, a dedicated component, and the like. Usually, any function implemented by a computer program may be easily implemented by using corresponding hardware. In addition, specific hardware structures used to implement a same function may be various, for example, an analog circuit, a digital circuit, or a dedicated circuit. However, in this application, a software program embodiment is a better embodiment in most cases. Based on such an understanding, the technical solutions of this application essentially or the part contributing to the conventional technology may be implemented in a form of a software product. The computer software product is stored in a readable storage medium, such as a floppy disk, a USB flash drive, a removable hard disk, a ROM, a RAM, a magnetic disk, or an optical disc of a computer, and includes several instructions for instructing a computer device (which may be a personal computer, a server, or a network device) to perform the methods described in embodiments of this application.

All or some of the foregoing embodiments may be implemented by software, hardware, firmware, or any combination thereof. When software is used to implement the foregoing embodiments, all or some of the embodiments may be implemented in a form of a computer program.

The computer program includes one or more computer instructions. When the computer program instructions are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to a computer, or a data storage device integrating one or more usable media, for example, a server or a data center. The usable medium may be a magnetic medium (for example, a floppy disk, a hard disk, or a magnetic tape), an optical medium (for example, a DVD), a semiconductor medium (for example, a solid state drive (SSD)), or the like.

Embodiment 4

Figure 60:
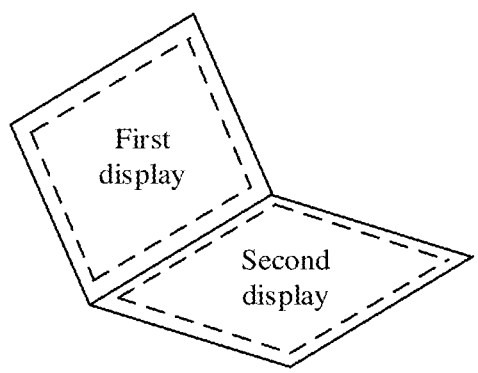
FIG. 60 shows a dual-screen electronic device according to an embodiment of the present invention.

This embodiment of the present invention may be applied to various smart multi-screen display terminals. For example, this embodiment of the present invention may be applied to a dual-screen electronic device. As shown in FIG. 60, the electronic device may be an electronic device having two displays. The two displays may be two separate displays, or may be two displays divided from a flexible folding screen or a curved screen. The electronic device may be an electronic device that works independently as a whole, for example, a personal notebook computer, or may be an electronic device formed by connecting two electronic devices that can work independently and work together, for example, a dual-screen electronic device formed by splicing two mobile phones or two tablet computers.

The dual-screen electronic device or the dual-screen electronic device formed by splicing two tablet computers usually includes a first display and a second display. The first display is mainly configured to provide an output function, that is, present currently running content, an executed operation, or the like to a user. Certainly, the first display may further have an input function. For example, the first display region may have a touchscreen function, performing an operation on a current application by using a touchscreen gesture. Compared with the first display, the second display is usually closer to a hand of the user, facilitating a user operation. Therefore, the second display mainly performs an input function, and may receive user input by using a touch display. On the touch display, the user input may also be received by using a virtual keyboard instead of a conventional mechanical keyboard. Certainly, the second display may also have an output function. For example, the second display may also be configured to present the currently running content, the executed operation, or the like to the user.

Figure 61:
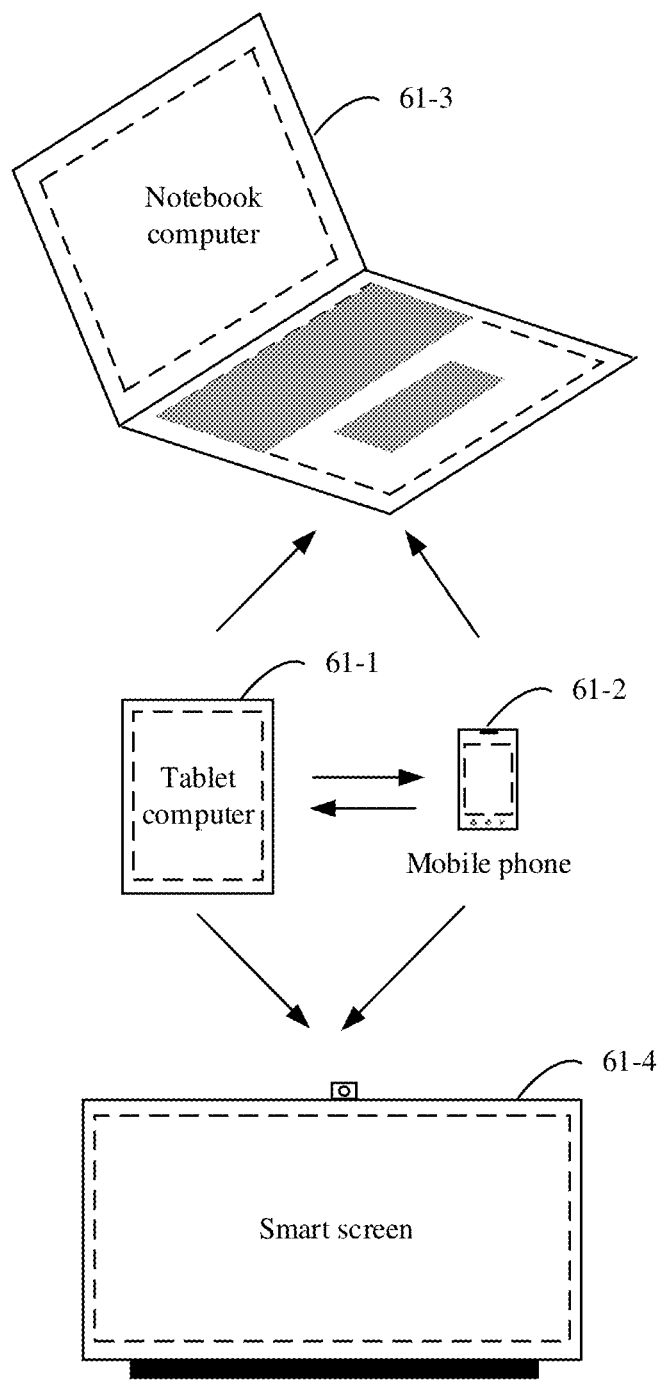
FIG. 61 shows an application scenario according to an embodiment of the present invention.

This embodiment of the present invention may be further used in a single-application dual-screen cross-device operation, where a display of a controlled device is mainly configured to present currently running content or an executed operation to the user, in other words, is mainly configured to implement the function of the first display. A function menu corresponding to a target application on the first display is moved to a display of a control device, in other words, is mainly configured to implement the function of the second display, to control an application on the controlled device. For example, as shown in FIG. 61, a tablet computer (61-1) or a mobile phone (61-2) may be used as a control terminal to remotely operate an application of a computer (61-3); the tablet computer (61-1) or the mobile phone (61-2) may be used as the control terminal to remotely operate an application of a smart screen (61-4); or the mobile phone and the tablet computer are interconnected, so that one is used as the control terminal to operate an application of the other one. Specifically, this embodiment of the present invention may be applied to a smart home scenario. For example, the controlled device may be a smart home device having a display, such as a television, a microwave oven, a refrigerator, or a washing machine, and the control device may be a mobile phone, a tablet computer, or a computer. This embodiment of the present invention may be further applied to the field of smart cockpits. For example, a mobile phone or a tablet computer is used as the control device to control a front-row vehicle head unit screen or a rear-row display, or to control the front-row vehicle head unit screen by using the rear-row display.

In the foregoing scenario, an interface of an application usually uses a fixed layout manner, and each interface is completely displayed on the first display. For example, a control key in the application is usually located in a function region menu on a top or a left side of the application. When the user needs to perform an operation on the control key in the application, regardless of a specific location of a current operation object of the user, the user needs to move a cursor to the function region menu to perform the operation, and then return to the current operation object. In one case, it may be difficult for the user to locate a specific control key in the function region menu of the application. In another case, after moving the cursor to the specific control key, it is difficult for the user to locate the current operation object again. In both cases, it is difficult for the user to perform an appropriate operation. In addition, in the foregoing operations, the user needs to control the cursor to continuously switch between the operation object and the function region menu. This causes a complex user operation and low operation efficiency.

Figure 62:
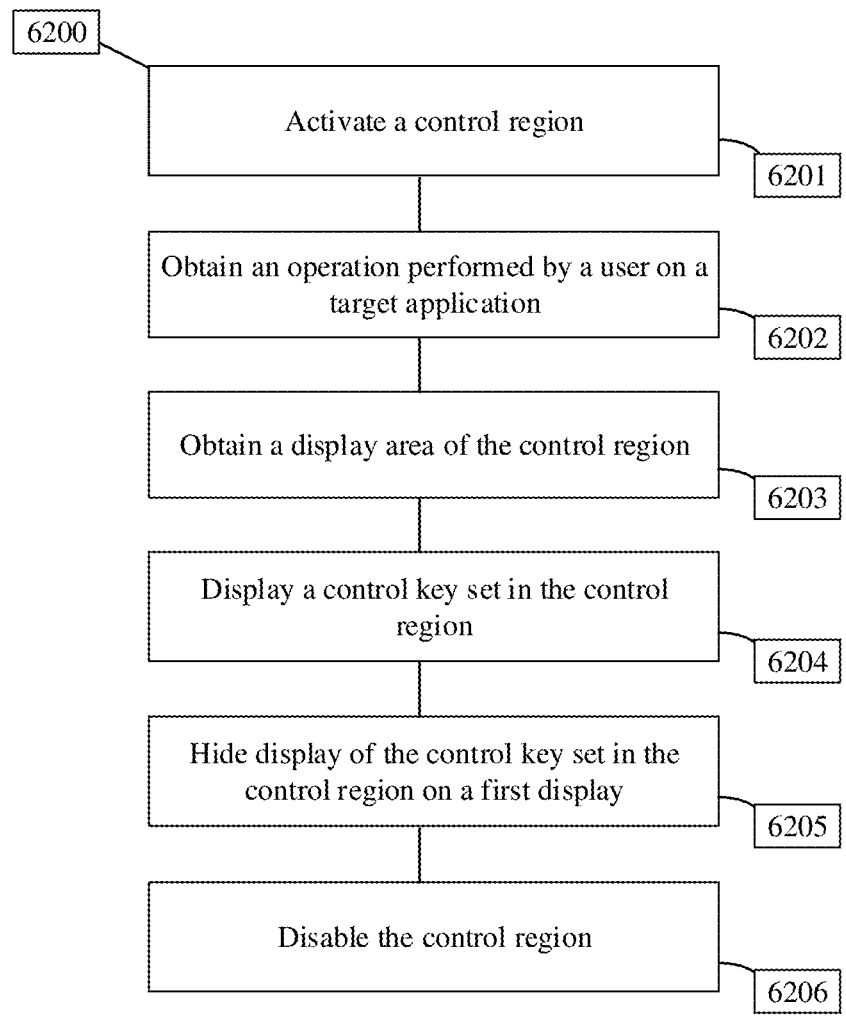
FIG. 62 shows a screen display method according to an embodiment of the present invention.

Refer to FIG. 62. An embodiment of the present invention provides a screen display method 6200. The screen display method 6200 is used to display a control region on the second display, so that a user can control the target application or an operating system on the first display by using the control region on the second display.

Figure 63A:
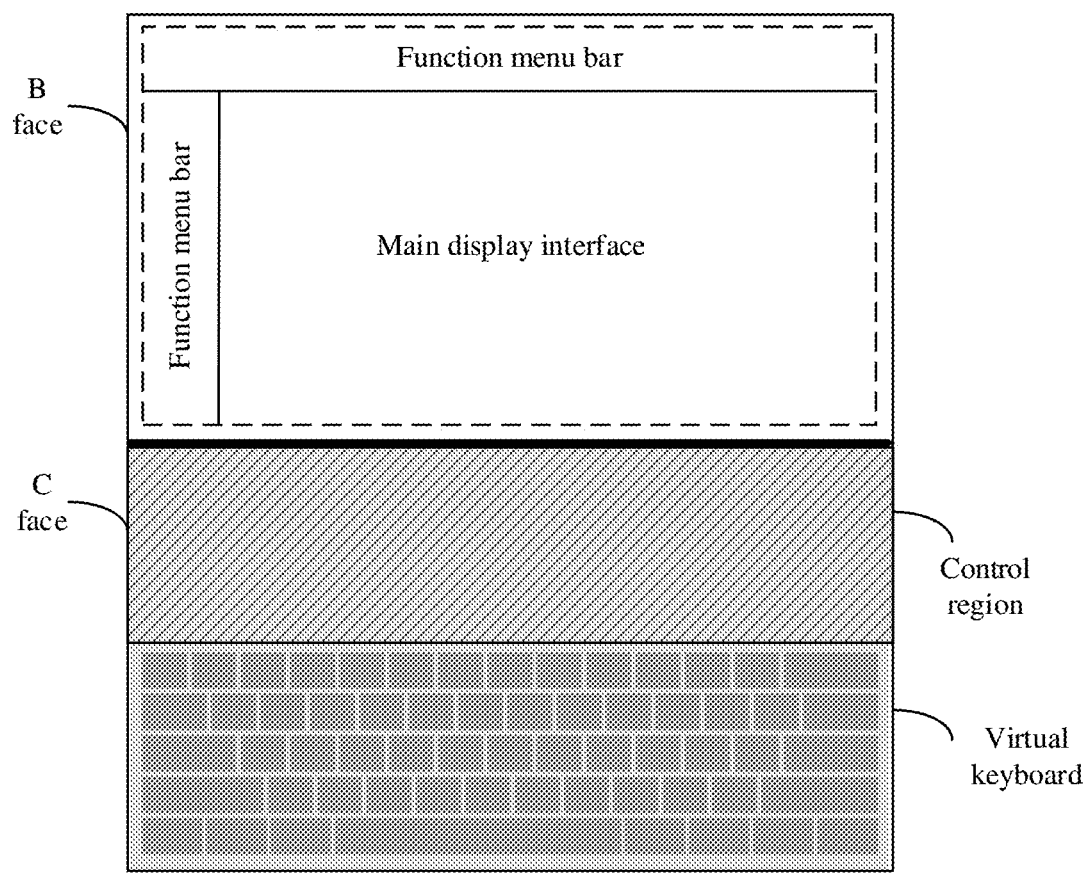
FIG. 63A shows a display manner of a control region according to an embodiment of the present invention.
Figure 63B:
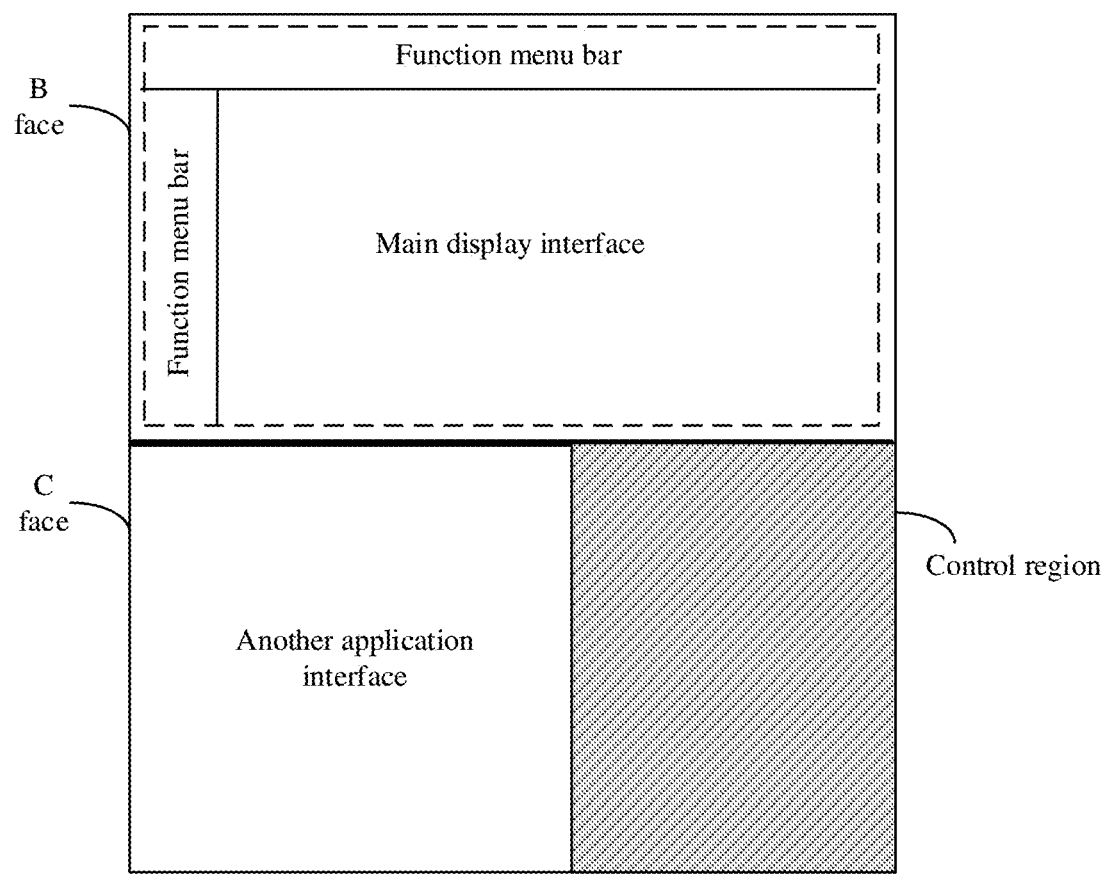
FIG. 63B shows another display manner of a control region according to an embodiment of the present invention.
Figure 63C:
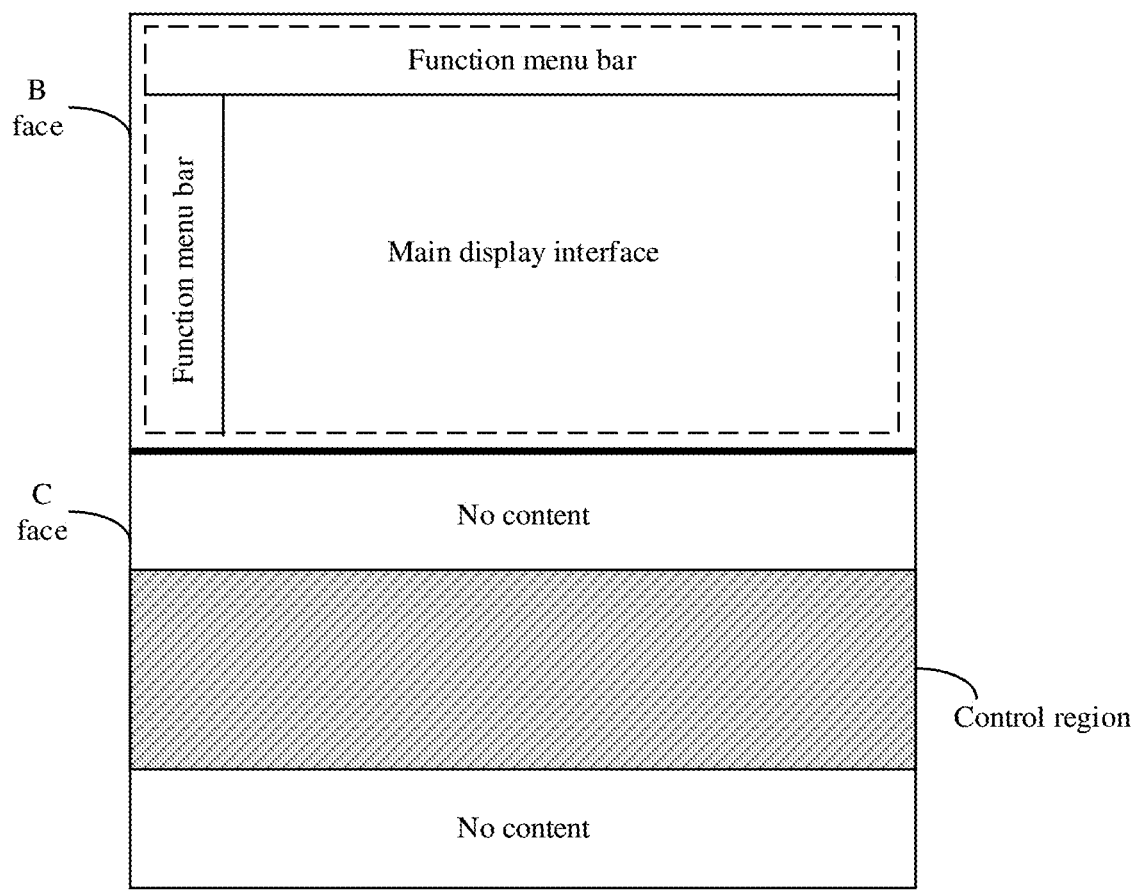
FIG. 63C shows another display manner of a control region according to an embodiment of the present invention.

When the method in this embodiment of the present invention is applied to a dual-screen display electronic device, for example, a dual-screen electronic device, a face B (a face usually set to a display) of the dual-screen electronic device may be used as the first display, and a face C (a face usually set to a keyboard) of the dual-screen electronic device may be used as the second display. In an embodiment, as shown in FIG. 63A, the face B may display a main display interface and a function menu bar of the target application operated by the user, and the face C may include a virtual keyboard and a control region. In another embodiment, as shown in FIG. 63B, the face B may display a main display interface and a function menu bar of the target application operated by the user, and the face C may include another application interface and a control region. In another embodiment, as shown in FIG. 63C, the face B may display a main display interface and a function menu bar of the target application operated by the user, and the face C may include only a control region. When the method in this embodiment of the present invention is applied to a single-application dual-screen cross-device operation, a display of a controlled device may correspond to a face B of a dual-screen electronic device, a display of a control device may correspond to a face C of the dual-screen electronic device. For display content of the displays of the controlled device and the control device, refer to FIG. 63A to FIG. 63C.

One application may usually include one main display interface and one or more function menu bars that include a control key corresponding to the application. The main display interface is usually used to display a current state of the application or an execution result of a user operation to the user. The control key in the function menu bar is usually used to receive user input and perform a specific operation on the target application. A text editing application is used as an example. A main display interface of the text editing application is an interface for displaying a currently edited document, and is usually an interface with a largest display area in the entire application. In addition, a function menu bar of the text editing application may include a function menu bar such as an editing menu bar (including control keys such as file, start, insert, design, and page layout) and a navigation menu bar, and is configured to receive an operation instruction of a user on the document. Usually, both the main display interface and the function menu bar of the application are displayed on the first display, and the user may operate the application on the first display only by using a mouse or a touchscreen gesture.

In this embodiment of the present invention, the control region is provided in the second display, and the control region may include a plurality of display regions. For example, in an embodiment, the control region may include a system control bar and an application control bar. The system control bar may include one or more functional modules. Each functional module includes a control key group related to an operating system. The application control bar may include one or more functional modules. Some functional modules may include a control key group corresponding to the target application. Some functional modules may include a shortcut operation control key group related to a current user operation. It should be understood that another display region setting and a functional module setting that help improve user operation efficiency are also possible. The control region is provided in the second display, so that the user can operate the target application or the system on the first display by using the control key on the second display. This provides a more convenient operation manner for the user and improves user operation efficiency.

Preferably, a location of the control region on the second display may be flexibly adjusted based on a user requirement. For example, the control region may be located at an upper end of the second display, and is located on an upper side of other display content (another application, the virtual keyboard, and the like) on the second display. Alternatively, the control region may be located at a lower end of the second display, and is located on a lower side of other display content (another application, the virtual keyboard, and the like) on the second display. Alternatively, the control region may be located on a left side or a right side of the second display. An initial display location of the control region may be customized by the system or the user. When the control region is displayed on the second display, the user may also flexibly move a location of the control region on the second display.

The screen display method 6200 may include the following operations.

Operation 6201: Activate the Control Region.

In an embodiment, in a general use state, the control region may be disabled. In this case, a main display module and some function menu bars of the target application may be displayed on the first display, and a control key in the function menu bar on the first display is operated in a general operation manner through a mouse operation or a touchscreen gesture, to implement an operation on the target application.

Figure 64A:
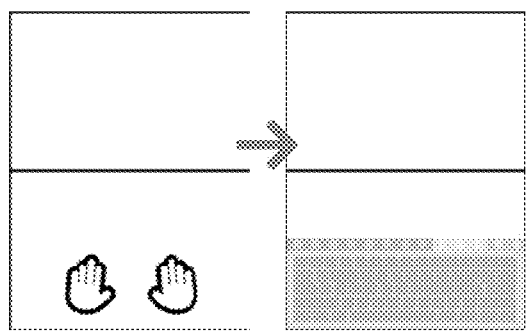
FIG. 64A shows a method for activating a control region according to an embodiment of the present invention.
Figure 64B:
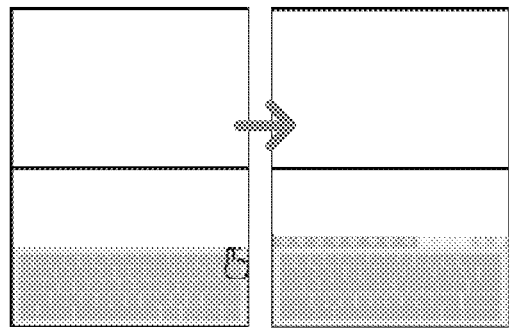
FIG. 64B shows another method for activating a control region according to an embodiment of the present invention.
Figure 64C:
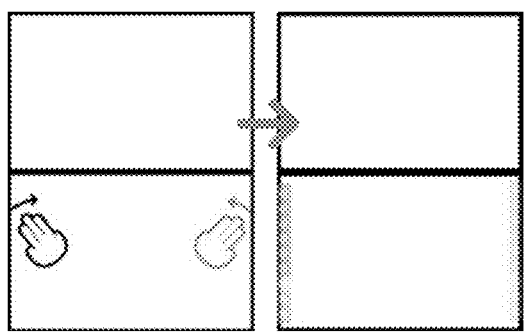
FIG. 64C shows another method for activating a control region according to an embodiment of the present invention.
Figure 64D:
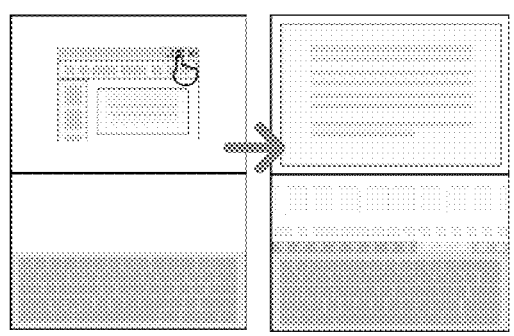
FIG. 64D shows another method for activating a control region according to an embodiment of the present invention.

When the user needs to enable the control region on the second display to more quickly use the control key in the target application on the first display, to improve operation efficiency, the user may activate the control region in a plurality of manners. In an embodiment, the control region may be related to the virtual keyboard, and the control region is enabled by default when the virtual keyboard is enabled. In this case, the virtual keyboard and the control region may be simultaneously activated by using an instruction for activating the virtual keyboard, as shown in FIG. 64A. In another embodiment, as shown in FIG. 64B, a control switch of the control region may be provided on the virtual keyboard. When the virtual keyboard is enabled but the control region is not enabled, the control region may be activated by using the control switch on the virtual keyboard. In another embodiment, as shown in FIG. 64C, the control region may be activated through gesture control, that is, a gesture for activating an auxiliary display region is stored in a storage module, and when the gesture performed by the user is detected, the control region is activated. The control gesture may be, for example, a finger slides inward from a side of the display. In another embodiment, whether the control region is enabled may be related to a display mode of the application. When a full-screen mode of the application is enabled, some display modules of the application are usually hidden. Therefore, the control region may be activated when the full-screen mode of the application is enabled, to further display content of the display modules, as shown in FIG. 64D. It should be understood that the foregoing operation manner of activating the control region is only an example, and another operation manner of activating the control region is also possible.

The control region is disabled in a general use state, and is activated by performing a simple operation when needed. This can simplify a user operation interface when the control region is not needed, and avoid interference of the control region with a general use state.

In another embodiment, the control region may be enabled by default after the electronic device is started. In this way, the user does not need to activate the control region by performing operation 6201. Therefore, operation 6201 is an optional operation of the screen display method 6200.

Operation 6202: Obtain an Operation Performed by the User on the Target Application.

In this embodiment of the present invention, display content in the control region is determined based on the operation performed by the user on the target application. In an embodiment, the operation performed by the user on the target application is displaying an operation interface of the target application on the first display. For example, before the user performs the operation, the target application may be disabled, and the user displays the operation interface of the target application on the first display by starting the target application. Alternatively, before the user performs the operation, the target application may be in a background running state, and the user displays the operation interface of the target application on the first display through a switching operation. When the operation performed by the user on the target application is displaying the operation interface of the target application on the first display, the control key corresponding to the target application may be displayed in the application control bar. After the operation interface of the target application is displayed on the first display, the first display may display only the operation interface of the target application, or may jointly display operation interfaces of a plurality of applications including the target application, for example, display in a dual-screen or multi-screen operation mode.

Optionally, in an embodiment, the application developer may provide the priority sequence of the functional modules and the priority sequence of the control keys of the application, and then the system may determine, based on an actual situation (the display area of the control region, and the like), the specific functional module and control key to be displayed in the application control bar corresponding to the application in the control region, and determine the layout manner of the application control bar.

In this embodiment, information that is about the target application and that is obtained by the system from the application may include each functional module of the target application, the control key included in each functional module, the priority sequence of the functional modules, and the priority sequence of different control keys in each functional module. The following separately describes the various information about the target application.

(1) Functional Module and Control Key

One application usually includes one main display module and a plurality of function menu bars, to control content in the main display module. The functional module in the control region may correspond to the function menu bar of the target application. A slide editing application is used as an example. T slide editing application may include a main display interface, a functional module 1, a functional module 2, a functional module 3, and the like. The main display interface displays a slide interface that is currently being edited by the user. The functional module 1 includes a common control key set for editing the slide interface. The functional module 2 is used to display all slides for the user to browse. The functional module 3 includes a control key set for a shortcut operation. It should be understood that, different applications implement different functions, and therefore a functional module setting and a control key setting in functional modules of the different applications may be different.

(2) Priority of the Functional Module

The priority of the functional module indicates an importance degree of each functional module in a use process of the user, and may be usually determined based on an indicator such as an importance degree of a function of each functional module, and a use frequency of the user. For example, priorities of the functional modules of the slide editing application may be defined as follows: a priority of a functional module 1>a priority of a functional module 2>a priority of a functional module 3. It should be understood that the foregoing definition of the priorities of the functional modules of the slide editing application is only an example. Another possible definition manner that meets a use habit of the user is also possible.

Optionally, in an embodiment, one or more mandatory functional modules may be defined for the application. The mandatory functional module is a functional module that is fixedly displayed in an enabled control region and that corresponds to the application. In addition, one or more preferred functional modules may further be defined for the target application. The preferred functional module is a functional module that can be preferentially displayed after all mandatory functional modules of the application are displayed in the control region. A priority sequence of each functional module of the target application may be set as follows: A mandatory functional module has a highest priority, a preferred functional module has a second highest priority, and another functional module has a third highest priority.

(3) Priority of the Control Key in the Functional Module

The priority of the control key indicates an importance degree of each control key in the use process of the user, and may be usually determined based on an indicator such as an importance degree of a control function of each control key and a use frequency of the user. A control key for editing text is used as an example. In an embodiment, priorities of control keys such as copy, paste, cut, font, paragraph, definition, synonym, and translation may be defined as follows: Copy and paste have highest priorities, cut has a lower priority than priorities of copy and paste, font and paragraph have lower priorities than the priority of cut, and definition, synonym, and translation have lower priorities than the priorities of font and paragraph. It should be understood that the foregoing priority definition is only a possible embodiment. Another manner of defining a priority of the function key in the application that conforms to the use habit of the user or that is commonly used is also possible.

In an embodiment, one or more mandatory control keys may be defined for each functional module. The mandatory control key is a control key that is regularly displayed when a corresponding functional module is displayed in the control region. In addition, one or more preferred control keys may be defined for each functional module. The preferred control key is a control key that may be preferentially displayed after all control keys in a corresponding functional module are displayed in the control region. A priority sequence of different control keys in a same functional module may be set as follows: A mandatory control key has a highest priority, a preferred control key has a second highest priority, and another control key has a third highest priority.

Optionally, in another embodiment, the application developer may directly define display content of the application control bar of different display areas, including the functional module and the control key in the application control bar, and the layout manner of the application control bar. For example, the application developer sets a display manner 1 of the application control bar for a display area 1, a display manner 2 of the application control bar for a display area 2, and a display manner 3 of the application control bar for a display area 3. The display area 1, the display area 2, and the display area 3 may not specifically mean a specific size, and may be a range. In this case, the system may select a corresponding display manner of the application control bar based on the display area of the application control bar.

In this embodiment, information about the target application obtained by the system from the application may include display manners of the application control bar of different display areas, and specifically include a specific functional module included in each display manner of the application control bar, a specific control key included in each functional module, and the layout manner of the application control bar. The display manner of the application control bar displayed in the control region may be completely the same as the display manner provided by the application.

Optionally, in another embodiment, the system may identify each functional module of the application and a control key in the functional module by using a text or image recognition technology. The system sets a priority sequence for each functional module and the control key of the application based on a use frequency or an importance degree of a user. Then, the system determines, based on the set priority sequence, a specific functional module and control key to be displayed in the application control bar, and determines a specific layout manner. In this embodiment, the system may not obtain additional information from the application.

It should be understood that, in the foregoing three embodiments, an interaction manner between the application and the system is only an example. Another feasible interaction manner or a new embodiment emerging with technology development is also possible.

In another embodiment, the operation performed by the user on the target application is an operation on the operation interface of the target application, for example, selecting specific content on the operation interface of the target application, or placing a cursor at a specific location on the operation interface of the target application. When the operation performed by the user on the target application is the operation on the operation interface of the target application, a shortcut control key related to the operation may be displayed in the application control bar.

The operation performed by the user on the operation interface of the target application includes any possible operation performed by the user when the user performs a specific function through the target application. In an embodiment, the operation performed by the user on the target application may be selecting a specific object on the operation interface, for example, selecting specific text, a symbol, a picture, a table, audio, or a video. The user may select the specific object in a plurality of manners such as a touchscreen gesture or a mouse operation. For example, the user may move the cursor to the specific object through the touchscreen gesture or the mouse operation, and may select the specific object (shading of the specific object is deepened) through the touchscreen gesture or the mouse operation. In another embodiment, the operation performed by the user on the operation interface of the target application may be a unique gesture or a mouse operation in a unique manner, for example, performing a slide gesture or scrolling a scroll wheel of the mouse to scroll content in the target region, to browse the content in the target region. It should be understood that the foregoing operations are only examples, and another operation that may be performed by the user on the target application in a process of using the electronic device is possible.

Figure 65A:
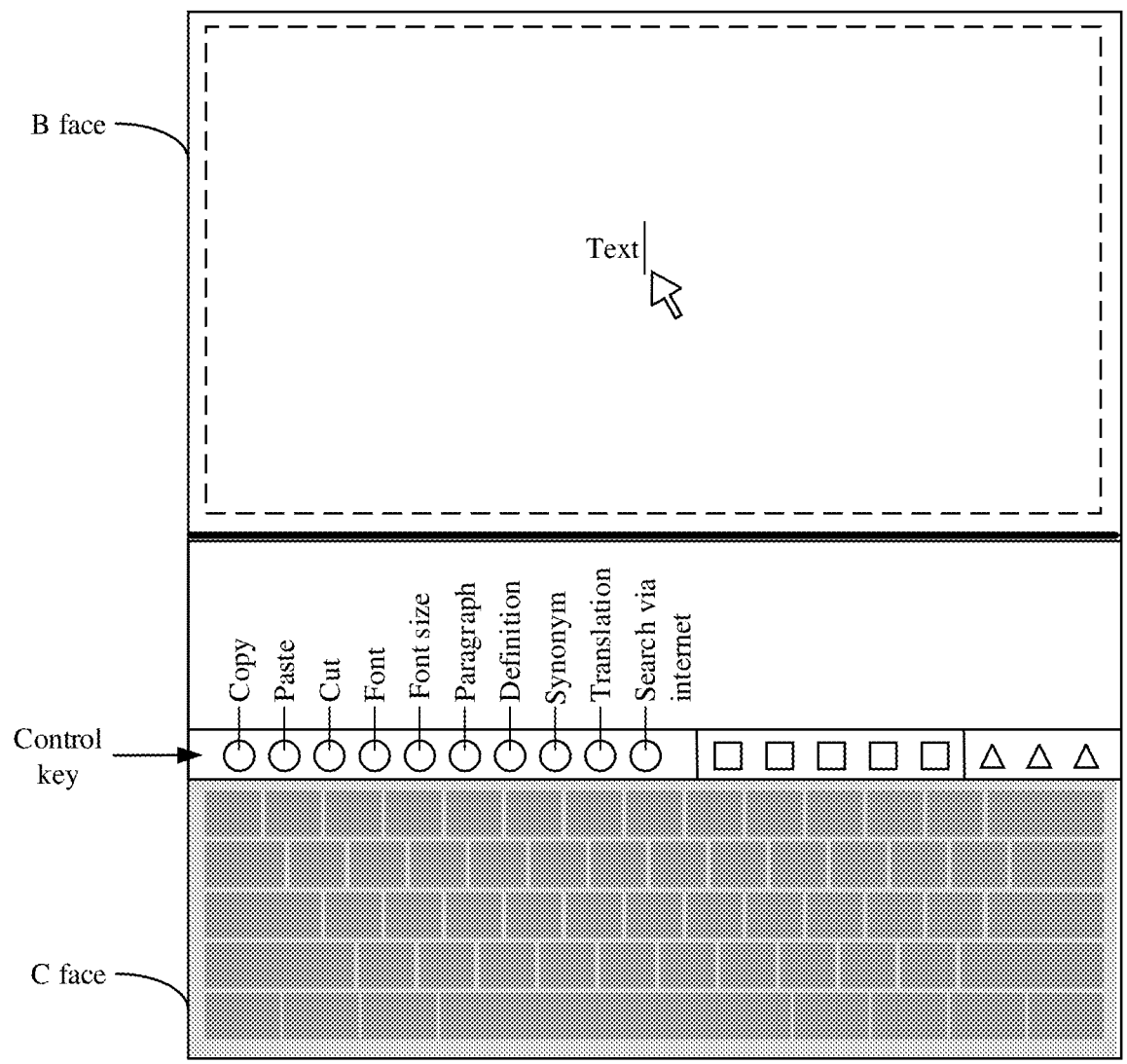
FIG. 65A shows a correspondence manner between a user operation and a control key group according to an embodiment of the present invention.
Figure 65B:
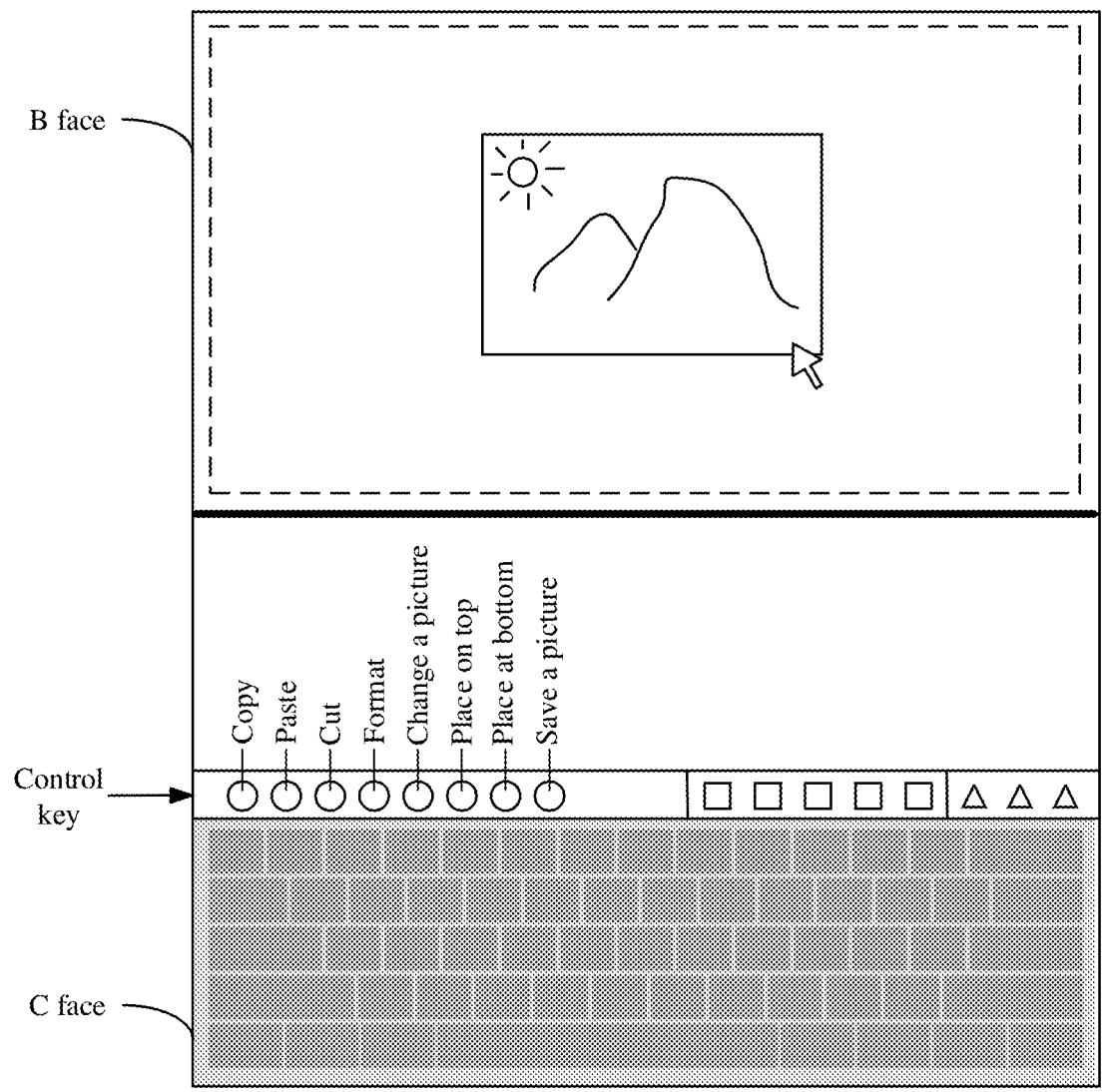
FIG. 65B shows another correspondence manner between a user operation and a control key group according to an embodiment of the present invention.
Figure 65C:
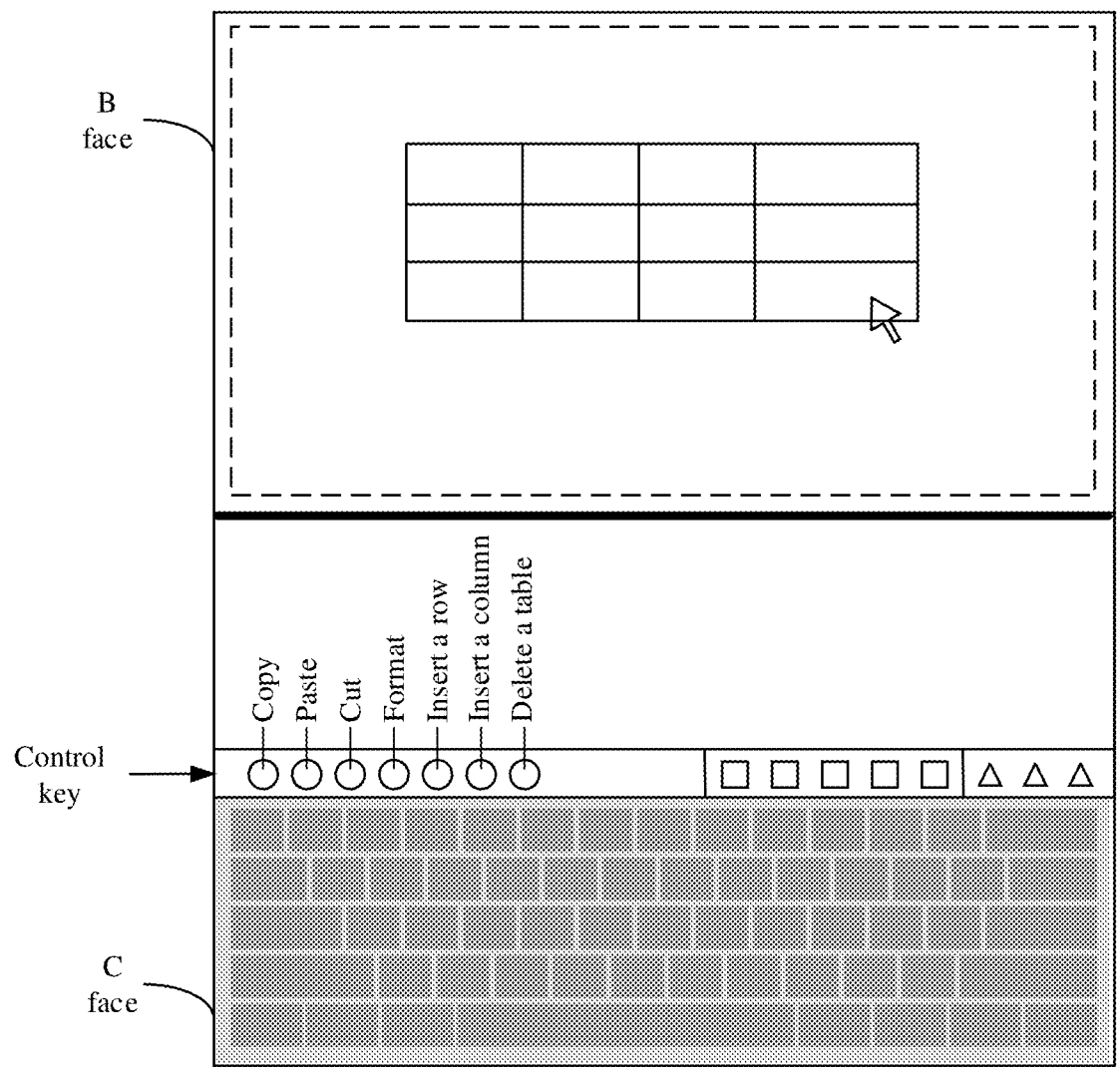
FIG. 65C shows another correspondence manner between a user operation and a control key group according to an embodiment of the present invention.
Figure 65D:
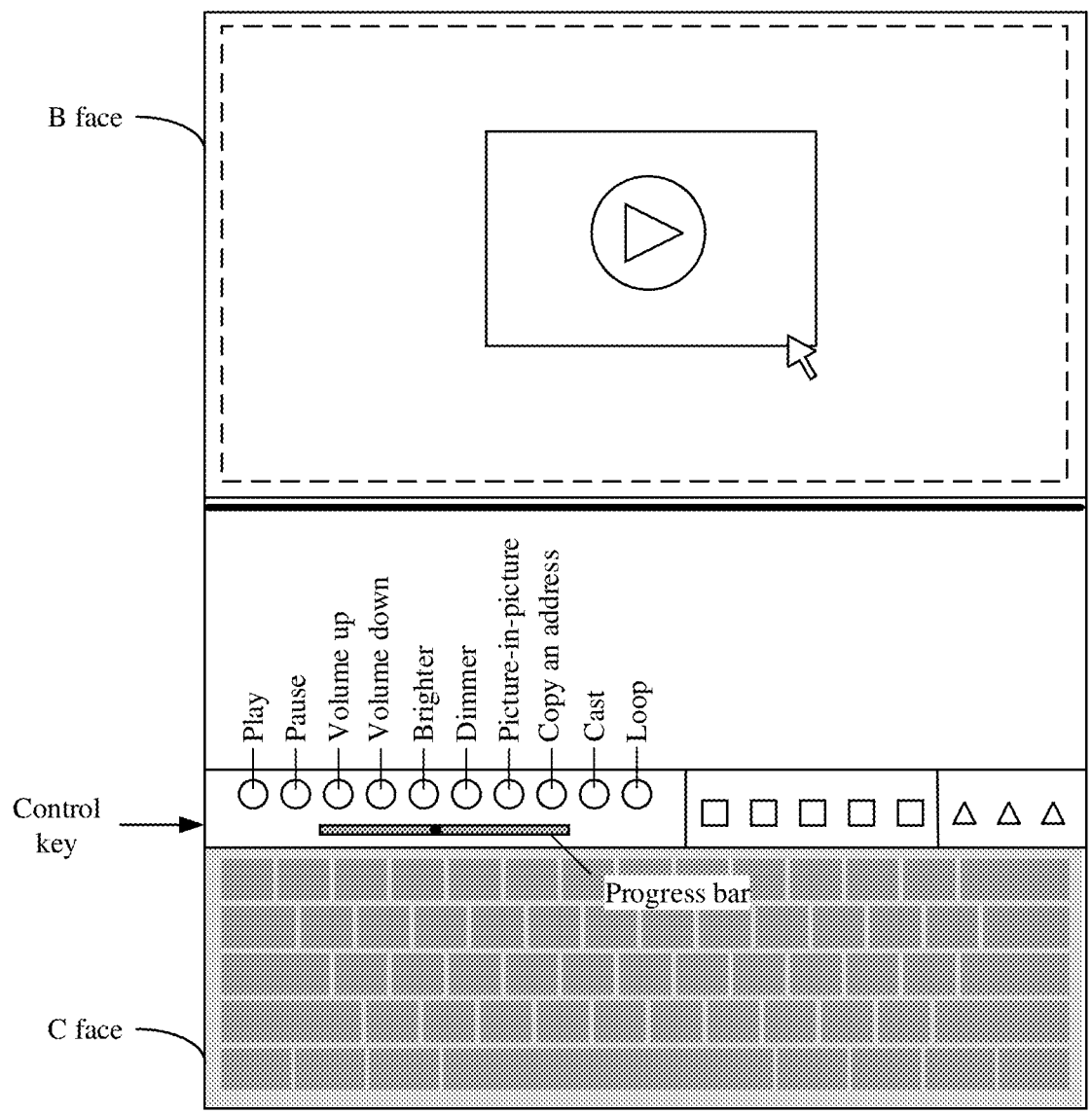
FIG. 65D shows another correspondence manner between a user operation and a control key group according to an embodiment of the present invention.
Figure 65E:
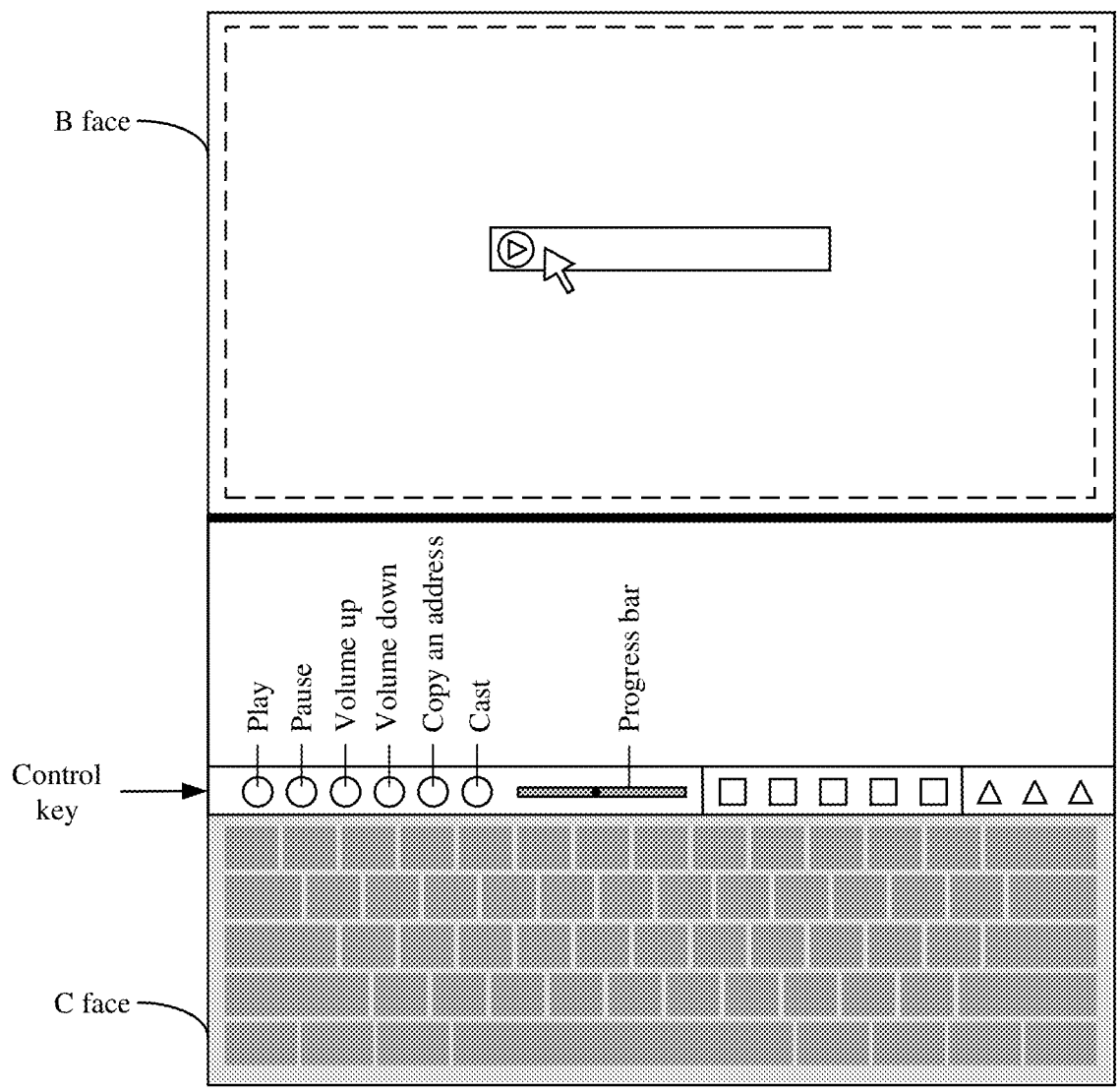
FIG. 65E shows another correspondence manner between a user operation and a control key group according to an embodiment of the present invention.
Figure 65F:
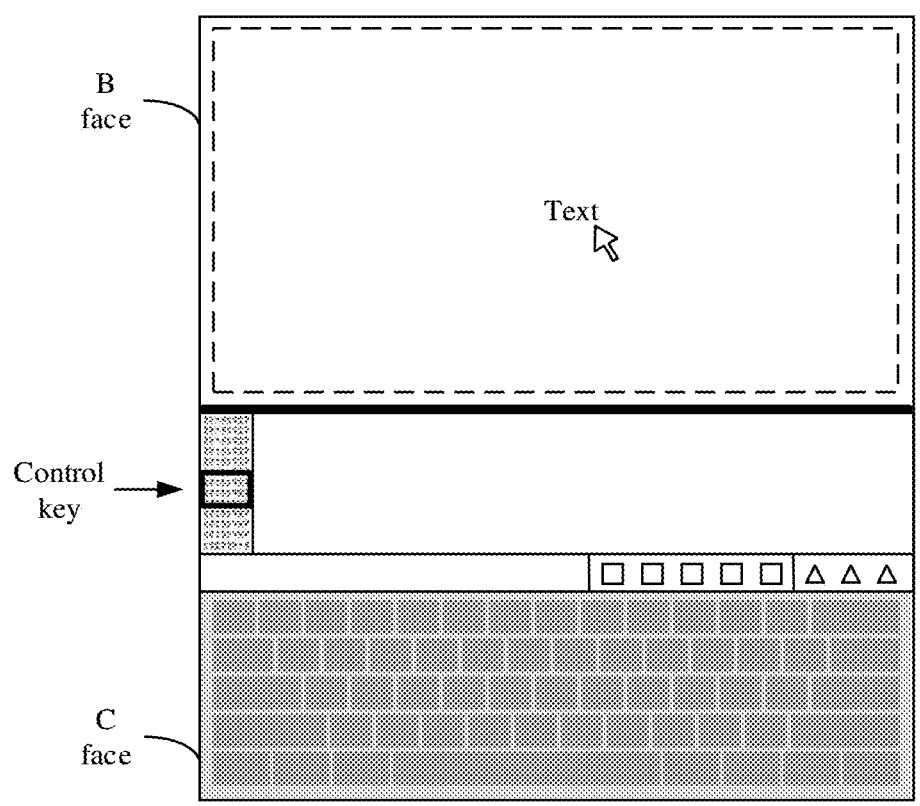
FIG. 65F shows another correspondence manner between a user operation and a control key group according to an embodiment of the present invention.

Different operations performed by the user on the operation interface of the target application may correspond to different control key groups. Control keys in the control key group may be a shortcut operation key set related to a specific operation. As shown in FIG. 65A, in an embodiment, the specific operation performed by the user on the target application may be selecting specific text content, for example, placing the cursor on the text content. A control key group corresponding to the specific operation may include a control key set such as copy, paste, cut, font, font size, paragraph, definition, synonym, translation, and search via internet. As shown in FIG. 65B, in an embodiment, the specific operation performed by the user on the target application may be selecting specific picture content. A control key group corresponding to the specific operation may include a control key set such as copy, paste, cut, set a picture format, change a picture, place on top, place on bottom, and save a picture. As shown in FIG. 65C, in an embodiment, the specific operation performed by the user on the target application may be selecting specific table content. A control key group corresponding to the specific operation may include a control key set such as copy, paste, cut, format, insert a row, insert a column, and delete a table. As shown in FIG. 65D, in an embodiment, the specific operation performed by the user on the target application may be selecting specific video content. A control key group corresponding to the specific operation may include a control key set such as play, pause, volume up, volume down, brighter, dimmer, picture-in-picture, copy a video address, cast, loop, and a progress bar. As shown in FIG. 65E, in an embodiment, the specific operation performed by the user on the target application may be selecting specific audio content. A control key group corresponding to the specific operation may include a control key set such as play, pause, next, volume up, volume down, copy an audio address, loop, and a progress bar. As shown in FIG. 65F, in an embodiment, the specific operation performed by the user on the target application may be browsing content in the target region through the slide gesture or scrolling the scroll wheel of the mouse. A control key group corresponding to the specific operation may include a thumbnail of the target region, a locating box for quickly locating target content in the thumbnail, and the like.

Optionally, in an embodiment, the system may define different control key sets for different user operations. The different shortcut operation control key groups are displayed for the different user operations on the target application. This can meet a user requirement, provide a more convenient operation for the user, and improve user operation efficiency. In another embodiment, the control key set may also be defined as a control key set displayed by right-clicking a current mouse location. A simple design in which the control key set is defined as the control key set displayed by right-clicking can avoid secondary development of the developer, reduce a burden of the developer, and shorten a development cycle.

Operation 6203: Obtain the Display Area of the Control Region.

Operation 6203 is an optional operation. When the display area of the control region is fixed, the display area of the control region does not need to be obtained, and operation 6204 may be directly performed. When the display area of the control region can be flexibly adjusted, operation 6203 may be performed.

Optionally, in an embodiment, the display area of the control region may be flexibly adjusted. Optionally, each time the control region is enabled, an initial display area of the control region may be different. For example, different applications may correspond to different initial display areas. In an embodiment, the initial display area of the control region may be defined by the system. The system may define initial display areas of different control regions for different applications. In another embodiment, the initial display area of the control region may be customized by the user, and the user may define initial display areas of different control regions for different applications. In another embodiment, the initial display area of the control region may be, by default, a display area of a control region enabled when the application is used last time. It should be understood that another possible manner of defining the initial display area of the control region that is commonly used in the art is also possible.

The display area of the control region is flexibly set, so that the functional module and the control key group displayed in the control region can better conform to a user habit, provide a more convenient operation for the user, and improve user operation efficiency.

Figure 66A:
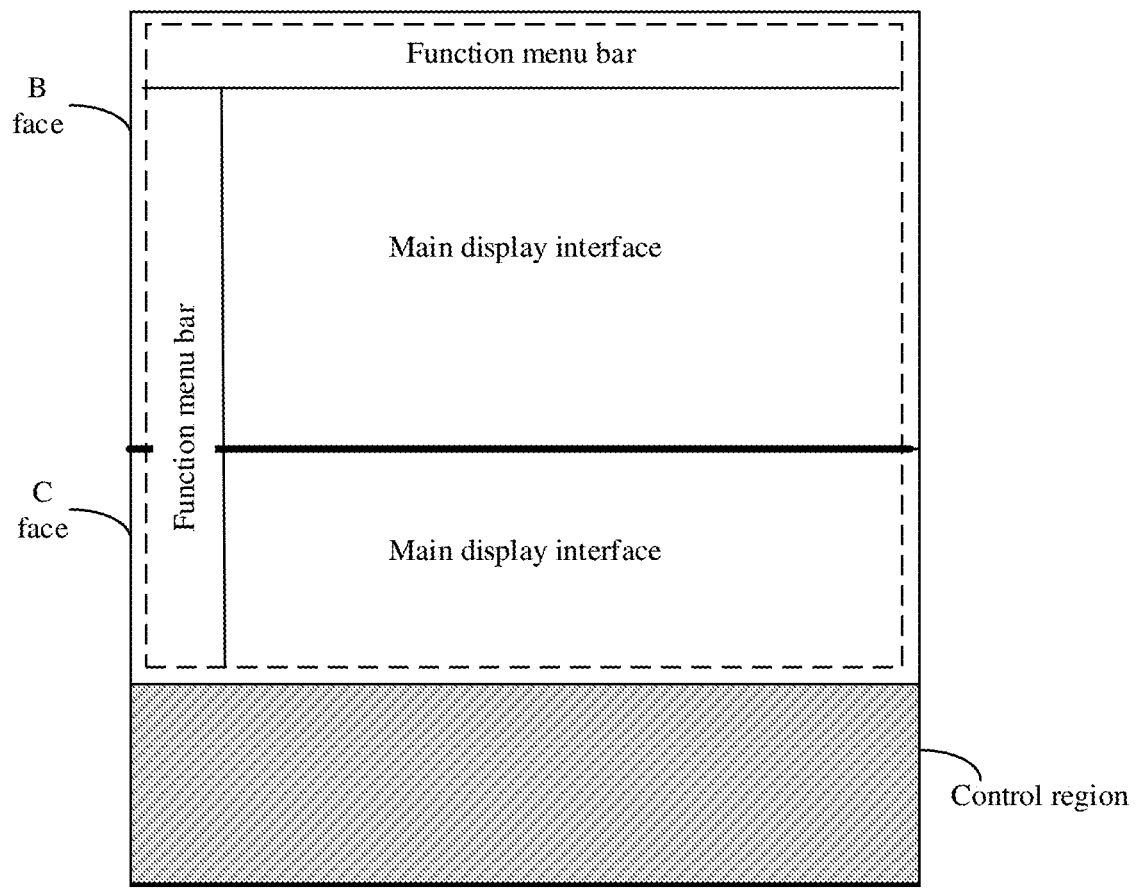
FIG. 66A shows a display manner of a control region according to an embodiment of the present invention.
Figure 66B:
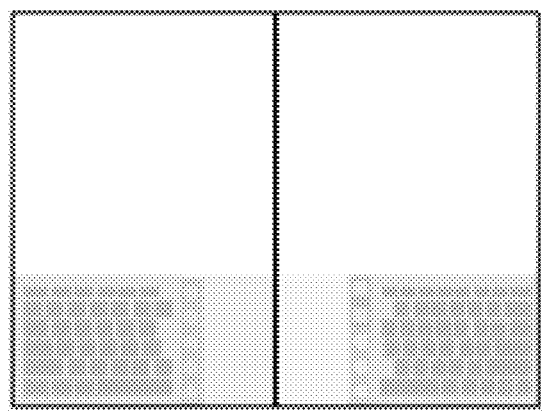
FIG. 66B shows another display manner of a control region according to an embodiment of the present invention.

A location and a layout manner of the control region may be flexibly provided based on a requirement. Optionally, as shown in FIG. 63A, in an embodiment, the control region may be disposed above the virtual keyboard or another application interface on the second display. As shown in FIG. 63B, in another embodiment, the control region may be displayed on a left side or a right side of the second display. As shown in FIG. 63C, in another embodiment, the control region may be displayed in the middle of the second display. As shown in FIG. 66A, in another embodiment, when the virtual keyboard or another application is not enabled on the second display, the target application on the first display may occupy a part of a display area of the second display. Correspondingly, the control region may be located at a bottom of the second display. As shown in FIG. 66B, in another embodiment, two displays of the dual-screen electronic device may be placed left and right. In this case, the virtual keyboard may be designed in a separate manner, and is located at lower ends of the two displays. Correspondingly, the application display region may be disposed in the middle of the separated keyboard.

Operation 6204: Display the Control Key Group in the Control Region.

In operation 6204, comprehensively considering the information obtained in the foregoing one or more operations, the functional module and the control key group included in the control region are determined, and are displayed in the control region.

Figure 67:
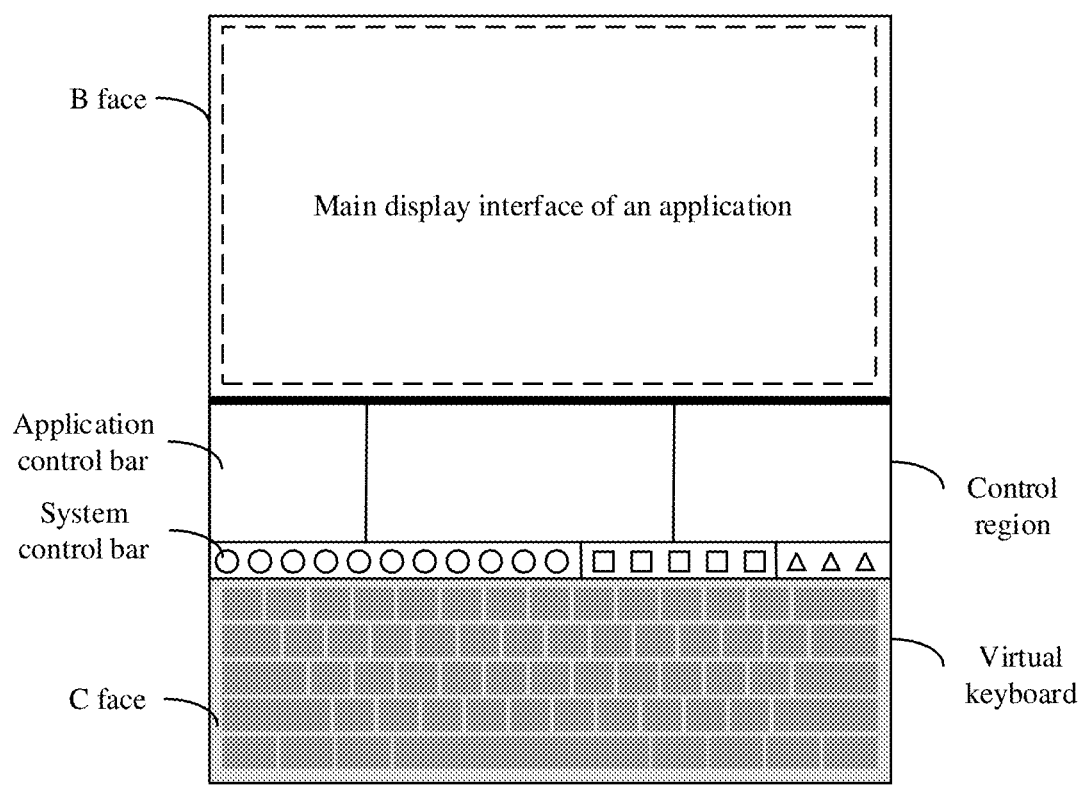
FIG. 67 shows a layout manner of display content of a control region according to an embodiment of the present invention.

Optionally, as shown in FIG. 67, in an embodiment, the control region may include the following regions:

(1) System Control Bar

The system control bar is mainly used to display a control key set related to system control, and optionally, may include a system control functional module and a dock functional module. The system control functional module may include a control key group used to execute an operating system. For example, the system control functional module may include a control key set such as adjust volume, adjust brightness, query weather, view time, view a calendar, view an alarm, and view a system notification. The dock functional module may include a control key group used to switch between a plurality of task programs in the system. For example, the dock functional module may include a control key such as a currently running program list, a frequently used/favorite application list, a recently used application list, or a desktop application list. Optionally, the control key set related to the system operation in the system control bar may be a relatively fixed control key set that is set by the system. Alternatively, the user may adjust, based on the use habit, the control key set in the system control bar that is set by the system.

(2) Application Control Bar

The application control bar is mainly used to display the control key group corresponding to the target application. The application control bar may include one or more functional modules corresponding to the target application and/or a shortcut operation functional module related to the operation performed by the user on the target application.

In an embodiment, when the operation performed by the user on the target application is displaying the operation interface of the target application on the first display, the control key group corresponding to the target application may be displayed in the control region. As described in operation 302, optionally, in an embodiment, the application developer may provide the priority sequence of the functional modules and the priority sequence of the control keys of the application, and then the system may determine, based on an actual situation (the display area of the control region, and the like), the specific functional module and control key to be displayed in the application control bar corresponding to the application in the control region, and determine the layout manner of the application control bar.

Preferably, when the display area of the control region is the smallest, the control key set of the target application may include the mandatory functional module of the target application and the mandatory control key in the mandatory functional module.

Figure 68:
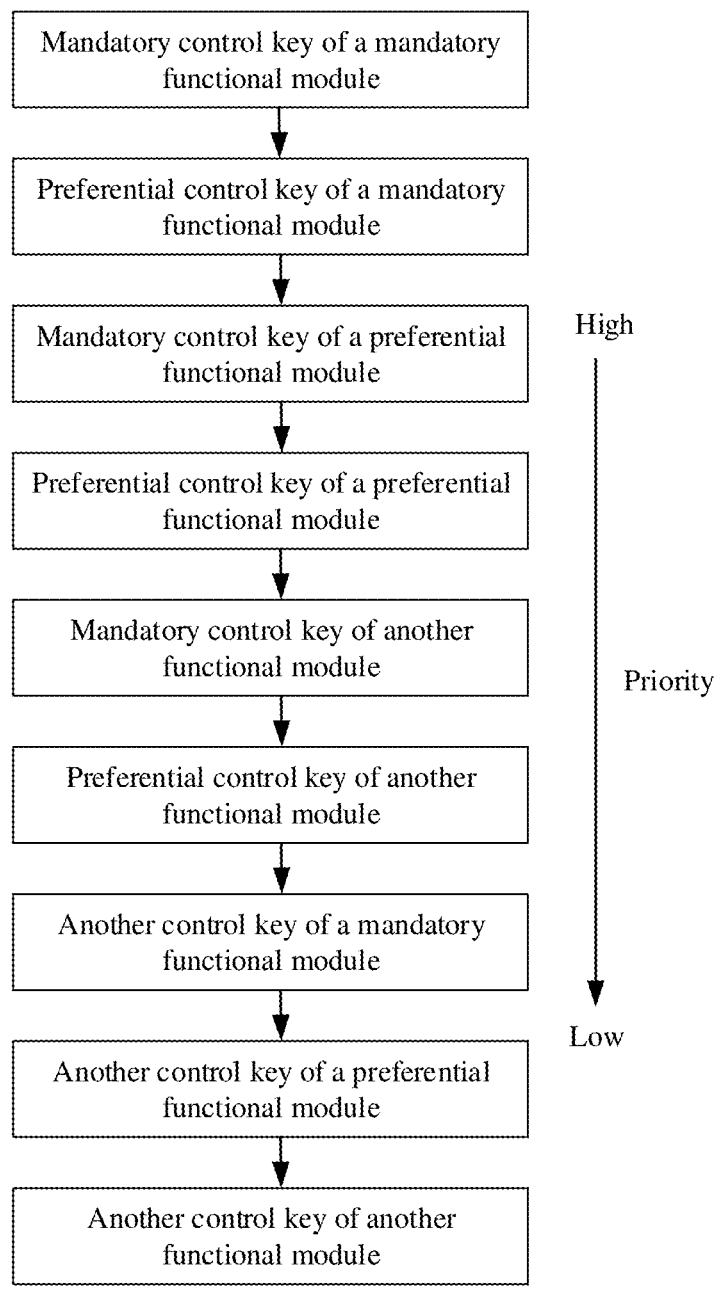
FIG. 68 shows a priority setting manner according to an embodiment of the present invention.

Preferably, when the display area of the control region is greater than a minimum display area, in an embodiment, control keys in the control key set of the target application may be added based on an overall priority sequence shown in FIG. 68 by comprehensively considering the priority sequence of the functional modules and the priority sequence of the control keys of the target application. Specifically, a priority of a mandatory control key in a mandatory functional module>a priority of a preferred control key in the mandatory functional module>a priority of a mandatory control key in a preferred functional module>a priority of a preferred control key in the preferred functional module>a priority of a mandatory control key in another functional module>a priority of a preferred control key in the another functional module>a priority of another control key in the mandatory functional module>a priority of another control key in the preferred functional module>a priority of another control key in the another functional module. Therefore, in a process of gradually increasing the initial display area of the control region, the mandatory control key in the mandatory functional module is first added to the control key set of the target application, the preferred control key in the mandatory functional module is added to the control key set of the target application, the mandatory control key in the preferred functional module is added to the control key set of the target application, the preferred control key in the preferred functional module is added to the control key set of the target application, the mandatory control key in the another functional module is added to the control key set of the target application, the another control key in the mandatory functional module is added to the control key set of the target application, the another control key in the preferred functional module is added to the control key set of the target application, and then the another control key in the another functional module is added to the control key set of the target application. Specifically, in a process of determining a specific type of control key in a specific type of functional module, the control key is added for displaying based on a priority sequence of each specific control key.

Figure 69:
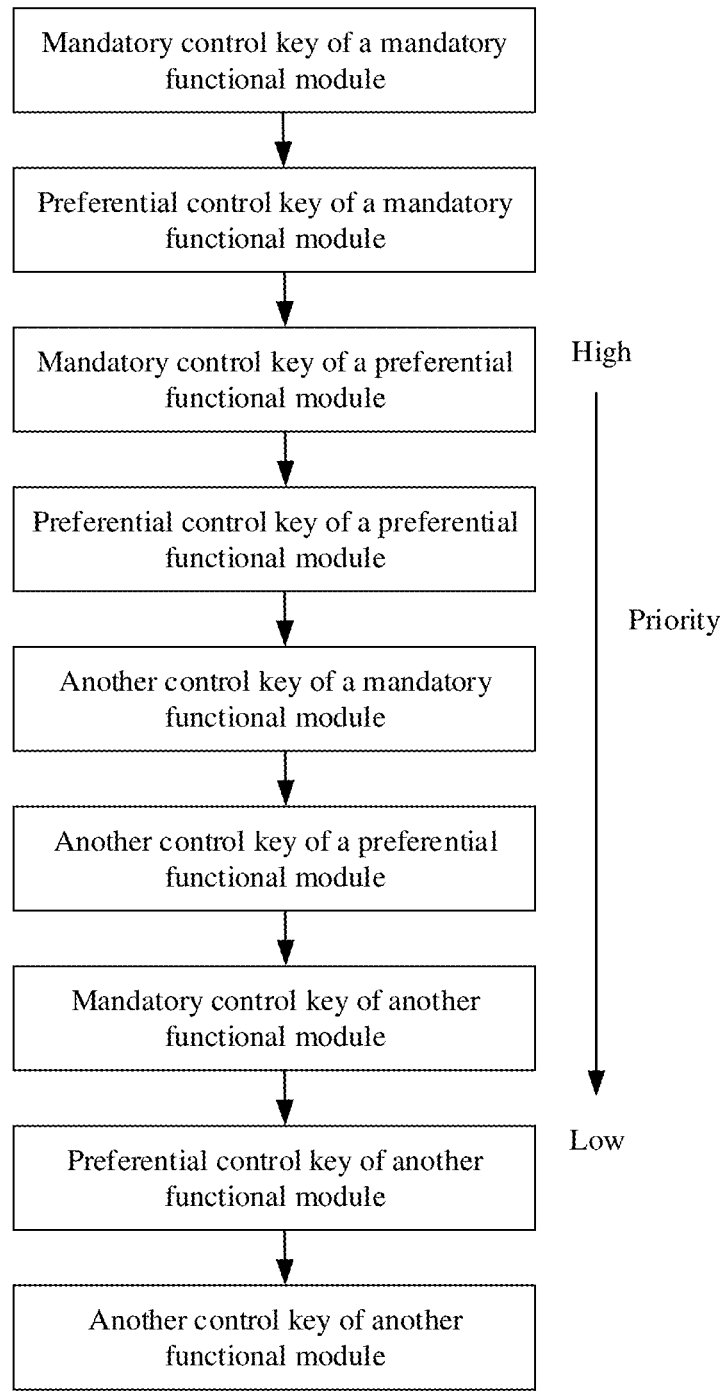
FIG. 69 shows another priority setting manner according to an embodiment of the present invention.

Preferably, when the display area of the control region is greater than a minimum display area, in another embodiment, control keys in the control key set of the target application may be added based on the priority sequence shown in FIG. 69 by comprehensively considering the priority sequence of the functional modules and the priority sequence of the control keys of the target application. Specifically, a priority of a mandatory control key in a mandatory functional module>a priority of a preferred control key in the mandatory functional module>a priority of a mandatory control key in a preferred functional module>a priority of a preferred control key in the preferred functional module>a priority of a mandatory control key in another functional module>a priority of another control key in the mandatory functional module>a priority of another control key in the preferred functional module>a priority of a mandatory control key in another functional module>a priority of a preferred control key in the another functional module>a priority of another control key in the another functional module. Therefore, in a process of gradually increasing the initial display area of the control region, the mandatory control key in the mandatory functional module is first added to the control key set of the target application, the preferred control key in the mandatory functional module is added to the control key set of the target application, the mandatory control key in the preferred functional module is added to the control key set of the target application, the preferred control key in the preferred functional module is added to the control key set of the target application, the another control key in the mandatory functional module is added to the control key set of the target application, the another control key in the preferred functional module is added to the control key set of the target application, the mandatory control key in the another functional module is added to the control key set of the target application, the control key in the another functional module is added to the control key set of the target application, and then the another control key in the another functional module is added to the control key set of the target application. Specifically, in a process of determining a specific type of control key in a specific type of functional module, the control key is added for displaying based on a priority sequence of each specific control key.

It should be understood that the foregoing two priority sequences are only examples, and another priority definition manner that meets the use habit of the user is also possible.

As described in operation 6202, optionally, in another embodiment, the application developer may directly define display content of the application control bar of different display areas, including the functional module and the control key in the application control bar, and the layout manner of the application control bar. The system selects, based on the display area of the application control bar, a specific display manner of the application control bar corresponding to the application. Optionally, in another embodiment, the system may identify each functional module of the application and a control key in the functional module by using a text or image recognition technology. The system sets a priority sequence for each functional module and the control key. Then, the system determines, based on the set priority sequence, a specific functional module and control key to be displayed in the application control bar, and determines a specific layout manner.

Optionally, the application control bar may include a shortcut operation functional module related to a current operation performed by the user on the target application. The shortcut operation functional module mainly includes a shortcut operation control key group related to the current operation performed by the user on the target application, for example, a control key set corresponding to different user operations described in operation 6203. In an embodiment, a shortcut operation control key related to the user operation may be defined by the application developer. That is, the application developer sets a corresponding shortcut operation control key set based on different operations performed by the user on the target application. In this embodiment, a same user operation may correspond to a different shortcut operation control key set in a different application. In another embodiment, a control key related to the user operation may be defined by the system. That is, the system sets a shortcut operation control key set corresponding to different operations of the user. In this embodiment, a same user operation may correspond to a same shortcut operation control key set in a different application.

In another embodiment, when the operation performed by the user on the target application is the operation on the operation interface of the target application, a shortcut control key group related to the user operation may be displayed in the control region. Optionally, in an embodiment, only the control key group related to the operation performed by the user on the operation interface of the target application may be displayed in the application control bar. In other words, an initial control key group that is originally displayed in the application control bar and that corresponds to the target application is replaced with the control key group related to the operation performed by the user on the operation interface of the target application. In another embodiment, both the initial control key group corresponding to the target application and the control key group related to the operation performed by the user on the operation interface of the target application may be displayed in the application control bar. In other words, the control key group related to the operation performed by the user on the operation interface of the target application is added based on the initial control key group corresponding to the target application.

When specific shortcut control keys corresponding to the user operation displayed in the application control bar are determined, an embodiment logic similar to the foregoing manner of determining the control key corresponding to the target application may be used. In an embodiment, the system may define a priority sequence of the shortcut control keys corresponding to the user operation, and then determine, based on the display area of the application control bar, specific shortcut control keys to be displayed in the application control bar. In another embodiment, the system may define corresponding shortcut control key groups for the application control bar of different display areas, and then determine, based on an actual display area of the application control bar, a shortcut control key group displayed in the application control bar.

Operation 6205: Hide Display of the Control Key Group in the Control Region on the First Display.

Operation 6205 is an optional operation. Preferably, after the control region on the second display is activated and the related control key group is displayed in the control region, display of the control key group in the control region on the first display may be hidden. This can save display space of the first display and expand a display area of a main display interface of the target application or a display area of another functional module in the first display region. The hiding display of the control key group in the control region on the first display may be that the control key in the control region is not displayed on the first display, or may be that the control key in the control region is folded on the first display, or may be that the control key in the control region displayed on the first display is faded, for example, the control key turns gray.

After the control key group in the application control bar is not displayed on the first display, display content on the first display may be adaptively adjusted. In an embodiment, after the control key set of the target application is not displayed on the first display, a size of display content of the main display interface of the target application or a size of display content of the another functional module may be increased, for example, a display font is enlarged, and a display picture is zoomed in, and a layout on the first display is adaptively adjusted. This embodiment can facilitate browsing for the user, and improve user experience.

In another embodiment, after the control key set of the target application is not displayed on the first display, display content of the main display interface of the target application may be added, or some functional modules that were not displayed before may be added to the first display, or undisplayed content of the functional module displayed on the first display may be added, and a layout on the first display is adaptively adjusted. For example, the application may define a plurality of layout manners that include different control keys and that are used for displaying on the first display. The system selects, based on the control key group displayed in the application control bar, a layout manner that is of the application on the first display and that adapts to the control key group. After the control key set of the target application is not displayed on the first display, display content on the first display is added, so that more detailed content or an operation manner of the target application can be reflected, and a more convenient operation is provided for the user. Certainly, one or more of the foregoing three types of display content may be all added, or display content may be added and display content may be zoomed in. It should be understood that, after the control key set of the target application is not displayed on the first display, another manner of changing the content layout on the first display that helps improve user experience is also possible.

Operation 6206: Disable the Control Region.

Figure 70A:
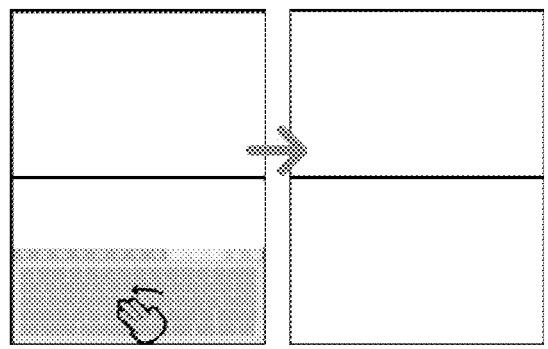
FIG. 70A shows a method for disabling a control region according to an embodiment of the present invention.
Figure 70B:
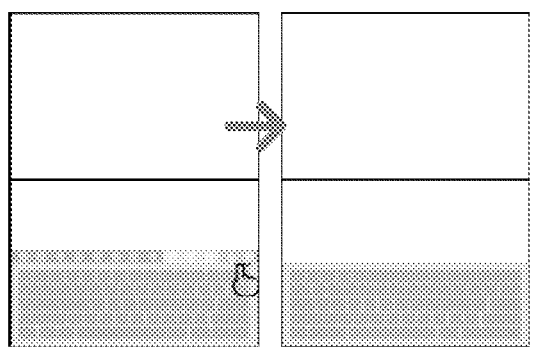
FIG. 70B shows another method for disabling a control region according to an embodiment of the present invention.
Figure 70C:
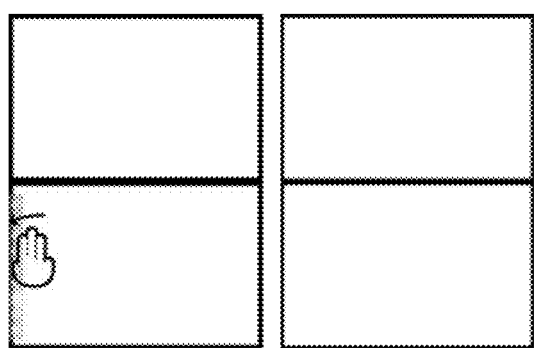
FIG. 70C shows another method for disabling a control region according to an embodiment of the present invention.
Figure 70D:
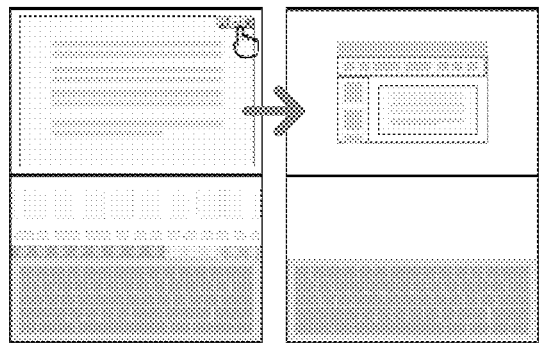
FIG. 70D shows another method for disabling a control region according to an embodiment of the present invention.

Optionally, in an embodiment, when the user temporarily does not need to use the control region, the control region may be disabled in a plurality of manners. In an embodiment, the control region may be related to the virtual keyboard, and the control region is disabled by default when the virtual keyboard is disabled. In this case, the virtual keyboard and the control region may be simultaneously disabled by using an instruction for disabling the virtual keyboard, as shown in FIG. 70A. In another embodiment, as shown in FIG. 70B, a control switch of the control region may be provided on the virtual keyboard. When the virtual keyboard is enabled, the control region may be disabled by using the control switch on the virtual keyboard. In another embodiment, as shown in FIG. 70C, the control region may be disabled through gesture control, that is, a gesture corresponding to disabling an auxiliary display region is stored in a storage module, and when the gesture performed by the user is detected, the control region is disabled. The control gesture may be, for example, a finger moves the control region to a side of the display through a slide operation. In another embodiment, whether the control region is enabled may be related to a display mode of the application. When the full-screen mode of the application is disabled, the control region may be disabled, and some content in the control region is migrated back to the first display region for displaying, as shown in FIG. 70D.

When the user does not need to use the control region temporarily, display of the control region is temporarily disabled, so that a display area of another application on the second display can be expanded. If the control region is not needed, interference of the control region with the another application on the second display is reduced, and a user operation interface is simplified.

In another embodiment, content in the control region may be always displayed on the second display. Therefore, operation 307 is optional.

In the screen display method 6200, the control region is displayed on the second display. The control region includes a control key group related to system control and/or the control key group related to the operation performed by the user on the operation interface of the target application. In this way, the user can operate the system or the target application on the first display by using the control region on the second display. With support of the control region, the user does not need to repeatedly move a location of a cursor on the first display and repeatedly locate an operation object or the control key. This greatly simplifies a user operation. The control region is displayed on the second display.

Compared with the first display, the second display is closer to two hands of the user, and can provide a more convenient operation for the user. In addition, after a related control key group is displayed in the control region, the related control key group is not displayed on the first display, so that a display area on the first display can be saved. In this way, display content on the first display is expanded, or display content on the first display is added. This improves user experience.

Figure 71:
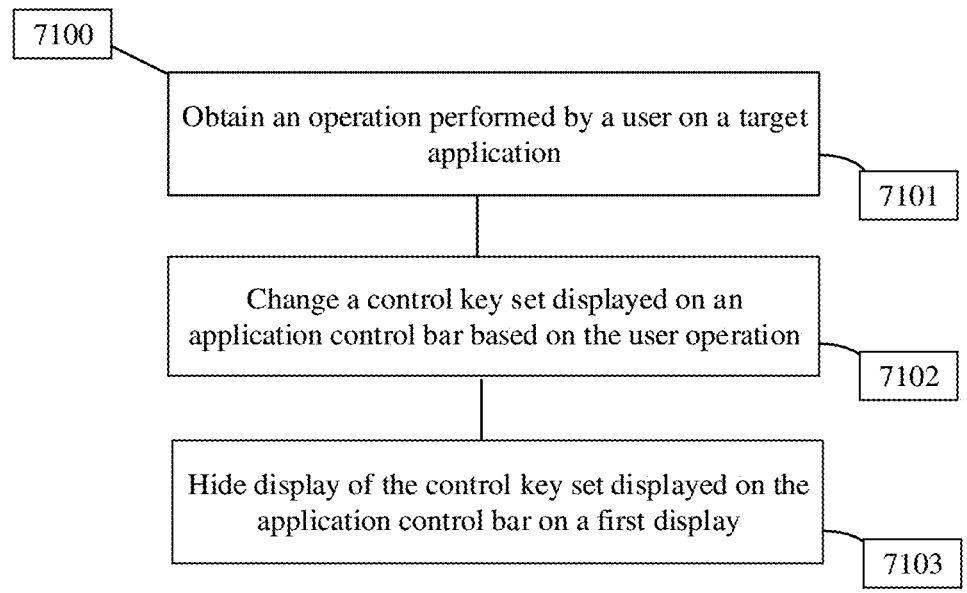
FIG. 71 shows another screen display method according to an embodiment of the present invention.

Refer to FIG. 71. In an embodiment of the present invention, a screen display method 7100 is provided. The screen display method is used to change display content of an application control bar in a control region based on a current operation of a user on a target application. The screen display method 7100 may include the following operations.

Operation 7101: Obtain the Operation Performed by the User on the Target Application.

After the control region is enabled, the current user operation on the target application is detected in real time, and a control key group displayed in the application control bar is changed based on the current user operation on the target application.

As described in operation 6202, in an embodiment, the current operation performed by the user on the target application may be displaying an operation interface of the target application on a first display. When the first display displays only the operation interface of the target application and does not display an operation interface of another application, the control key group displayed in the application control bar may be completely replaced with a control key group corresponding to the target application. When the first display includes both the operation interface of the target application and an operation interface of another application, the control key group displayed in the application control bar may be partially replaced with a control key group corresponding to the target application, or a control key group corresponding to the target application is added to the control key group displayed in the application control bar. In other words, control key groups corresponding to a plurality of applications including the target application are all displayed in the application control bar.

As described in operation 6202, in another embodiment, the current operation performed by the user on the target application may be an operation on the operation interface of the target application. Specifically, optionally, before the user performs the operation on the operation interface of the target application, if a shortcut control key group related to a previous operation performed by the user on the operation interface of the target application is displayed in the application control bar, this part and the shortcut control key group corresponding to the previous operation are replaced with a shortcut control key group corresponding to the current operation. Before the user performs the operation on the operation interface of the target application, if only the control key group corresponding to the target application is displayed in the application control bar, the control key group corresponding to the target application may be replaced the shortcut control key group related to the current operation of the user, or a shortcut control key group related to the current operation of the user is added to the control key group corresponding to the target application.

A specific embodiment of operation 7101 is the same as that of operation 6202. To avoid repetition, details are not described herein again.

Operation 7102: Change the Control Key Group in the Application Control Bar Based on the User Operation.

Optionally, in an embodiment, the changing the control key group in the application control bar based on the user operation may be: adding, based on an original control key group in the application control bar, some control key groups related to the current operation performed by the user on the target application. For example, when the user starts only the target application, and does not perform an operation on the target application, the application control bar may not include the shortcut operation control key group corresponding to the user operation. In other words, the initial control key group in the application control bar includes only a control key set corresponding to the target application, and does not include a shortcut operation control key set. When the user performs a first operation on the target application, a shortcut operation control key set corresponding to the user operation may be added to the application control bar, that is, a shortcut operation control key set related to the first operation of the user is added to the application control bar.

Optionally, in another embodiment, the changing the control key group in the application control bar based on the user operation may be: removing, based on an original control key group in the application control bar, some control key groups related to the current operation performed by the user on the target application. For example, when the user operation changes, that is, when the user performs a second operation different from the first operation, a shortcut operation control key set corresponding to the second operation of the user is included in the shortcut operation control key set corresponding to the first operation of the user, and shortcut operation control keys corresponding to the second operation of the user is less than shortcut operation control keys corresponding to the first operation of the user. In this case, a shortcut operation control key group unrelated to the second operation in the application control bar may be decreased based on the second operation performed by the user on the target application.

Optionally, in another embodiment, the changing the control key group in the application control bar based on the user operation may be partially or completely replacing the control key group originally displayed in the application control bar with a new control key group. For example, when the user operation changes, that is, when the user performs a second operation different from the first operation, if a correlation between the second operation and the first operation is small, a shortcut operation control key group related to the first operation of the user in the application control bar may be partially or completely replaced with a shortcut operation control key group related to the second operation of the user.

Optionally, if the current operation performed by the user on the target application corresponds to a large quantity of shortcut operation control keys, the application control bar is crowded, or all shortcut operation control keys cannot be completely displayed. For example, based on the current operation performed by the user on the target application, one control key group needs to be added to the application control bar, or a quantity of control keys used to replace the control key group originally displayed in the application control bar is greater than a quantity of control keys originally displayed. In this case, a display area of the application control bar and a display area of the control region may be adaptively increased, so that the application control bar displays all shortcut operation control keys corresponding to the current operation performed by the user on the target application. When more control keys need to be displayed in the application control bar, the display area of the application control bar is adaptively increased, so that display of the application control bar can be optimized, and display of the control keys in the application control bar is not excessively small. This provides better operation experience for the user.

Optionally, if the current operation performed by the user on the target application corresponds to a small quantity of shortcut operation control keys, there is an idle display region in the application control bar. For example, based on the current operation performed by the user on the target application, one control key group needs to be removed from the application control bar, or a quantity of control keys used to replace the control key group originally displayed in the application control bar is less than a quantity of control keys originally displayed. In this case, a display area of the application control bar and a display area of the control region may be adaptively decreased, so that the display area of the application control bar matches the shortcut operation control key corresponding to the current operation performed by the user on the target application. When less control keys need to be displayed in the application control bar, the display area of the application control bar is adaptively decreased, so that display of the application control bar can be optimized, and there is no idle display area in the application control bar. This can save a display control of the second display, expand a display area of another application on the second display, and provide better operation experience for the user.

Operation 7103: Hide Display of the Control Key Group in the Application Control Bar on the First Display.

Preferably, after the control key group in the application control bar is changed based on the user operation, display of the control key in the application control region may be hidden on the first display. A specific embodiment is described in operation 6205.

In the screen display method 7100, a control key displayed in the application control bar is changed based on a change of the current operation performed by the user on the target application, so that a control key group corresponding to the current operation performed by the user on the target application is displayed in the application control bar in real time. This meets an operation requirement of the user to a maximum extent, provides a more efficient operation for the user, and improves user operation efficiency.

It should be noted that a quantity of times of performing operations 7101 to 7103 is not limited in this embodiment of the present invention. That is, a change of the current operation performed by the user on the target application may be obtained for a plurality of times, and the control key group displayed in the application control bar may be changed for a plurality of times.

It should be noted that, optionally, in addition to operations 7101 to 7103, the screen display method 7100 may further include one or more operations in the screen display method 6200. A specific embodiment of the one or more operations is described in the screen display method 6200. To avoid repetition, details are not described herein again.

Figure 72:
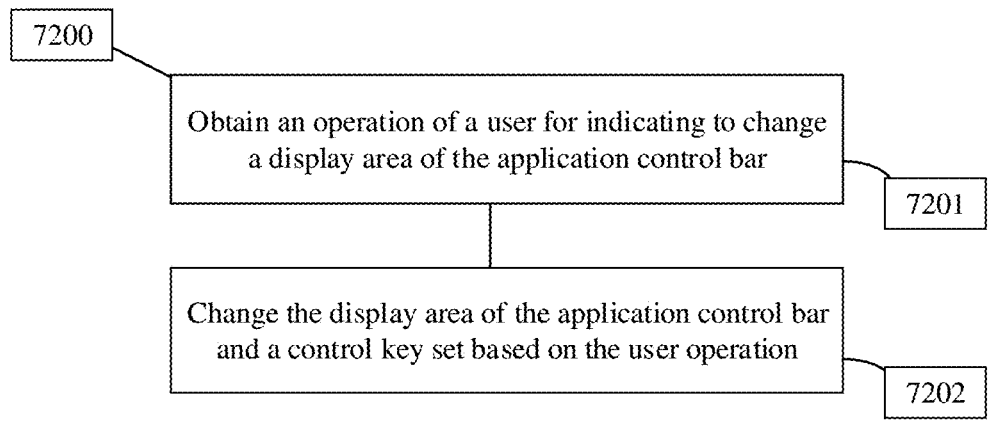
FIG. 72 shows another screen display method according to an embodiment of the present invention.

Refer to FIG. 72. An embodiment of the present invention provides a screen display method 7200. The screen display method is used to change a display area of an application control bar and a control key group in the application control bar based on an operation of changing the display area of the application control bar by a user. The screen display method 7200 may include the following operations.

Operation 7201: Obtain an Operation of Indicating to Change the Display Area of the Application Control Bar by the User.

A requirement of the user in a process of using a terminal usually changes in real time. In some cases, the user may expect that more control keys are displayed in the application control bar in a control region, so that the user is better assisted in operation, for example, when the user performs a complex operation on a target application. In this case, increasing the display area of the application control bar can provide more control keys for the user, and improve user operation efficiency. In some other cases, the user may expect that fewer control keys are displayed in the application control bar in a control region, for example, when the user simultaneously performs another operation on a second display, but the user expects to provide a larger display interface for another application, or when the user performs a simple operation on a target application. In this case, decreasing the display area of the application control bar can save display space on the second display, and decreasing the control keys in the application control bar allows the user to locate a required control key more simply and quickly. This can improve user operation efficiency and improve user experience.

Figure 73A:
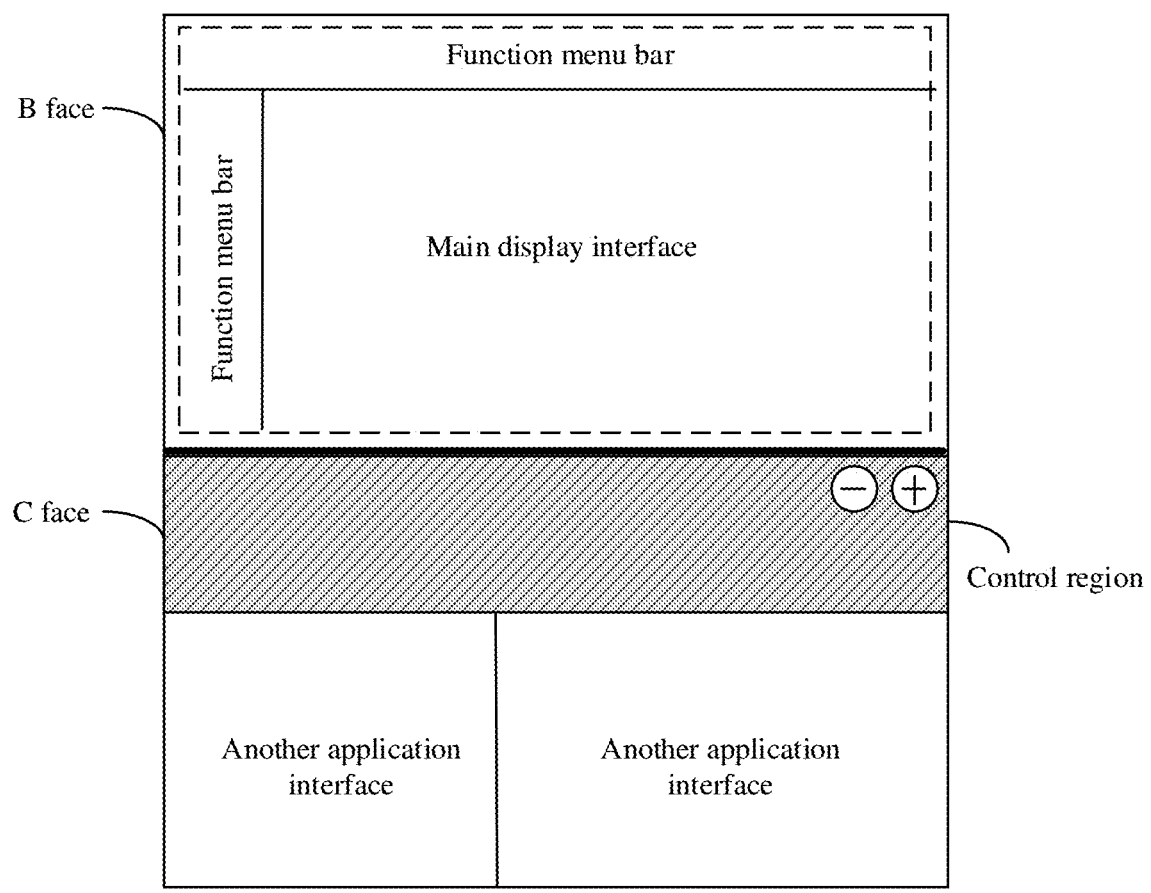
FIG. 73A shows a method for changing a display area of an application control bar according to an embodiment of the present invention.
Figure 73B:
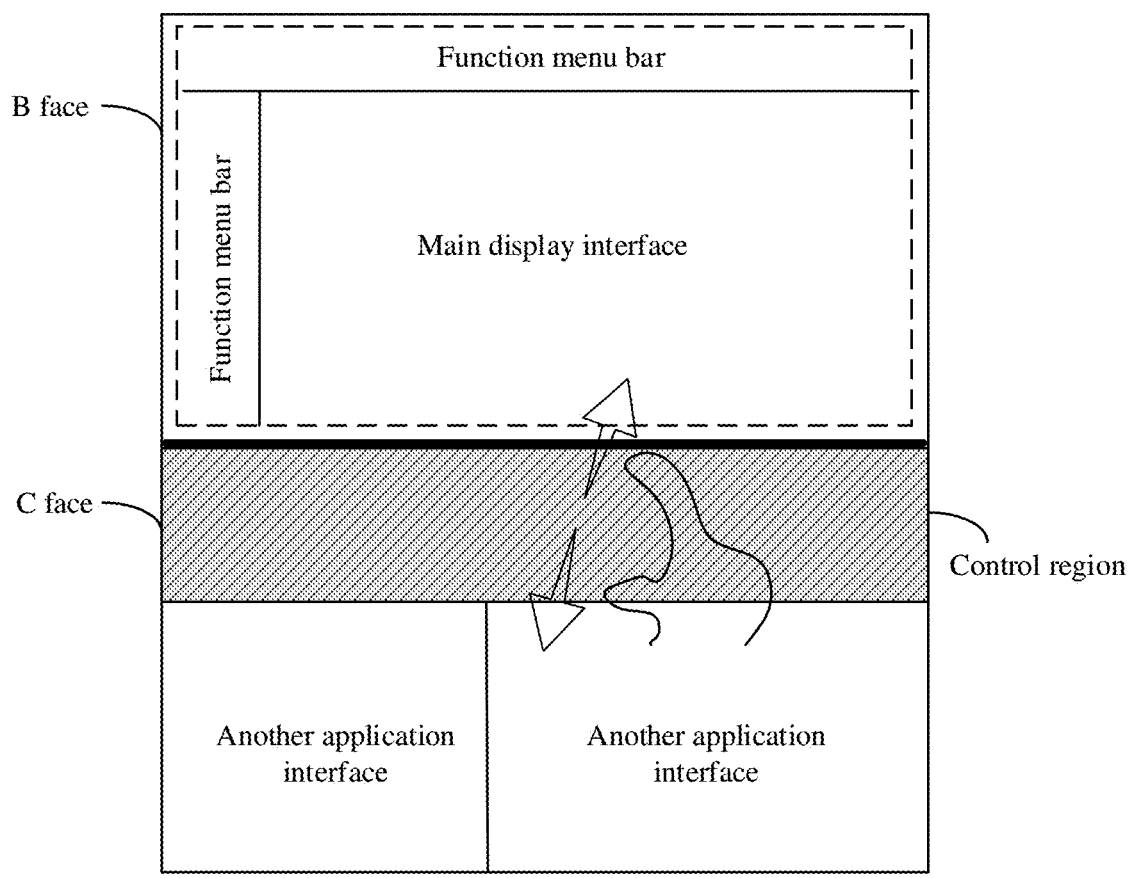
FIG. 73B shows a method for increasing a display area of an application control bar according to an embodiment of the present invention.
Figure 73C:
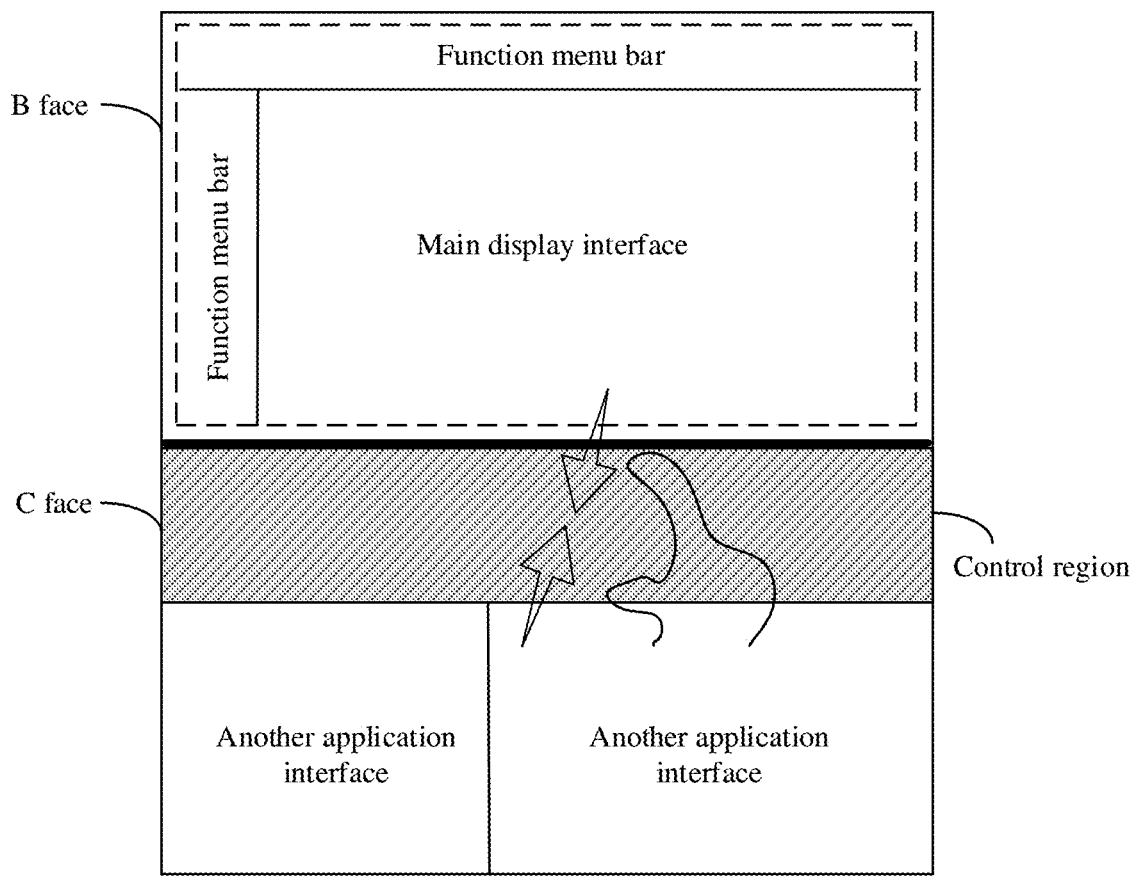
FIG. 73C shows a method for increasing a display area of an application control bar according to an embodiment of the present invention.
Figure 74A:
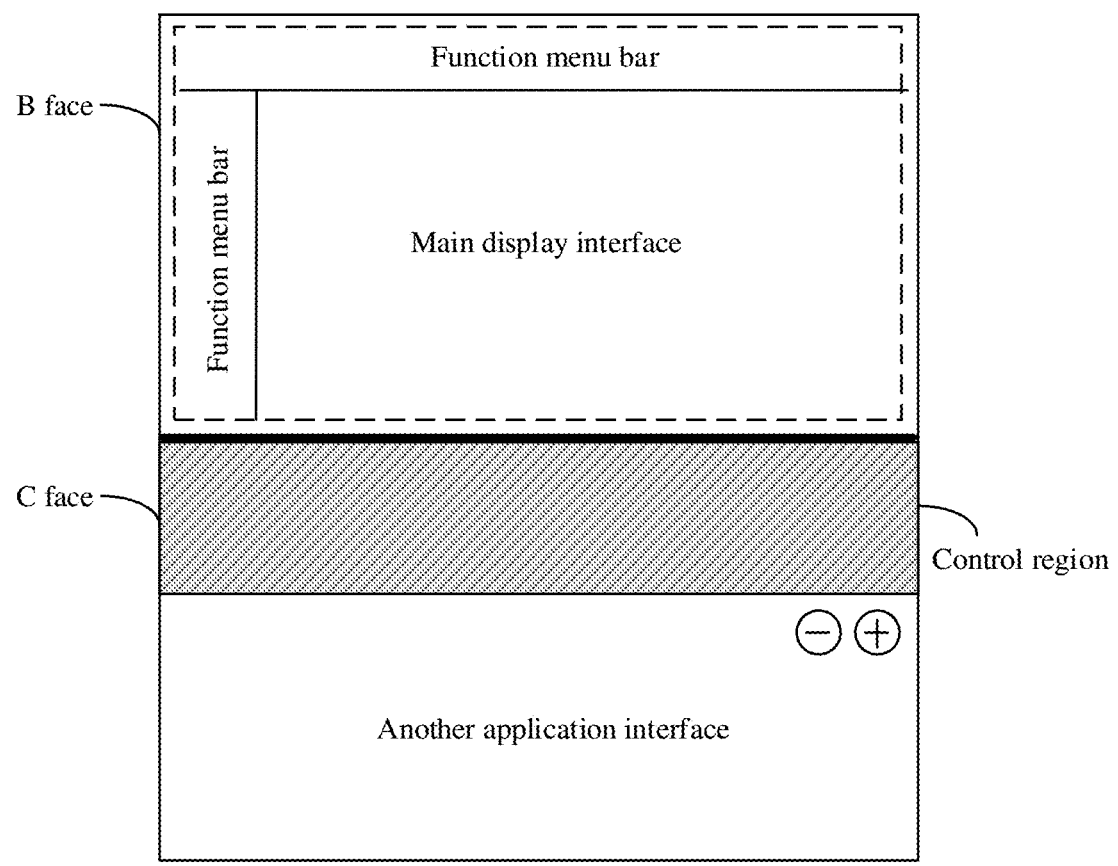
FIG. 74A shows another method for changing a display area of an application control bar according to an embodiment of the present invention.
Figure 74B:
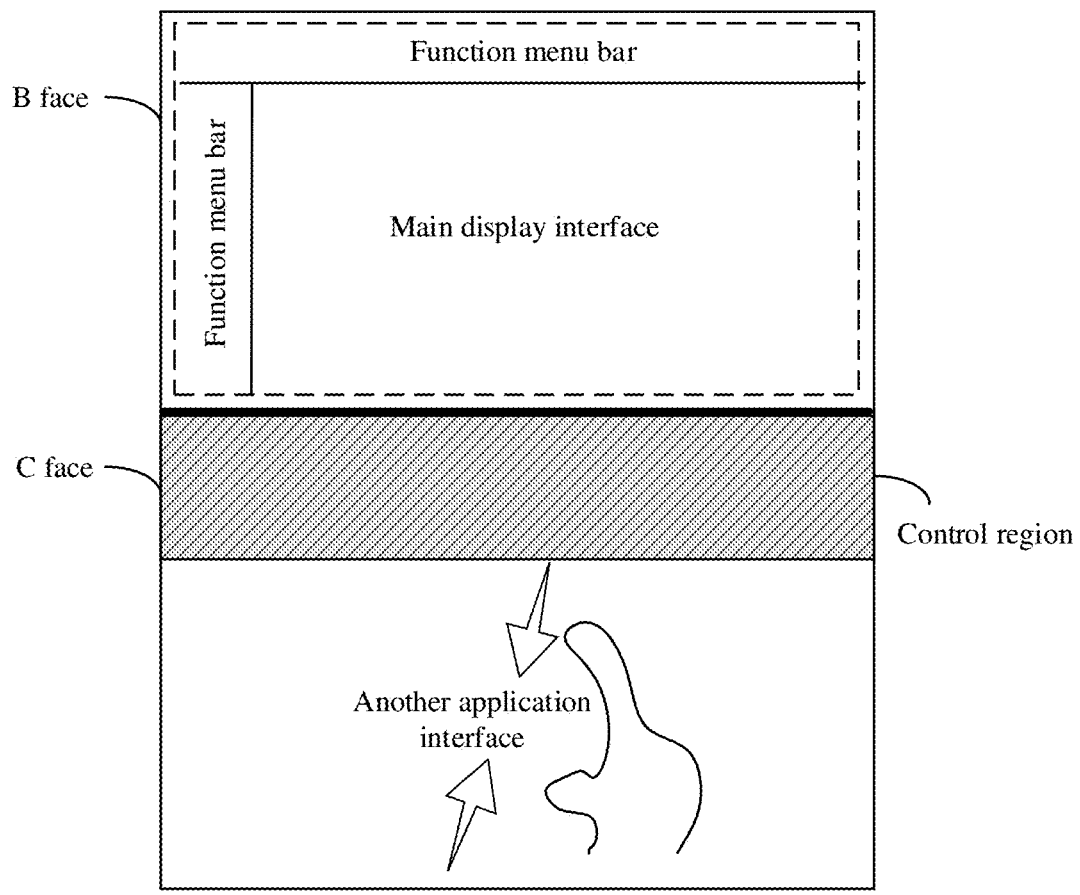
FIG. 74B shows another method for increasing a display area of an application control bar according to an embodiment of the present invention.
Figure 74C:
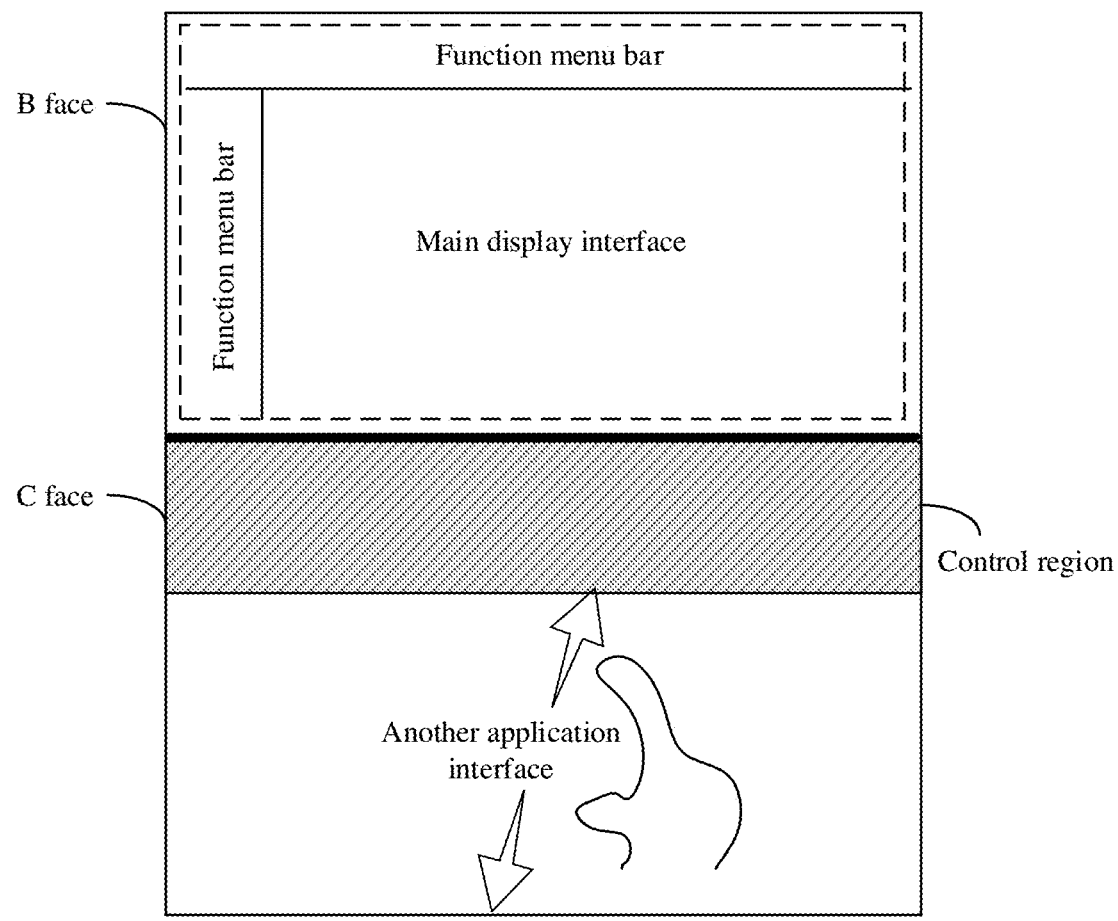
FIG. 74C shows another method for increasing a display area of an application control bar according to an embodiment of the present invention.
Figure 75A:
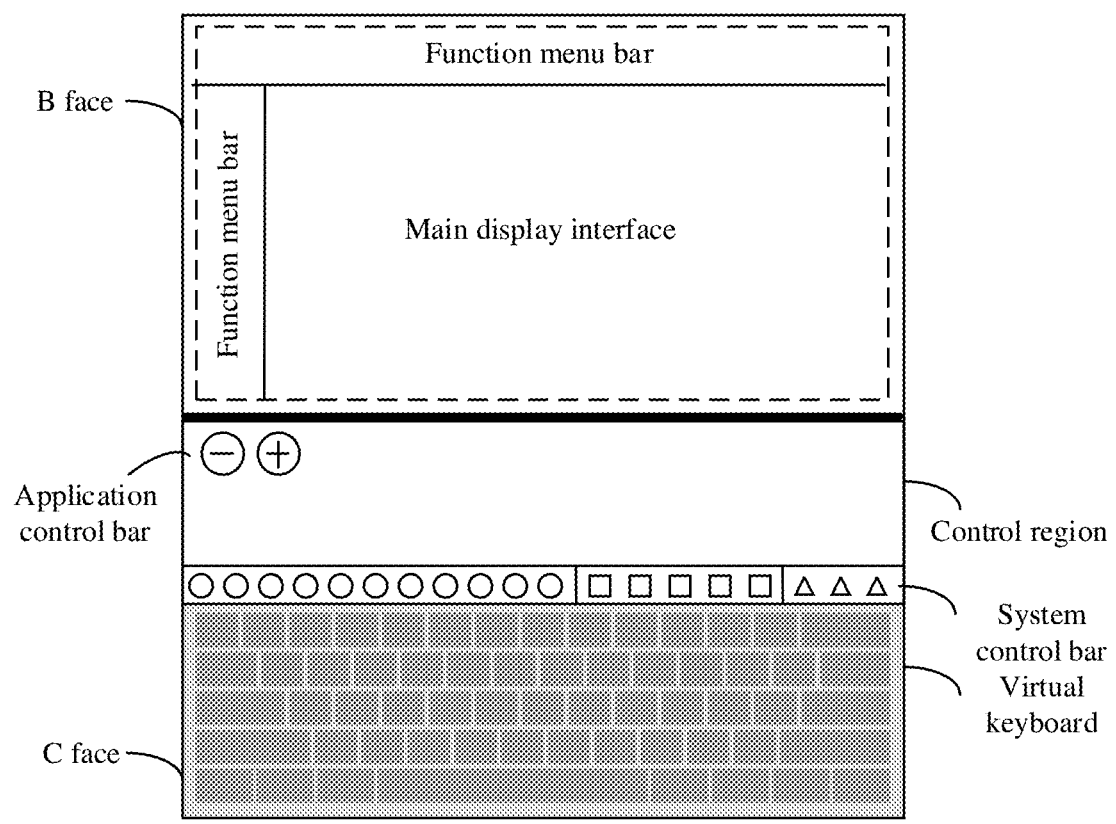
FIG. 75A shows another method for changing a display area of an application control bar according to an embodiment of the present invention.
Figure 75B:
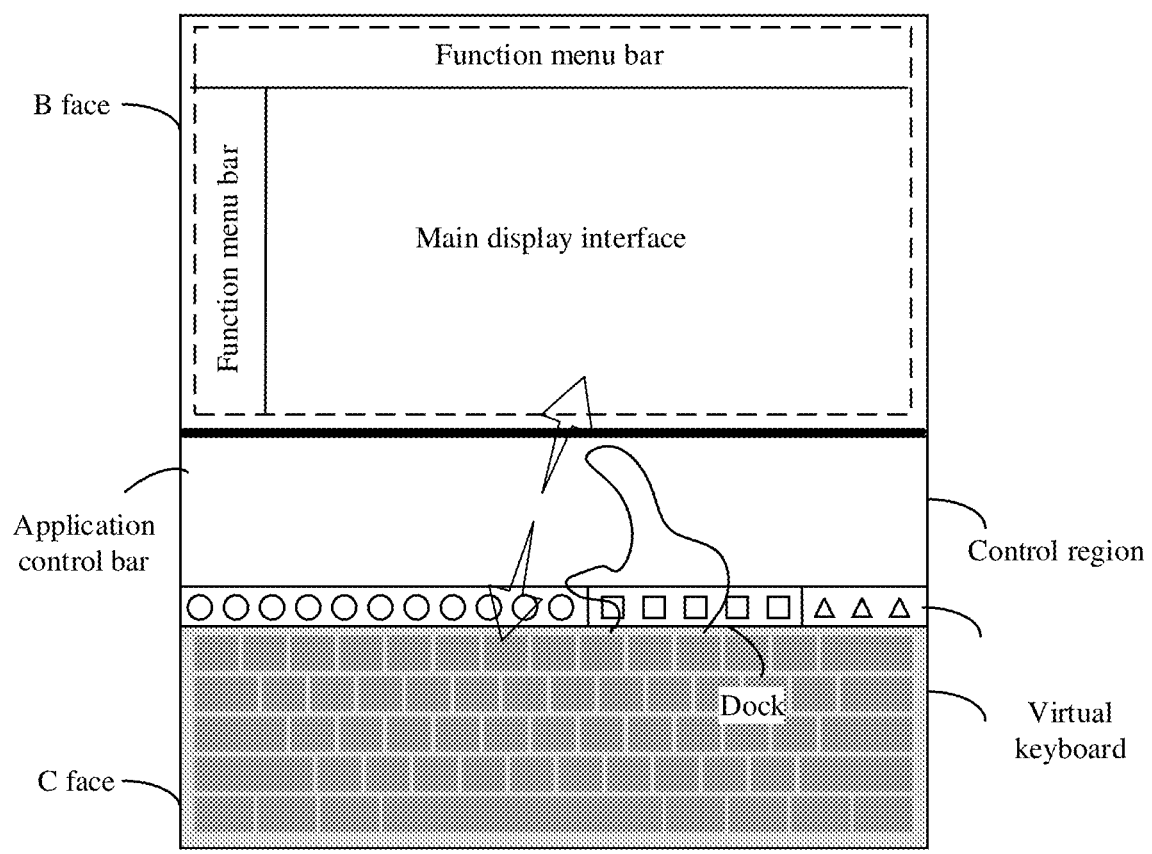
FIG. 75B shows another method for increasing a display area of an application control bar according to an embodiment of the present invention.
Figure 75C:
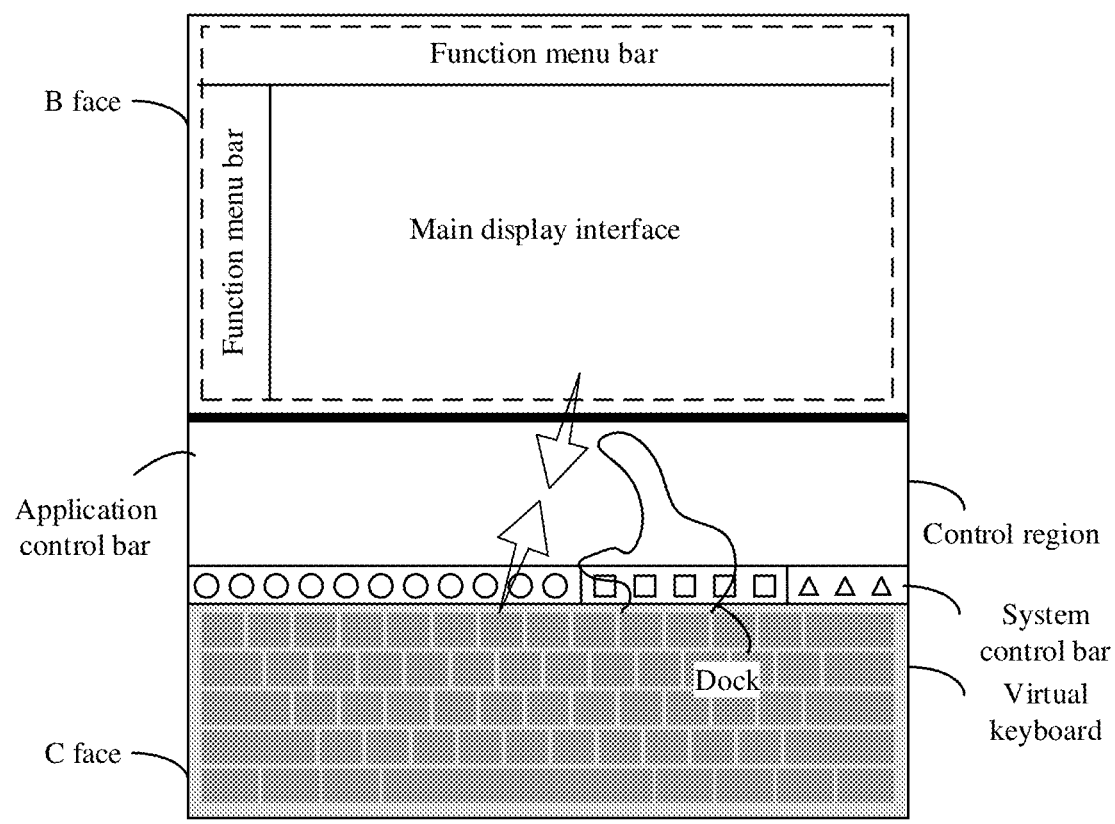
FIG. 75C shows another method for increasing a display area of an application control bar according to an embodiment of the present invention.

The user may implement an objective of changing the display area of the application control bar in a plurality of manners. In an embodiment, the user may indirectly change the display area of the application control bar by changing a display area of the control region. For example, as shown in FIG. 73A, the display area of the control region may be expanded by using a zoom-in key in the control region, to indirectly expand the display area of the application control bar. The area of the control region may be reduced by using a zoom-out key in the control region, to indirectly reduce the display area of the application control bar. In addition, as shown in FIG. 73B, the display area of the control region may be expanded through a zoom-in gesture, to indirectly expand the display area of the application control bar. As shown in FIG. 73C, the display area of the control region may be reduced through a zoom-out gesture, to indirectly reduce the display area of the application control bar. In another embodiment, the user may change a display area of another application on the second display, to indirectly change the display area of the control region and to further change the display area of the application control bar. For example, as shown in FIG. 74A, the display area of the another application may be expanded by using a zoom-in key on the another application on the second display, to indirectly reduce the display area of the control region and to further reduce the display area of the application control bar. The display area of the another application may be reduced by using a zoom-out key on the another application on the second display, to indirectly expand the display area of the control region and the display area of the application control bar. In addition, as shown in FIG. 74B, the user may zoom out another application interface on the second display through the zoom-out gesture, to expand the display area of the control region and the display area of the application control bar. As shown in FIG. 74C, the user may zoom in another application interface on the second display through the zoom-in gesture, to reduce the display area of the control region and the display area of the application control bar. In another embodiment, the user may directly perform an operation on the application control bar to change the display area of the application control bar. For example, as shown in FIG. 75A, the display area of the application control bar may be expanded by using a zoom-in key in the application control bar. The display area of the application control bar may be reduced by using a zoom-out key in the application control bar. In addition, as shown in FIG. 75B, the user may expand the display area of the application control bar through the zoom-in gesture. As shown in FIG.

75C, the user may reduce the display area of the application control bar through the zoom-out gesture.

In another embodiment, the display area of the application control bar may alternatively be changed based on an operation performed by the user on an application on a first display. Specifically, when a quantity of control keys corresponding to a current user operation is greater than a quantity of control keys corresponding to a previous user operation, to display all control keys in the application control bar and ensure a display effect of the control keys in the application control bar, the display area of the application control bar may be appropriately expanded. For example, the previous user operation is starting a specific application. An initial control key corresponding to the application may be displayed in the application control bar, and the current user operation is an operation performed on a target application interface. In this case, a control key for the current user operation may be added to the application control bar, and the display area of the application control bar may be appropriately expanded. When a quantity of control keys corresponding to a current operation is less than a quantity of control keys corresponding to a previous user operation, the display area of the application control bar may be appropriately reduced, to save a display area of the second display.

In another embodiment, the display area and a location of the control region may flexibly adapt to a change of display of another functional module on the second display. The display area of the application control bar is also simultaneously adjusted with a change of the display area and the location of the control region. For example, when the user triggers different types of virtual keyboards through different gestures, the display area and location of the control region may be flexibly determined based on display regions of the different types of virtual keyboards. For a specific embodiment of triggering the different types of virtual keyboards based on the different gestures, refer to Embodiment 2. Details are not described herein again.

In another embodiment, when the user indicates to enable a handwriting input mode of the target application, the target application interface is displayed on the second display, so that the user may perform handwriting input by using the second display. Optionally, in an embodiment, the application control bar may be displayed on the second display, and a control key related to the handwriting input mode is displayed in the application control bar. In another embodiment, because the target application interface is already displayed on the second display, the application control bar may not be displayed on the second display. For a specific embodiment of switching between the handwriting input mode and a virtual keyboard input mode, refer to Embodiment 3. Details are not described herein.

In another embodiment, when the user switches an input mode to the handwriting input mode, a handwriting input region may be displayed in the application control bar. Alternatively, a control key group related to the handwriting input mode may be displayed in the application control bar, for example, pen, eraser, color, and font. Alternatively, the handwriting input region and the control key group related to the handwriting input mode may be both displayed in the application control bar. In this way, the user can perform handwriting input by using the application control bar, and/or operate the handwriting input mode by using the application control bar. This improves operation efficiency. For a specific embodiment related to switching of the handwriting input mode, refer to Embodiment 3. Details are not described herein again.

Operation 7202: Change the Display Area and a Control Key Set of the Application Control Bar Based on the User Operation.

When the user operation indicates to expand the display area of the application control bar, the display area of the application control bar is expanded based on a degree of the user operation. For example, when the user expands the display area by tapping the zoom-in key, a degree to which the display area of the application control bar is to be expanded may be determined based on a quantity of taps of the user. When the user expands the display area through the zoom-in gesture, a degree to which the display area of the application control bar is to be expanded may be determined based on a degree of the zoom-in gesture of the user.

Figures 1, 76A:
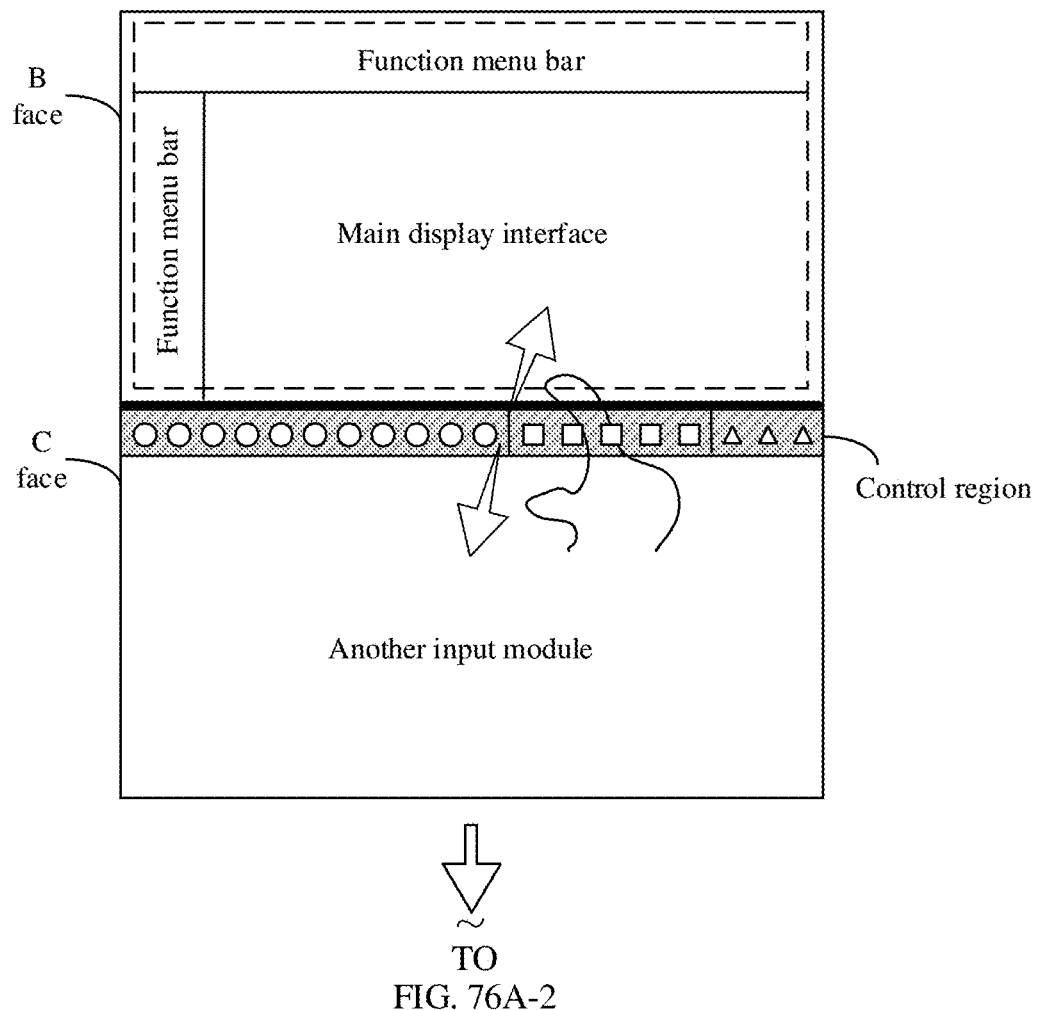
Figures 2, 76A:
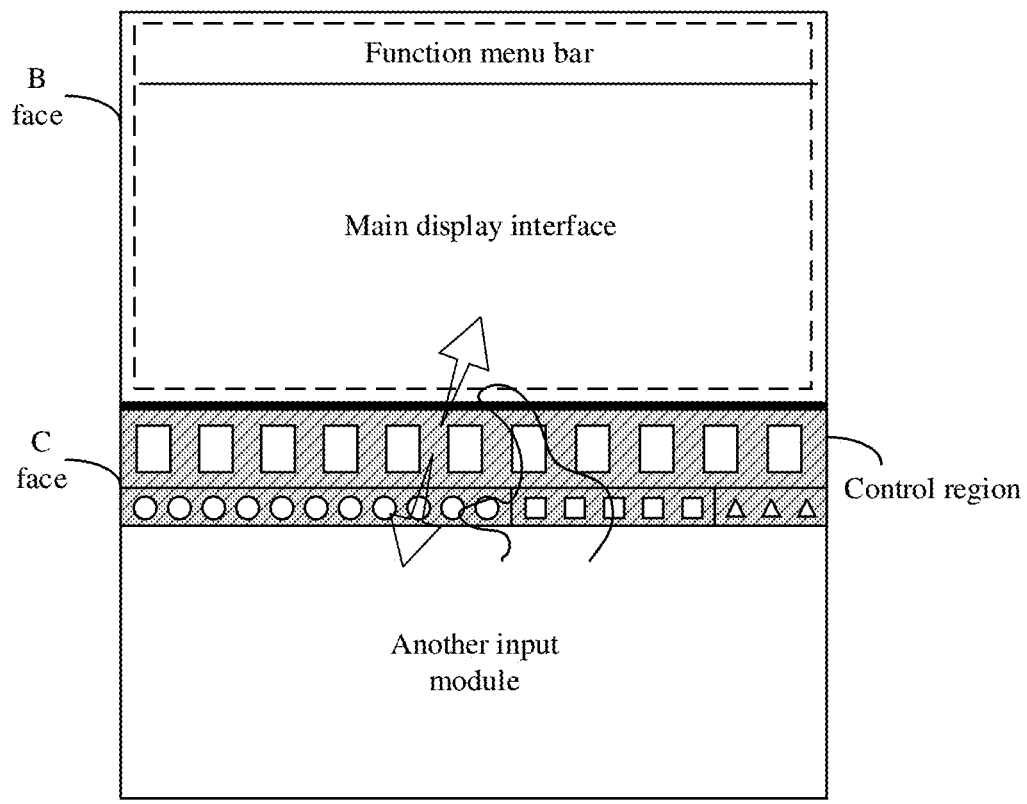
Figures 3, 76A:
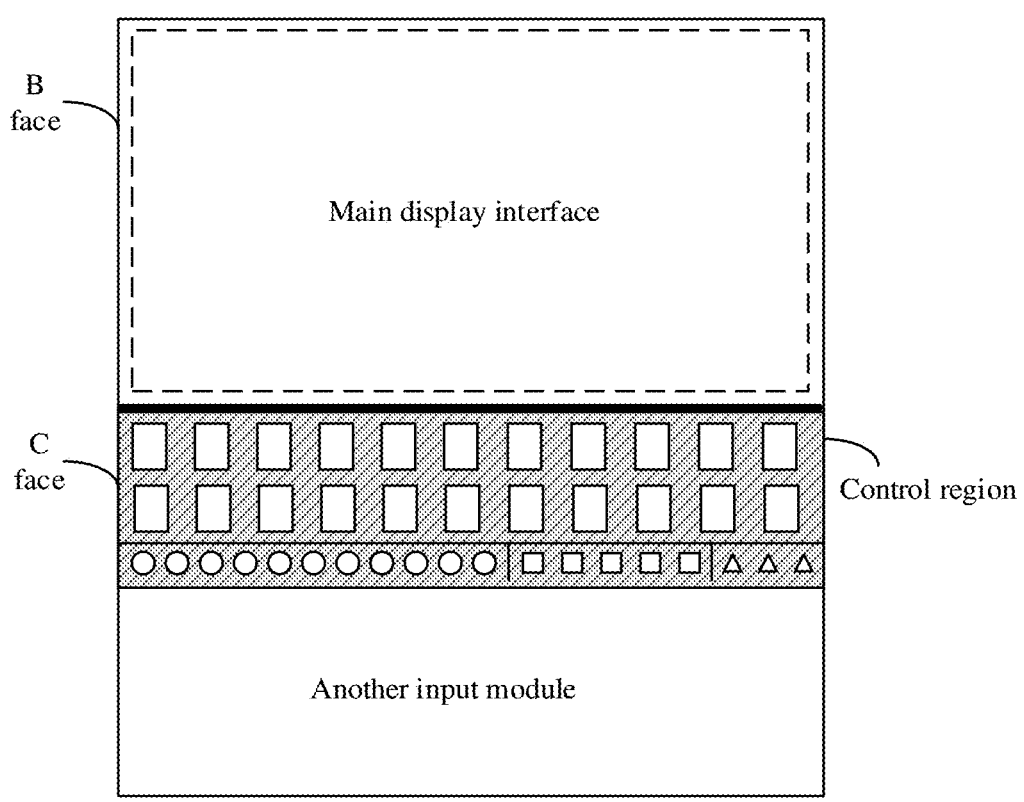

As shown in FIG. 76A-1 to FIG. 76A-3, when the display area of the application control bar is expanded, a control key in a control key group corresponding to the target application may be added in the application control bar. Optionally, in an embodiment, when the display area of the application control bar is expanded, a control key in an original functional module in the application control bar may be added. In another embodiment, when the display area of the application control bar is expanded, a new functional module and a corresponding control key set may be added to the application control bar. In another embodiment, when the display area of the application control bar is expanded, a control key in an original functional module and a new functional module and a corresponding control key set in the application control bar may be both added.

As described in the operation 6202, in an embodiment, the system may add, based on priorities of functional modules and control keys and in a descending order of priorities, some control keys based on the control key set displayed by the application control bar, and determine a layout of the application control bar after the control keys are added. Preferably, when the display area of the application control bar is expanded, as shown in FIG. 76A-1 to FIG. 76A-3, the control key group originally displayed in the application control bar can be moved downward, and a newly added control key group is displayed above the control key group originally displayed in the application control bar. That is, compared with the control key group originally displayed in the application control bar, the newly added control key group is closer to the first display in the application control bar with the expanded display area. In this embodiment, a priority of the newly added control key group is lower than that of the control key group originally displayed in the application control bar. Based on the foregoing setting, when the display area of the application control bar is expanded, a control key with a higher priority (a control key that has a more important function or that is more frequently used by the user) can be always disposed at a location closer to two hands of the user. This provides a more convenient operation for the user and improves user operation efficiency.

In another embodiment, the system may select, based on the display area of the application control bar, a display manner of the application control bar that is provided by an application and that corresponds to the display area, to perform display in the control region.

Preferably, when the display area of the application control bar is expanded so that control keys corresponding to the target application in the application control bar increase, display of the added control keys on the first display may be hidden. A specific embodiment and a beneficial effect are described in operation 6205.

When the user operation indicates to reduce the display area of the application control bar, the display area of the application control bar is reduced based on a degree of the user operation. For example, when the user expands the display area by tapping the zoom-in key, a degree to which the display area of the application control bar is to be expanded may be determined based on a quantity of taps of the user. When the user reduces the display area through the zoom-out gesture, a degree to which the display area of the application control bar is to be reduced may be determined based on a degree of the zoom-out gesture of the user.

Figures 1, 76B:
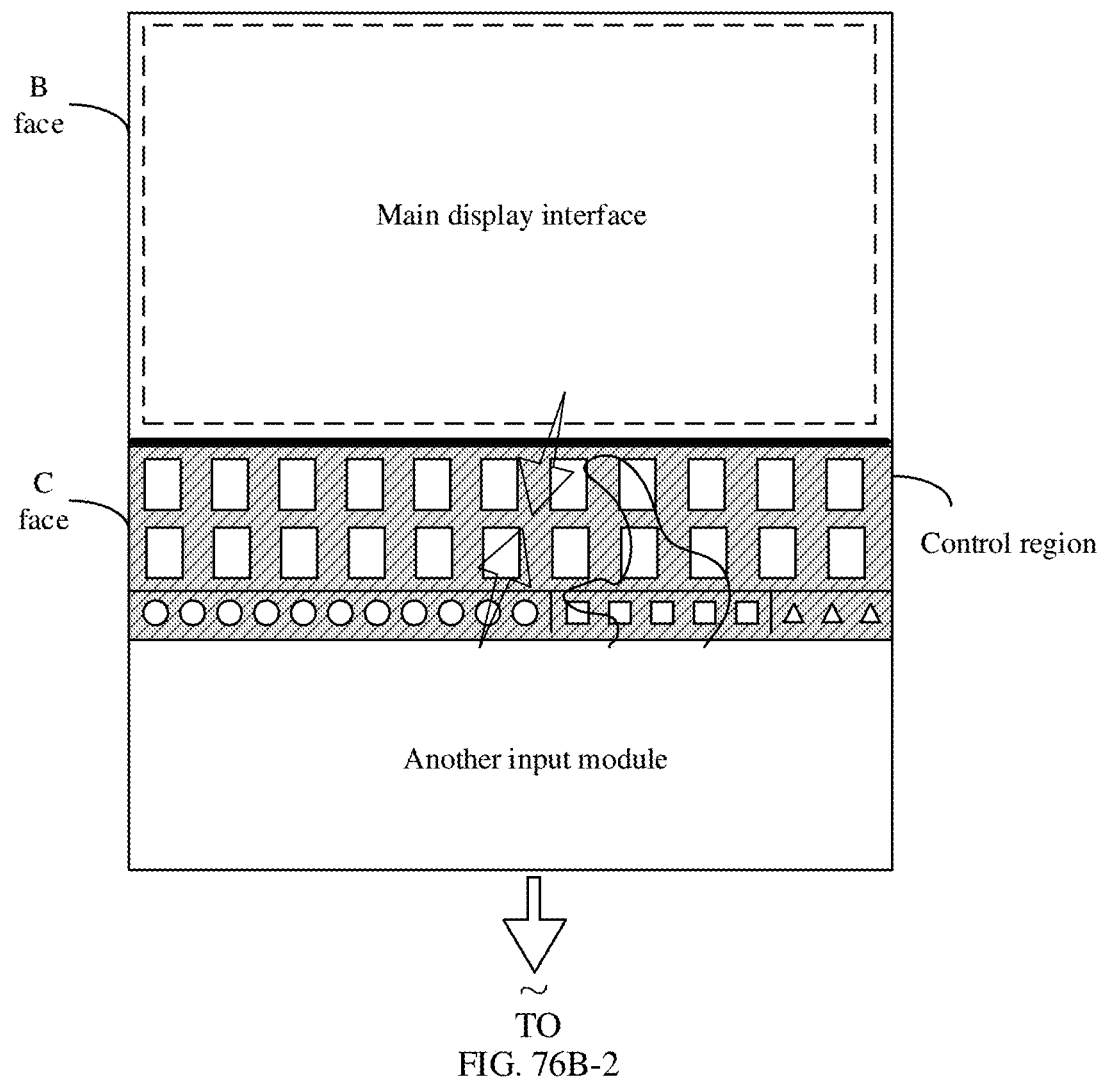
Figures 2, 76B:
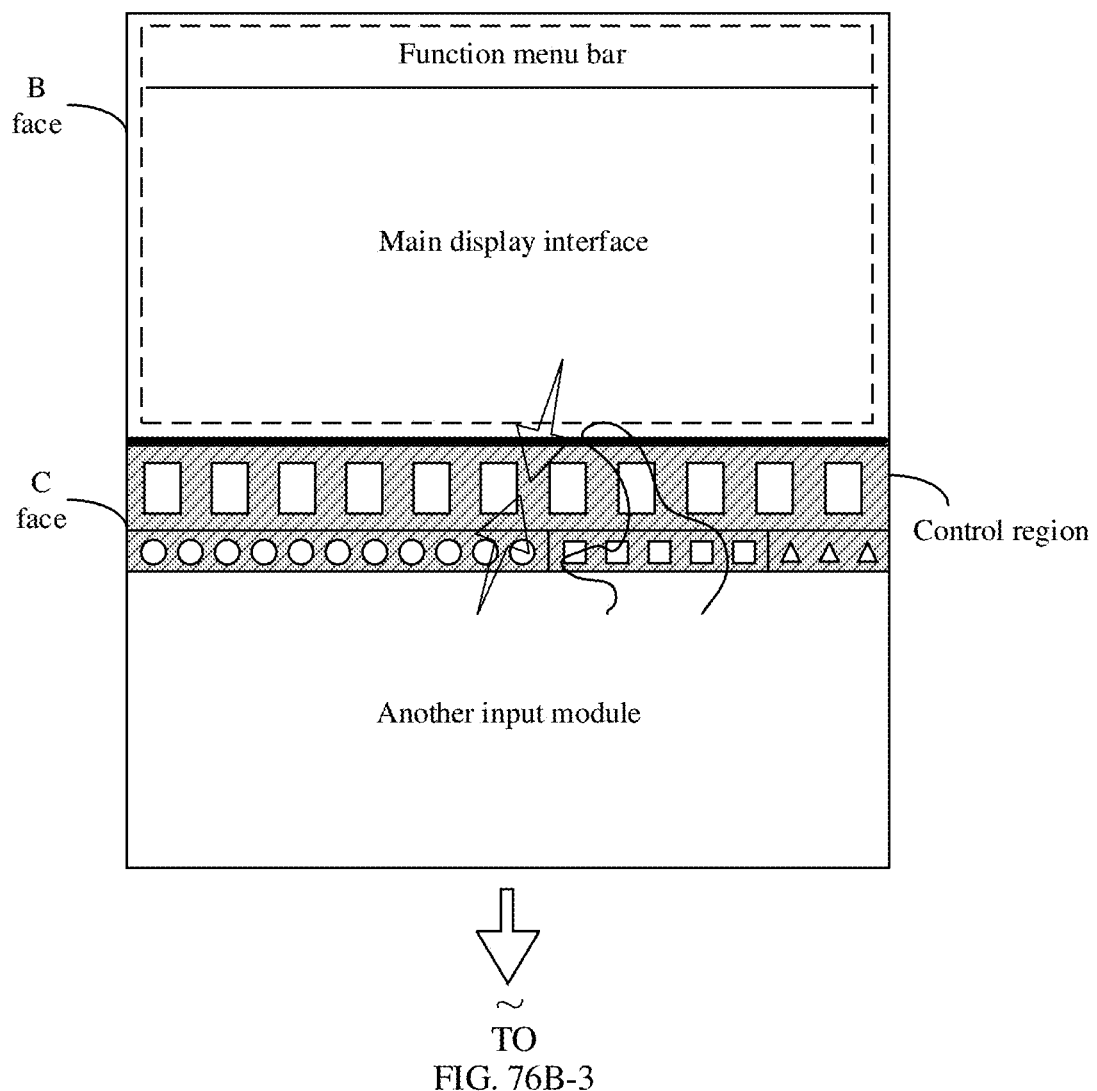
Figures 3, 76B:
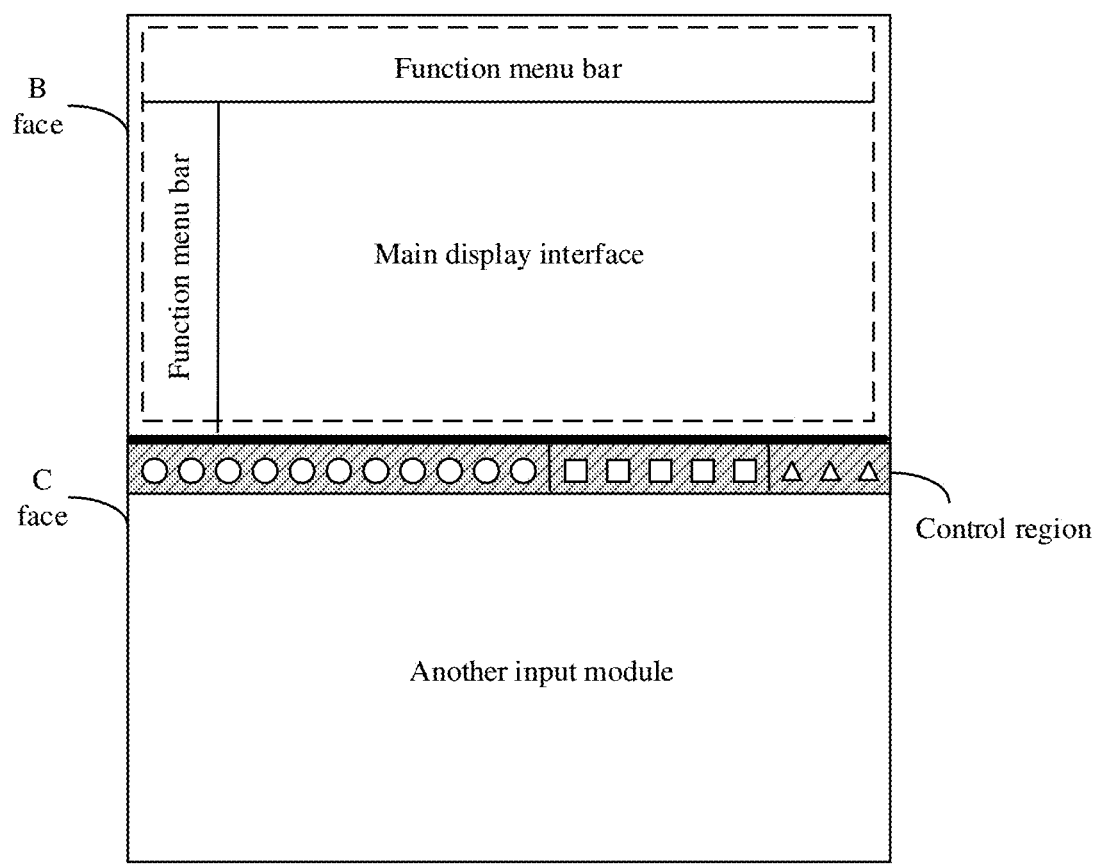

As shown in FIG. 76B-1 to FIG. 76B-3, when the display area of the application control bar is reduced, the control key in the control key group corresponding to the target application in the application control bar may be decreased. Optionally, in an embodiment, when the display area of the application control bar is reduced, a quantity of functional modules in the application control bar may be kept unchanged, and a quantity of control keys in the functional module is reduced. In another embodiment, when the display area of the application control bar is reduced, the functional module and the corresponding control key set in the application control bar may be decreased. In another embodiment, when the display area of the application control bar is reduced, the functional module, the corresponding control key set, and a quantity of control keys in another reserved functional module in the application control bar may all be decreased.

As described in the operation 6202, in an embodiment, the system may decrease, based on priorities of functional modules and control keys in an ascending order of priorities, some control keys based on the control key set displayed by the application control bar, and determine a layout of the application control bar after the control keys are decreased. In another embodiment, the system may select, based on the display area of the application control bar, the display manner of the application control bar that is provided by the application, to perform display in the control region.

Preferably, when the display area of the application control bar is reduced so that the control keys corresponding to the target application in the application control bar decrease, display of the decreased control keys on the first display may be restored. In this case, when the user needs to use these control keys, the user can perform an operation on the first display in a conventional manner through a touchscreen gesture or a mouse operation.

In the screen display method 7200, the display area of the application control bar and the control key group in the application control bar are changed based on an operation of indicating to change the display area of the target application control bar by the user. This allows more flexible display of the control region, meets different use requirements of the user in different use scenarios, and improves user experience.

In addition, when the display area of the application control bar is adjusted, a display area of another display region (such as a system control bar) in the control region or a display layout of another display module (such as a display interface of another application or the virtual keyboard) on the second display may be adaptively adjusted.

In addition, to help the user quickly locate a to-be-located control key without moving a line of sight to the second display, especially if the display area and a display key in the control region change, the to-be-located control key can still be quickly located, an anchor point feedback technology may be introduced to the control region. In an embodiment, when the user touches the control key in the application control bar, feedback may be provided for the user, to indicate that the user touches the control key in the application control bar. In another embodiment, when the user touches a control key in the system control bar, feedback may be provided for the user, to indicate that the user touches the control key in the system control bar. In another possible embodiment, some control keys that have important functions or that are frequently used by the user in the application control bar or the system control bar may be set as anchor point feedback keys, so that the user quickly locates these important or frequently used control keys. For a specific embodiment of the anchor point feedback, refer to Embodiment 1. Details are not described herein again.

It should be noted that this embodiment of the present invention does not limit a quantity of times of performing operation 7201 and operation 7202. The user may perform an operation of changing the display area of the application control bar for a plurality of times. The system may obtain in real time the operation that the user indicates to change the display area of the application control bar, and change the display area of the application control bar and the control key group in the application control bar for a plurality of times based on the user operation.

It should be noted that, optionally, in addition to operations 7201 and 7202, the screen display method 7200 may further include one or more operations in the screen display method 6200. A specific embodiment of the one or more operations is described in the screen display method 6200. To avoid repetition, details are not described herein again.

The control region displayed on the second display has an output function, that is, is used as a human-computer interaction interface to display a set of some control keys of the target application to the user. In addition, the control region may further have some input functions, for example, a touchscreen gesture function, to receive input of the user, to further perform some operations on the target application or perform some operations on the control region.

In an embodiment, the control region may receive input of the user, to implement control on the target application function. For example, when the target application is mainly used to edit a document, a control key set in the control region corresponding to the target application may include a control key for processing text content, such as copy, paste, and cut. In this case, the text content may be edited by tapping a control key in the control region through a touchscreen gesture or selecting a control key in the control region by using a mouse. When the target application is mainly used to play video content, a control key set in the control region corresponding to the target application may include a control key for controlling the video content, such as a volume control key, a brightness control key, or a progress control bar. In this case, volume, brightness, playback progress, and the like of a video may be controlled by tapping a corresponding control key in the control region through the touchscreen gesture or selecting the corresponding control key in the control region by using the mouse. It should be understood that the target application and the control keys for operating the target application are examples, and another common target application and a common control key in the art are also possible.

In another embodiment, the user may operate the target application on the first display by using the control key set in the control region and in another input mode. For example, the user may select a specific object on an editing page by using the mouse or the touchscreen gesture on the first display, and edit the selected object by using the control key set in the control region. It should be understood that cooperative control based on the control key set in the control region and the mouse or the touchscreen gesture is only an example, and another possible cooperative mode that can implement an operation on the target application on the first display is also possible.

In an embodiment of the present invention, a user may view, edit, and customize the control key set in the control region. In an embodiment, the control region may support the following touchscreen gesture operations of the user:

(1) Touchscreen Gesture Operation

Figure 77A:
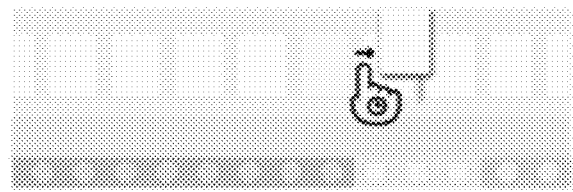
FIG. 77A shows a gesture control method according to an embodiment of the present invention.
Figure 77B:
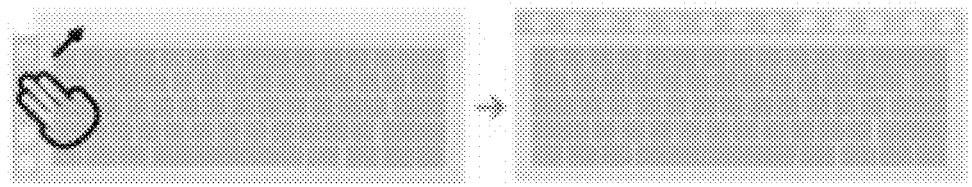
FIG. 77B shows another gesture control method according to an embodiment of the present invention.

In an embodiment, the operation may be performed on the control region through a drag gesture. For example, the drag gesture may be used to drag a control key at a specific location in the control region to another location in the control region, as shown in FIG. 77A. The drag gesture may be further used to drag a functional module in the control region as a whole to another location in the control region. As shown in FIG. 77B, the drag gesture may be further used to move a location of the entire control region on the second display.

Figure 77C:
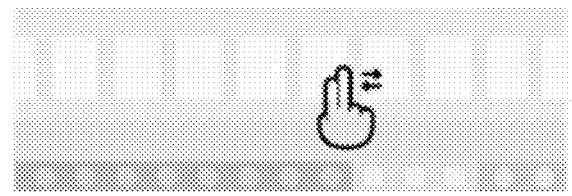
FIG. 77C shows another gesture control method according to an embodiment of the present invention.

In another embodiment, the operation may be performed on the control region through a slide gesture. For example, the slide gesture may be used to browse display content in the control region. For example, when a specific functional module does not display all control keys due to a limitation of the display area of the control region, a control key that is not displayed in the functional module may be browsed through the slide gesture, as shown in FIG. 77C.

Figure 77D:
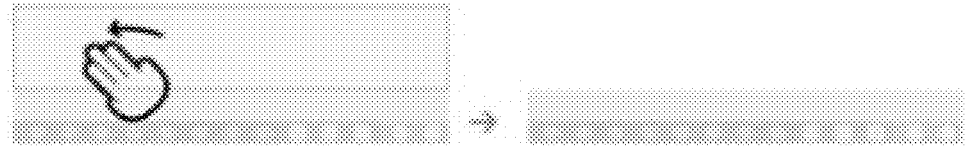
FIG. 77D shows another gesture control method according to an embodiment of the present invention.

In another embodiment, the operation may be performed on the control region through a flick gesture. For example, the flick gesture may be used to remove some content from the control region, as shown in FIG. 77D.

(2) Finger-Press Gesture Operation

Figure 78A:
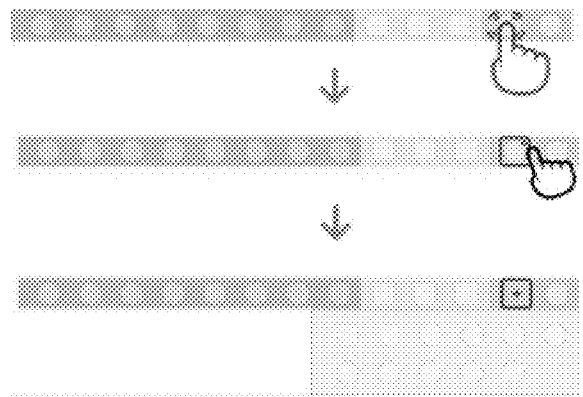
FIG. 78A shows another gesture control method according to an embodiment of the present invention.
Figure 78B:
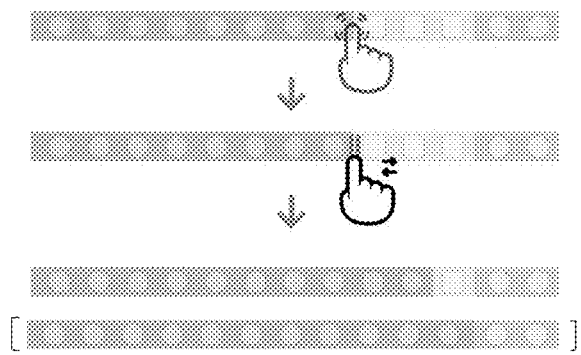
FIG. 78B shows another gesture control method according to an embodiment of the present invention.

The operation may be performed on the control region through a finger press gesture. When the finger press gesture of the user is received at different locations in the control region, different functions may be correspondingly performed. As shown in FIG. 78A, in an embodiment, if the finger press gesture of the user is received on a control key in the control region, a delete key of the current control key may be displayed, and the control key is deleted by using the delete key. In addition, after the control key is deleted, a corresponding display location may be displayed as null, and an add key is displayed. The user may add a new control key to the location by using the add key. As shown in FIG. 78B, if the finger press gesture is received at a boundary of different functional modules, a function of moving an edge of two functional modules divided by the boundary may be triggered. The user may drag the boundary to change display areas of the two functional modules. Specifically, a display area of one functional module is increased, and a display area of the other functional module is decreased. Based on a priority sequence of control keys in the two functional modules, control keys displayed in the functional module with the increased display area may be increased, and control keys displayed in the functional module with the decreased display area may be decreased.

(3) Floating Gesture Operation

Figure 79:
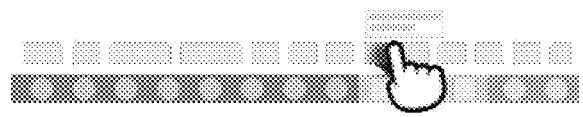
FIG. 79 shows another gesture control method according to an embodiment of the present invention.

The operation may be performed on the control region through a floating gesture. The floating gesture may be used to perform a preview operation. For example, as shown in FIG. 79, the floating gesture operation may be used to view content such as a name and an auxiliary prompt of a current control key. The floating gesture operation may be used to preview a control key that is not displayed in the current control region due to a limitation of the display area.

It should be understood that, the foregoing enumerated touchscreen gesture operations are only examples, and another common gesture operation manner in the art is also possible.

According to the embodiments corresponding to FIG. 60 to FIG. 79, to better reflect the solutions and beneficial effects of the embodiments of this application, the following provides a specific embodiment.

Figure 80A:
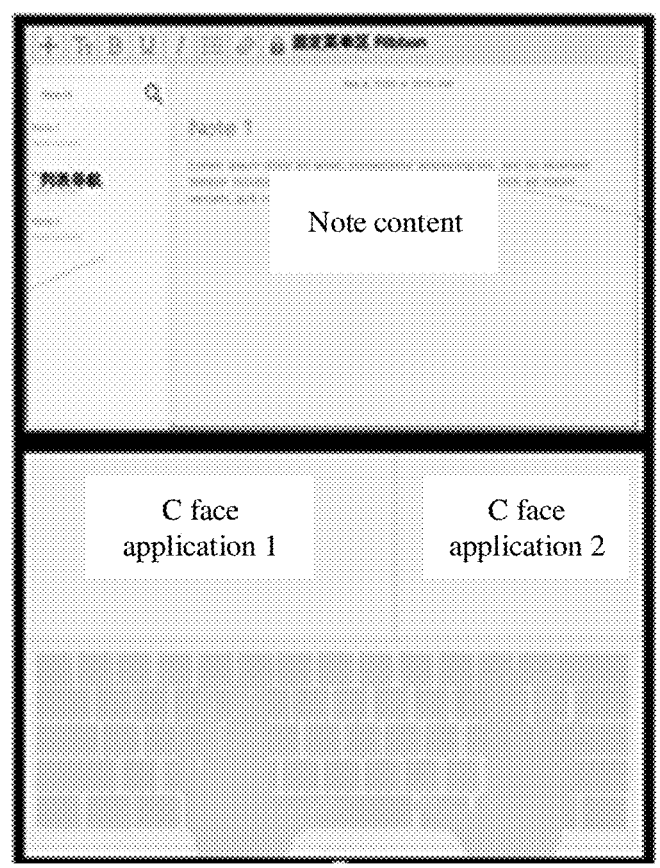
FIG. 80A shows a specific embodiment of a screen display method according to an embodiment of the present invention.

A note application on a dual-screen electronic device is used as an example. FIG. 80A shows a general display state. All content related to the note application is displayed on a first display. For example, FIG. 80A may include a main display region of note content and a function menu bar such as list navigation and a fixed menu bar. In the general display state, a user may operate the note application in a general operation manner, for example, control the note application by using a mouse or a touchscreen gesture on the first display.

When the user needs to enable an auxiliary operation of a control region on a second display, the user may activate the control region in the following four manners:

(1) If a virtual keyboard is disabled, the virtual keyboard and the control region may be simultaneously enabled when an instruction of the user for enabling the virtual keyboard is received.
(2) If the virtual keyboard is enabled, an instruction of the user for enabling an application control bar may be received by using a control key in the control region on the virtual keyboard, and the control region is enabled.
(3) The control region may be enabled when a gesture of enabling the control region by the user is received.
(4) When the note application is not displayed in a full-screen mode, the control region may be enabled when an instruction of a full-screen note application of the user is received.

Figure 80B:
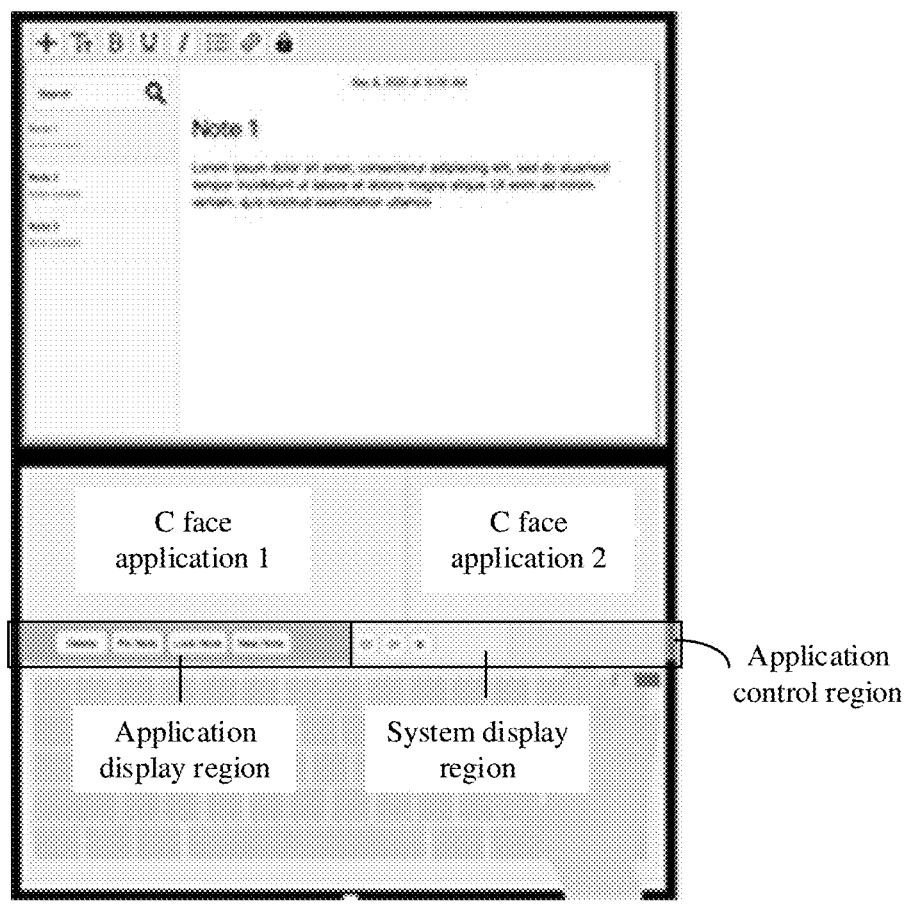
FIG. 80B shows another specific embodiment of a screen display method according to an embodiment of the present invention.

When the system receives an instruction for the user to activate the control region, the system displays, based on the embodiments in the method embodiment corresponding to the screen display method 6200 and a display area of the control region, a corresponding system control key group and a control key group corresponding to a target application in the control region on the second display, and correspondingly reduces a display area of another application on the second display. For example, as shown in FIG. 80B, when an initial display area of the control region is the smallest, only a system control key group related to system control is displayed in a system control bar in the control region, and some control key groups corresponding to the target application are displayed in the application control bar.

Figure 80C:
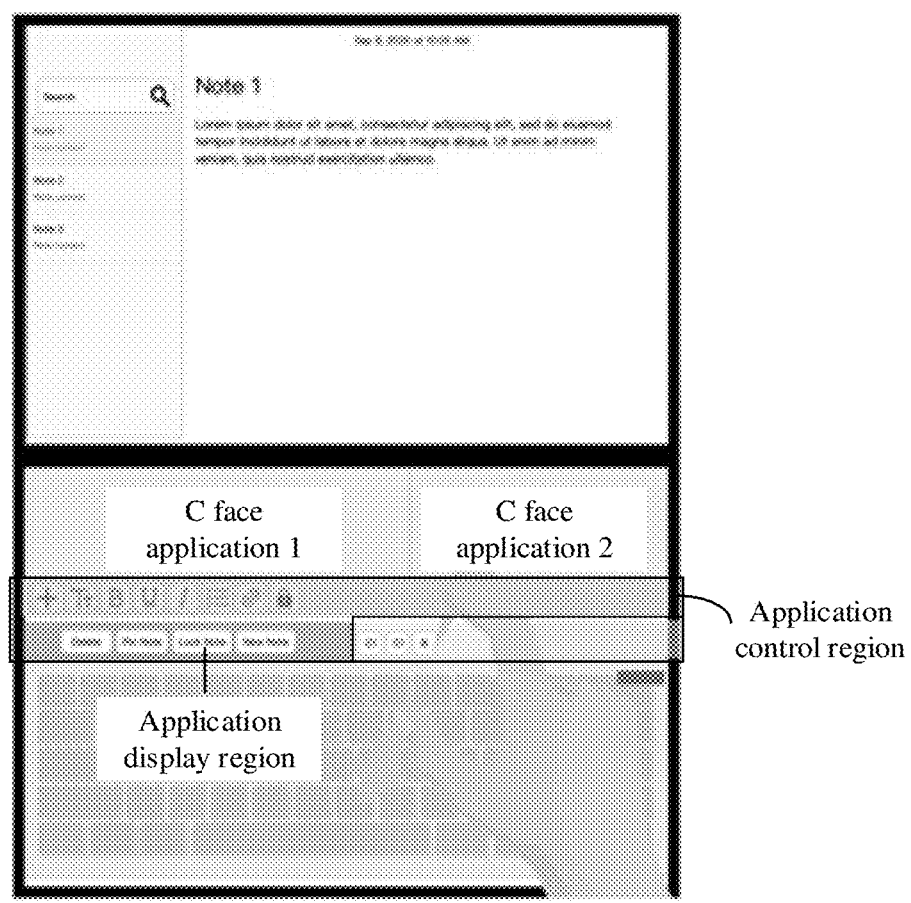
FIG. 80C shows another specific embodiment of a screen display method according to an embodiment of the present invention.
Figure 80D:
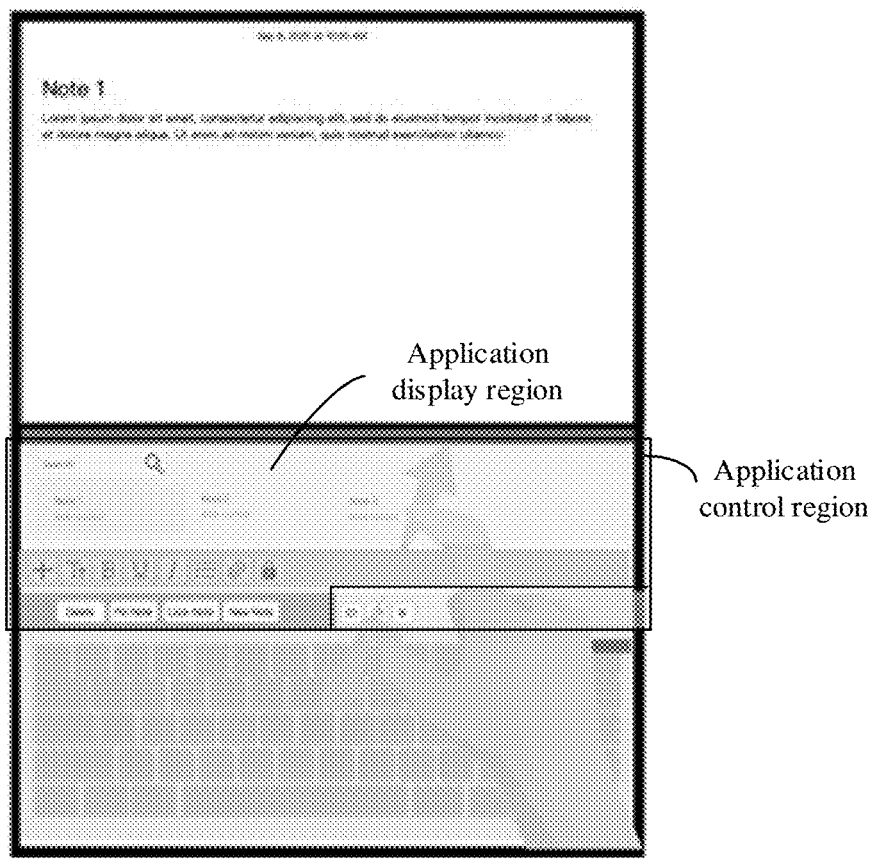
FIG. 80D shows another specific embodiment of a screen display method according to an embodiment of the present invention.

When an operation of changing a display area of the application control bar by the user is received, for example, as shown in FIG. 80C, when the user expands the display area of the application control bar through a zoom-in gesture, the system expands the display areas of both the control region and the application control bar based on the user operation, and adds a functional module and a control key group thereof that correspond to the note application to the application control bar. Similarly, a function menu bar that is originally displayed on the first display and that corresponds to the functional module is removed. As shown in FIG. 80D, when the user further expands the display area of the application control bar through a zoom-in gesture, the system further expands the display areas of both the control region and the application control bar based on the user operation, and adds another functional module and a control key group thereof that correspond to the note application to the application control bar. Similarly, the function menu bar that is originally displayed on the first display and that corresponds to the functional module is removed.

Figure 80E:
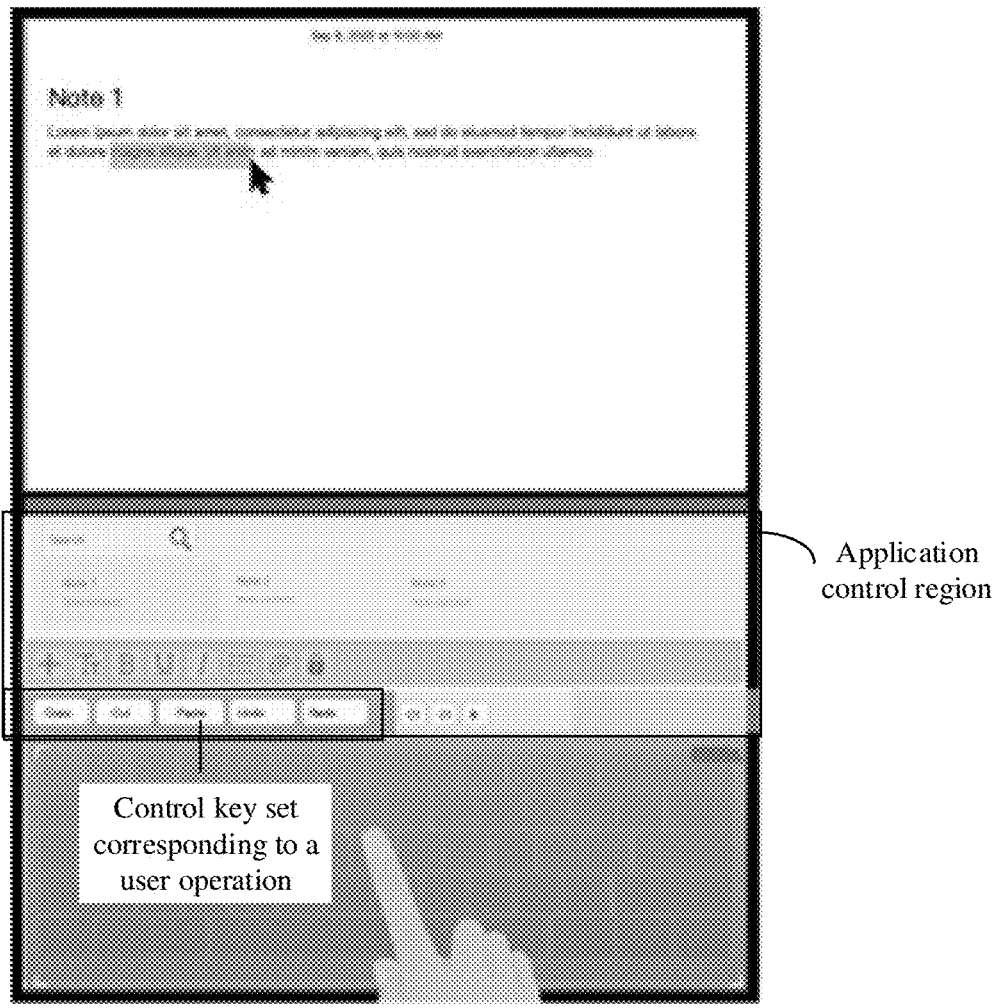
FIG. 80E shows another specific embodiment of a screen display method according to an embodiment of the present invention.

When the user performs an operation on the target application, for example, as shown in FIG. 80E, selects a part of text in an operation interface of the target application, a current user operation on the target application is obtained, and a control key group corresponding to the current user operation on the target application, for example, copy, paste, or cut, is displayed in the application control bar based on the user operation. When the user changes the current operation on the target application, for example, selects some pictures in the operation interface of the target application, the current user operation on the target application is obtained, and a control key group corresponding to the previous user operation in the application control bar is changed to a control key group corresponding to a next user operation based on the user operation.

Figure 80F:
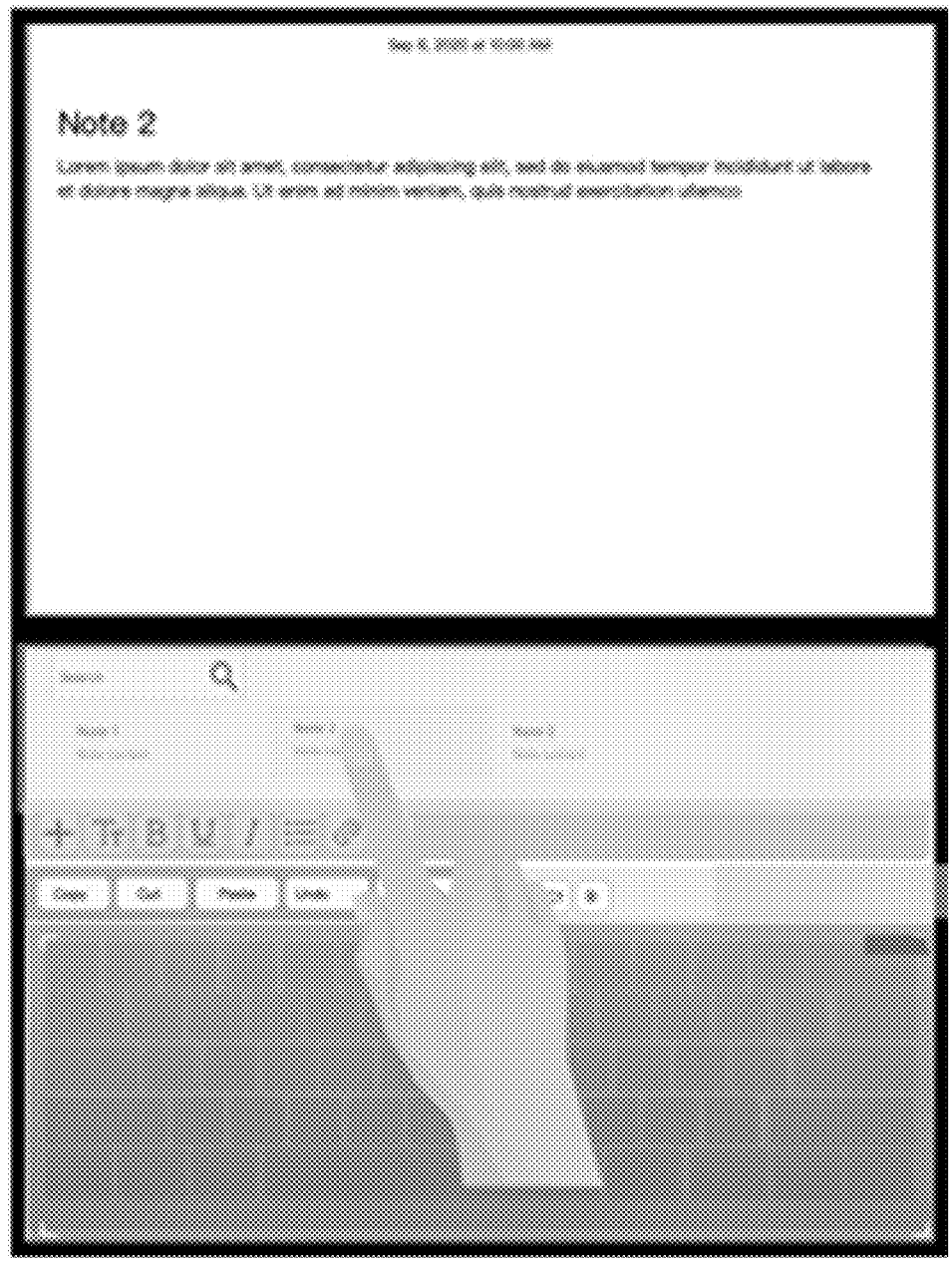
FIG. 80F shows another specific embodiment of a screen display method according to an embodiment of the present invention.
Figure 80G:
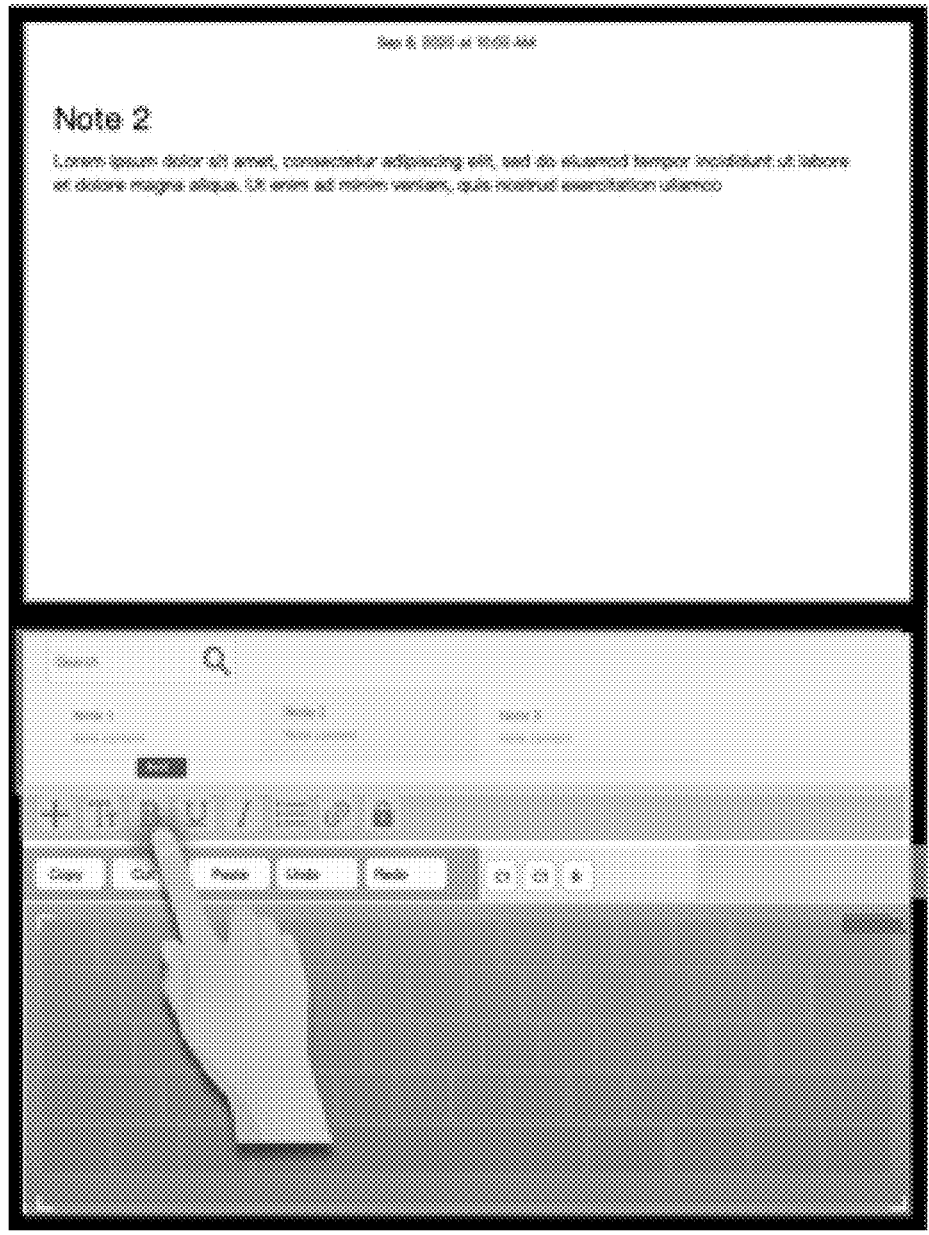
FIG. 80G shows another specific embodiment of a screen display method according to an embodiment of the present invention.

The user may operate the target application on the first display by using a control key in the control region of the second display. For example, as shown in FIG. 80F, the user may select, by tapping a control key in the functional module, a specific note to be browsed in the note application, and the user may edit a currently displayed note by tapping a control key in the functional module. In addition, the user may further perform an operation on the application control bar. For example, as shown in FIG. 80G, the user may customize and edit display content of the application control bar, or the user may view a name, a function, or another description of a control key in the control region through a floating gesture.

If the user does not need to use the control region for an auxiliary operation, the user can disable the control region in the following manners:

(1) If the virtual keyboard is enabled, the virtual keyboard and the control region may be simultaneously disabled when an instruction of the user for disabling the virtual keyboard is received.

(2) If the virtual keyboard is enabled, an instruction of the user for disabling an application control bar may be received by using a control key in the control region on the virtual keyboard, and the control region is disabled.

(3) The control region may be disabled when a gesture of disabling the control region by the user is received.

(4) When the note application is displayed in a full-screen mode, the control region may be disabled when an instruction of the user for disabling the full-screen display mode is received.

It may be understood that, to implement the foregoing functions, the electronic device includes corresponding hardware and/or software modules for performing the functions. With reference to the method operations of examples described in embodiments disclosed in this specification, this application may be implemented in a form of hardware or a combination of hardware and computer software. Whether a function is performed by hardware or hardware driven by computer software depends on particular applications and design constraints of the technical solution. A person skilled in the art may use different methods to implement the described functions for each particular application with reference to embodiments, but it should not be considered that the implementation goes beyond the scope of this application.

In this embodiment, the electronic device may be divided into functional modules based on the foregoing method examples. For example, each functional module corresponding to each function may be obtained through division, or two or more functions may be integrated into one processing module. The integrated module may be implemented in a form of hardware. It should be noted that module division in this embodiment is an example and is merely logical function division. In actual implementation, there may be another division manner.

Figure 81:
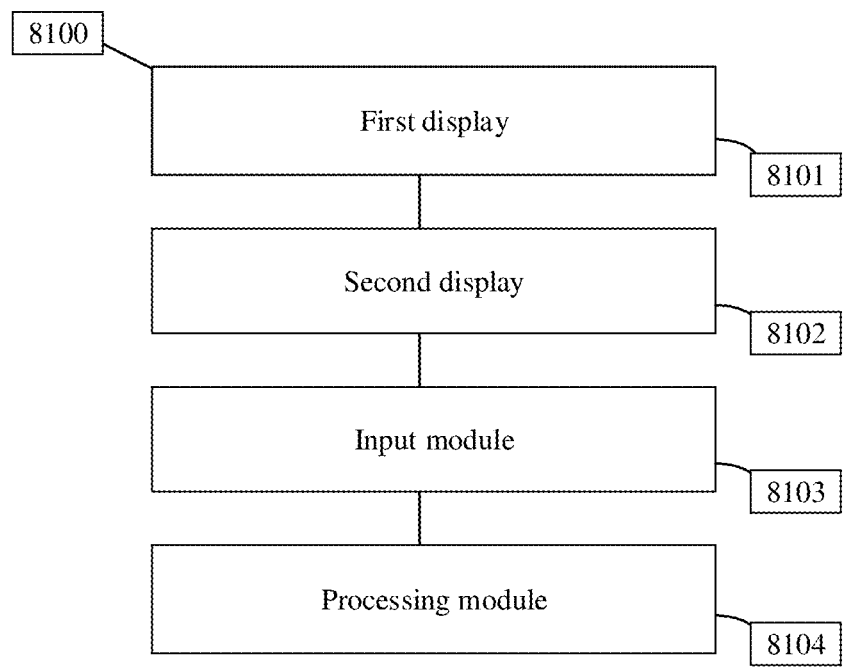
FIG. 81 shows an electronic device according to an embodiment of the present invention.

When the functional modules are obtained through division based on the corresponding functions, FIG. 81 is a schematic diagram of a possible composition of the electronic device in the foregoing method embodiments. As shown in FIG. 81, the electronic device 8100 may include a first display 8101, a second display 8102, an input module 8103, and a processing module 8104.

The first display 8101 may be configured to support the electronic device 8100 in displaying a target application interface, and/or be configured perform another process of the technology described in this specification.

In a dual-screen display electronic device, the first display usually carries an output function, that is, displays content such as a state of a target application and an execution result of a user operation. Optionally, the display content of the first display may include a main display interface of the target application and some function menu bars. In addition, the first display may further carry an input function, and an operation may be performed on the first display through a touchscreen gesture, to implement the input function.

The second display 8102 may be configured to support the electronic device 8100 in displaying a control region, and/or be configured perform another process of the technology described in this specification.

In a dual-screen display electronic device, in an embodiment, the second display may carry an input function, that is, receive input of a user. In another embodiment, the second display may alternatively carry an output function, that is, display content such as the state of the target application and the execution result of the user operation. The electronic device 8100 displays the control region on the second display, so that the user can control the target application on the first display by using the control region on the second display. This improves operation efficiency and user experience.

The input module 8103 may be configured to support the electronic device 8100 in performing operation 6202 in the screen display method 6200, may be configured to support the electronic device 8100 in performing operation 7101 in the screen display method 7100, may be configured to support the electronic device 8100 in performing operation 7201 in the screen display method 7200, and/or is configured to perform another process of the technology described in this specification.

Specifically, in operation 6202 and operation 7101, the input module is configured to receive an operation performed by the user on the target application. In an embodiment, the user may operate the target application by operating a mouse. In this case, the input module may be the mouse. In another embodiment, the user may operate the target application through a touchscreen gesture. In this case, the input module may be the first display. In another embodiment, the user may perform an operation on the target application through a mid-air gesture. In this case, the input module may be a depth camera configured to collect gesture information, or the like. In operation 7201, the input module is configured to receive an operation of changing the display area of the application control bar by the user. In an embodiment, the user may perform an operation on the second display through a touchscreen gesture, to change the display area of the application control bar. In this case, the input module may be the second display. In another embodiment, the user may change the display area of the application control bar by using the mouse. In this case, the input module may be the mouse. In another embodiment, the user may change the display area of the application control bar through a mid-air gesture. In this case, the input module may be a depth camera configured to collect gesture information, or the like.

The processing module 8104 may be configured to support the electronic device 8100 in performing operations 6201, 6203, 6204, 6205, and 6206 in the screen display method 6200, may be configured to support the electronic device 8100 in performing operations 7102 and 7103 in the screen display method 7100, may be configured to support the electronic device 8100 in performing operation 7202 in the screen display method 7200, and/or is configured to perform another process of the technology described in this specification.

The processing module may be a processor or a controller. The processor may implement or execute various example logical blocks, modules, and circuits described with reference to content disclosed in this application. The processor may be alternatively a combination for implementing a computing function, for example, a combination including one or more microprocessors or a combination of a digital signal processor (DSP) and a microprocessor.

It should be noted that content such as information exchange and an execution process between the modules/units in the electronic device 8100 is based on a same concept as the method embodiments corresponding to FIG. 60 to FIG. 79 in this application. For specific content, refer to the descriptions in the foregoing method embodiments in this application. Details are not described herein again.

Figure 82:
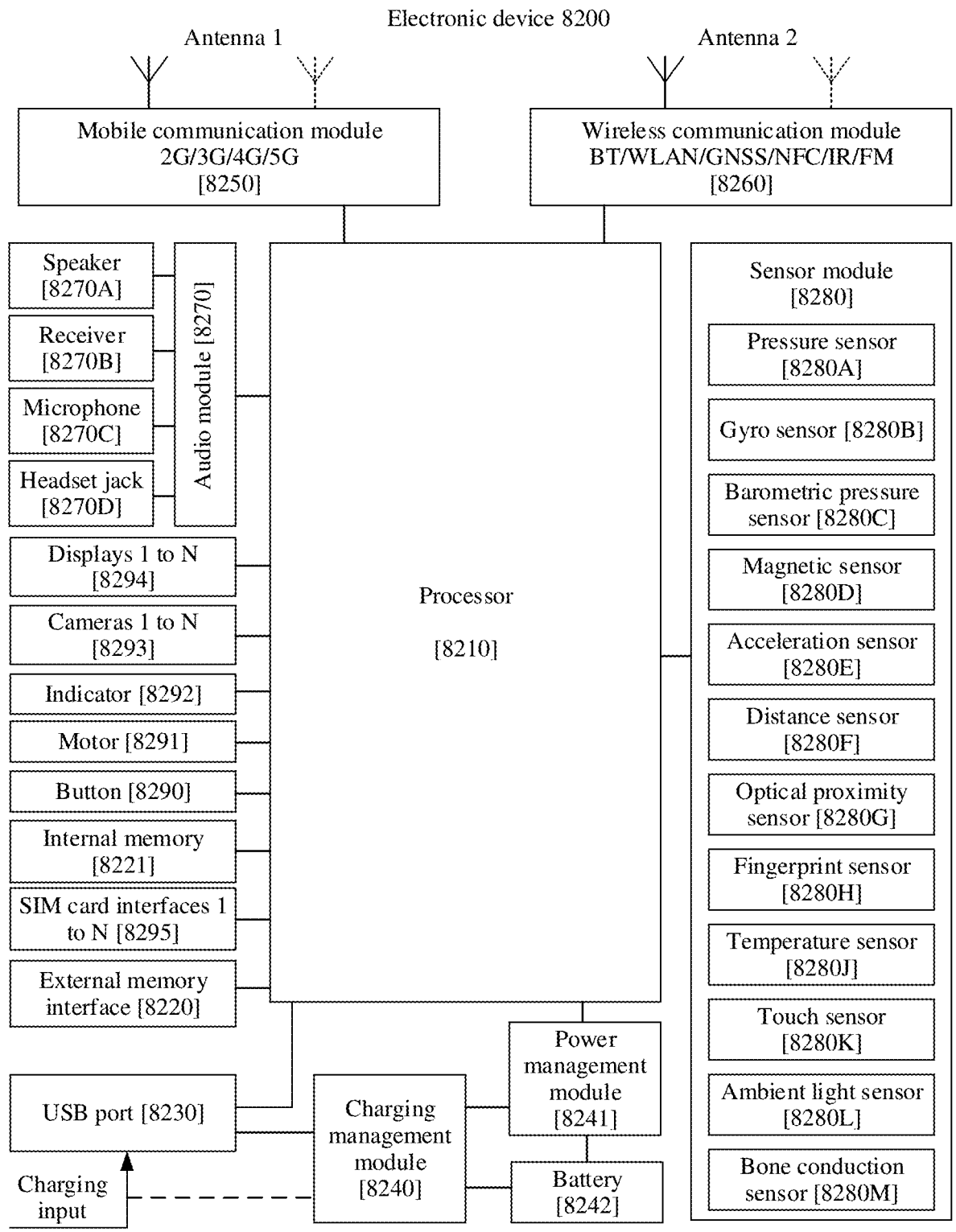
FIG. 82 shows another electronic device according to an embodiment of the present invention.

For example, FIG. 82 is a schematic diagram of a structure of an electronic device 8200. The electronic device 8200 may be specifically represented as a dual-screen electronic device, for example, a notebook computer, an ultra-mobile personal computer (UMPC), a netbook, or a personal digital assistant (PDA) that have two displays or curved screens or have a flexible folding screen. Alternatively, the electronic device may be represented as two electronic devices that are connected and used synchronously, for example, two tablet computers or two mobile phones. A specific type of an electronic device having two displays is not limited in this embodiment of this application.

The electronic device 8200 may include a processor 8210, an external memory interface 8220, an internal memory 8221, a universal serial bus (USB) port 8230, a charging management module 8240, a power management module 8241, a battery 8242, an antenna 1, an antenna 2, a mobile communication module 8250, a wireless communication module 8260, an audio module 8270, a speaker 8270A, a receiver 8270B, a microphone 8270C, a headset jack 8270D, a sensor module 8280, a button 8290, a motor 8291, an indicator 8292, a camera 8293, a display 8294, a subscriber identity module (SIM) card interface 8295, and the like. The sensor module 8280 may include a pressure sensor 8280A, a gyro sensor 8280B, a barometric pressure sensor 8280C, a magnetic sensor 8280D, an acceleration sensor 8280E, a distance sensor 8280F, an optical proximity sensor 8280G, a fingerprint sensor 8280H, a temperature sensor 8280J, a touch sensor 8280K, an ambient light sensor 8280L, a bone conduction sensor 8280M, and the like.

It may be understood that the structure shown in this embodiment of this application does not constitute a specific limitation on the electronic device 8200. In some other embodiments of this application, the electronic device 8200 may include more or fewer components than those shown in the figure, or some components may be combined, or some components may be split, or a different component arrangement may be used. The components shown in the figure may be implemented by hardware, software, or a combination of software and hardware.

The processor 8210 may include one or more processing units. For example, the processor 8210 may include an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. Different processing units may be independent components, or may be integrated into one or more processors.

The controller may be a nerve center and a command center of the electronic device 8200. The controller may generate an operation control signal based on instruction operation code and a time sequence signal, to complete control of instruction fetching and instruction execution. A memory may be further disposed in the processor 8210, and is configured to store instructions and data. In some embodiments, the memory in the processor 8210 is a cache memory. The memory may store instructions or data that has been recently used or cyclically used by the processor 8210. If the processor 8210 needs to use the instructions or the data again, the processor may directly invoke the instructions or the data from the memory. This avoids repeated access, reduces waiting time of the processor 8210, and improves system efficiency.

In some embodiments, the processor 8210 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) port, and/or the like.

The power management module 8241 is configured to connect the battery 8242, the charging management module 8240, and the processor 8210. The power management module 8241 receives input of the battery 8242 and/or the charging management module 8240, to supply power to the processor 8210, the internal memory 8221, an external memory, the display 8294, the camera 8293, the wireless communication module 8260, and the like. The power management module 8241 may be further configured to monitor parameters such as a battery capacity, a battery cycle count, and a battery state of health (electric leakage or impedance). In some other embodiments, the power management module 8241 may alternatively be provided in the processor 8210. In some other embodiments, the power management module 8241 and the charging management module 8240 may alternatively be provided in a same device.

The electronic device 8200 implements a display function by using the GPU, the display 8294, the application processor, and the like. The GPU is a microprocessor for image processing, and is connected to the display 8294 and the application processor. The GPU is configured to: perform mathematical and geometric computation, and render an image. The processor 8210 may include one or more GPUs that execute program instructions to generate or change display information.

The display 8294 is configured to display an image, a video, and the like. The display 8294 includes a display panel. The display panel may be a liquid crystal display (LCD), an organic light-emitting diode (OLED), an active-matrix organic light-emitting diode (AMOLED), a flexible light-emitting diode (FLED), a mini-LED, a micro-LED, a micro-OLED, a quantum dot light-emitting diode (QLED), or the like. In this embodiment of the present invention, the display 8294 is divided into a first display and a second display. The first display or the second display may have an input function, for example, control the display through a touchscreen gesture.

The external memory interface 8220 may be configured to connect to an external memory card, for example, a micro SD card, to extend a storage capability of the electronic device 8200. The external memory card communicates with the processor 8210 through the external memory interface 8220, to implement a data storage function. For example, files such as music and videos are stored in the external storage card.

The internal memory 8221 may be configured to store computer-executable program code, and the executable program code includes instructions. The processor 8210 runs the instructions stored in the internal memory 8221, to perform various function applications and data processing of the electronic device 8200. The internal memory 8221 may include a program storage region and a data storage region. The program storage region may store an operating system, an application required by one or more functions (for example, a sound play function and an image play function), and the like. The data storage region may store data (for example, audio data and a phone book) and the like created when the electronic device 8200 is used. In addition, the internal memory 8221 may include a high-speed random access memory, and may further include a nonvolatile memory, for example, one or more magnetic disk storage devices, a flash memory, a universal flash storage (UFS), or the like.

An embodiment further provides a computer storage medium. The computer storage medium stores computer instructions, and when the computer instructions are run on an electronic device, the electronic device is enabled to perform the foregoing related method operations, to implement the screen display method in the foregoing embodiments.

An embodiment further provides a computer program product. When the computer program product is run on a computer, the computer is enabled to perform the foregoing related operations, to implement the screen display method in the foregoing embodiments.

In addition, an embodiment of this application further provides an apparatus. The apparatus may be specifically a chip, a component, or a module. The apparatus may include a processor and a memory that are connected to each other. The memory is configured to store computer executable instructions. When the apparatus runs, the processor may execute the computer executable instructions stored in the memory, to enable the chip to perform the screen display method in the foregoing method embodiments.

The electronic device, the computer storage medium, the computer program product, or the chip provided in embodiments is configured to perform the corresponding method provided above. Therefore, for beneficial effects that can be achieved, refer to the beneficial effects of the corresponding method provided above. Details are not described herein again.

Based on descriptions about the foregoing embodiments, a person skilled in the art may understand that, for a purpose of convenient and brief description, division into the foregoing functional modules is used as an example for illustration. In actual application, the foregoing functions may be allocated to different functional modules and implemented based on a requirement. In other words, an inner structure of an apparatus is divided into different functional modules to implement all or some of the functions described above.

In the several embodiments provided in this application, it should be understood that the disclosed apparatuses and methods may be implemented in other manners. For example, the described apparatus embodiment is only an example. For example, division into the modules or the units is only logical function division and may be other division in an actual embodiment. For example, a plurality of units or components may be combined or integrated into another apparatus, or some characteristics may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separate, and components displayed as units may be one or more physical units, may be located in one place, or may be distributed on different places. Some or all of the units may be selected based on actual requirements to achieve the objectives of the solutions in embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software function unit.

When the integrated unit is implemented in the form of a software functional unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor to perform all or some of the operations of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are only specific embodiments of this application, but are not intended to limit the protection scope of this application. Any variation or replacement readily figured out by a person skilled in the art in the technical scope disclosed in this application should fall within the protection scope of this application. Therefore, the protection scope of this application should be subject to the protection scope of the claims.

What is claimed is:

1. A feedback method, comprising:
   detecting a first contact operation acting on a touchscreen of an electronic device;
   obtaining, in response to the first contact operation, first location information of a first contact point corresponding to the first contact operation, wherein the first location information corresponds to a first virtual key on a virtual keyboard;

when the first virtual key is an anchor point key, obtaining a first vibration feedback element from a plurality of vibration feedback elements of the touchscreen, wherein the first vibration feedback element is a vibration feedback element that matches the first virtual key;

obtaining a vibration intensity of a vibration wave corresponding to each of at least one first vibration feedback element, wherein the vibration intensity of the vibration wave of each of the at least one first vibration feedback element is related to a first quantity, and the first quantity is a quantity of the first vibration feedback elements;

indicating the first vibration feedback element to emit the vibration wave, to perform a first feedback operation, wherein the first feedback operation prompts the first virtual key is the anchor point key; and emitting, based on the vibration intensity of the vibration wave corresponding to each first vibration feedback element, the vibration wave using the at least one first vibration feedback element, so that a difference between a vibration feedback intensity corresponding to the first virtual key and a vibration feedback intensity corresponding to a second virtual key falls within a preset intensity range, wherein the second virtual key and the first virtual key are different virtual keys, wherein the electronic device stores location information of each virtual key on a first type of virtual keyboard, and after the electronic device obtains the first location information of the first contact point corresponding to the first contact operation, the method further comprises:

obtaining, based on the first location information and the first type of virtual keyboard, the first virtual key corresponding to the first contact point.

2. The method according to claim 1, wherein a first mapping relationship is configured for the electronic device that indicates a correspondence between virtual keys and vibration feedback elements, and the obtaining the first vibration feedback element from the plurality of vibration feedback elements comprises:

obtaining the first vibration feedback element based on the first mapping relationship and the first virtual key.

3. The method according to claim 1, wherein a first mapping relationship is configured for the electronic device that indicates a correspondence between location information and vibration feedback elements, and the obtaining the first vibration feedback element from the plurality of vibration feedback elements comprises:

obtaining the first vibration feedback element based on the first mapping relationship and the first location information.

4. The method according to claim 1, wherein the first vibration feedback element is one of: a piezoelectric ceramic sheet, a linear motor, or a piezoelectric film.

5. The method according to claim 1, wherein before the performing the first feedback operation, the method further comprises:

obtaining, based on the first location information, a location type corresponding to the first contact point, wherein the location type comprises that the first contact point is located in a first location region of the first virtual key and the first contact point is located in a second location region of the first virtual key, the first location region is different from the second location region, and the second location region is contained within the first location region; and performance of the first feedback operation comprises:

performing the first feedback operation by using the touchscreen based on the location type corresponding to the first contact point, wherein a feedback operation corresponding to the first location region is different from a feedback operation corresponding to the second location region.

6. The method according to claim 1, wherein before the detecting the first contact operation acting on the touchscreen, the method further comprises:

selecting, in response to a detected first gesture operation, the first type of virtual keyboard corresponding to the first gesture operation from a plurality of types of virtual keyboards, wherein virtual keys comprised in different types of virtual keyboards in the plurality of types of virtual keyboards are not completely the same; and displaying the first type of virtual keyboard by using the touchscreen, wherein a location of the first type of virtual keyboard on the touchscreen is fixed in a process of displaying the first type of virtual keyboard; and the detecting the first contact operation acting on the touchscreen comprises:

detecting the first contact operation acting on the touchscreen in the process of displaying the first type of virtual keyboard.

7. An electronic device, comprising:

a touchscreen comprising a tactile sensing module and a vibration feedback module, and the vibration feedback module comprises a plurality of vibration feedback elements;

the tactile sensing module is configured to obtain first location information of a first contact point on the touchscreen;

a processor configured to obtain a vibration intensity of a vibration wave corresponding to each of at least one first vibration feedback element, wherein the vibration intensity of the vibration wave of each of the at least one first vibration feedback element is related to a first quantity, and the first quantity is a quantity of the first vibration feedback elements;

a first vibration feedback element is configured to emit the vibration wave when a first virtual key corresponding to the first contact point is an anchor point key, wherein the vibration wave prompts the first virtual key is the anchor point key, and the first vibration feedback element emits, based on the vibration intensity of the vibration wave corresponding to each first vibration feedback element, the vibration wave using the at least one first vibration feedback element, so that a difference between a vibration feedback intensity corresponding to the first virtual key and a vibration feedback intensity corresponding to a second virtual key falls within a preset intensity range, wherein the second virtual key and the first virtual key are different virtual keys; and the first virtual key is a virtual key on a virtual keyboard, and the first vibration feedback element is a vibration feedback element that matches the first virtual key in the plurality of vibration feedback elements, wherein the electronic device stores location information of each virtual key on a first type of virtual keyboard, and after the tactile sensing module obtains the first location information of the first contact point corresponding to the first contact operation, the electronic device is further configured to:

obtain, based on the first location information and the first type of virtual keyboard, the first virtual key corresponding to the first contact point.

8. The device according to claim 7, wherein
the touchscreen further comprises a cover and an ultrasonic module, and the ultrasonic module is configured to emit an ultrasonic wave to change a tactile characteristic of the cover; or
the touchscreen further comprises a cover and an electrostatic module, and the electrostatic module is configured to generate an electrical signal to change a tactile characteristic of the cover; and
the tactile characteristic comprises one or more of the following characteristics: a sliding friction coefficient, a stick slip property, and a temperature.

9. The device according to claim 7, wherein the touchscreen further comprises a pressure sensing module, the pressure sensing module and the vibration feedback module are integrated, and the vibration feedback element is a piezoelectric ceramic sheet, a piezoelectric polymer, or a piezoelectric composite.

10. An electronic device, wherein the electronic device comprises a touchscreen, a memory, one or more processors, and one or more programs, the touchscreen is provided with a plurality of vibration feedback elements, the one or more programs are stored in the memory, and when the one or more processors execute the one or more programs, the electronic device is enabled to perform operations, comprising:
detecting a first contact operation acting on the touchscreen;
obtaining, in response to the first contact operation, first location information of a first contact point corresponding to the first contact operation, wherein the first location information corresponds to a first virtual key on a virtual keyboard;
when the first virtual key is an anchor point key, obtaining a first vibration feedback element from the plurality of vibration feedback elements, wherein the first vibration feedback element is a vibration feedback element that matches the first virtual key;
obtaining a vibration intensity of a vibration wave corresponding to each of at least one first vibration feedback element, wherein the vibration intensity of the vibration wave of each of the at least one first vibration feedback element is related to a first quantity, and the first quantity is a quantity of the first vibration feedback elements;
indicating the first vibration feedback element to emit the vibration wave, to perform a first feedback operation, wherein the first feedback operation prompts the first virtual key is the anchor point key; and
emitting, based on the vibration intensity of the vibration wave corresponding to each first vibration feedback element, the vibration wave using the at least one first vibration feedback element, so that a difference between a vibration feedback intensity corresponding to the first virtual key and a vibration feedback intensity corresponding to a second virtual key falls within a preset intensity range, wherein the second virtual key and the first virtual key are different virtual keys,
wherein the electronic device stores location information of each virtual key on a first type of virtual keyboard, and after the electronic device obtains the first location information of the first contact point corresponding to the first contact operation, the method further comprises:

obtaining, based on the first location information and the first type of virtual keyboard, the first virtual key corresponding to the first contact point.

11. The electronic device according to claim 10, wherein a first mapping relationship is configured for the electronic device that indicates a correspondence between virtual keys and vibration feedback elements, when the one or more processors execute the one or more programs, the electronic device is enabled to perform the following operation:
obtaining the first vibration feedback element based on the first mapping relationship and the first virtual key.

12. The electronic device according to claim 10, wherein a first mapping relationship is configured for the electronic device that indicates a correspondence between location information and vibration feedback elements, when the one or more processors execute the one or more programs, the electronic device is enabled to perform the following operation:
obtaining the first vibration feedback element based on the first mapping relationship and the first location information.

13. The electronic device according to claim 10, wherein the first vibration feedback element is one of: a piezoelectric ceramic sheet, a linear motor, or a piezoelectric film.

14. The electronic device according to claim 10, wherein when the one or more processors execute the one or more programs, the electronic device is enabled to further perform the following operations:
obtaining, based on the first location information, a location type corresponding to the first contact point, wherein the location type comprises that the first contact point is located in a first location region of the first virtual key and the first contact point is located in a second location region of the first virtual key, the first location region is different from the second location region, and the second location region is contained within the first location region; and
performing the first feedback operation by using the touchscreen based on the location type corresponding to the first contact point, wherein a feedback operation corresponding to the first location region is different from a feedback operation corresponding to the second location region.

15. The electronic device according to claim 10, wherein when the one or more processors execute the one or more programs, the electronic device is enabled to further perform the following operations:
selecting, in response to a detected first gesture operation, the first type of virtual keyboard corresponding to the first gesture operation from a plurality of types of virtual keyboards, wherein virtual keys comprised in different types of virtual keyboards in the plurality of types of virtual keyboards are not completely the same;
displaying the first type of virtual keyboard by using the touchscreen, wherein a location of the first type of virtual keyboard on the touchscreen is fixed in the process of displaying the first type of virtual keyboard; and
detecting the first contact operation acting on the touchscreen in the process of displaying the first type of virtual keyboard.

16. A non-transitory machine readable medium having instructions stored thereon, which when loaded and executed by an electronic device, cause the electronic device to perform the method according to claim 1.

17. An electronic device, comprising a processor, wherein the processor is coupled to a memory, the memory stores program instructions, and when the program instructions stored in the memory are executed by the processor, the method according to claim 1 is performed.

\* \* \* \* \*